US012646033B2

(12) United States Patent
Khokhar et al.

(10) Patent No.: US 12,646,033 B2
(45) Date of Patent: *Jun. 2, 2026

(54) METHOD AND SYSTEM FOR ELECTRONIC TRANSACTION MANAGEMENT AND DATA EXTRACTION

(71) Applicant: Nammu21, Inc., New York, NY (US)

(72) Inventors: Someera Fazal Khokhar, Manhattan, NY (US); Joel Jerome Jarvis, Minneapolis, MN (US); Brian Shaw, Austin, TX (US); Darcy Binder, Montvale, NJ (US); Daniel Ayoub, Austin, TX (US); Adam Tyler Pugh, Austin, TX (US); Kusmina Gerasimina Laura Djohan Spender, London (GB); Jason Simmons, Pittsburgh, PA (US); Jordan Shelley, New York, NY (US); Paul DeGrote, Austin, TX (US)

(73) Assignee: NAMMU21, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,331

(22) Filed: Jun. 7, 2024

(65) Prior Publication Data

US 2024/0330858 A1      Oct. 3, 2024

Related U.S. Application Data

(63) Continuation of application No. 18/048,565, filed on Oct. 21, 2022, now Pat. No. 12,045,777, which is a
(Continued)

(51) Int. Cl.
    *G06Q 10/10*      (2023.01)
    *G06F 3/04842*    (2022.01)
    (Continued)

(52) U.S. Cl.
    CPC ......... *G06Q 10/10* (2013.01); *G06F 3/04842* (2013.01); *G06F 16/2379* (2019.01);
    (Continued)

(58) Field of Classification Search
    None
    See application file for complete search history.

(56) References Cited

U.S. PATENT DOCUMENTS

2013/0132814 A1*   5/2013   Mangini  ............... G06F 40/169
                                                              709/201
2013/0254710 A1*   9/2013   Banti  ..................... G06Q 10/10
                                                              715/810

(Continued)

OTHER PUBLICATIONS

F. S. Gharehchopogh and Z. A. Khalifelu, "Analysis and evaluation of unstructured data: text mining versus natural language processing, "20115th International Conference on Application of Information and Communication Technologies (AICT), 2011, pp. 1-4, doi: 10.1109/ICAICT.2011.6111017. (Year: 2011).*

(Continued)

*Primary Examiner* — Paul S Schwarzenberg
(74) *Attorney, Agent, or Firm* — Orrick, Herrington & Sutcliffe LLP

(57)                    ABSTRACT

A system and method for end-to-end transaction management, for example, for a structured finance market. The system and method digitizes and deconstructs complex interconnected transaction documents. The system creates transparency around the complexities of the transactions, generating significant efficiencies for existing market participants and enabling access to previously hidden and/or inaccessible data. In some embodiments, the platform supports a selected ecosystem (compared to specific use-cases within a market vertical) with a seamless integration of frameworks and schemas for the organization and structure of provisions, analytical tools extracting the required data, (Continued)

and the creation of metrics to informatively assess and calibrate the market. The system advantageously creates a digital language providing a tool, which will further enable the digitization of the finance ecosystem.

12 Claims, 120 Drawing Sheets

Related U.S. Application Data continuation of application No. 16/904,421, filed on Jun. 17, 2020, now Pat. No. 11,526,848.

(60) Provisional application No. 62/862,543, filed on Jun. 17, 2019.

(51) Int. Cl.

| | | |
|---|---|---|
| *G06F 16/23* | (2019.01) |
| *G06F 16/93* | (2019.01) |
| *G06F 40/205* | (2020.01) |
| *G06Q 30/018* | (2023.01) |
| *G06Q 30/04* | (2012.01) |
| *G06Q 40/03* | (2023.01) |

(52) U.S. Cl.
CPC ............ *G06F 16/93* (2019.01); *G06F 40/205* (2020.01); *G06Q 30/018* (2013.01); *G06Q 30/04* (2013.01); *G06Q 40/03* (2023.01)

(56) References Cited

U.S. PATENT DOCUMENTS

| | | | | |
|---|---|---|---|---|
| 2014/0143126 A1* | 5/2014 | Malik | .................... | G06Q 40/03 |
| | | | | 705/38 |
| 2017/0242852 A1* | 8/2017 | Clain | .................... | G06F 40/174 |
| 2018/0260368 A1* | 9/2018 | Vagell | .................. | G06F 16/176 |
| 2019/0121840 A1* | 4/2019 | Abbott | ................. | G06F 40/106 |
| 2020/0073642 A1* | 3/2020 | Koryakin | ............. | H04L 67/562 |

OTHER PUBLICATIONS

Gharehchopogh et al., "Analysis and evaluation of unstructured data: text mining versus natural language processing," In2011 5th International Conference on Application of Information and Communication Technologies (AICT) Oct. 1, 20112, pp. 1-4.

\* cited by examiner

Features
201

Intelligence
220

Navigation
215

Core Provisions
205

Figure 2B:
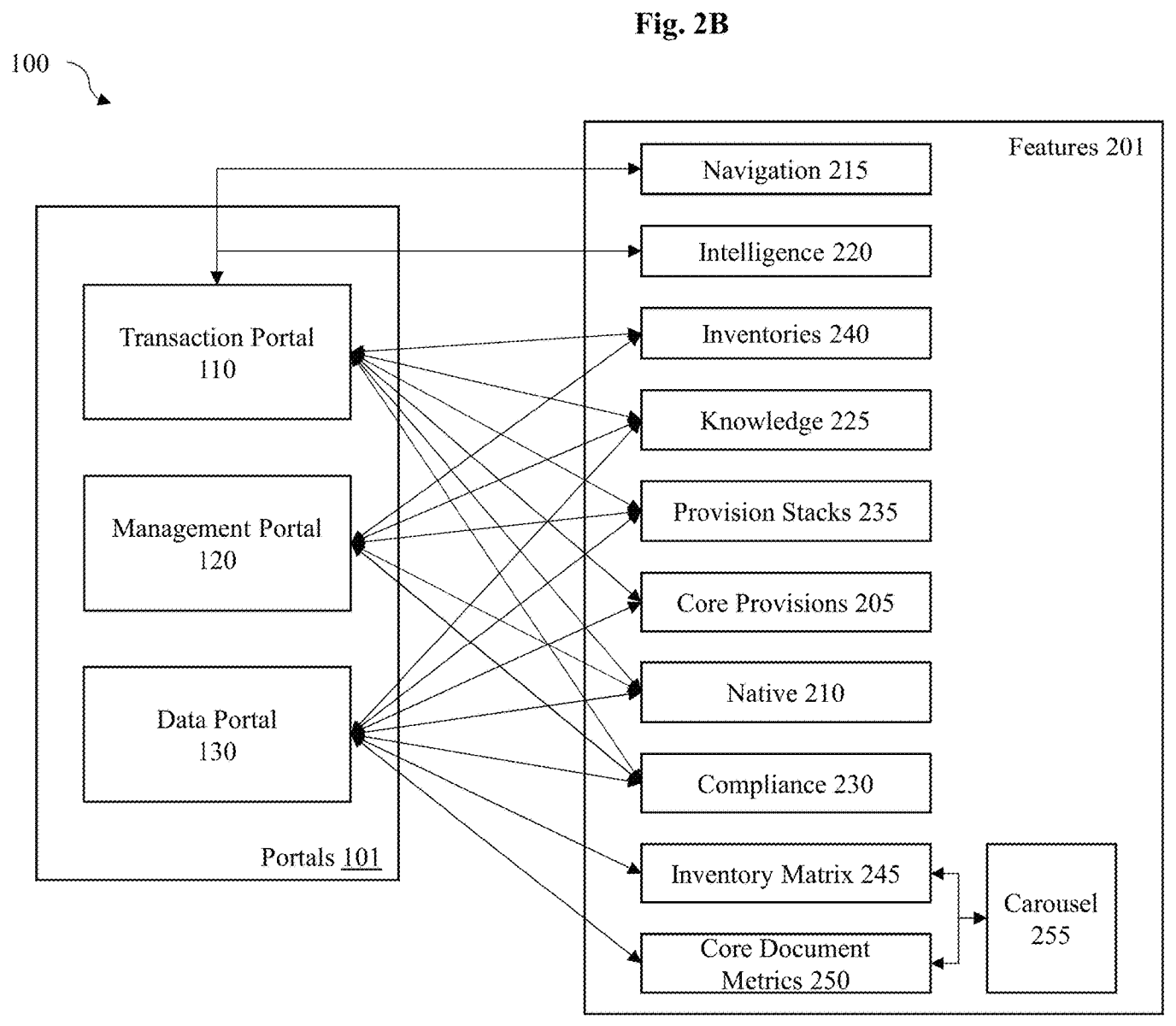

Features 201

Carousel 255

Navigation 215

Intelligence 220

Inventories 240

Knowledge 225

Provision Stacks 235

Core Provisions 205

Native 210

Compliance 230

Inventory Matrix 245

Core Document Metrics 250

Portals 101

Transaction Portal 110

Management Portal 120

Data Portal 130

DSCR

Cash Available for Debt Service

Project Revenues - Operating Expenses

Costs and Expenses - OE Paid from Reserves

705

705K

705L

705J

401

225

CFCC

Available Cash
Dividends

Debt Principal
Payments

Consolidated
Interest Expense

Consolidated
Shareholder
Distributions

+       +       +

235

Documents    Nammu knowledge    Provision Stacks    Provision Inventory    Compliance

901

902

903

904

905

245

OME | PROVISION INVENTORIES |

Document Types

Transactions

Provision Inventory

245

Select All

255

Figure 12A:
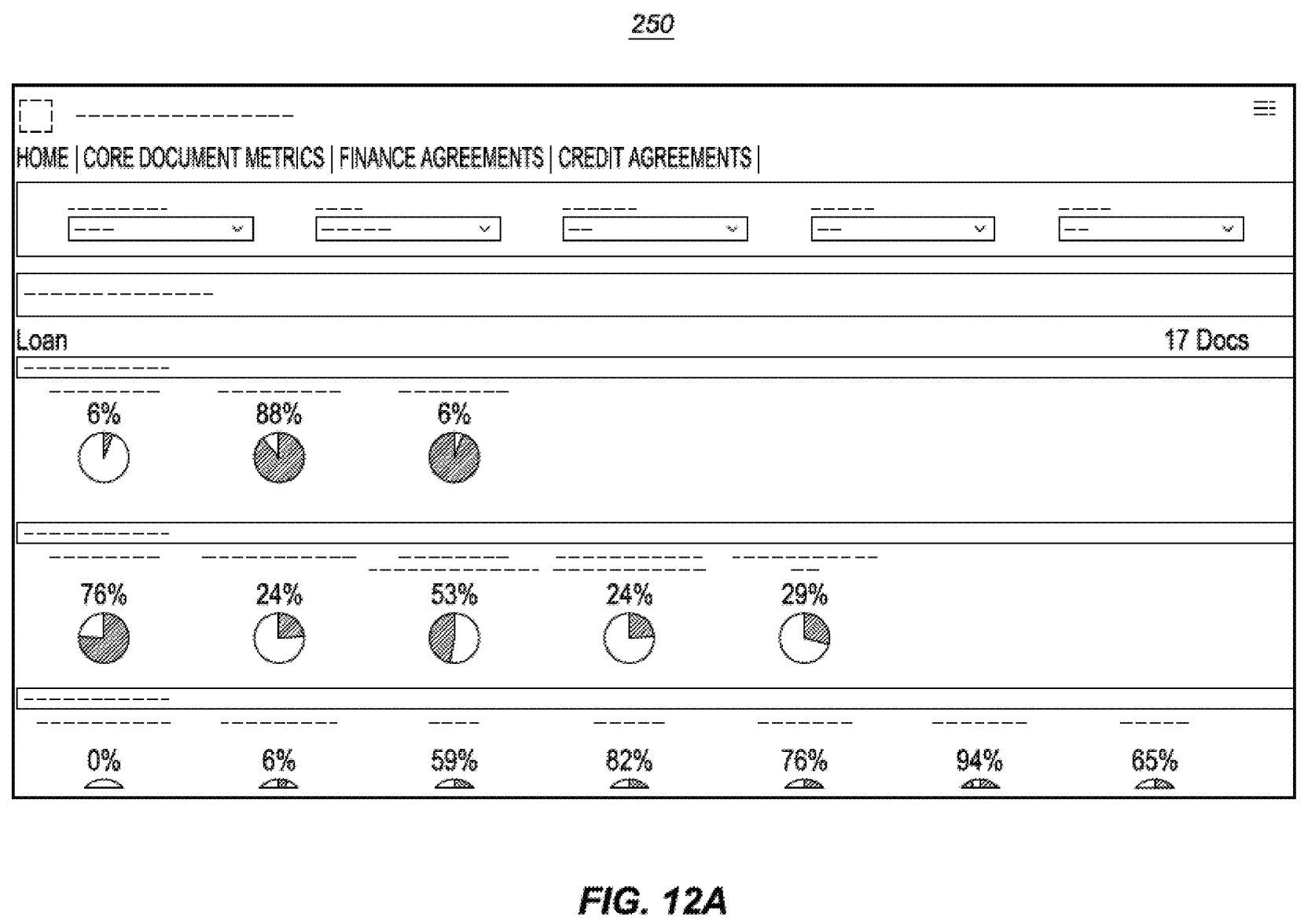

250

HOME | CORE DOCUMENT METRICS | FINANCE AGREEMENTS | CREDIT AGREEMENTS |

17 Docs

Loan

METHOD AND SYSTEM FOR ELECTRONIC TRANSACTION MANAGEMENT AND DATA EXTRACTION

CROSS-REFERENCE TO RELATED APPLICATIONS

This application is a continuation of and claims priority to U.S. patent application Ser. No. 18/048,565, which was filed Oct. 21, 2022, which application claimed priority to U.S. patent application Ser. No. 16/904,421, which was filed Jun. 17, 2020, now U.S. Pat. No. 11,526,848 issued Dec. 13, 2022, which application claimed priority to U.S. Provisional Patent Application No. 62/862,543, which was filed Jun. 17, 2019. The disclosure of the Patent Applications are herein incorporated by reference in their entirety and for all purposes.

FIELD

The present disclosure relates generally to computer-based data analysis systems, and more specifically, but not exclusively, to systems and methods for end-to-end transaction management, for example, based on a data schema for assessing, analyzing, and reviewing complex transactions, such as syndicated loan finance transactions and extracted, aggregated data points thereof.

BACKGROUND

The private credit markets are utilized to raise debt capital through complex instruments which include syndicated loans, bonds, and indentures. Syndicated loans are financings offered by groups of lenders to borrowers which can include corporations, projects, owners of specific large assets or even sovereign governments. These types of financial instruments are complex, involve multiple parties and are relying on the value of an asset or future long-term payment streams (including corporate revenues) to raise the debt capital.

Examples of syndicated loans for projects include loans for infrastructure assets (e.g., toll roads, airports, ports and bridges), energy assets (e.g., power plants, renewable power facilities including solar and wind facilities), transmission lines, and pipelines), and transportation assets (e.g., aircrafts, vessels, railcars), and so on.

The finance ecosystem is deeply interconnected, with changes in one part of the ecosystem affecting, positively or negatively, other aspects of either the system itself or other stakeholders in it. There are various pressures currently impacting the finance ecosystem, the effects of which are compounded as each of these pressures impact multiple stakeholders across it. For example, regulatory pressures on financial institutions and increased reporting/auditing requirements have a direct impact not only on the business operations of those financial institutions, but also on the companies that raise capital, and own, manage, and operate the financed assets, as resulting increases in the cost of debt capital are ultimately passed onto those companies/borrowers. This increased cost, when combined with the conventionally manual and disconnected processes for document creation, negotiation, and analysis, ultimately results in a structural inefficiency.

Private credit transactions, including syndicated finance transactions are document intensive and complex. Multiple advisors, representing different parties, are involved in an often-lengthy agreement drafting and negotiating process.

The process involves significant manual and repetitive document editing, analysis, and review. This process has remained largely unchanged over the last few decades. In addition, certain types of private credit transactions include numerous continuing obligations across the contracting parties, which must be monitored and complied with. These are currently manually tracked and reported with multiple inputs of the same data required by numerous parties, across multiple functions, both within a single institution and across the multiple institutions involved in a transaction.

Conventional systems fail to effectively manage the complex web of documents, negotiations, process management and data extraction required by these transactions. Generally, the parties involved in the finance ecosystem perceive the underlying processes to be too complex and challenging to design and develop for.

For example, conventional methods of document review, data identification, and data aggregation are manual, disconnected, and disjointed, and include traditional paper or electronic versions of portable document format (PDF)/ Microsoft Word documents/Excel spreadsheets, bespoke rudimentary document annotations and comments/footnotes, basic document graphics and charts (if developed at all for a specific transaction), and/or manual and repetitive data inputs into spreadsheets. This process is extremely inefficient, not scalable and, notwithstanding the generally repetitive structures of the transactions and documents, designed and specific for each transaction.

Current document reviewing and data identification, extraction, and aggregation solutions are not developed for a specialized market and, either require considerable model training by the ultimate users or are generally limited to rudimentary identification and simple extraction without providing more filtered and in-depth solutions and analysis. In addition, conventional solutions generally impose a regimented format on the users, requiring their workflow and data outputs to be adapted and incorporated into generalized templates that are unsuited for their needs.

Conventional solutions also do not address the full spectrum of needs in the financial market, with the solutions generally being focused on only portions of the transaction process (for example, document readers focused on due diligence of documents or workflow tools focused on broad transaction management processes). In fact, workflow—both administration of the transaction and the need for in-depth analysis—is bespoke for particular transaction types (e.g., syndicated lending, structured finance, and so on) and current solutions cannot identify and provide access to specific provisions and data required by professionals working in these areas. Conventional tools also are not integrated with data aggregation analytics, document management, and workflow requiring users to inefficiently move between electronic mail, document management systems, and review platforms throughout the document analysis and review process.

Furthermore, conventional solutions need to be trained to identify and extract essential references. This requires a user to have some level of familiarity and experience with the subject matter to ensure that appropriate matters are being reviewed and/or extracted. Any solution that requires administrative and/or substantive training or new transaction processes to be developed, undertaken, or learned before any efficiencies can be realized is not suitable for this market as such systems-which conventional systems are individually trained and developed-do not create uniform and market equivalencies which are required for any type of solution or platform to be accepted by a network of market stakeholders and ultimately scaled. In addition, the frictional cost of change, the pace and speed of the transaction processes, and the market normally prevent even any general acceptance of simple self-contained tools and platforms by sufficient market participants to enable the creation of meaningful efficiencies.

Currently, as well, notwithstanding the need for increased, more granular and accurate data, the results of any data extraction from transaction documents are generally stored or managed in spreadsheets, resulting in static data with limited ability to compare, assess and review at scale-ultimately yielding a detached, disconnected data set, which has limited use beyond its immediate purpose.

Additionally, there is no structure or framework imposed upon extracted data points. Because current document reviewing solutions are not developed for a specialized market, any data organization must be determined on an individual basis and there is no accepted structure or framework for doing so despite there being a general market acceptance and understanding on the core, critical data points required to assess, evaluate and monitor the transactions. Therefore, even when extracted data has any material value (e.g., for operational efficiency or to assist in the creation of new value, such as derivative financial instruments), there may be challenges to using the data to improve decision making capabilities, create efficiencies, or identify new trading opportunities, thereby limiting its value.

Additional details regarding the conventional processes for conducting due diligence in mergers and acquisitions is further described in "A Dataset and an Examination of Identifying Passages for Due Diligence," by Adam Roegiest, Alexander K. Hudek, and Anne McNulty, from Kira Systems, published in the "Proceedings of SIGIR '18, The 41st International ACM SIGIR Conference on Research & Development in Information Retrieval," pages 465-474; and, "Redesigning a Document Viewer for Legal Documents," by Adam Roegiest and Winter Wei, from Kira Systems, published in the "CHIR '18, Proceedings of the 2018 Conference on Human Information Interaction & Retrieval," pages 297-300, which both articles are hereby incorporated by reference in their entireties and for all purposes.

Accordingly, there is a need for improved systems and methods for creating operational efficiency in the end to end life cycle of a complex transaction and transparency and insights into the terms and conditions of the transaction (and across a portfolio of transactions) in an effort to overcome the aforementioned obstacles and deficiencies of conventional data structuring systems.

BRIEF DESCRIPTION OF THE DRAWINGS

FIG. 1 is an exemplary top-level system diagram illustrating one embodiment of a data structuring platform.

Figure 2A:
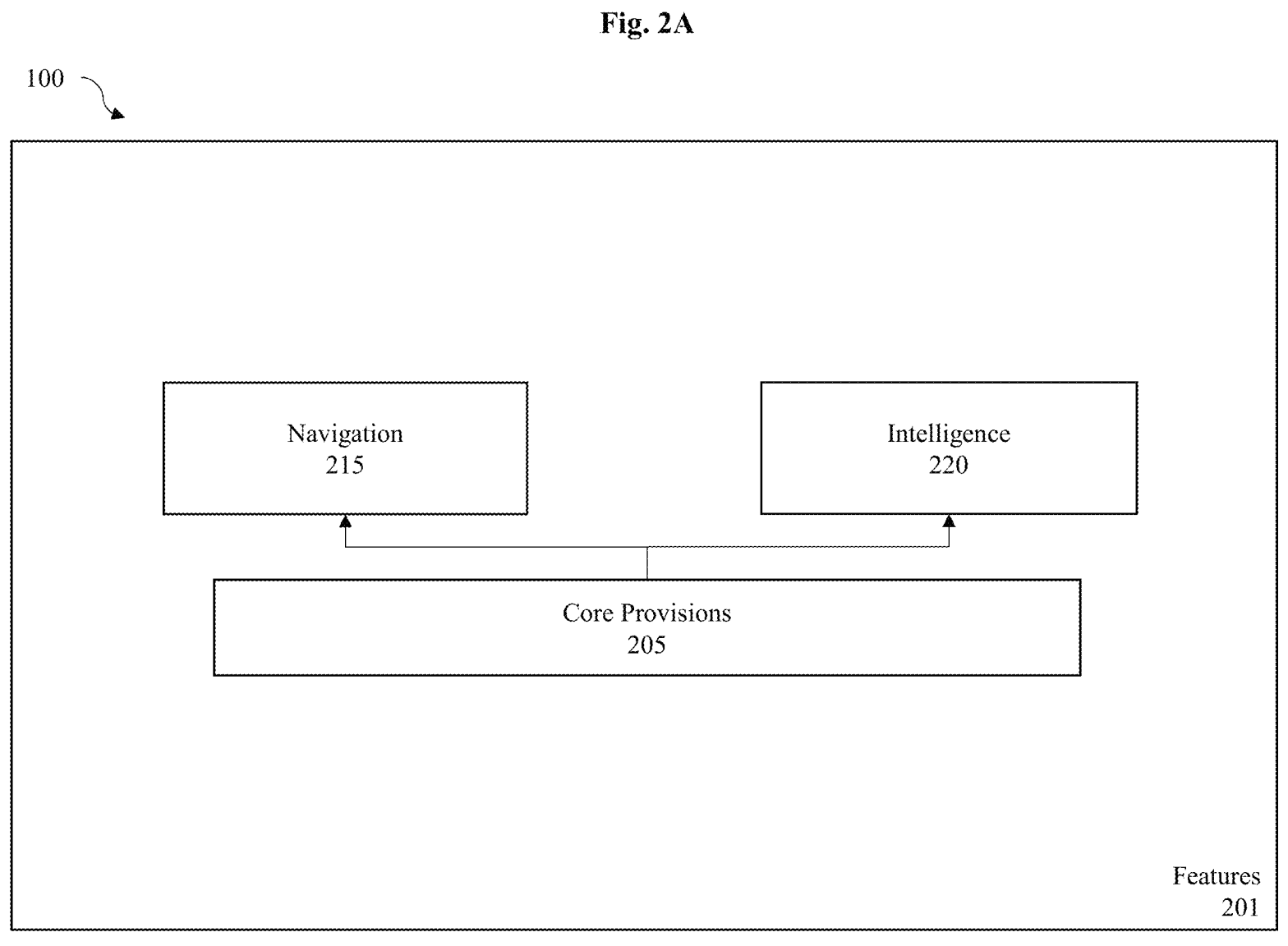

FIG. 2A is an exemplary top-level flow system diagram illustrating one embodiment of features that are available across the data structuring platform of FIG. 1.

FIG. 2B is an exemplary top-level flow system diagram illustrating another embodiment of the features that are available across the data structuring platform of FIG. 1.

FIG. 7O is an exemplary screenshot illustrating another embodiment of a graphical user interface for presenting the knowledge feature of FIG. 2B.

FIG. 7AA is an exemplary screenshot illustrating another embodiment of a graphical user interface for presenting the knowledge feature of FIG. 2B.

FIG. 7BB is an exemplary screenshot illustrating another embodiment of a graphical user interface for presenting the knowledge feature of FIG. 2B.

FIG. 7CC is an exemplary screenshot illustrating another embodiment of a graphical user interface for presenting the knowledge feature of FIG. 2B.

FIG. 7DD is an exemplary screenshot illustrating another embodiment of a graphical user interface for presenting the knowledge feature of FIG. 2B.

FIG. 7EE is an exemplary screenshot illustrating another embodiment of a graphical user interface for presenting the knowledge feature of FIG. 2B.

FIG. 7FF is an exemplary screenshot illustrating another embodiment of a graphical user interface for presenting the knowledge feature of FIG. 2B.

FIG. 7GG is an exemplary screenshot illustrating another embodiment of a graphical user interface for presenting the knowledge feature of FIG. 2B.

FIG. 7HH is an exemplary screenshot illustrating another embodiment of a graphical user interface for presenting the knowledge feature of FIG. 2B.

FIG. 7II is an exemplary screenshot illustrating another embodiment of a graphical user interface for presenting the knowledge feature of FIG. 2B.

FIG. 7JJ is an exemplary screenshot illustrating another embodiment of a graphical user interface for presenting the knowledge feature of FIG. 2B.

FIG. 7KK is an exemplary screenshot illustrating another embodiment of a graphical user interface for presenting the knowledge feature of FIG. 2B.

FIG. 7LL is an exemplary screenshot illustrating another embodiment of a graphical user interface for presenting the knowledge feature of FIG. 2B.

FIG. 7MM is an exemplary screenshot illustrating another embodiment of a graphical user interface for presenting the knowledge feature of FIG. 2B.

FIG. 7NN is an exemplary screenshot illustrating another embodiment of a graphical user interface for presenting the knowledge feature of FIG. 2B.

FIG. 7OO is an exemplary screenshot illustrating another embodiment of a graphical user interface for presenting the knowledge feature of FIG. 2B.

FIG. 7PP is an exemplary screenshot illustrating another embodiment of a graphical user interface for presenting the knowledge feature of FIG. 2B.

FIG. 7QQ is an exemplary screenshot illustrating another embodiment of a graphical user interface for presenting the knowledge feature of FIG. 2B.

FIG. 7RR is an exemplary screenshot illustrating another embodiment of a graphical user interface for presenting the knowledge feature of FIG. 2B.

FIG. 7SS is an exemplary screenshot illustrating another embodiment of a graphical user interface for presenting the knowledge feature of FIG. 2B.

FIG. 7TT is an exemplary screenshot illustrating another embodiment of a graphical user interface for presenting the knowledge feature of FIG. 2B.

FIG. 12A is an exemplary screenshot illustrating one embodiment of a graphical user interface for presenting the core document metrics feature of FIG. 2B.

FIG. 12D is an exemplary screenshot illustrating another embodiment of a graphical user interface for presenting the core document metrics feature of FIG. 2B.

FIG. 13D is an exemplary screenshot illustrating another embodiment of a graphical user interface for presenting the provisional carousel feature of FIG. 2B.

Figure 2C:
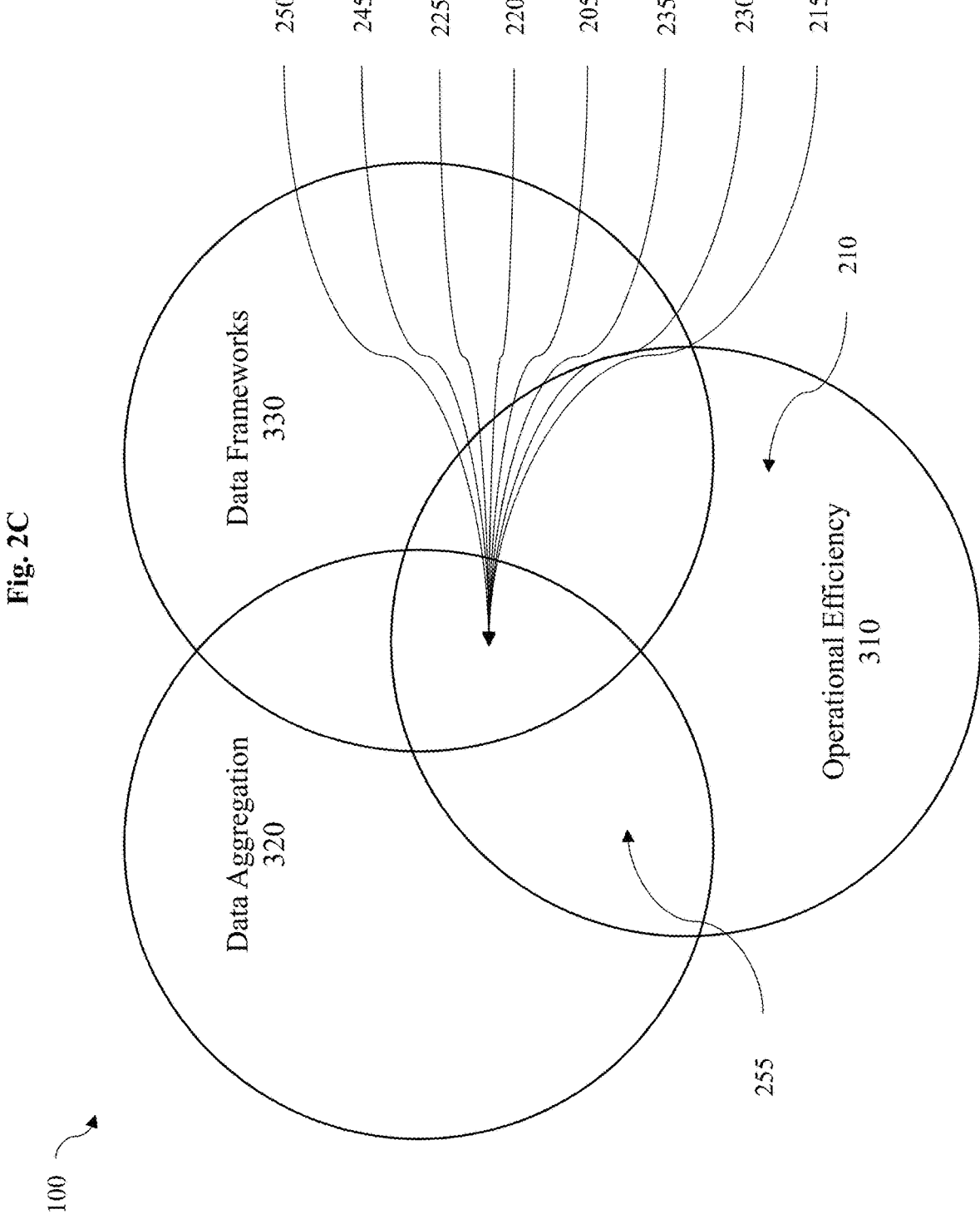
FIG. 2C is an exemplary top-level flow system diagram illustrating another embodiment of the features that are available across the data structuring platform of FIG. 1.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 1:
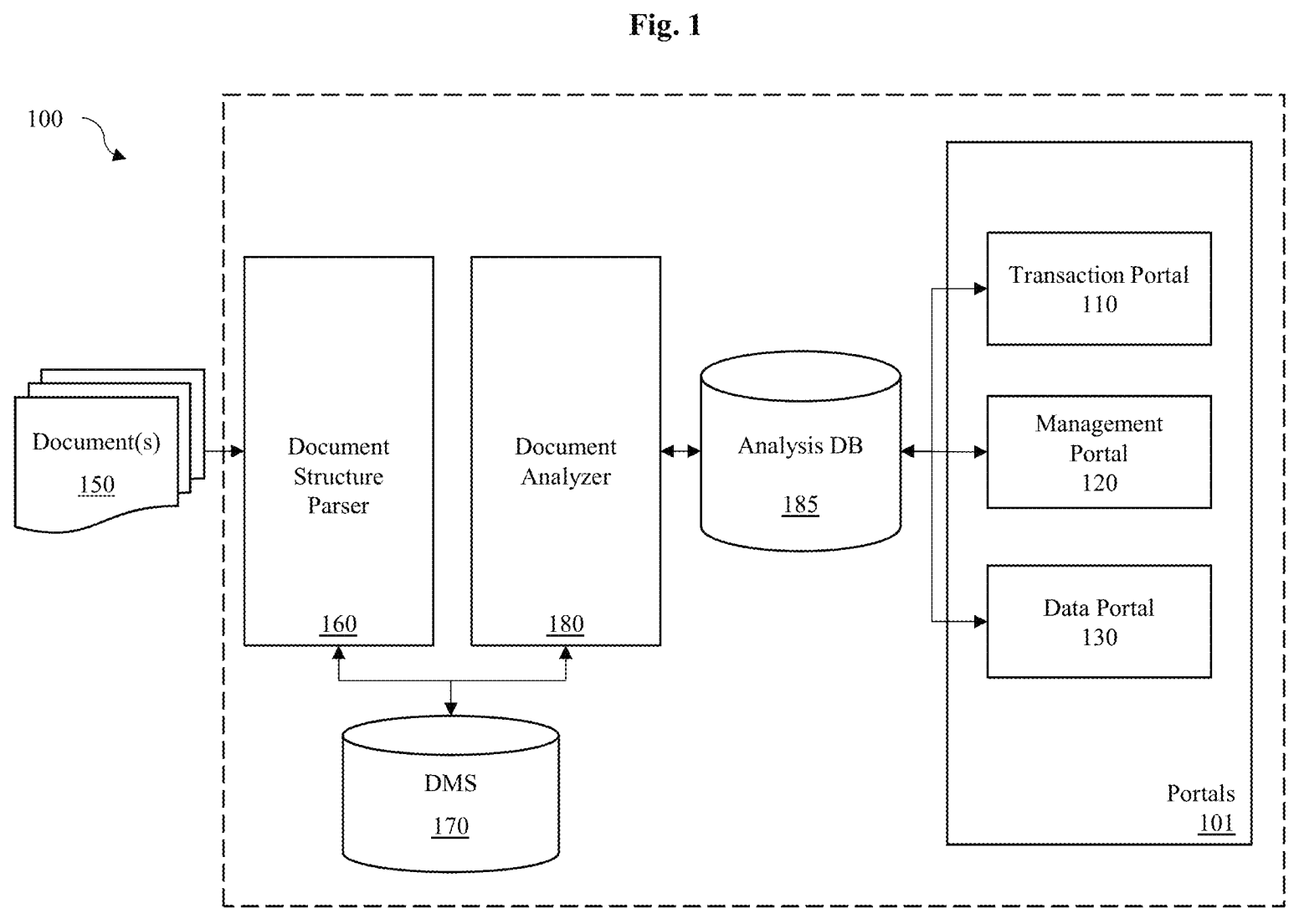

Currently-available document analysis systems are deficient because they fail to accommodate market needs for an end-to-end transaction management platform. A system for identifying, navigating, and extracting both structured and unstructured data from complex interconnected transaction documents can have significant value and provide a basis for a wide range of private credit financing applications, providing benefits and advantages across the ecosystem stakeholders such as: (i) reducing the inefficiencies and current cost of transactions and their operational processes; (ii) increased access to long term capital; (iii) attracting new sources of long-term capital through democratization of the market; and (iv) increasing data-driven transparency and liquidity. This result can be achieved, according to one embodiment disclosed herein, by a system 100 for end-to-end transaction management as illustrated in FIG. 1.

The present disclosure describes a number of methods and computerized systems for deconstructing and digitizing complex interconnected documents to create operational efficiencies and identify and extract transactional data. In some embodiments and turning to FIG. 1, the system 100 can receive one or more documents 150 for deconstructing and digitizing. The documents 150 can include any number of electronic files and/or hard-copy documents that are used during a transaction lifecycle. By way of example, the documents 150 can include Microsoft Word® document formats, portable document format (PDF) files, compound document formats, extensible markup language (xml) files, rich text format files, open documents, and so on.

The system 100 can deconstruct the received documents 150, for example, through a document structure parser 160. In some embodiments, the document structure parser 160 represents one or more programmable computational units that can parse the electronic data of the documents 150. The parsed electronic data can be reorganized into one or more hierarchical frameworks, each layer of which creates a further foundation for the next layer effectively creating indexed structures and sub-structures of complex interconnected data. A document analyzer 180 similarly can include one or more programmable computational units coupled to an analysis database 185 for maintaining the analyzed electronic data. Additionally and/or alternatively, a document management server 170 can be in operable communication with the document structure parser 160 and the document analyzer 180 for managing the received documents 150. In some embodiments, the document management server 170 can represent a third-party document management system. In a preferred embodiment, the analyzed electronic data maintained in the analysis database 185 is not stored on the document management server 170. However, in some embodiments, although shown and described as separate components, those of ordinary skill in the art would appreciate that the document structure parser 160, the document analyzer 180, the analysis database 185, and/or the document management server 170 can reside on the same computing platform.

As shown in FIG. 1, the system 100 comprises a transaction portal 110, a management portal 120, and a data portal 130, collectively referred to as portals 101 herein. The system 100 advantageously identifies, extracts, and aggregates transaction data. For example, users can access the documents for review, analysis, assessment, and calibration through the portals 101. In some embodiments, users can interface with the portals 101 using one or more application programming interfaces (APIs) (not shown).

Each portal 101 is focused on a particular portion of a transaction lifecycle and specifically addresses one or more market needs. In some embodiments, the transaction portal 110 expedites transaction review, analysis, and execution, for example, by imposing data hierarchies and structures on various transaction documents including a framework of core provisions which enable a structured automated navigation schema to be enabled within a document and across connected documents in a transaction. The management portal 120 creates an interconnected digital ecosystem for obligation management within each transaction, for example, by automating transaction management across stakeholders, creating efficiencies for compliance and regulatory audits. The data portal 130 identifies/extracts/aggregates electronic data at a granular level to provide immediate access and in-depth transparency into transaction portfolios and data sets. Advantageously, together the portals 101 advance the art of transaction user interfaces by creating a holistic and immersive ecosystem using an expertly-developed structure, analytical schema, and data framework.

The portals 101 synthesize technology, market, and sector expertise to transform static files into dynamic, integrated digital data sets. Accordingly, market participants benefit from an improved understanding of, and ability to review and analyze, their portfolios, which can reduce compliance risk and increase operational efficiencies across transaction life cycles.

The system 100 enables efficacy and efficiency in operational processes. Conventional methods of reviewing paper copies or using rudimentary document management software, such as PDF viewers and network document repositories, include general, non-specific search functions which need to be initiated by the user and result in a disconnected management, reporting, and compliance process. In contrast, the system 100 advantageously provides automated dynamic data displays for reviewing and analyzing key information to enable a more efficient and more accurate review and analysis process for digital, streamlined, and integrated reporting and monitoring. Similarly, the system 100 enables immersive collaboration, real-time document drafting and negotiation, connected and synthesized processes, efficiency and consistency within and across transactions, and cost savings over conventional unstructured collaboration methods. Previously limited in transparency (e.g., limited market information, data points, and insights into transaction portfolios), the system 100 provides an innovative method for access and transparency into data, data extraction, and insight creating real-time dynamic pools of information and knowledge which can result in market efficiencies and potentially increased market liquidity.

Turning to FIG. 2A, the system 100 includes layered data frameworks that classify, enumerate, and catalogue identified provisions. As shown in FIG. 2A, the system 100 includes a core provision 205 for supporting and providing a structure for both a navigation 215 and an intelligence 220. The overlay of the core provisions 205, the navigation 215, and the intelligence 220 on top of a native 210 view create document review/analysis efficiency and thoroughness. The core provisions 205 provide a framework through which to organize, classify, catalogue and analyze the data in a document. Each document type can have its own core provision framework. By way of example, guarantee agreements may include specific core provisions such as "Guaranteed Obligations" or "Subrogation" and loan agreements may include specific core provisions such as "Facility Types" and "Facility Terms". In addition, loan agreements for different sectors may include core provisions that are relevant to that sector such as "Construction and Development" core provisions for project finance loan agreements.

Additionally and/or alternatively, the system 100 includes any number of features 201 as desired, each not only to ensure operational efficiency, comprehension, and analysis of complex, interconnected documents, but also to enable the effective extraction of data at scale that was previously inaccessible, hidden, or unknown. By way of example, the features 201 can include additional examples shown in FIG. 2B.

Each of the portals 101 can support any number of features 201. The features include a back-end data extraction engine (not shown) to deconstruct transaction documents. The back-end data extraction engine uses automated systems, manual processes, and/or a combination thereof to identify and label elements of the transaction documents and information relevant to the transaction. The extraction engine uses machine learning and natural language processing systems to perform the required data identification, extraction, and analysis, as would be understood by a person of skill in the art. The particular data of interest extracted by the back-end data extraction will depend on the needs of the transaction at issue (e.g., data can be transaction sector/product specific). However, exemplary data that might be extracted is described herein in the various exemplary embodiments. The deconstructed data is digitized, organized, and stored so that it can be immediately recalled and used across the features as needed. Additional calculations and computations are performed on the extracted data—both within and across transactions—to provide key metrics, aggregate data points, and identify intra/inter document connection points. Similarly, these derived digital datasets are further organized and stored for further use across the features and other analytical tools ultimately ensuring that the data is reusable, dynamic, and remains relevant.

Each of the features 201 described herein can be used in and integrated across the three portals 101, such as shown in FIG. 2B. For example, a selected feature 201 can be used in the transaction portal 110 and the management portal 120 for a particular document or set of connected documents within a single transaction. The same selected feature can also be modified to be used in the data portal 130 for documents of the same type across different transactions.

As shown in FIG. 2B, the features can include the core provision 205, the native 210, a navigation 215, an intelligence 220, a knowledge 225, a compliance 230, a provision stack 235, inventories 240, an inventory matrix 245 (and prevalence bar), core document metrics 250, and a carousel 255. In some embodiments, each feature can be self-contained. However, those of ordinary skill in the art will appreciate that some features can be embedded in, coexist with, and/or overlap other features as desired.

Additionally and/or alternatively, the disclosed system incorporates at least three components, such as shown in FIG. 2C. Turning to FIG. 2C, the components can include one or more data frameworks 330 (including data frameworks/schemas), a data aggregation 320, and an operational efficiency 310. Each feature described herein can be structured to provide the user with the value resulting from these components, such as illustrated in FIG. 2C. The data frameworks 330 provide a framework to structure and organize identified and extracted data. The data aggregation 320 provides a framework to aggregate, assemble, index, and inventory identified and extracted data. The operational efficiency 310 provides a framework to review, analyze, and search data and collaborate seamlessly with others. Together and individually, these components provide the dynamic, data driven features discussed above and provide a hierarchy, framework, structure, and organization over individual transaction documents, connected transaction documents within a single transaction, and documents across multiple transactions and/or portfolios.

The components shown in FIG. 2C enable a structured analytical approach to be imposed on transaction documents and portfolios by identifying and creating comparable data sets, which can be further refined through embedded data filtering schemas. This approach is accretive with each new document or transaction adding additional insights and perspectives into the system 100. Relevant knowledge pools are continually expanded in real time to add additional data points for improving the functionality and accuracy of the system 100. The system 100 recreates data functionality from static to active.

The system 100 provides the user with unique perspectives and insights and an expert driven process and framework through which to review, analyze, and assess the critical terms and conditions of documents and transactions. In some embodiments, the components described support the features 201 described with reference to FIG. 2B.

By way of example, the core provision 205, the provision stack 235, the compliance 230, the navigation 215, the intelligence 220, the knowledge 225, the inventories 240, the inventory matrix 245 (and prevalence bar), and the core document metrics 250 can span the three components (e.g., the data frameworks 330, the data aggregation 320, and the operational efficiency 310) described above. Similarly, the carousel 255 can span the operational efficiency 310 and the data aggregation 320 components. The native 210 view can span the operational efficiency 310 component.

Figure 2D:
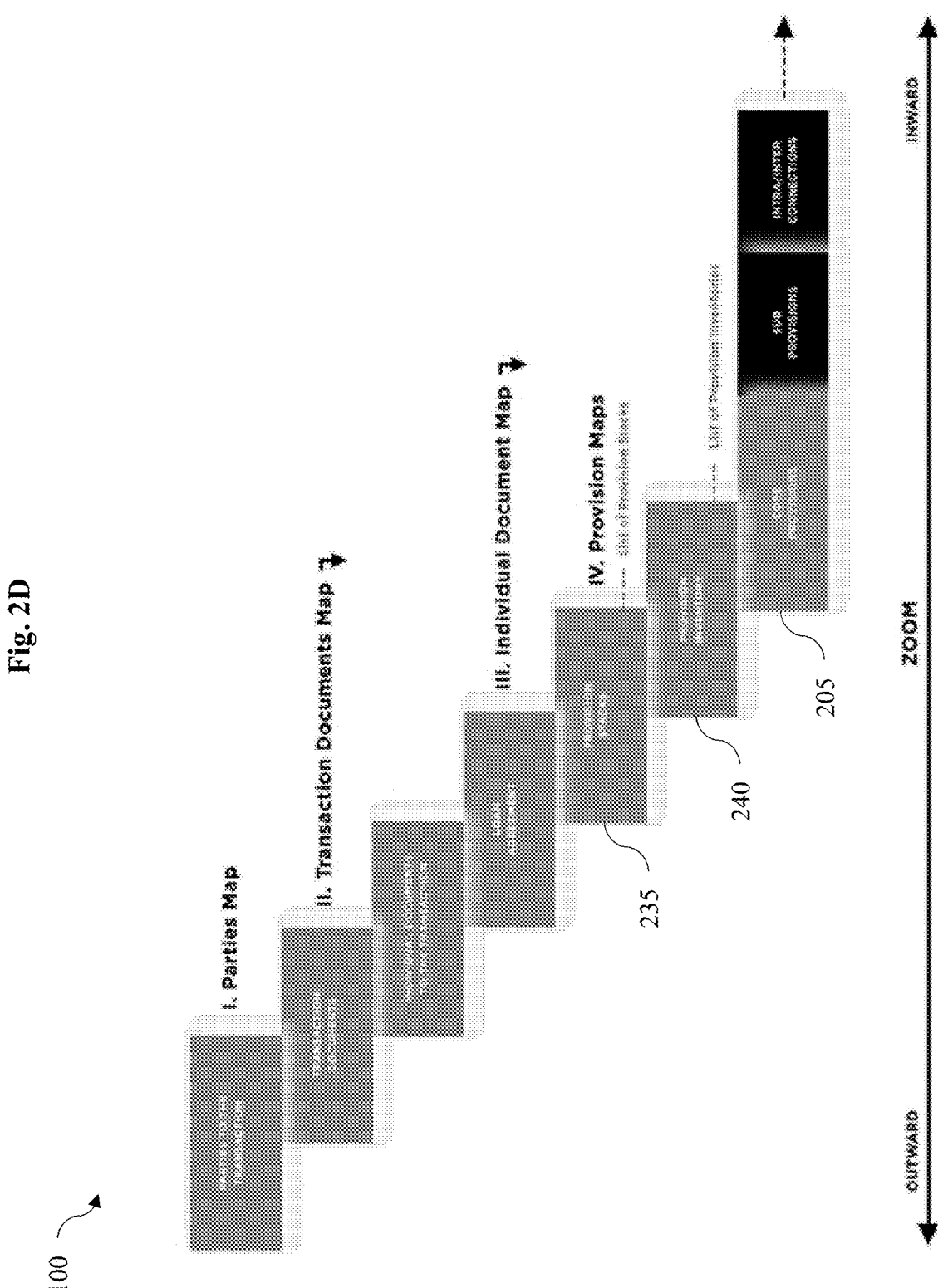
FIG. 2D is an exemplary top-level flow system diagram illustrating another embodiment of the features that are available across the data structuring platform of FIG. 1.

As previously described, the data aggregation 320 and the operational efficiency 310, together and individually, provide the dynamic, data driven features discussed above and provide a structured hierarchy over (i) individual transaction documents, (ii) connected transaction documents within a single transaction, and (iii) documents across multiple transactions and/or portfolios, such as shown in FIG. 2D. With reference to FIG. 2D, the system 100 can digitally distill transaction documents from parties of the transaction to the core provisions 205. The hierarchy shown in FIG. 2D is for exemplary purposes only.

Core Provisions

The core provision 205 can span the three components (e.g., the data frameworks 330, the data aggregation 320, and the operational efficiency 310) described above.

Stakeholders in a conventional ecosystem do not have any consistency in their diligence, review, and analysis processes, with each document effectively being approached de novo. This is true—notwithstanding that there is always a series of equivalent provisions in documents of the same type across transactions, which must be considered and reviewed as part of these processes. This archaic, bespoke approach creates an inefficient, disconnected and duplicative process that undermines market efficiency and negatively impacts productivity in the ecosystem.

The core provisions 205 provide a framework through which to organize, classify, catalogue and analyze the data in a document or set of documents which is identified to be relevant or related to each specific core provision.

In some embodiments, the core provisions 205 enable document deconstruction and analysis for document review and analysis to be undertaken through a unified analytical framework. The core provisions 205 include a critical set of terms and conditions within a document that are distinct and specific to that type of document. These provisions together form the document's matrix of risk, rights, and obligations (referred to as the document's "core provisions"). The upfront identification of core provisions creates a framework for effectively and efficiently navigating through a document.

Each document type can be represented by its own unique set of core provisions that can be defined in the transaction portal 110. Additional core provisions can be included for particular sectors and/or financial products. For example, all loan agreements can have a number of identical core provisions (e.g., related to facility terms and types). But all loan agreements for transactions in the power sector can have additional unique core provisions different than loan agreements for transactions in the aviation sector—for example, provisions that relate to the monitoring, assessment, and review of the performance of a power plant verses an aircraft. Loan agreements can also have different core provisions than those in other structured finance documents (e.g., security documents and guarantees can have their own set of core provisions unique from the core provisions of loan agreements). In some embodiments, selected core provisions can be common to all documents related to the governing law and jurisdiction, as those can be critical provisions for all contractual agreements.

The core provisions advantageously identify various relevant definitions, provisions, and connections related to a selected core provision. Transaction originators (e.g., from loan and capital markets), syndication teams, buy-side transaction teams, portfolio/transaction managers, credit/risk teams, and lawyers can all benefit from document review, analysis, and negotiation, document drafting, and risk/exposure analysis using the core provisions.

The core provisions 205 provide a structure and framework to review complex documents. Specifically, the core provisions 205 enable the user to analyze and judge critical components of the document with speed and efficiency, thereby improving the pace, consistency, and value of decisions and assessments of transactions and transaction documents. This ultimately improves risk and compliance management, productivity and transaction, and market insights. The structure and framework of the core provisions 205 significantly improves identification of anomalies, omissions, and market deviations in transaction documents.

Figure 3A:
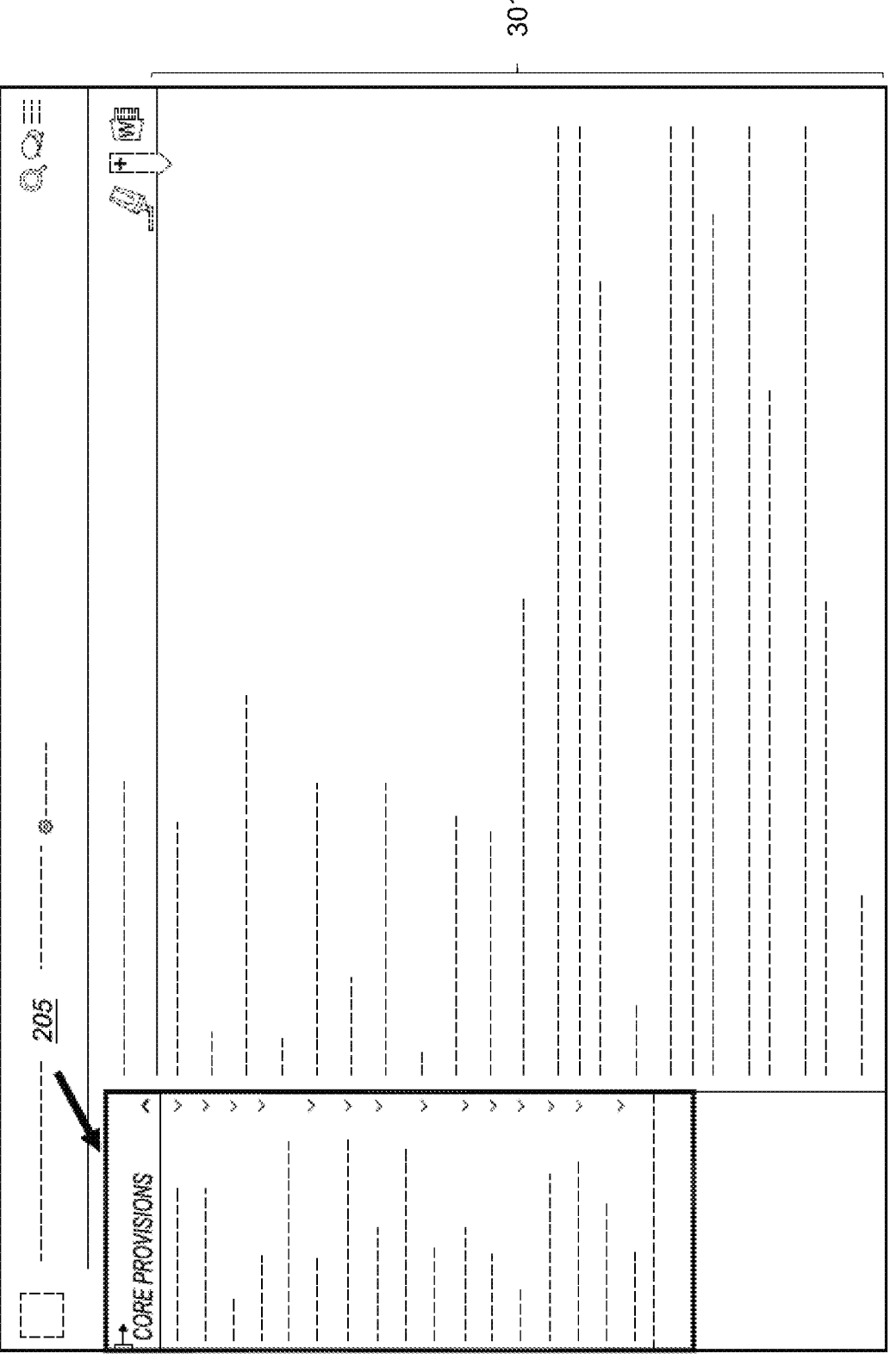
FIG. 3A is an exemplary screenshot illustrating one embodiment of a graphical user interface for presenting the core provision feature of FIG. 2B.
Figure 3B:
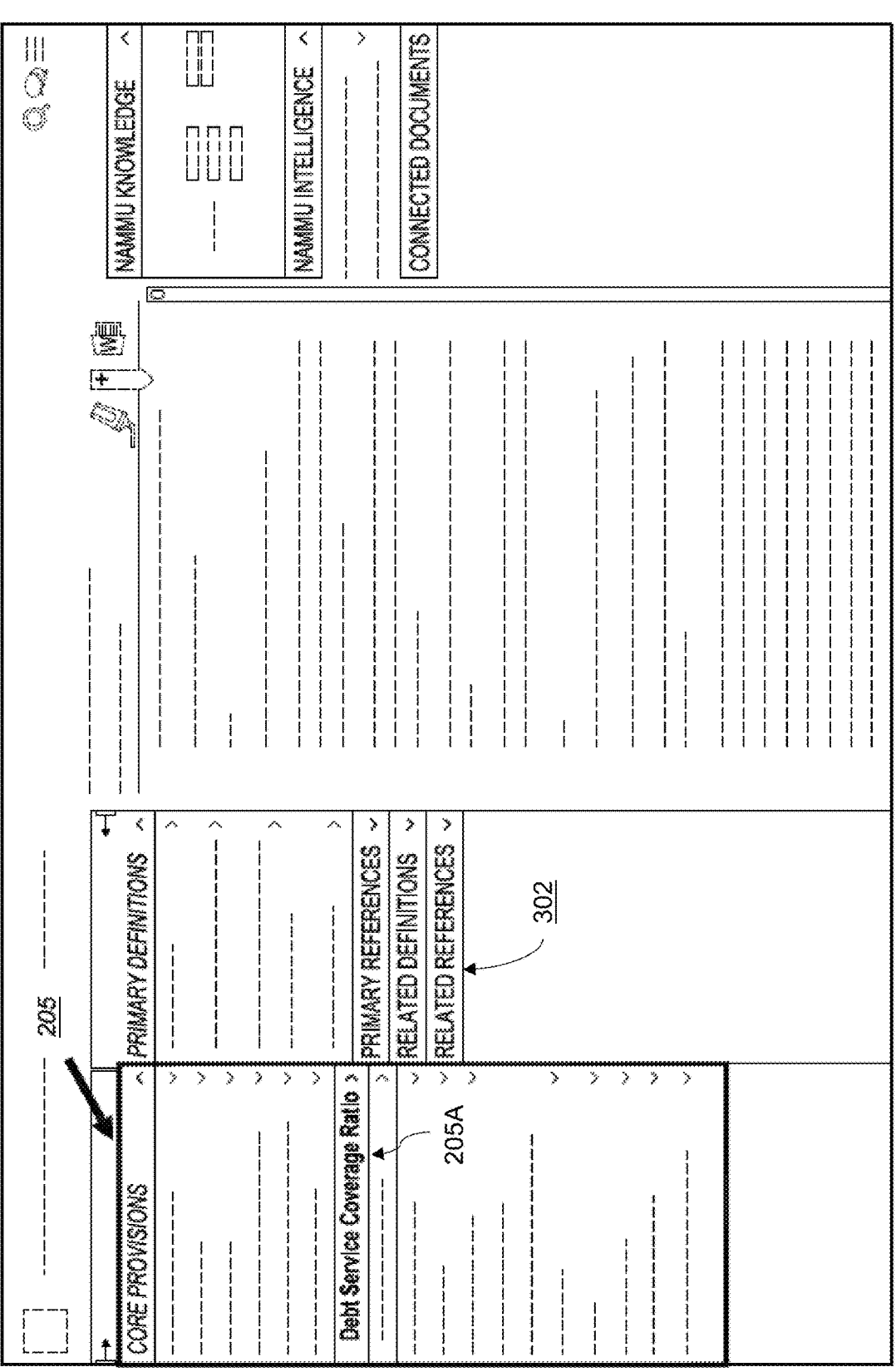
FIG. 3B is an exemplary screenshot illustrating another embodiment of a graphical user interface for presenting the core provision feature of FIG. 2B.
Figure 3C:
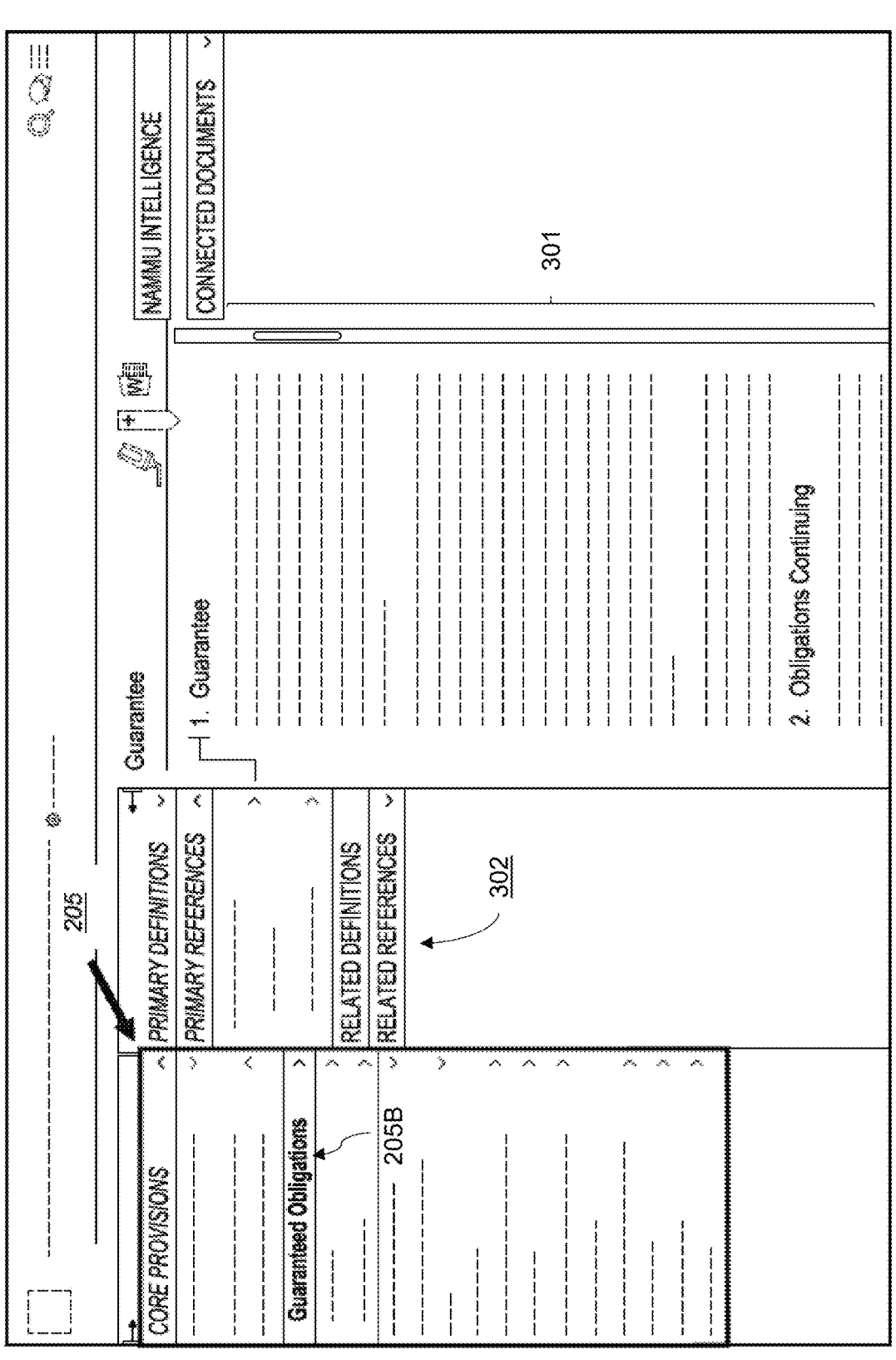
FIG. 3C is an exemplary screenshot illustrating another embodiment of a graphical user interface for presenting the core provision feature of FIG. 2B.

FIGS. 3A-C illustrate exemplary screenshots showing the presentation of the core provisions 205 of exemplary documents. Specifically, FIG. 3A illustrates an exemplary presentation of the structure of the core provisions 205, for example, for an exemplary engineering, procurement, and construction (EPC) contract. As shown, the core provisions 205 are listed on the left of the user interface, with each provision having an option to expand and/or drop down additional menu options. As the user moves between each provision of the core provisions 205, the text of a corresponding main window 301 is exposed. In some embodiments, the main window 301 displays the text of an original document.

FIG. 3B illustrates an exemplary presentation of the core provisions 205 of an exemplary loan agreement, wherein primary definitions have been identified from the core provisions 205. As shown, when a user selects a core provision 205—such as a debt service coverage ratio (shown as an exemplary core provision 205A) from a core provision framework for loan agreements—an additional navigation framework 302 can be exposed. The additional navigation framework 302 creates a structure to guide the user through references relevant to the selected provision such as, for example, through the primary definitions found in the document, primary references, related definitions, and related references. FIG. 3C illustrates the core provisions 205 for a guarantee agreement. With reference to FIG. 3C, an exemplary core provision 205B (e.g., guaranteed obligations) from the core provision framework for guarantee agreements is selected, which exposes the additional navigation framework 302. As shown in FIG. 3C, a selection of a menu option from the additional navigation framework 302 can also dynamically expose the text of a deconstructed guarantee agreement in the main window 301.

The inventory of the core provisions 205 can be categorized into relevant definitions, provisions, and other connections related to each core provision to assemble and index disparate terms and provisions—which are often spread across a document—into a logical and unified framework. This can be seen in the examples shown in FIGS. 3B, C.

Advantageously, the core provisions 205 create an innovative data structure, scalable across equivalent documents, imposing a framework of classification of terms and conditions to enable a structured and organized review and navigation across complex documents in a unique intuitive manner. This enables speed and consistency in analysis, decision making, assessment and judgement. In addition, this further enables more effective comparisons between equivalent document types across different transactions to be developed as there is a framework and structure into which data points from the relevant documents are placed enabling them to be more easily assessed and compared.

Imposing equivalency and consistency across data points from equivalent documents from different transactions improves risk management and increases productivity and insights. It also enables and improves the ability of transaction stakeholders to immediately focus on critical issues as well as identification of anomalies and deviations at speeds and scales currently not available in this market.

Additionally and/or alternatively, the core provisions 205 can provide the foundational data structure for other features of the system 100 described below, such as the navigation 215 and the intelligence 220. Accordingly, the core provisions 205 advantageously enable a framework for the organization of additional classification and cataloguing of terms and conditions. The data structure provided by the core provisions 205 and the data aggregation component of the system 100 increases productivity and insights. It also improves both focus on critical issues and identification of anomalies and deviations at speeds and scales currently not available in this market.

Native

The native 210 view encapsulates at least the operational efficiency 310 of the system 100. The native 210 view creates an environment for the other features described above to perform, enabling efficient and effective review and assessments of both complex terms and conditions in a unique intuitive manner.

In some embodiments, the native 210 view provides an interface of formatted text already extracted from an electronic word document (or portable document format (PDF) file). The native 210 view presents the original text including formatting in a view that has embedded tools (e.g., navigation 215 discussed herein) to provide an organized, consistent, and systematic framework through which to review, examine and search both within a single document and across connected documents, creating significant operational efficiencies for the user. The native 210 view can be embedded into other features for additional efficiencies within those other features (for example, in the inventories 240), or as a separate feature providing value through its dynamic presentation of the entire transaction document.

The native 210 view converts a static two-dimensional document view into a dynamic, intuitive document view, enabling the user to view multiple component parts of a document, including schedules and tables, on a single-screen, such as shown in FIGS. 4A-F. Additionally and/or alternatively, only a selected subset of provisions or clauses can be shown in the native 210 view.

Figure 4A:
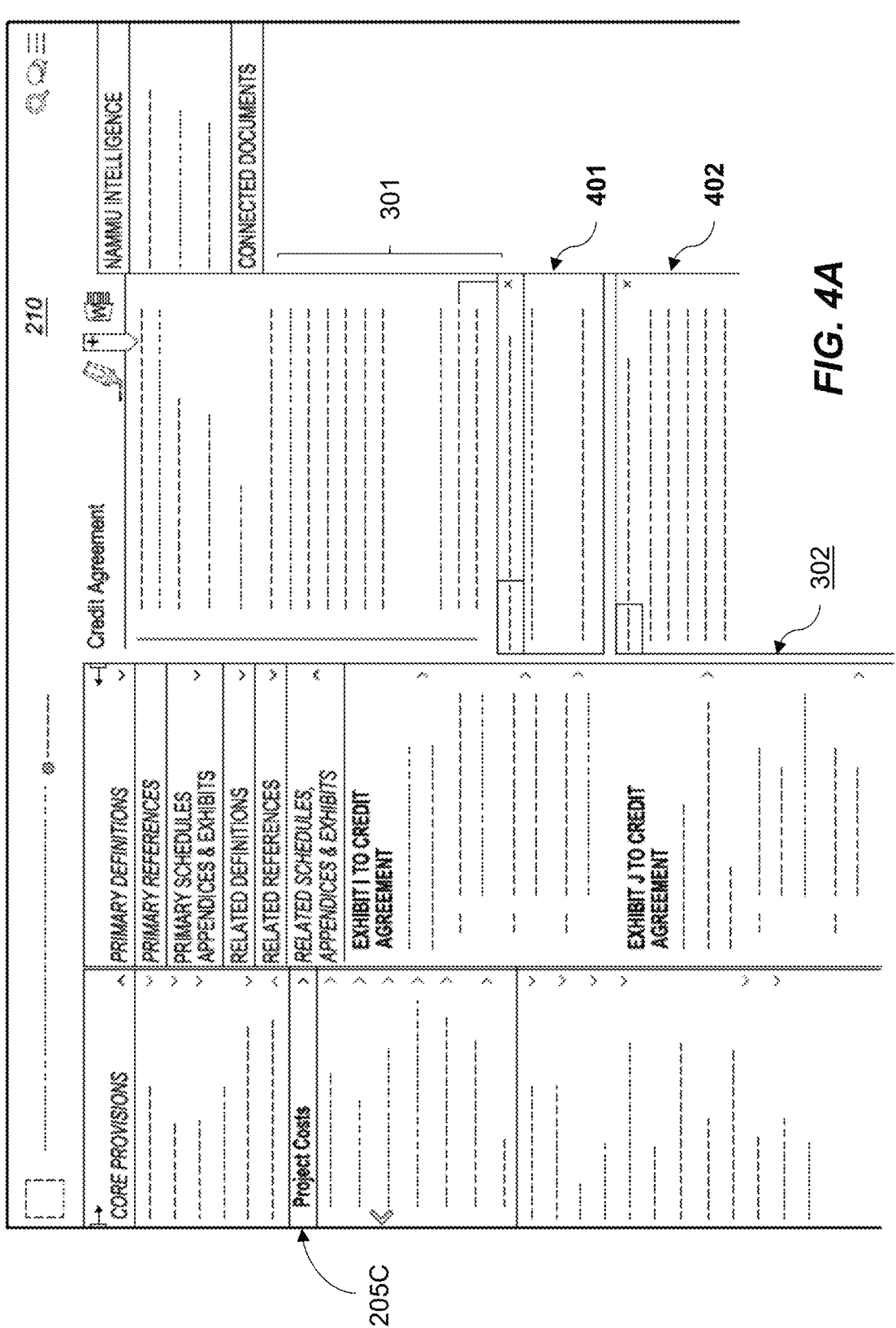
FIG. 4A is an exemplary screenshot illustrating another embodiment of a graphical user interface for presenting the native view feature of FIG. 2B.
Figure 4B:
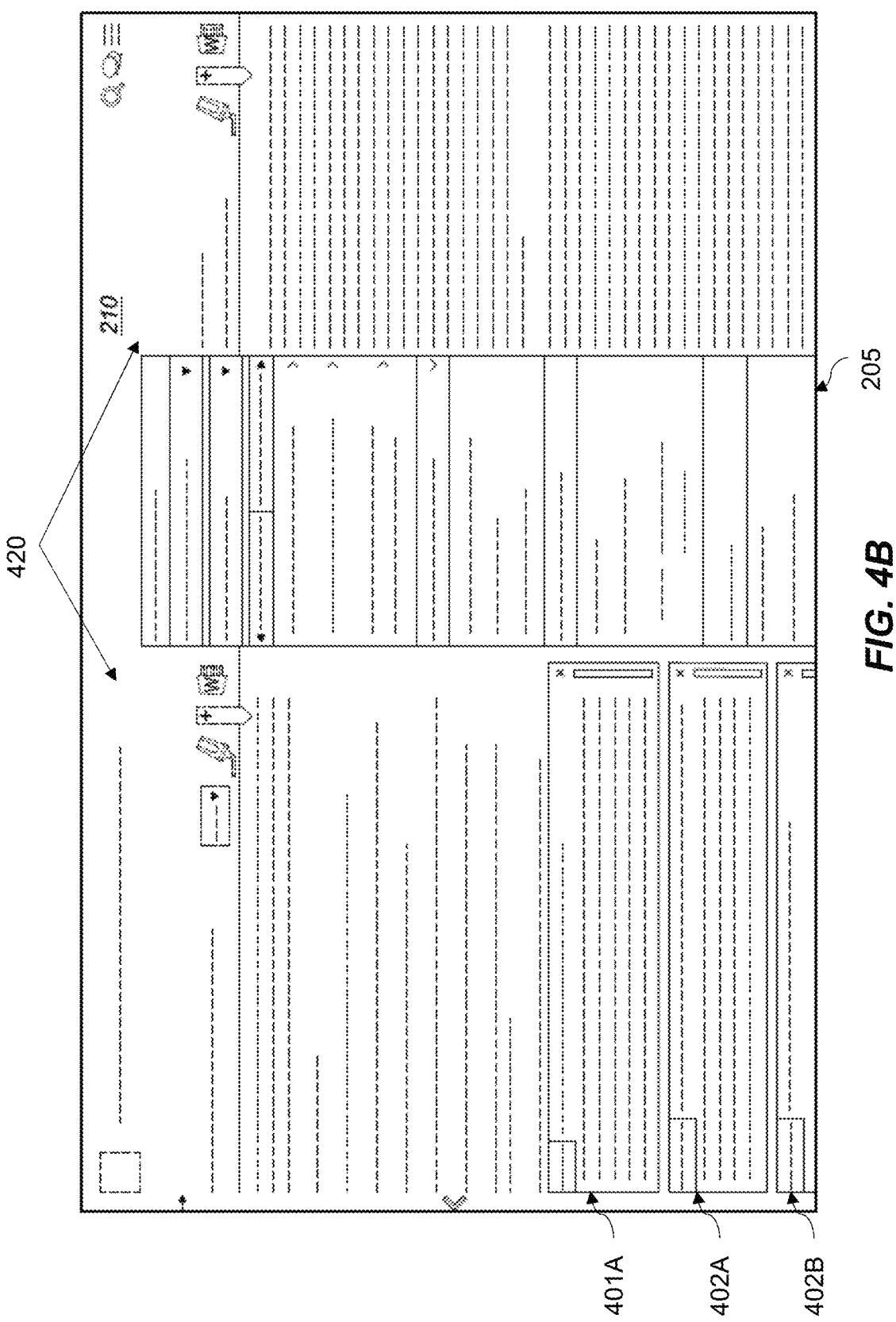
FIG. 4B is an exemplary screenshot illustrating another embodiment of a graphical user interface for presenting the native view feature of FIG. 2B.
Figure 4C:
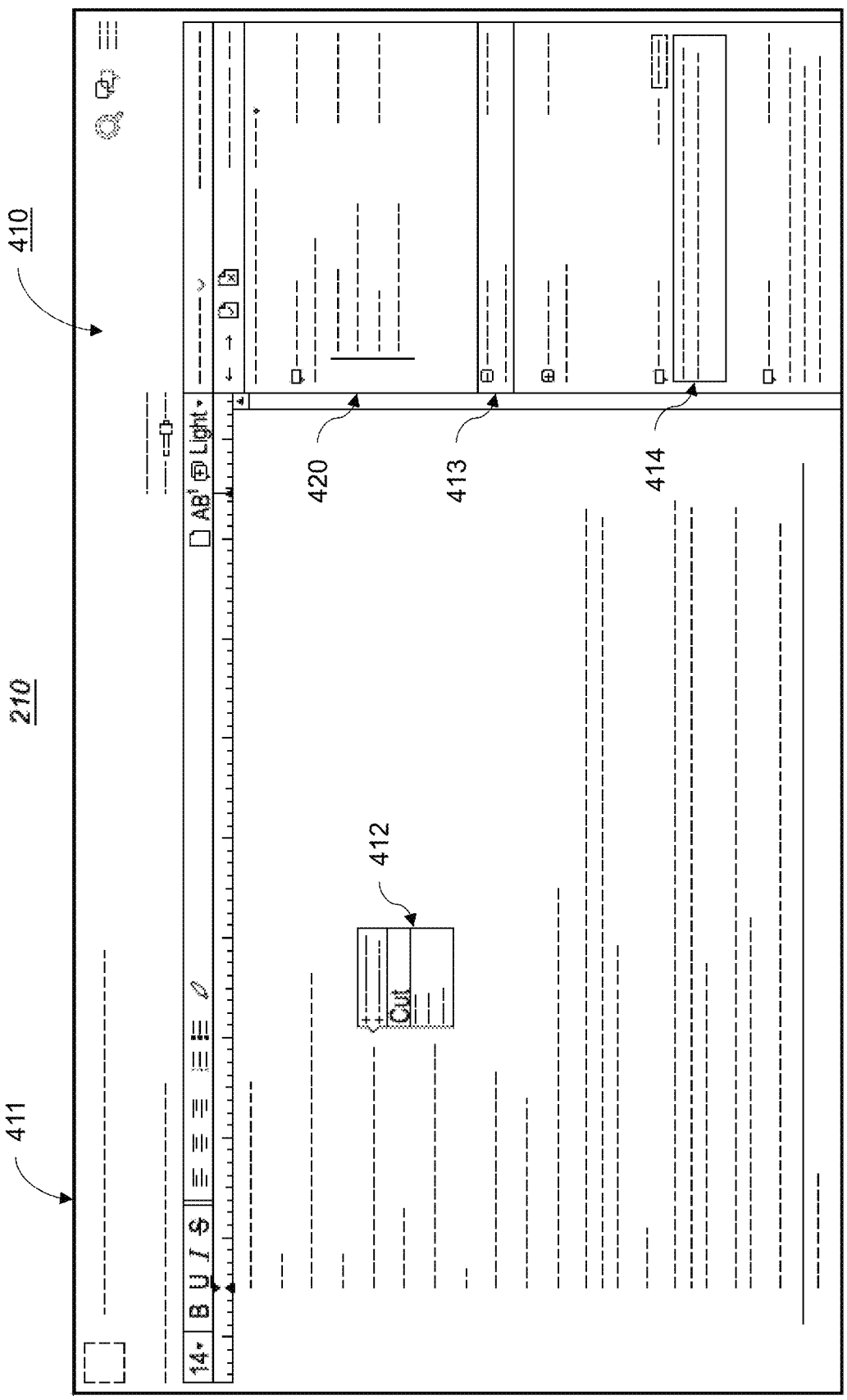
FIG. 4C is an exemplary screenshot illustrating another embodiment of a graphical user interface for presenting the editing function using the native view feature of FIG. 2B.
Figure 4D:
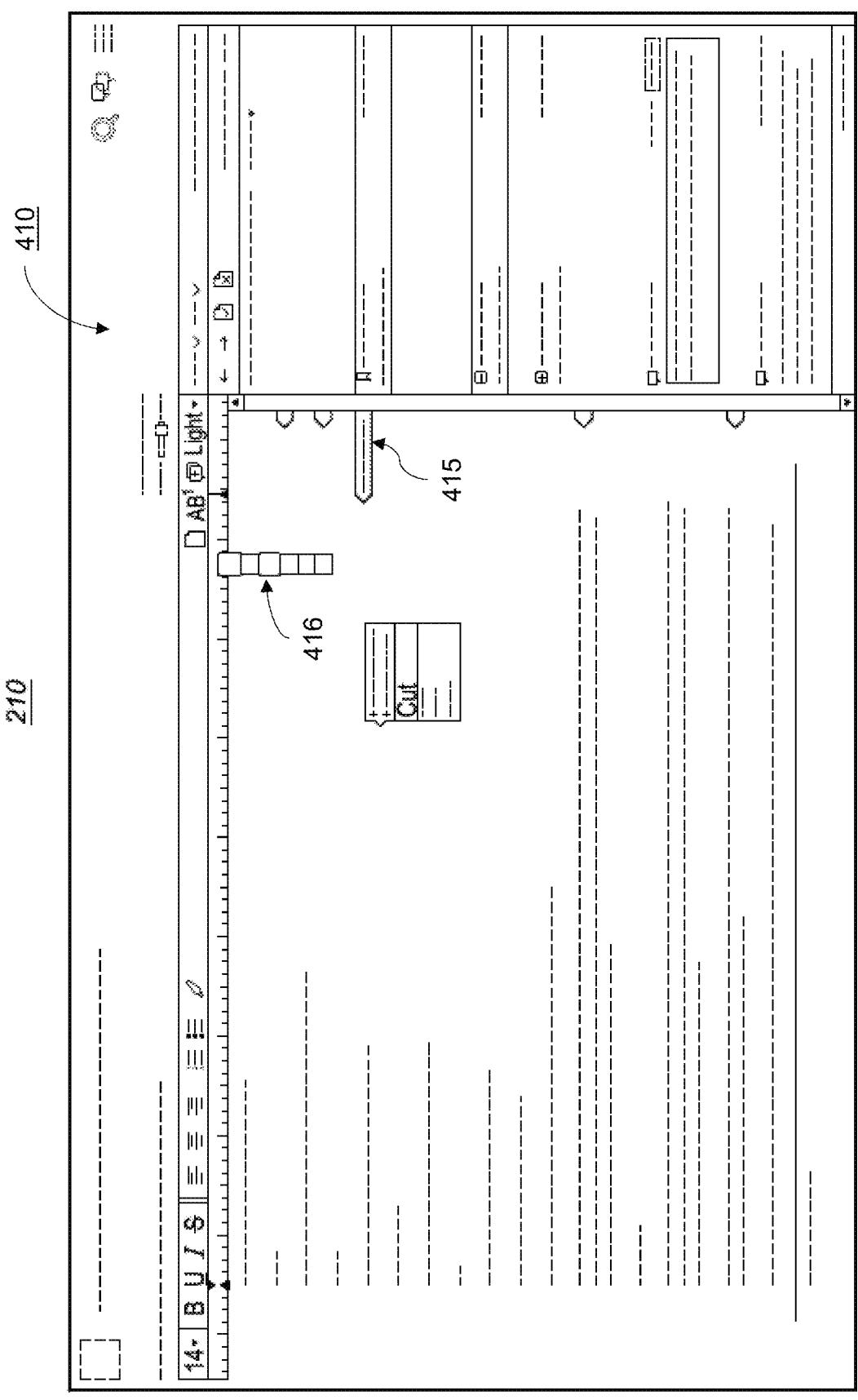
FIG. 4D is an exemplary screenshot illustrating another embodiment of a graphical user interface for presenting the editing function using the native view feature of FIG. 2B.
Figure 4E:
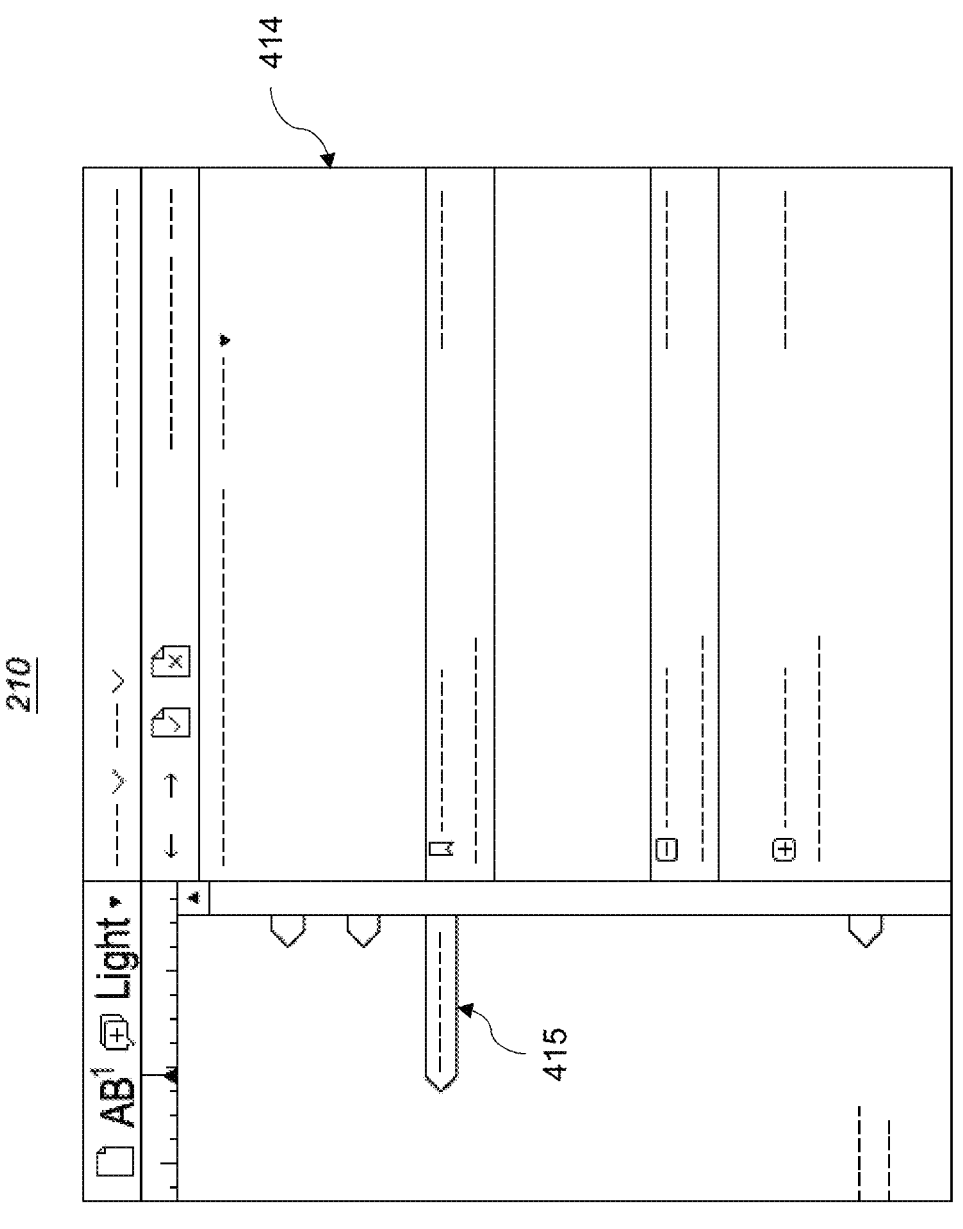
FIG. 4E is an exemplary screenshot illustrating another embodiment of a graphical user interface for presenting the editing function using the native view feature of FIG. 2B.

In some embodiments, additional tools can be embedded within the native 210 view. For example, a peek function 401, described herein and also referenced as a peek 401 or one or more peeks 401, can be used to automatically display defined terms and cross-references within the document, such as shown in FIGS. 4A-B. The peek function 401 allows the user to click on the defined term and/or cross-reference for immediate review of the language in those defined terms and cross-references. As definitions and cross-referenced text also include other embedded terms and/or cross-references, those embedded links can also be used to create a series of stacked definitions and references (hereinafter stacks 402). This functionality also works across connected documents to access defined terms from one document which may be defined in a connected document or cross-references in that connected document. Peeks 401 and stacks 402 provide the user immediate access to the defined term and cross-referenced provision, eliminating the time-consuming, manual need for the user to stop/pause a review/analysis and physically move through the document or across connected documents.

The native 210 view can be used with the peeks 401 and stacks 402 to streamline the review and analysis process throughout the lifecycle of a transaction (e.g., at transaction creation, during negotiation/amendments, and so on). The native 210 view can be used across the portals 101, within other features described herein, including the provision stacks 235, provision inventories 240, and the core document metrics 250. In some embodiments, the navigation 215 and the intelligence 220 can operate from within the native 210 view, thereby providing immediate access to the intra- and inter-document connections provided by those features.

Figure 4F:
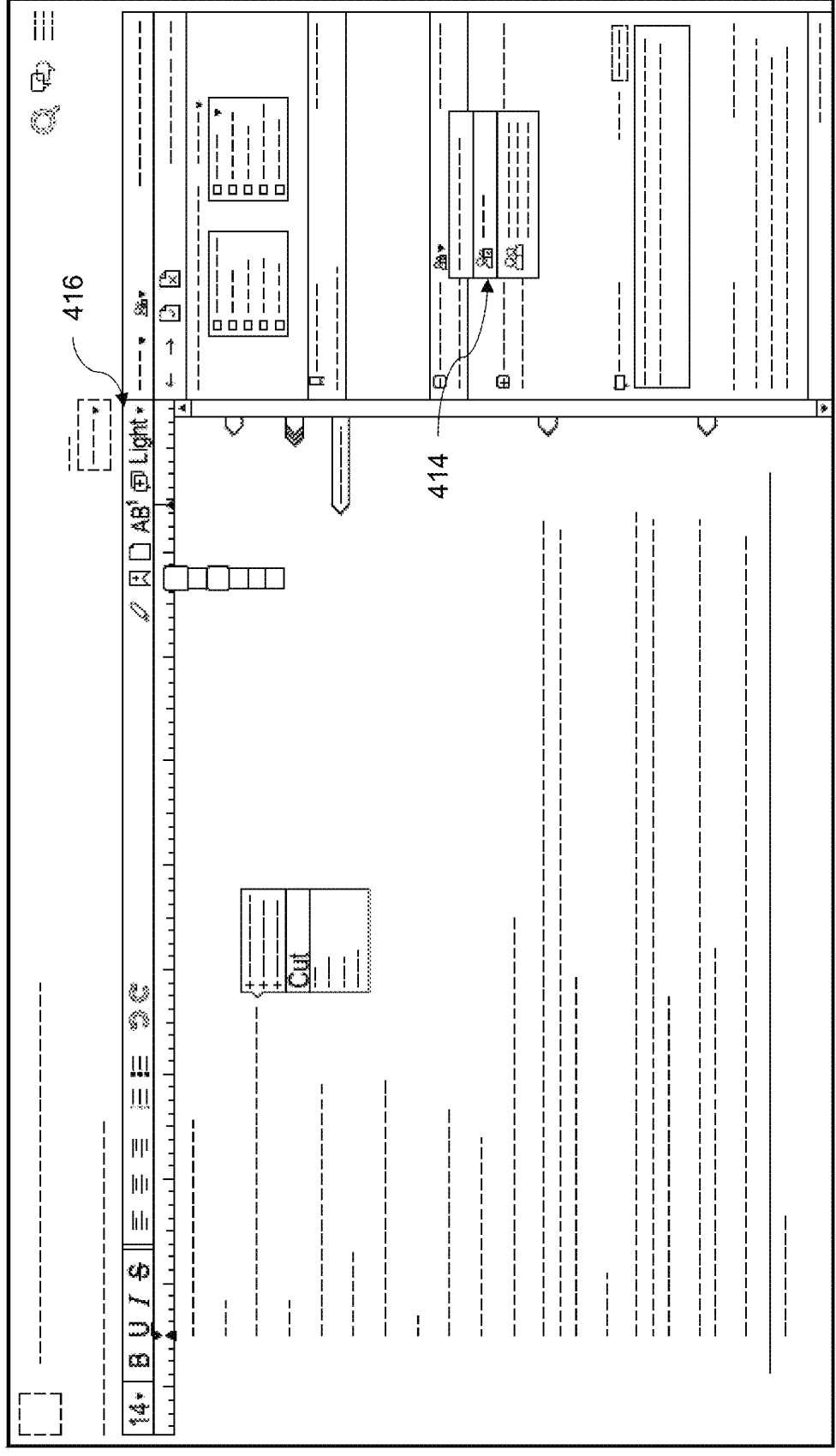
FIG. 4F is an exemplary screenshot illustrating another embodiment of a graphical user interface for presenting the editing function using the native view feature of FIG. 2B.

In some embodiments, a document editing feature 410 can be embedded within the native 210 view. The editing feature 410 allows users to provide real-time edits, viewable by others, for a seamless and collaborative work process. Additionally and/or alternatively, the user can tab/highlight text in both a single and dual document view. The provision of analytical data extractions alongside the editing function 410 creates a holistic transaction experience and structure for a user, enabling a user to access real-time dynamic data extractions, information and knowledge whilst editing and negotiating transaction documents. The interface also enables the user to move from a dark background to a white background (option 416) to ensure a preference in this functionality is provided to the user, such as shown in FIG. 4F.

Conventional document analysis requires hard copy review with limited searchability and manual means for moving through provisions, definitions, and cross-references within a single document or across multiple electronic or hard copy files. The native 210 view can be used across the portals 101 to streamline the lifecycle (e.g., creation, during negotiation, revisions, and so on) of a transaction, and advantageously enables speed, accuracy, and scale in document review with immediate access to provisions, definitions, and cross-references within a document or across multiple documents. The native 210 view also provides access to two connected documents side-by-side in a split, but connected screen, such as shown in FIG. 4B.

FIGS. 4A-H illustrate exemplary screenshots showing the presentation of the native 210 view of exemplary documents. FIG. 4A illustrates an exemplary presentation of a single document being shown in the native 210 view, wherein the core provisions 205 have been expanded to identify related schedules, appendices, and exhibits (shown as peeks 401 and stacks 402). In other words, the peek 401 exposes a selected definition or cross-reference from the native 210 view. The stacks 402 exposes a definition or cross-reference contained in the selected peek 401. As also shown in FIG. 4A, an exemplary core provision 205C (e.g., project costs) from the core provision framework for a loan agreement for a project financing is selected, which exposes the additional navigation framework 302. As shown in FIG. 4A, the selection of the menu option from the additional navigation framework 302 can also dynamically expose the text of a deconstructed and digitized document based on the native text of an original document in the main window 301.

FIG. 4B illustrates the native 210 view for dual document viewing showing the core provisions 205 between the two documents. As shown in FIG. 4B, the main window 301 has been separated into one or more multi-document windows 420. On the left of the user interface, the construction contracts can represent the primary document being viewed with a loan agreement shown on the right as a secondary document. The core provisions 205 have been dynamically repositioned to the center of the screen between the multi-document windows 420. Peeks 401 and stacks 402 for the primary document are shown. For example, a selected peek 401A of either a defined term or a cross-reference from the native text of the primary document is shown. A first stack 402A can present a definition and/or cross-reference detected in the selected peek 401A; a second stack of a definition or cross-reference detected in the native text of the first stack 402A is also shown.

FIGS. 4C-F show the editing function 410 available using the native 210 view. By way of example, turning to FIG. 4C, the editing function 410 enables the user to include comment boxes 414, footnotes 413, and redlines (not shown). These options are available on a dynamic text smart editing window 411. As shown on the right of the image, an editing review window 420 can be used to display the comment boxes 414, the footnotes 413, and/or a document revision history is available to manage the historical changes made to the document. A dynamic interface for smart editing can also enable a dynamic pop-up editing window 412. In some embodiments, the user can select a dark background for using the editing functionality 410 and/or a lighter background for ease of review. FIGS. 4C-F illustrate the editing function 410 available using the native view 210 wherein a dynamic user interface enables the user to annotate the document with footnotes 413, comment boxes 414, track-changes, tabs, and highlighting. For example, with reference to FIGS. 4D-E, a tab insert option 415 enables the user to place tabs into the text. Highlighting options 416 are also shown to highlight text in the interactive window. FIG. 4F illustrates various footnotes 413, comment-boxes 414, track-changes, tabs, and highlighting that have been expanded in the user interface. The comment boxes 414 shown in FIG. 4F illustrate exemplary multi-party commenting options to enable collaboration between parties.

Navigation

The navigation 215 feature can span the three components (e.g., the data frameworks 330, the data aggregation 320, and the operational efficiency 310) described above. The navigation 215 advantageously provides a supplemental data structure and data aggregation overlying the foundational data structure of the core provisions 205. This type of data structure, data aggregation and operational efficiency ultimately increases productivity and insights. In addition, it improves both focus on critical issues and the identification of anomalies and deviations at a speed and scale currently not available in this market.

The navigation 215 structures and presents the core provisions 205 to create an intuitive and organized classification and catalogue of identified and extracted data, enabling the user to effectively navigate and be directed and guided through a document using the core provisions 205 of that document.

The navigation 215 feature can be included within the native 210 view described herein. In some embodiments, the navigation 215 enables the user to navigate and be directed and guided through a document using the documents core provisions 205. The navigation 215 enables immediate access within a document and across connected documents, referred to herein as the intra- and inter-document connections, respectively, which the native 210 view provides, further streamlining and accelerating the review process.

Figure 5A:
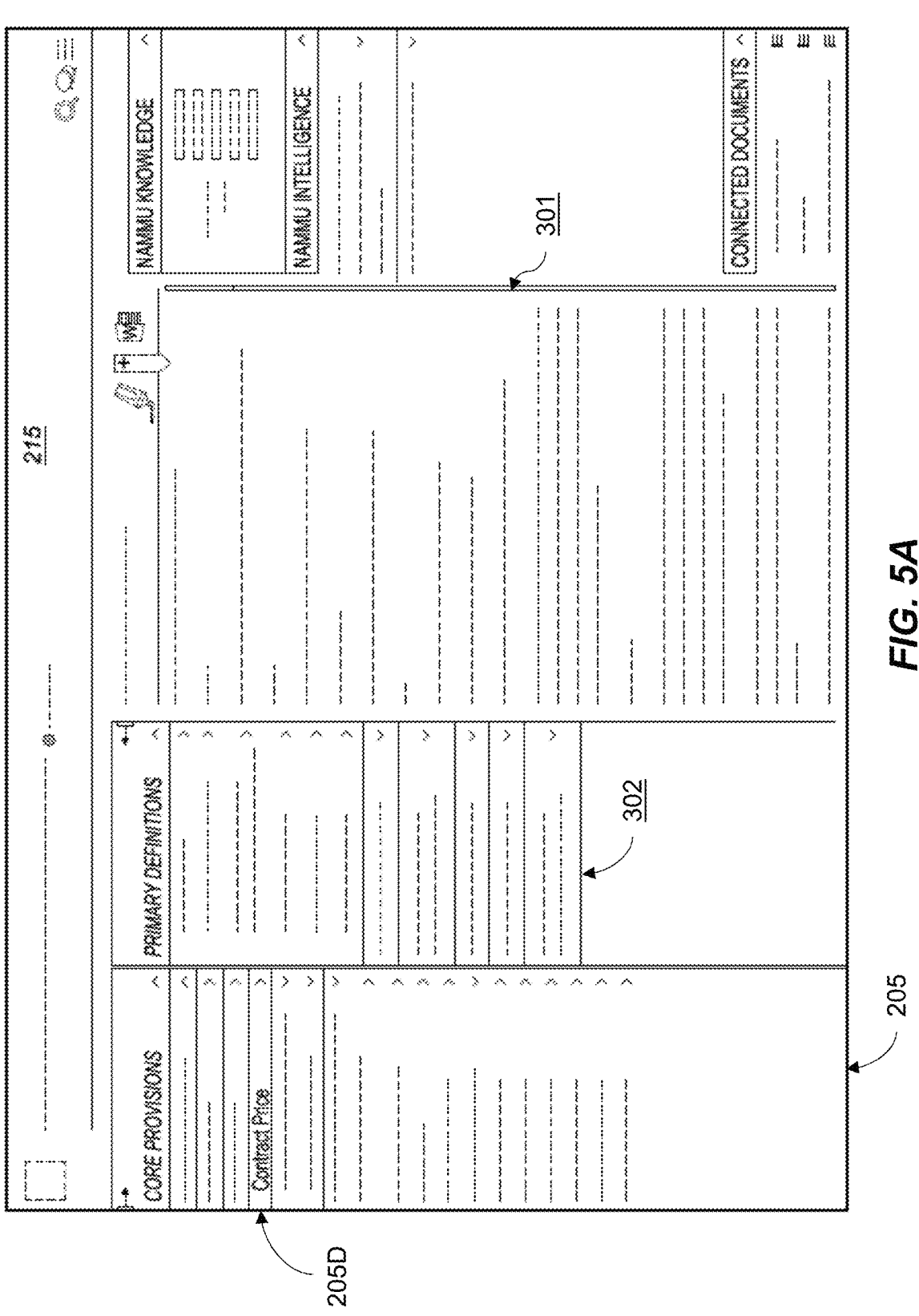
FIG. 5A is an exemplary screenshot illustrating another embodiment of a graphical user interface for presenting the navigation feature of FIG. 2B.

With reference to FIG. 5A, for example, an exemplary core provision 205C (e.g., contract price) from the core provision framework for a construction and development contract is selected, which exposes the additional navigation framework 302. As shown in FIG. 5A, a selection of a menu option from the additional navigation framework 302 can also dynamically expose the text of a deconstructed guarantee agreement in the main window 301. In some embodiments, the identified results of the navigation 215 can be set out in an exemplary navigation framework 302 that includes:

i. Primary Definitions,
   ii. Primary References,
   iii. Primary Schedules, Appendices & Exhibits,
   iv. Related Definitions,
   v. Related References and
   vi. Related Schedules, Appendices & Exhibits.

This structured indexing of results provides the user with an organized data schema for the identified data for each core provision, creating a repository of document and transaction connections. The repository exposes document topologies, which can be used to identify, extrapolate, and extract data patterns from documents at scale. This enables cross-transaction/cross-document comparisons, reviews, and assessments that were previously not possible with any meaningful scope, scale, or consistency.

In addition to navigating through the core provisions 205 of a selected document, the navigation 215 also enables the user to connect the selected document with any secondary document in a transaction. The navigation 215 also provides an organized data schema for the secondary documents connected to the primary document in a transaction. In some embodiments, substantive connections between two documents can be presented in a synthesized and organized framework. For example, with reference to FIG. 5A, the framework can include the following structure:

i. Connected Definitions,
   ii. Connected References,
   iii. Connected Schedules, Appendices & Exhibits,
   iv. Associated Definitions,
   v. Associated References, and
   vi. Associated Schedules, Appendices & Exhibits.

This structured index of results provides the user with an organized data schema for the identified data for each core provision connection into secondary documents creating a repository of secondary document connections. This repository of connections exposes connected document topologies. Inter-document topologies can be utilized to efficiently compare the core provisions 205 across transactions as well as further utilized to identify, extrapolate and extract data patterns at scale. This enables cross-transaction/cross-document comparisons, reviews, and assessments that were previously not possible with any meaningful scope, scale, or consistency.

Additionally and/or alternatively, all features described herein are available for each document separately. For example, a user can peek into a definition open on one document (via the peek function 401) and can peek and stack on a second document.

The navigation 215 is available throughout the lifecycle of a transaction, including at transaction creation and during negotiation and amendments to documents, such as shown in FIGS. 5A-D. In addition, because transactions in the private credit markets include numerous ongoing monitoring and reporting obligations, the navigation 215 can be used by transaction monitoring and operations teams who must continually refer to the documents to ensure such obligations are satisfied.

The navigation 215 advantageously enables speed in document review with immediate access to all provisions, connections, relationships, definitions, and/or cross-references within a document or across multiple documents.

Figure 5B:
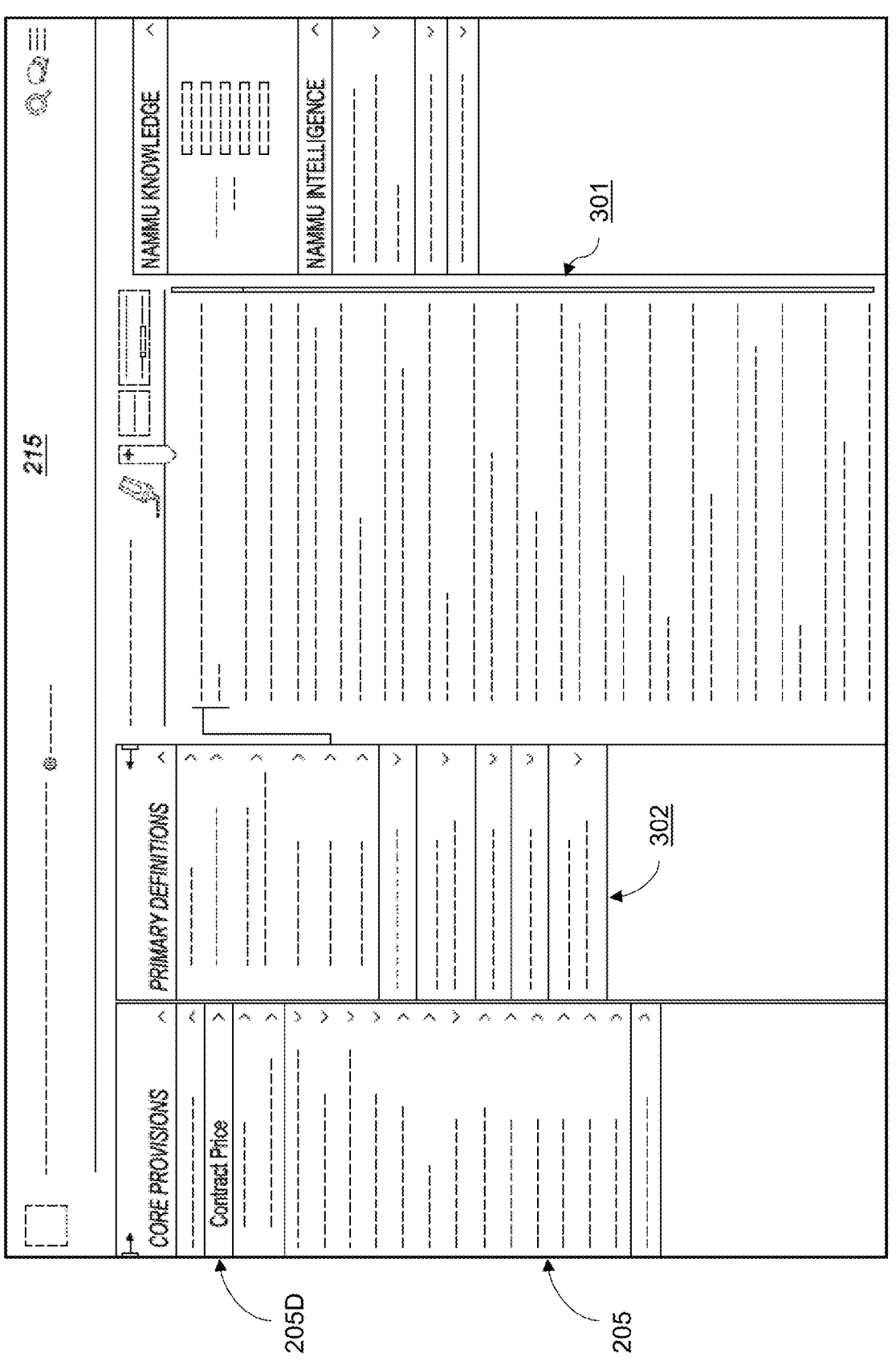
FIG. 5B is an exemplary screenshot illustrating another embodiment of a graphical user interface for presenting the navigation feature of FIG. 2B.

FIGS. 5A-D illustrate exemplary screenshots showing the presentation of the navigation 215 feature of exemplary documents. Specifically, FIG. 5A shows a graphical user interface for viewing the navigation 215 features in a single document view, wherein the core provisions 205 shown in the native 210 view are expanded for further details on the structure of a second-tier organization of primary and related definitions. Similarly, FIG. 5B illustrates the graphical user interface of FIG. 5A, wherein a selected primary definition for the core provision of the contract price is further expanded in the main window 301.

Figure 5C:
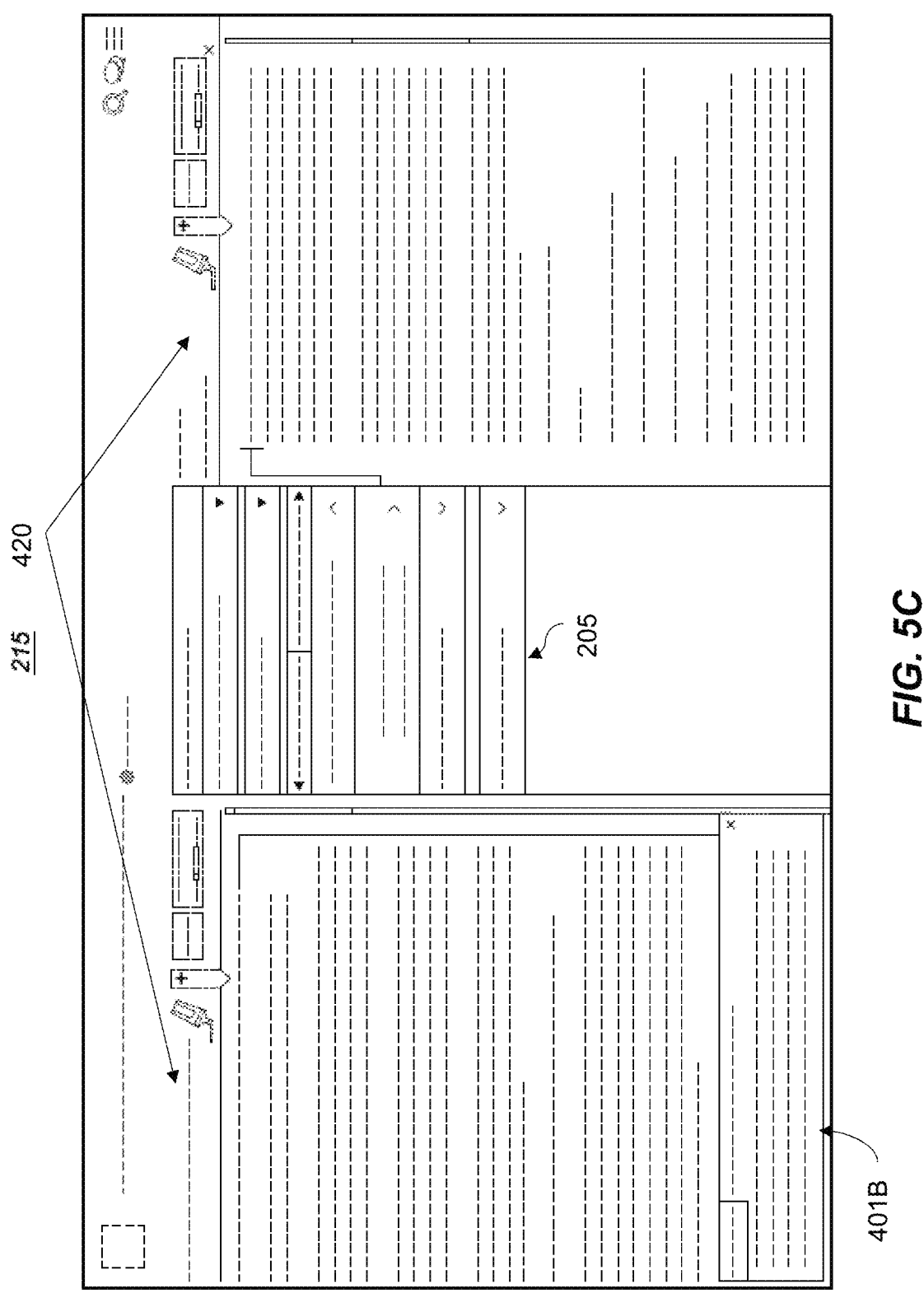
FIG. 5C is an exemplary screenshot illustrating another embodiment of a graphical user interface for presenting the navigation feature of FIG. 2B.

FIG. 5C illustrates a graphical user interface, wherein a selected primary definition for the core provision of the contract price is further expanded in multi-document windows 420.

Figure 5D:
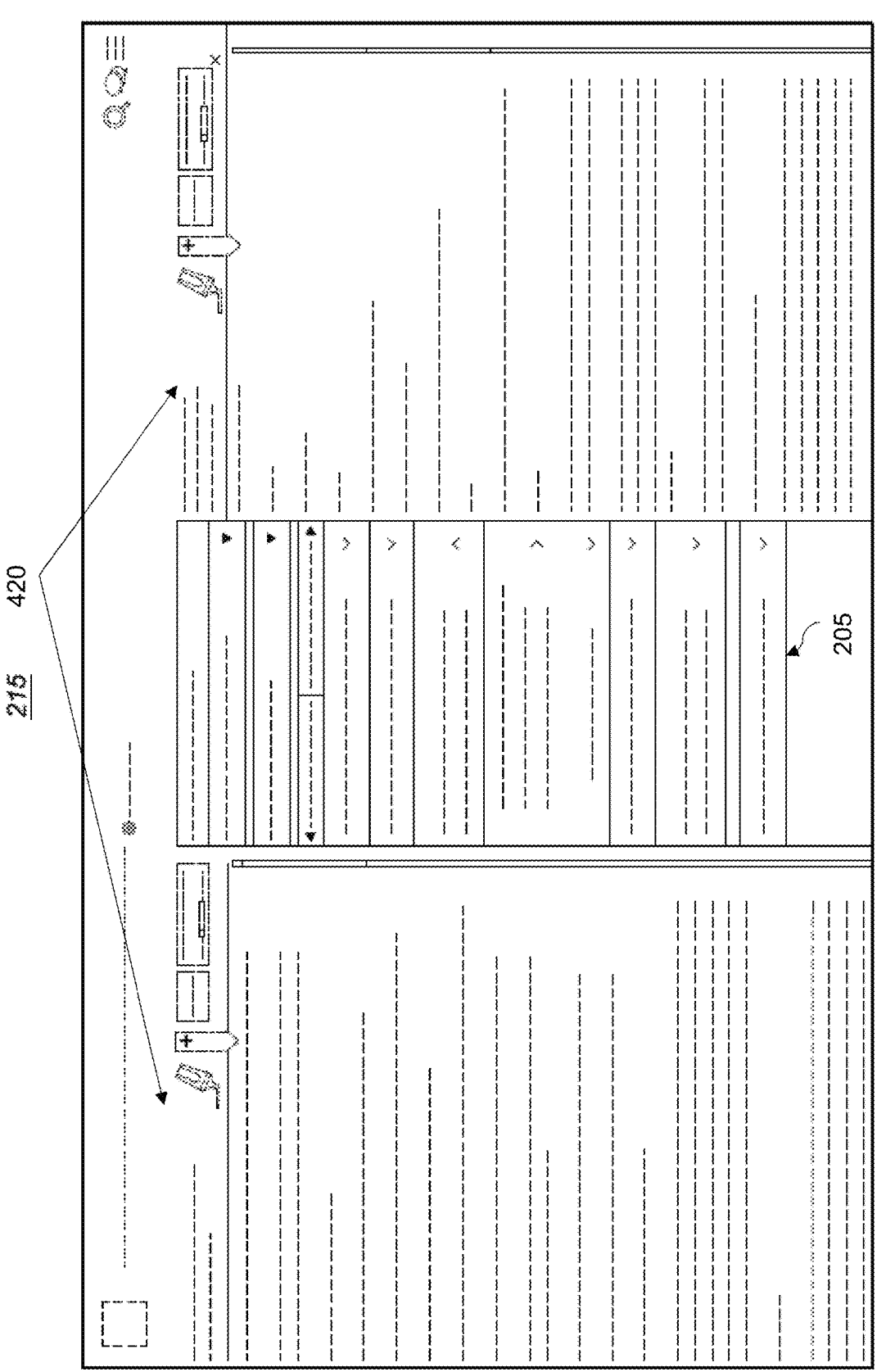
FIG. 5D is an exemplary screenshot illustrating another embodiment of a graphical user interface for presenting the navigation feature of FIG. 2B.

Additionally and/or alternatively, the navigation 215 feature can enable navigation through the core provisions 205 from the single document view shown in FIGS. 5A, B and/or the dual document view of FIGS. 5C-D. The dual document view enables the user to move between the connected documents with efficiency, focus and direction utilizing a structure and framework in the review and analysis of the connections and synthesis of provisions across a transaction.

Intelligence

The intelligence 220 feature can span the three components (e.g., the data frameworks 330, the data aggregation 320, and the operational efficiency 310) described above. The intelligence 220 feature structures data sets enabling efficient and effective review and assessments of both complex terms and conditions in a unique intuitive manner. This type of data structure, data aggregation and operational efficiency ultimately increases productivity and insights. It also improves both focus on critical issues and the identification of anomalies and deviations at speed and scale currently not available in this market.

The intelligence 220 feature represents a tertiary framework for data structuring and aggregation overlying the core provisions 205 to create an intuitive and organized classification and catalogue of identified and extracted data. The intelligence 220 feature is an analytical tool, such as used within the native 210 view, and includes the deconstruction and identification of complex and sophisticated relationships in and across documents. In some embodiments, the relationships are based on how provisions directly and indirectly interrelate and intersect and can represent a next level of association and linkage of the provisions in the data framework hierarchy. For example, the intelligence 220 provides immediate access to relevant relationships for a core provision 205 both within a document and across a set of connected documents (intra and inter connections). This further layer of "intelligent connections" streamlines and accelerates the document and transaction review process through the provision of tools, knowledge and insights generally reserved to the "experts" in this ecosystem.

The intelligence 220 feature creates uniformity, structure and organization with respect to the identification, review and analysis of the complex and sophisticated connections in and across documents.

The connections and relationships of the intelligence 220 feature are based on what is customarily considered, read, and reviewed by experts in their undertaking of a comprehensive, in-depth analysis of documents or sets of connected documents.

The intelligence 220 feature provides a data schema to enable users to immediately access and use the expert connections in an organized and structured review of transaction documents to quickly identify, understand, and assess provisions, rights, and obligations within a transaction and at scale across multiple transactions.

The identified results of the intelligence 220 can be structured into an organized framework:

Context,
Related Rights or Obligations,
Potential Mitigants or
Potential Consequences.

This structured indexing of results provides the user with an organized schema for the identified data, relationships, and insights for each core provision, creating a repository of document and transaction level relationships and insights. This repository exposes both individual document—(i.e., intra) and transaction-level (i.e., inter) topologies, which can be used to identify, extrapolate, and extract patterns of insights and relationships from documents at scale. This enables cross-transaction/cross-document comparisons, reviews, and assessments that were previously not possible with any meaningful scope or proportion.

Conventional methods do not offer an organized, structured approach to determining and analyzing the smart connections that exist within or across documents. In other words, conventional methods are manual, bespoke, require the user to have knowledge, unstructured and not scalable, requiring de novo analysis to be undertaken for each transaction, with no framework or structure to organize the results. This means that effective comparisons and assessments across documents and transactions are de facto impossible. In addition, this "recreating the wheel" analysis process for each transaction is time-consuming, inefficient and inconsistent.

With reference to FIGS. 6A-D, the intelligence 220 feature enables the user to navigate and analyze complex documents by providing access and insights into real-time knowledge, speed in analysis, decision making, assessment, and judgment, consistency in transaction analysis and an enhanced ability to manage risk, increased productivity and insights. It also improves both focus on critical issues as well as the identification of anomalies and deviations at speed and scale currently not available in this market.

Figure 6A:
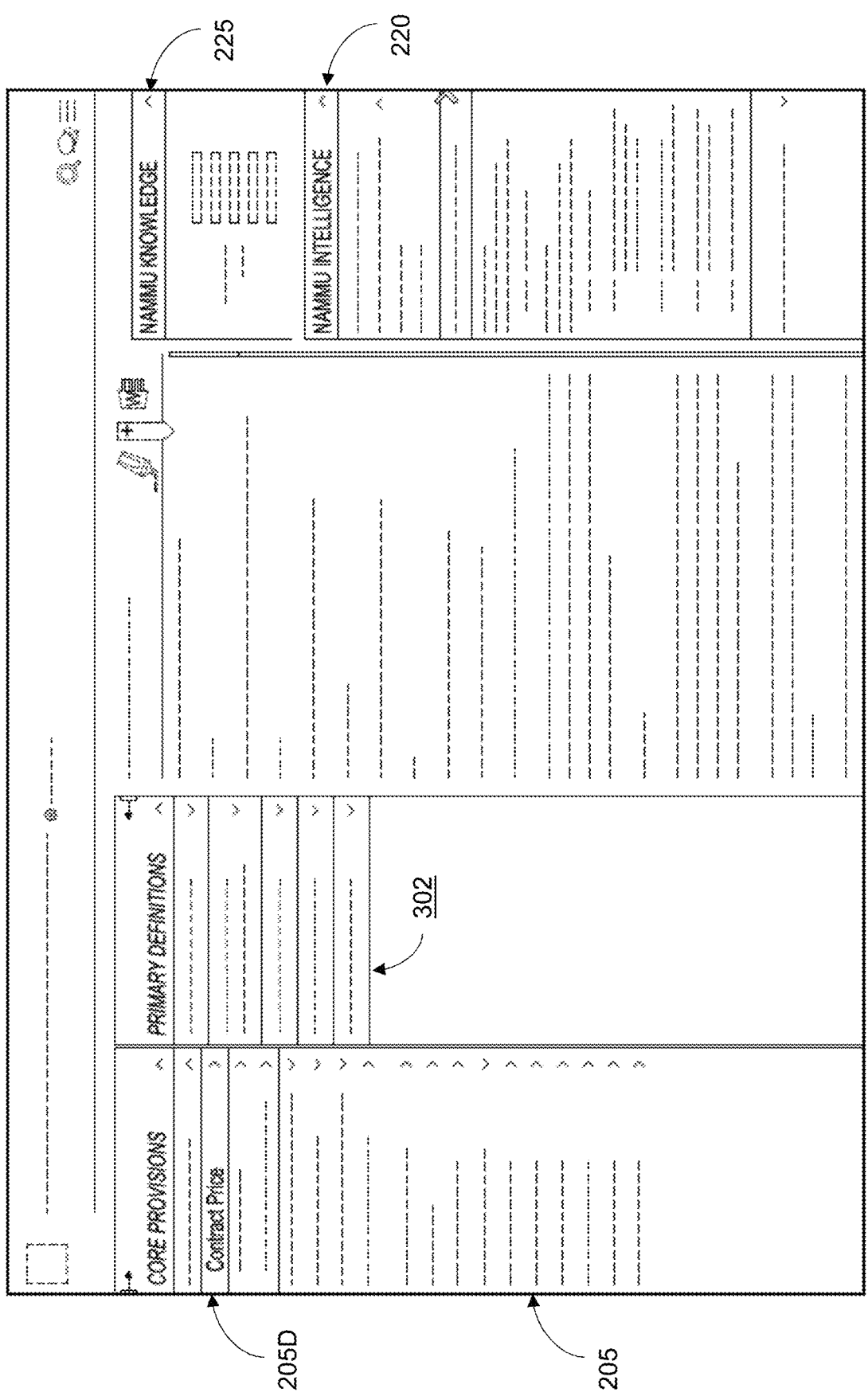
FIG. 6A is an exemplary screenshot illustrating another embodiment of a graphical user interface for presenting the intelligence feature of FIG. 2B.
Figure 6B:
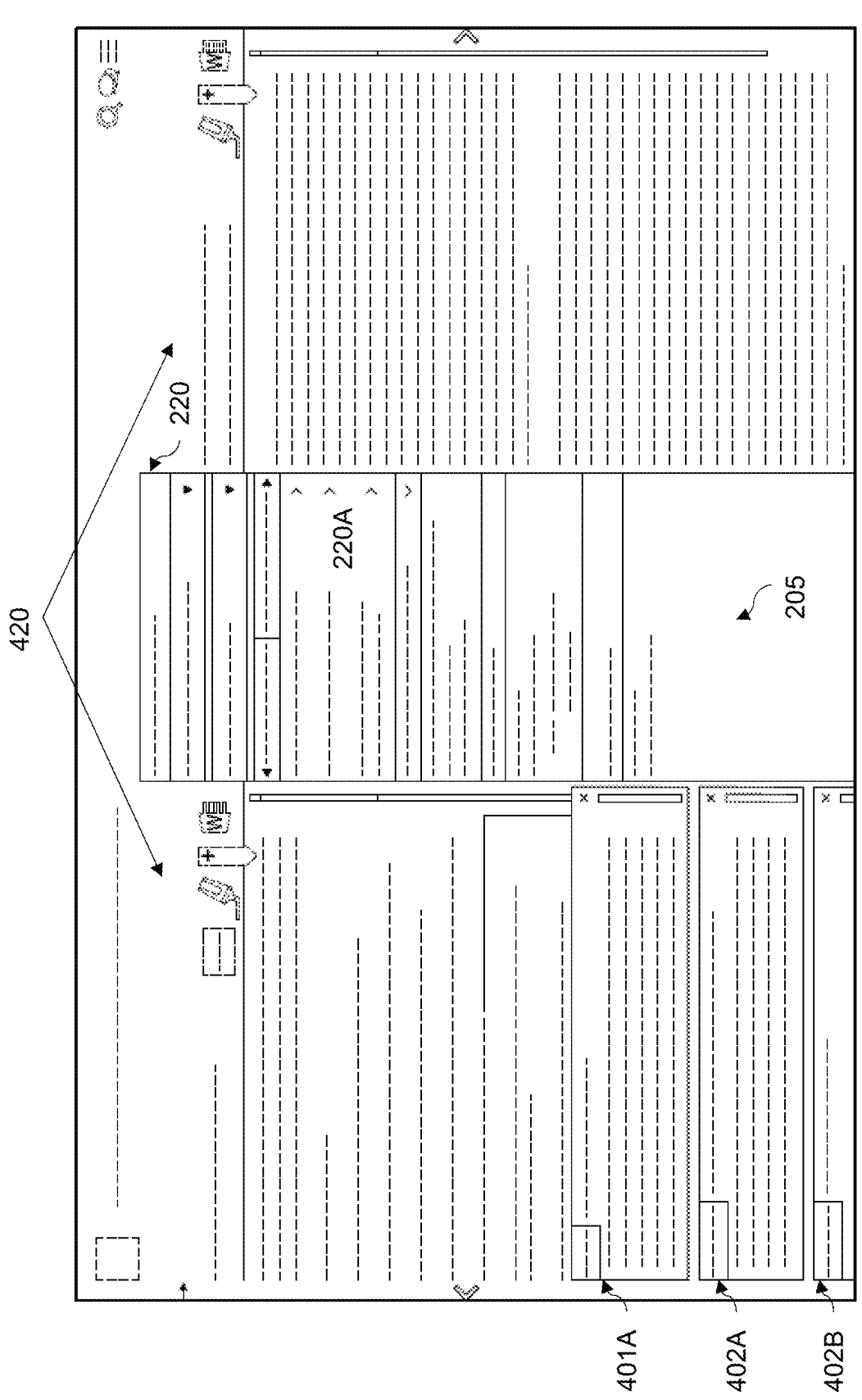
FIG. 6B is an exemplary screenshot illustrating another embodiment of a graphical user interface for presenting the intelligence feature of FIG. 2B.
Figure 6C:
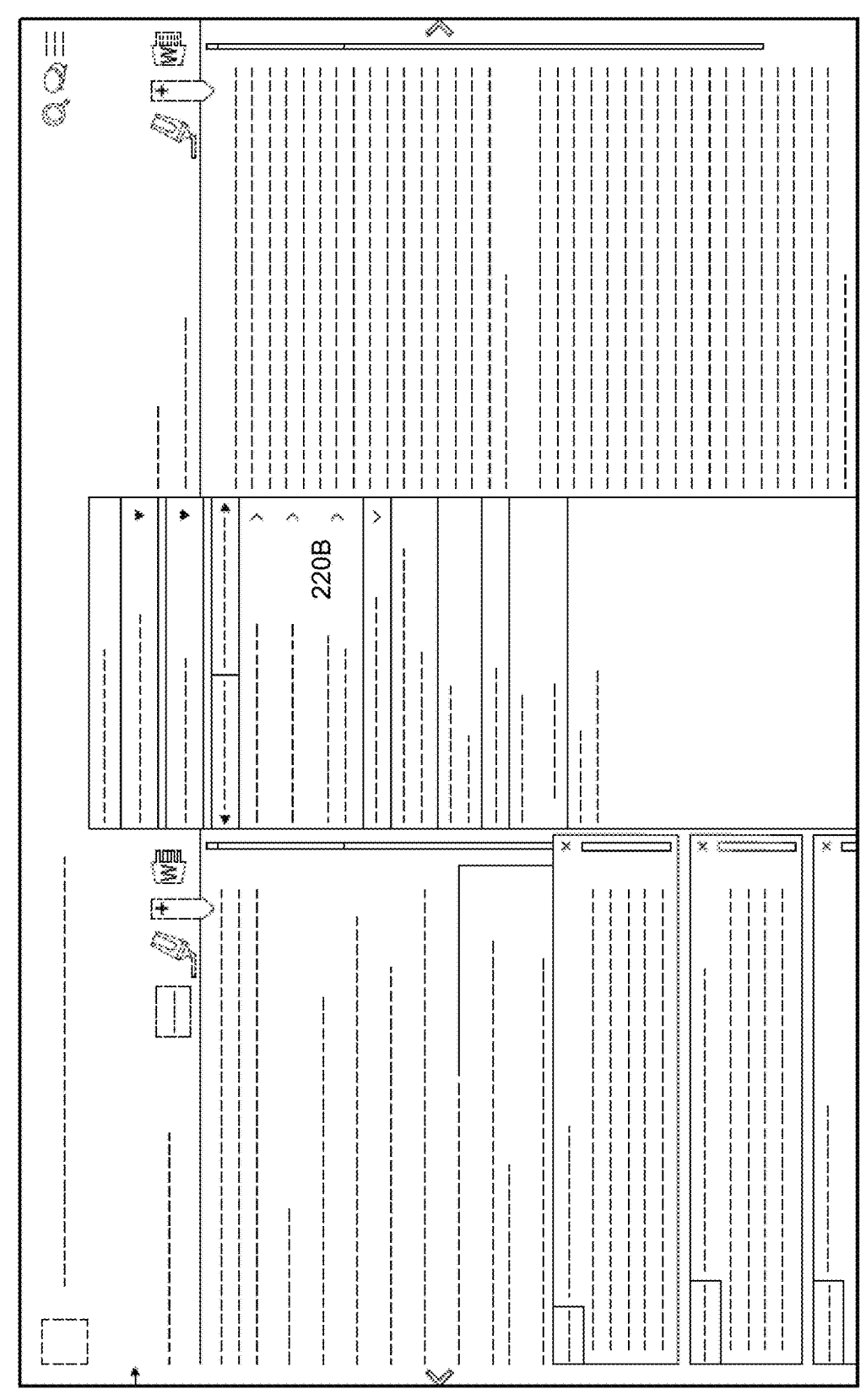
FIG. 6C is an exemplary screenshot illustrating another embodiment of a graphical user interface for presenting the intelligence feature of FIG. 2B.
Figure 6D:
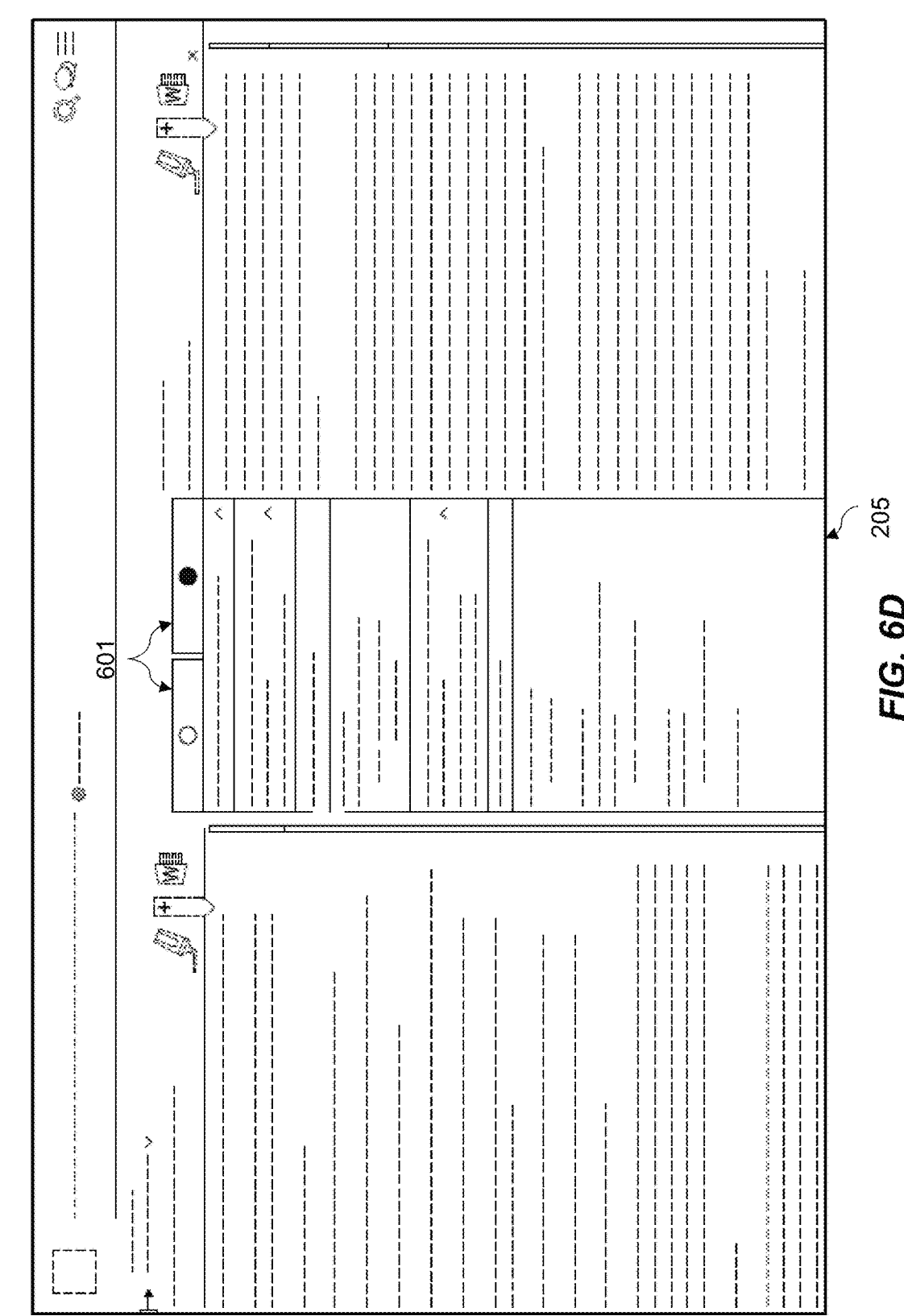
FIG. 6D is an exemplary screenshot illustrating another embodiment of a graphical user interface for presenting the intelligence feature of FIG. 2B.

FIG. 6A illustrates a single document view of an alternative intelligence 220 feature, for example as a "potential consequence" (not shown) intelligent connection. As shown, an exemplary core provision 205D (e.g., contract price) from the core provision framework is selected, which exposes the additional navigation framework 302. In some embodiments, the selection of the exemplary core provision 205D can activate the knowledge 225 and the intelligence 220 features that are related to the selected core provision 205D. For example, the framework of the intelligence 220 feature for the primary document can provide one or more smart connections/relationships for the selected core provision 205D. FIG. 6B shows a dual document view of the "potential consequence" intelligent connection exposed in the connected document. Specifically, the core provisions 205 and intelligence 220 features enable uses to navigate and review at least two connected documents simultaneously in multi-document windows 420. The intelligence 220 connections are shown in the middle column, with the "potential consequence" intelligence connection 22A into the secondary document being highlighted. FIG. 6C shows yet another intelligence 220 feature, shown as the "context" intelligent connection 220B in the connected document. Peeks 401 and stacks 402 of the primary document can be seen in FIGS. 6B-C. FIG. 6D illustrates an alternative embodiment of the intelligence 220 feature of various documents. As shown, an option 601 is provided to navigate between the core provision 205 framework (shown) and intelligence 220 feature (not shown) across the connected documents.

Knowledge

The knowledge 225 feature can span the three components (e.g., the data frameworks 330, the data aggregation 320, and the operational efficiency 310) described above. The knowledge 225 feature presents a graphical, dynamic representation of critical concepts in a single document or across multiple electronic files or documents, aggregating, categorizing, indexing, and displaying-often disparate-key data points for visual analysis. In some embodiments, the knowledge 225 feature presents user comparative data based on the content of the document and what the system has identified in equivalent documents from other transactions. This enables the user to immediately assess the document being reviewed, comparing it to equivalent documents.

Conventionally, graphical representations of provisions or obligations in individual documents or connected documents in a transaction, if created, are developed manually by each transaction stakeholder separately. The representations are static and bespoke, generally do not provide any basis for comparing provisions across transactions, take considerable time to prepare, are costly to produce and ultimately have limited value beyond the transaction for which they were developed. There is also no consistency, equivalency, or ability to scale or effectively compare the data from any of the graphics and there is no market accepted approach to their development which, if it existed, would enable market connectivity and real-time collaboration, analysis and assessments across transaction stakeholders.

Accordingly, the knowledge 225 feature uniquely displays a dynamic aggregation of key data points in transaction documents. The knowledge 225 feature enables access and insight into real time pools of information and knowledge previously inaccessible at scale, speed in analysis, decision making, assessment and judgment, consistency in transaction analysis, enhanced ability to manage risk, increased productivity improving both focus on critical issues as well as the identification of anomalies and deviations at a speed and scale currently not available in this market.

Figure 7A:
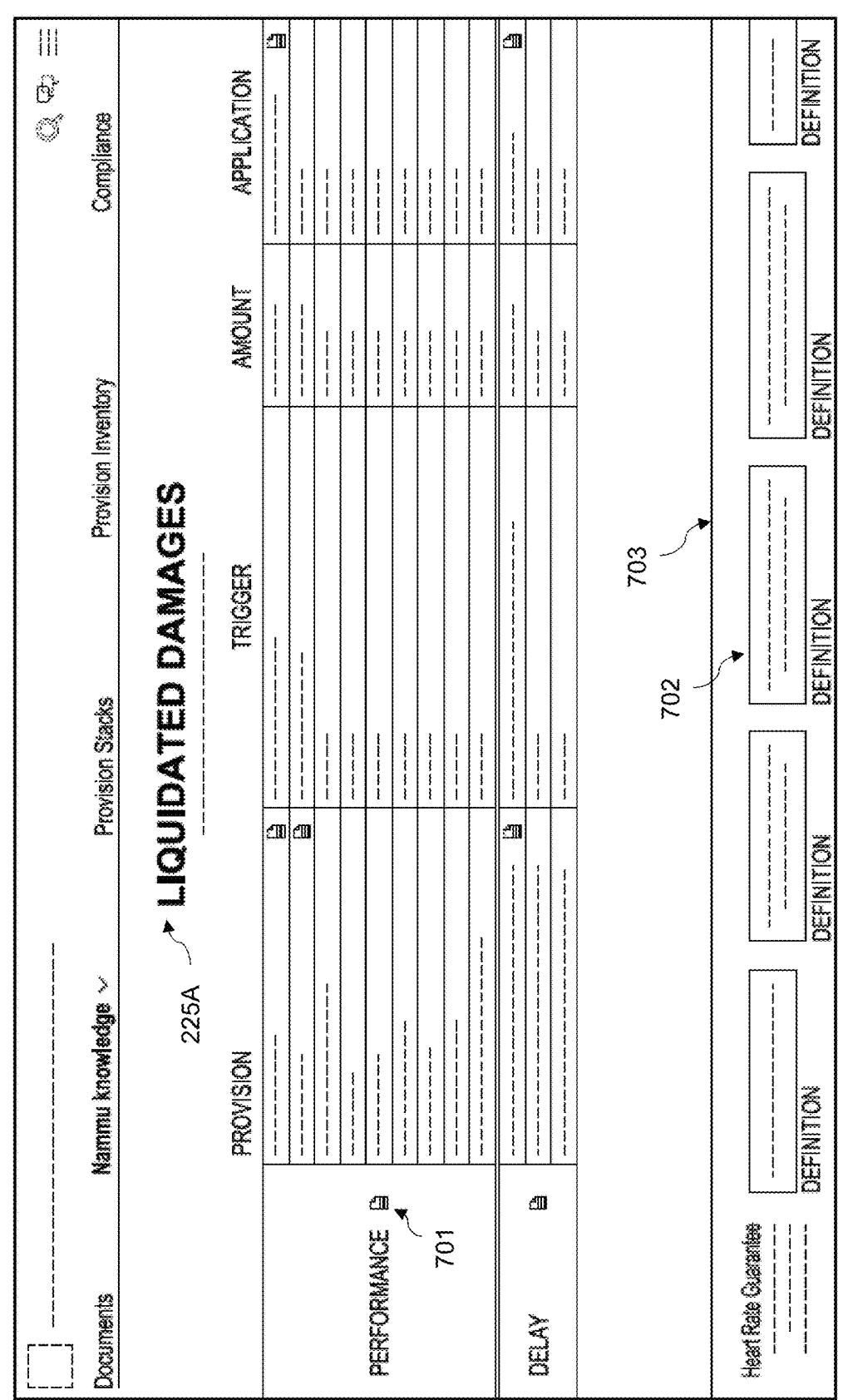
FIG. 7A is an exemplary screenshot illustrating one embodiment of a graphical user interface for presenting the knowledge feature of FIG. 2B.

For example, with reference to FIGS. 7A-TT, the knowledge 225 feature enables access and insight into real time pools of information and knowledge previously inaccessible at scale. It further enables speed in analysis, decision making, assessment and judgment, consistency in transaction analysis, and enhanced ability to manage risk.

Assignment & Transfer Table—organized, structured relevant data extracts across connected documents selected by user.

Change Orders—organized structured relevant data extracts across 2 connected documents.

Construction Timeline—organized structured relevant data within the primary document and also across connected documents.

Contract Price—organized structured relevant data from a single document.

Credit Support—organized structured relevant data from a single document.

Debt Service Coverage Ratio—organized structured relevant data from a single document.

Force Majeure—organized, structured relevant data extracts across connected documents selected by user.

Liquidated Damages—organized structured relevant data across connected documents.

In some embodiments, each of the graphical representations of provisions or obligations can be connected to relevant portions of underlying transaction documents enabling the user to move from a graphic into relevant provisions of that transaction document that has been dynamically extracted. The extracted provisions can be displayed to the user at the bottom of the user interface using the native 210 view (and/or the peeks 401 and stacks 402 embedded in the user interface).

The knowledge 225 feature is a visual framework creating an intuitive structure over data sets enabling efficient and effective review and assessments of complex provisions, terms, and conditions (often referenced across various sections of documents (inter and intra) in a unique advanced manner. This type of data structure, data aggregation and operational efficiency ultimately increases productivity and insights and improves both focus on critical issues and the identification of anomalies and deviations at a speed and scale currently not available in this market.

FIGS. 7A-TT illustrate exemplary screenshots showing the presentation of the knowledge 225 feature of exemplary documents. FIGS. 7A-B illustrates a user interface showing an exemplary knowledge 225 feature of a liquidated damages concept across connected documents from a single transaction. As shown, various relevant references and connections from the underlying documents are collated and aggregated into the graphical representation of the liquidated damages. Exemplary relevant references and connections are shown at the bottom of the interface. Each of the boxes are linked to the identified provision and the user can view peeks 401 and stacks 402 in this feature. For example, each reference 702 is clickable and the text of the native document can be displayed. Similarly, all relevant provisions 703 that contain or refer to data that is identified and extracted can be shown. A document icon 701 enables access to the relevant provisions in the underlying document. FIG. 7B further illustrates an identified provision that can be further expanded on the bottom. Specifically, as shown, peeks 401 and stacks 402 for defined terms and cross-references are available.

Figure 7C:
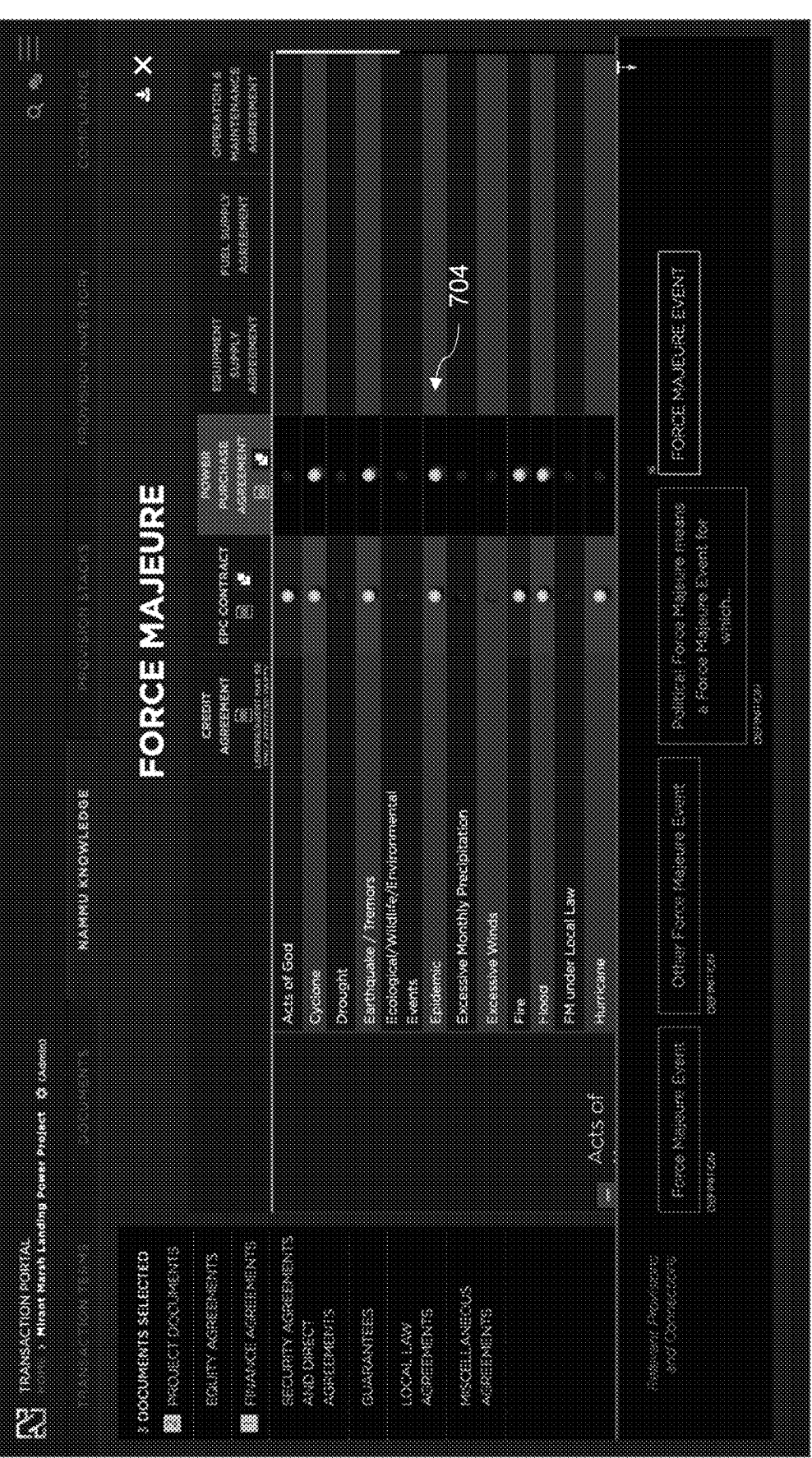
FIG. 7C is an exemplary screenshot illustrating another embodiment of a graphical user interface for presenting the knowledge feature of FIG. 2B.
Figure 7D:
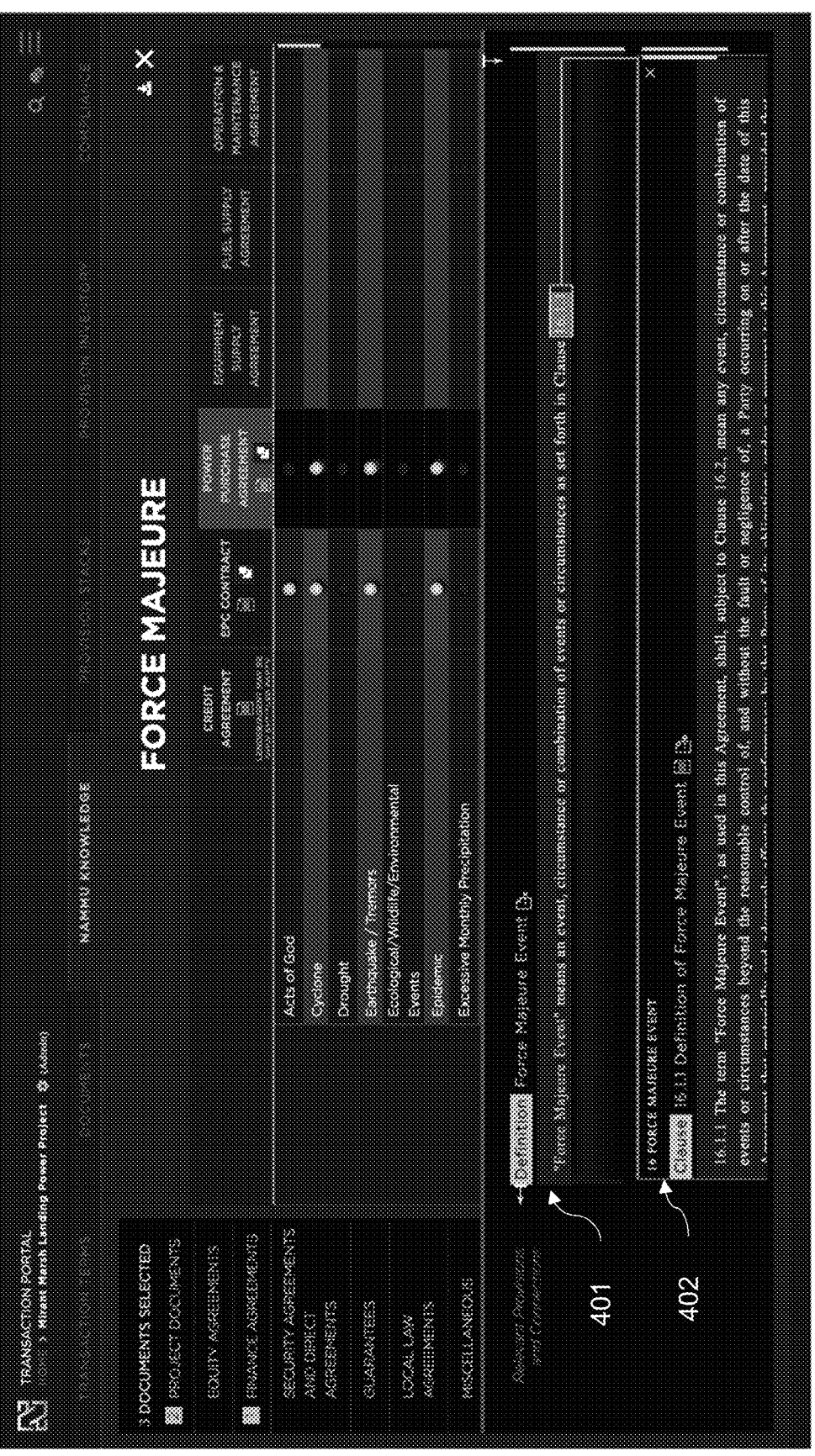
FIG. 7D is an exemplary screenshot illustrating another embodiment of a graphical user interface for presenting the knowledge feature of FIG. 2B.

FIGS. 7C-D show an alternative knowledge 225 feature of a force majeure concept across connected documents from a single transaction. As shown, various relevant references and connections from the underlying documents are collated and aggregated into the graphical representation of the force majeure. In some embodiments, the data equivalencies 704 can include links (shown as a double document icon) to bring up and view the underlying related document. Exemplary relevant references and connections are shown at the bottom of the interface. Each of the boxes are linked to the identified provision and the user can view peeks 401 and stacks 402 in this feature. Furthermore, data equivalencies 704 can be immediately assessed and reviewed across connected documents. FIG. 7D further illustrates an identified provision that can be further expanded on the bottom. Specifically, as shown, peeks 401 and stacks 402 for defined terms and cross-references are available.

Figure 7E:
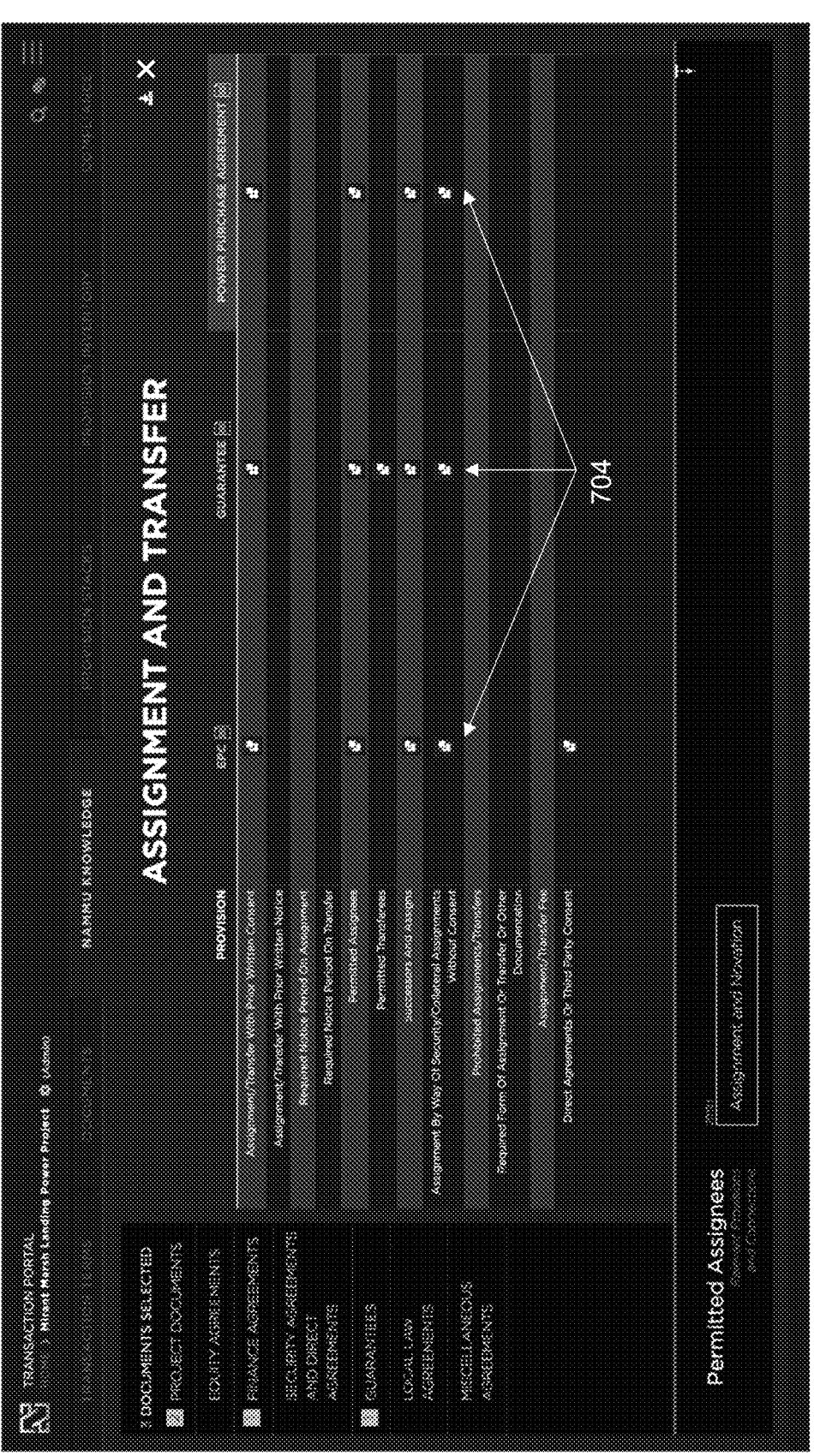
FIG. 7E is an exemplary screenshot illustrating another embodiment of a graphical user interface for presenting the knowledge feature of FIG. 2B.
Figure 7F:
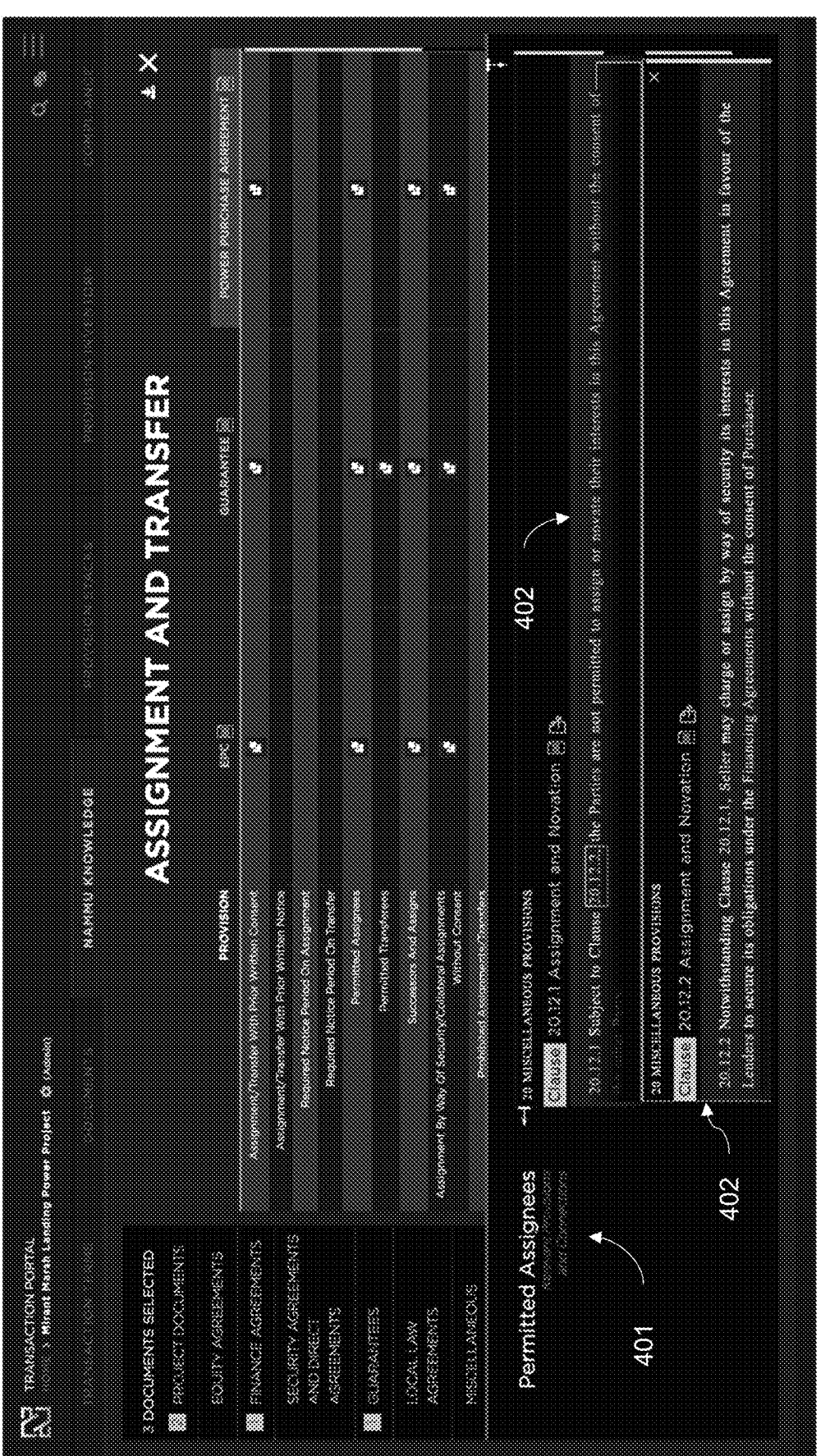
FIG. 7F is an exemplary screenshot illustrating another embodiment of a graphical user interface for presenting the knowledge feature of FIG. 2B.
Figure 7G:
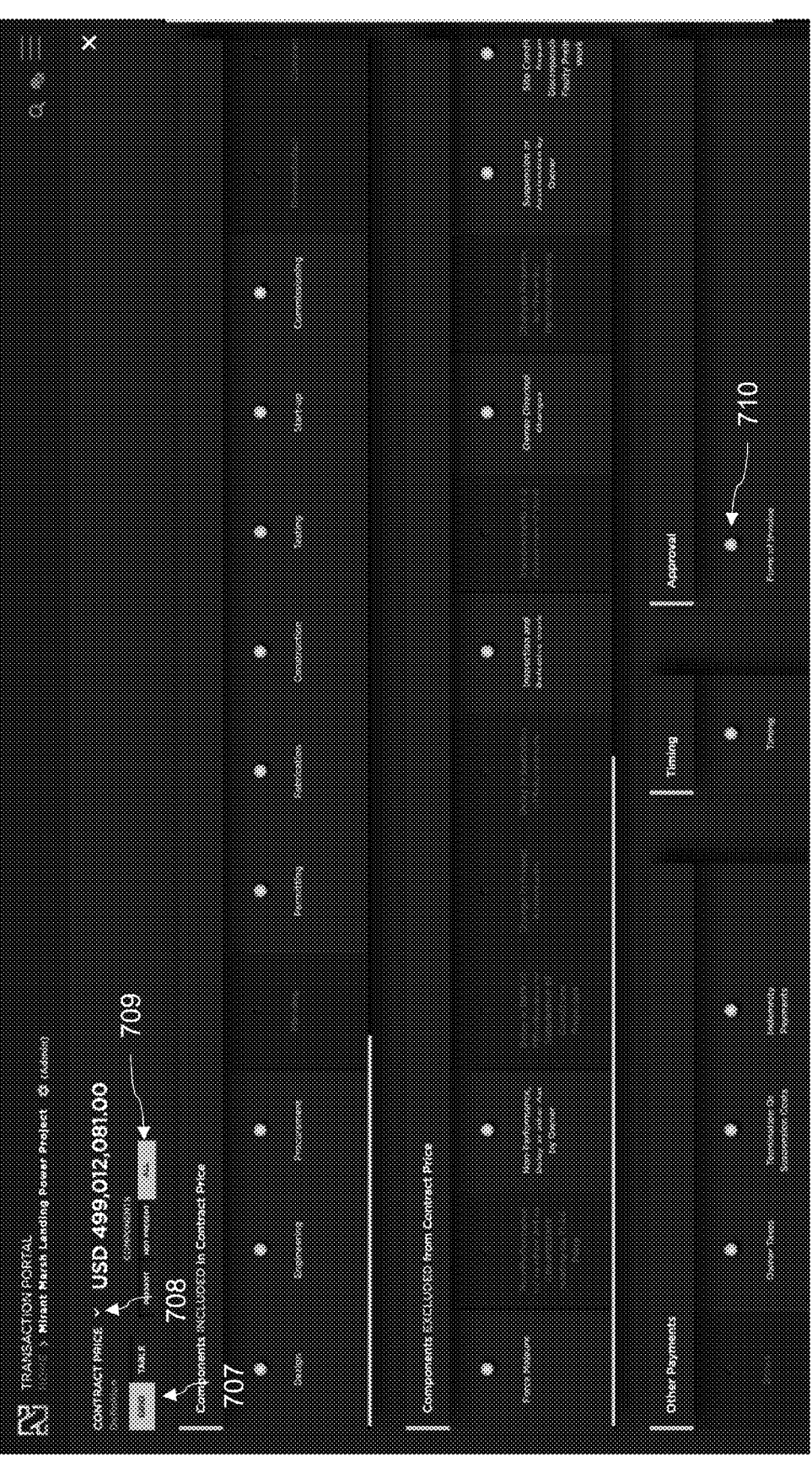
FIG. 7G is an exemplary screenshot illustrating another embodiment of a graphical user interface for presenting the knowledge feature of FIG. 2B.

FIGS. 7E-F show an alternative knowledge 225 feature of an assignment and transfer concept across connected documents from a single transaction. As shown, various relevant references and connections from the underlying documents are collated and aggregated into the graphical representation of the assignment and transfer provisions. Exemplary relevant references and connections are shown at the bottom of the interface with each of the boxes linked to the identified provision and the user can view peeks 401 and stacks 402 in this feature. In some embodiments, the data equivalencies 704 can include links (shown as a double document icon) to bring up and view the underlying related document. The identified provision can be accessed from this view with the peeks 401 and stacks 402 feature, shown in FIG. 7F.

FIGS. 7G-L show an alternative knowledge 225 feature of a concept of contract price for a construction contact in its initial state. As shown, all the components relating to contract price set out across different provisions in a construction contract are collated and aggregated into a dynamic "live" data hierarchy through which the user can delve into the relevant details on the concept in a structured and organized framework. Each of the initial limbs expands to expose the aggregated details of the contract price. In some embodiments, with reference to FIG. 7G, an indicator button 710 can also be used to indicate the presence of a component of the contract price. Upon selection of the indicator button 710, a definition, clause, schedule, and associate prices with that component can be opened. A multi-state toggle button 707 can also move between a table or grid view to show an overview of included components, excluded components, other payments, timings, and approvals associated with the contract price. The contract price is also formatted in the style of a drop-down option 708 to present any related definitions, clauses, and/or schedules. A second multi-state toggle option 709 can display filtered components of the contract price that are present, not present, or all together. With reference to FIGS. 7H-L, a third multi-state toggle option 719 can also be used to toggle additional filters: for example, included, excluded, other payments, timing, approval.

Figure 7H:
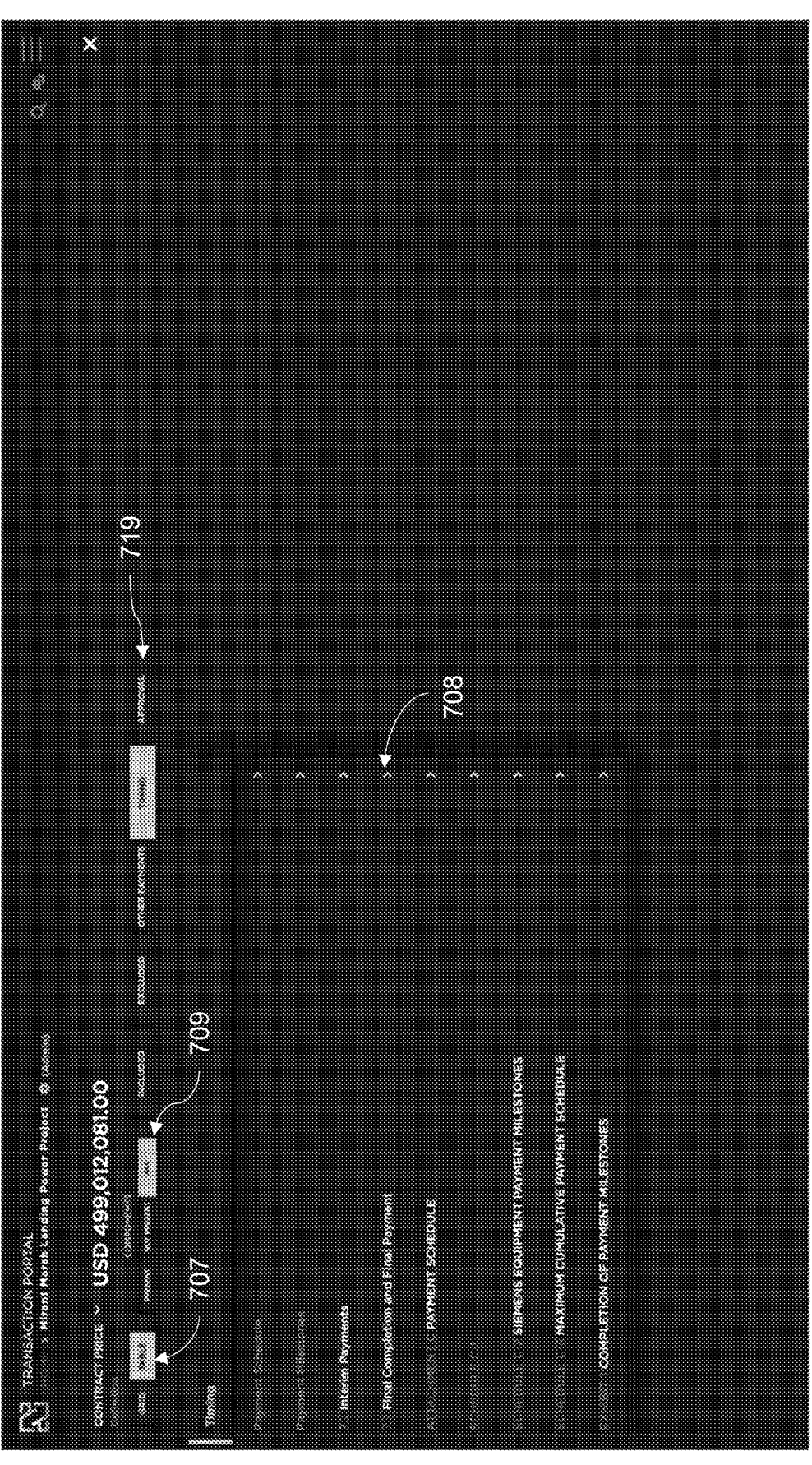
FIG. 7H is an exemplary screenshot illustrating another embodiment of a graphical user interface for presenting the knowledge feature of FIG. 2B.
Figure 71:
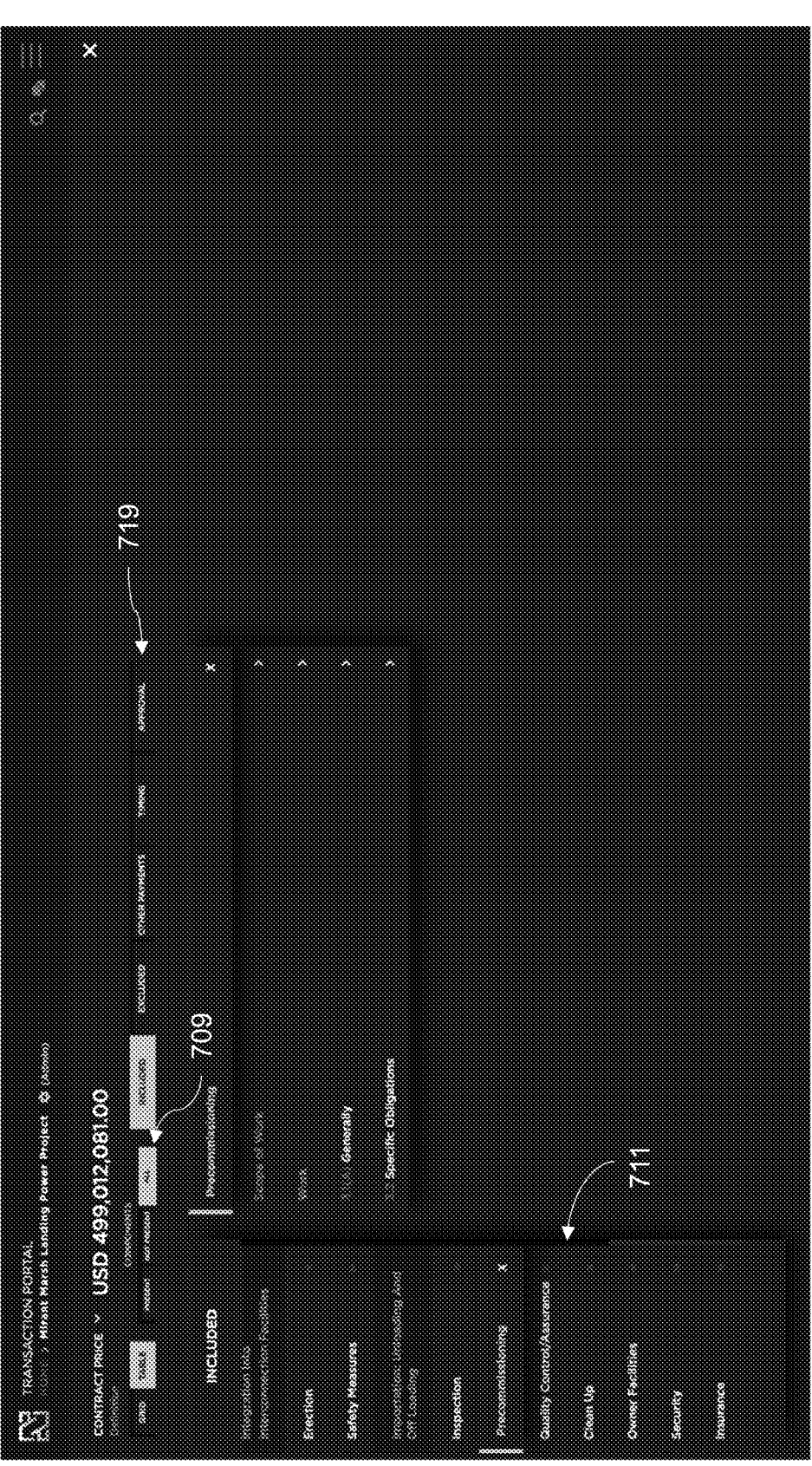
Figure 7J:
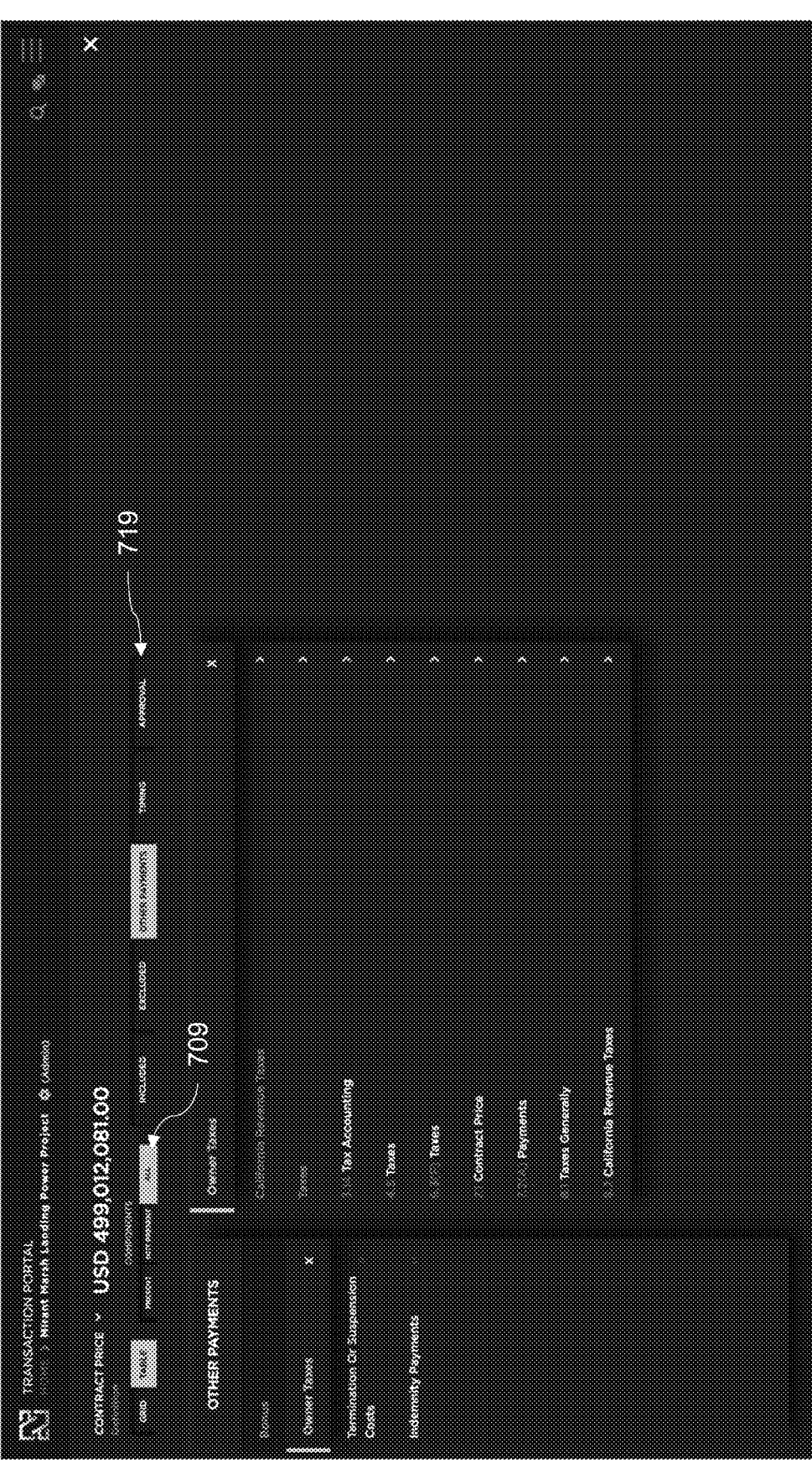
FIG. 7J is an exemplary screenshot illustrating another embodiment of a graphical user interface for presenting the knowledge feature of FIG. 2B.
Figure 7K:
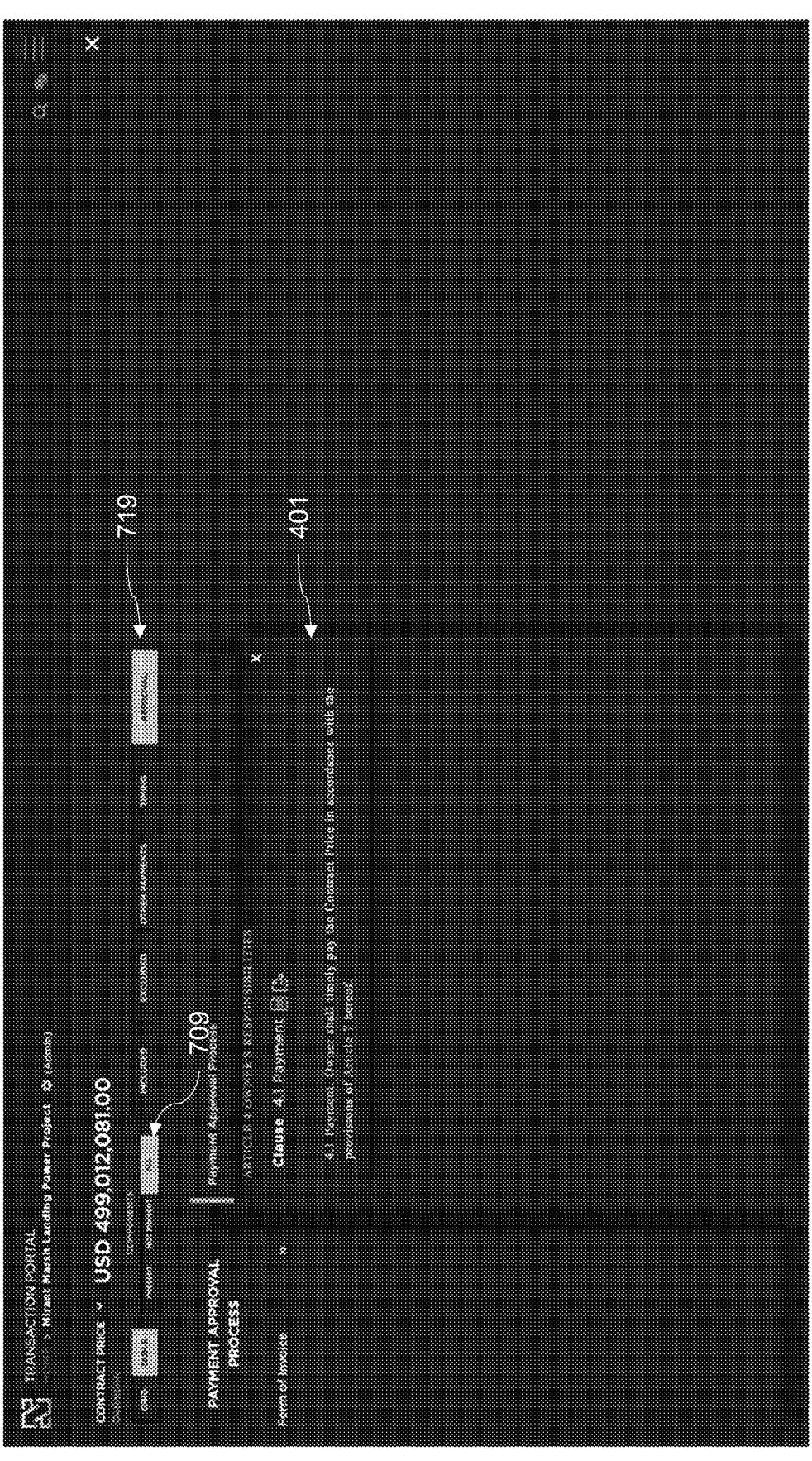
FIG. 7K is an exemplary screenshot illustrating another embodiment of a graphical user interface for presenting the knowledge feature of FIG. 2B.
Figure 7L:
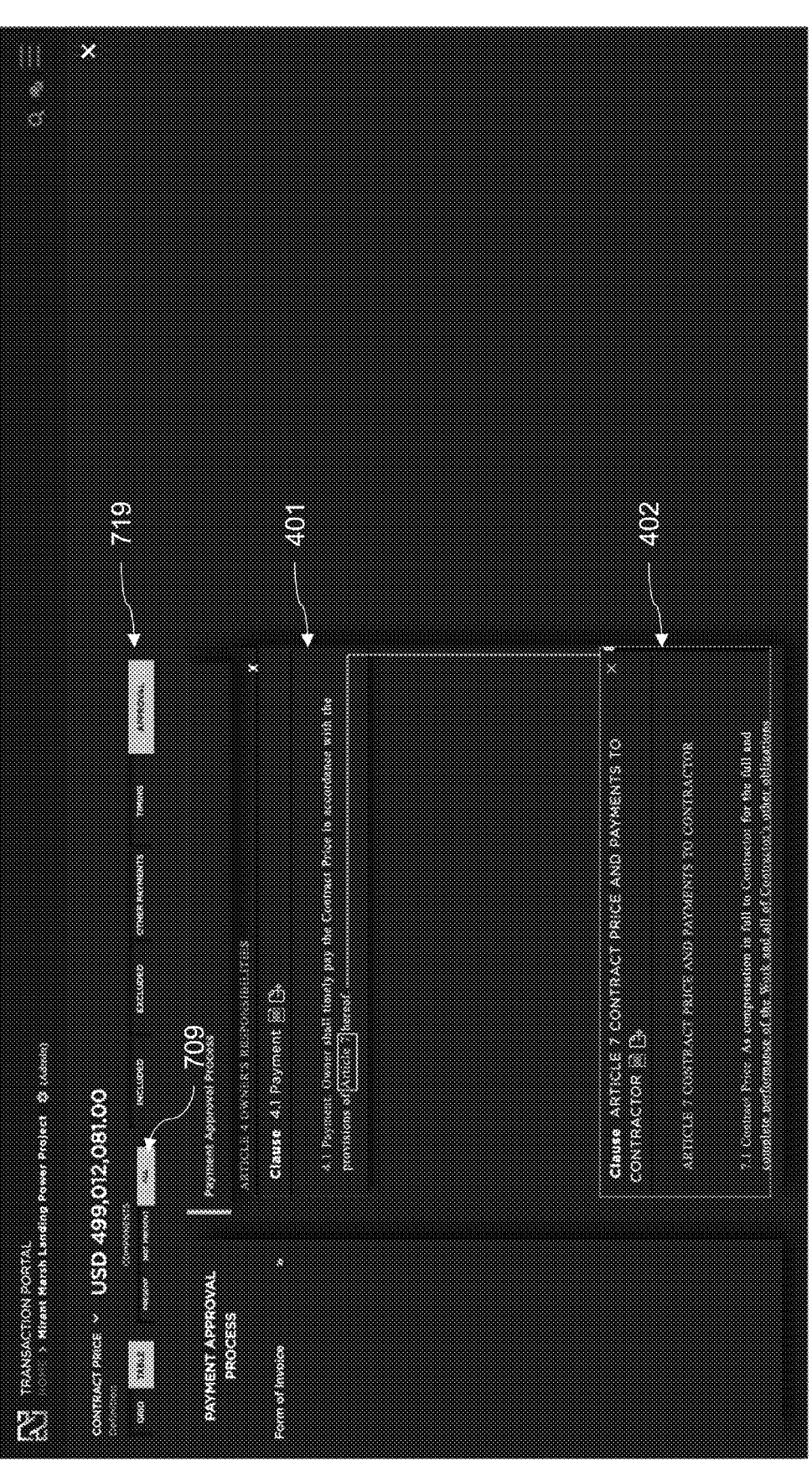
FIG. 7L is an exemplary screenshot illustrating another embodiment of a graphical user interface for presenting the knowledge feature of FIG. 2B.

Each of the boxes can be color-coded (not shown) to indicate different segments (e.g., relevant definitions versus relevant schedules), such as shown in FIG. 7H. Additional drop-down options 708 are provided for each relevant connection shown in the dynamic panel area. With reference to FIG. 7I, a navigation panel 711 shows all components included in the contract price and allows the user to choose one or more provisions to review at one time in the multi-document windows 420. FIG. 7J illustrates the initial limb selected to show that other payments are part of the contract price. The payment approval process is shown in FIG. 7K. Pecks 401 and stacks 402 can also be available, as also shown in FIG. 7K. References from the graphic into the underlying document are shown at the bottom of the screen, such as shown in FIG. 7L.

Figure 7M:
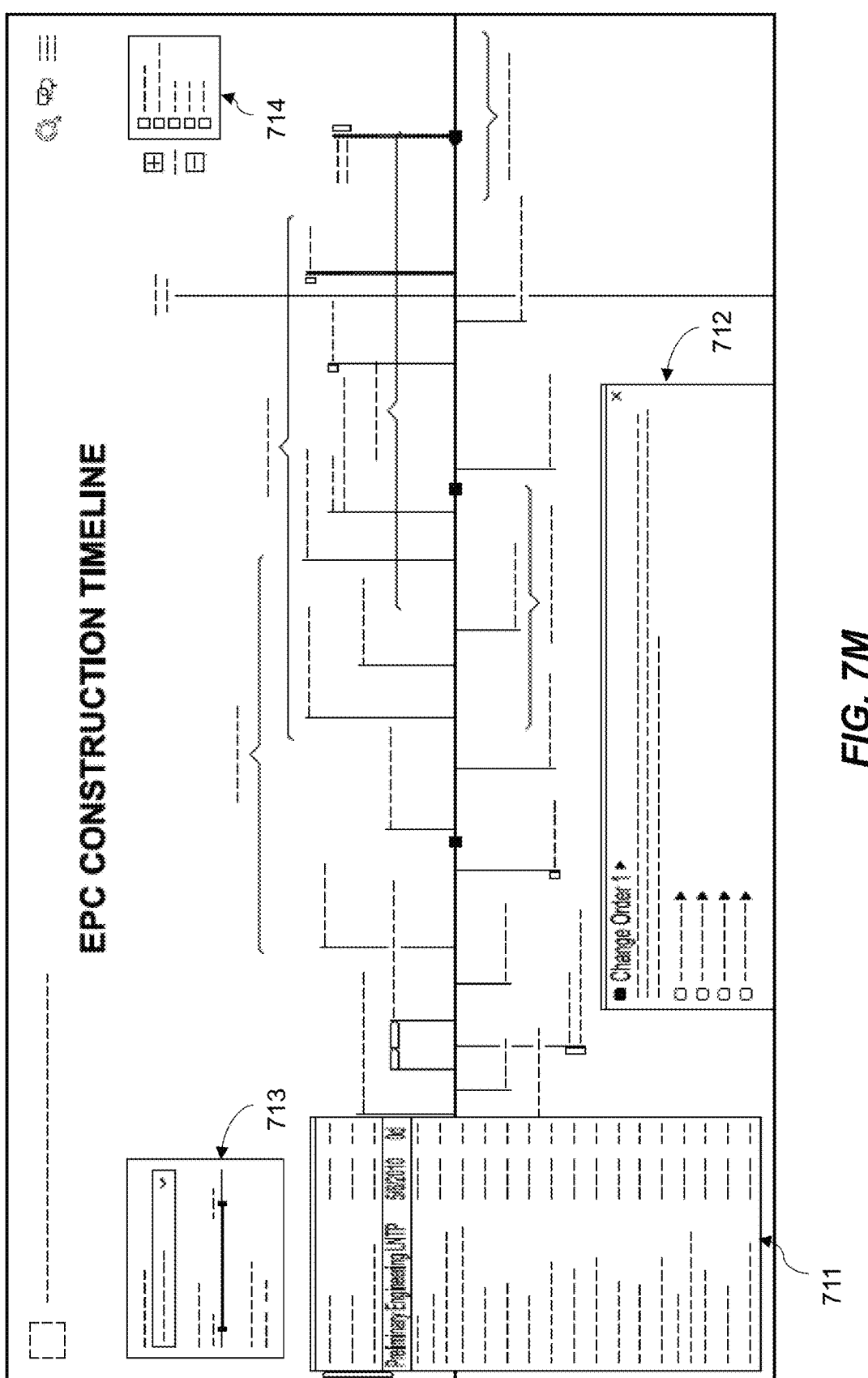
FIG. 7M is an exemplary screenshot illustrating another embodiment of a graphical user interface for presenting the knowledge feature of FIG. 2B.
Figure 7N:
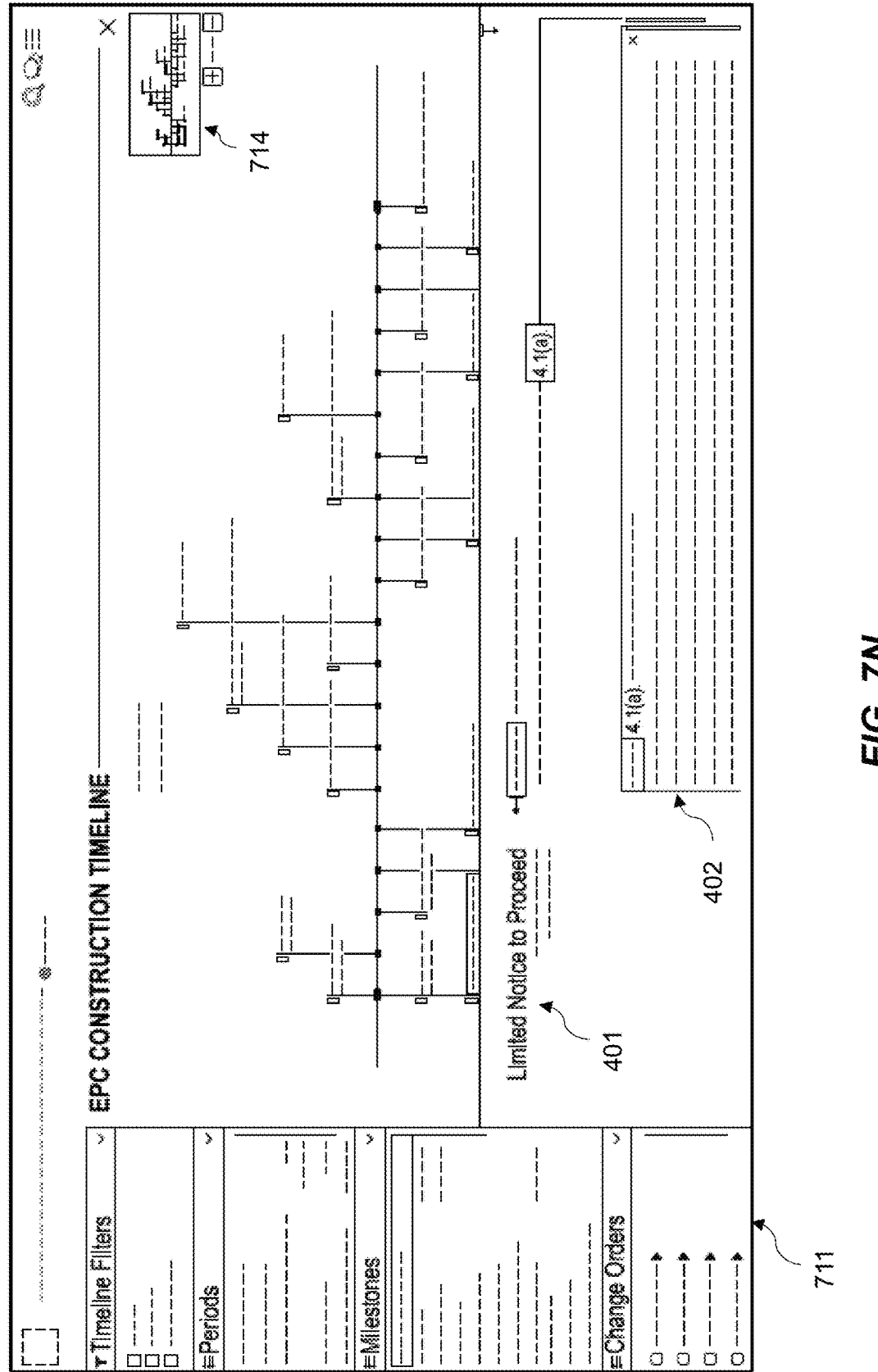
FIG. 7N is an exemplary screenshot illustrating another embodiment of a graphical user interface for presenting the knowledge feature of FIG. 2B.
Figure 70:
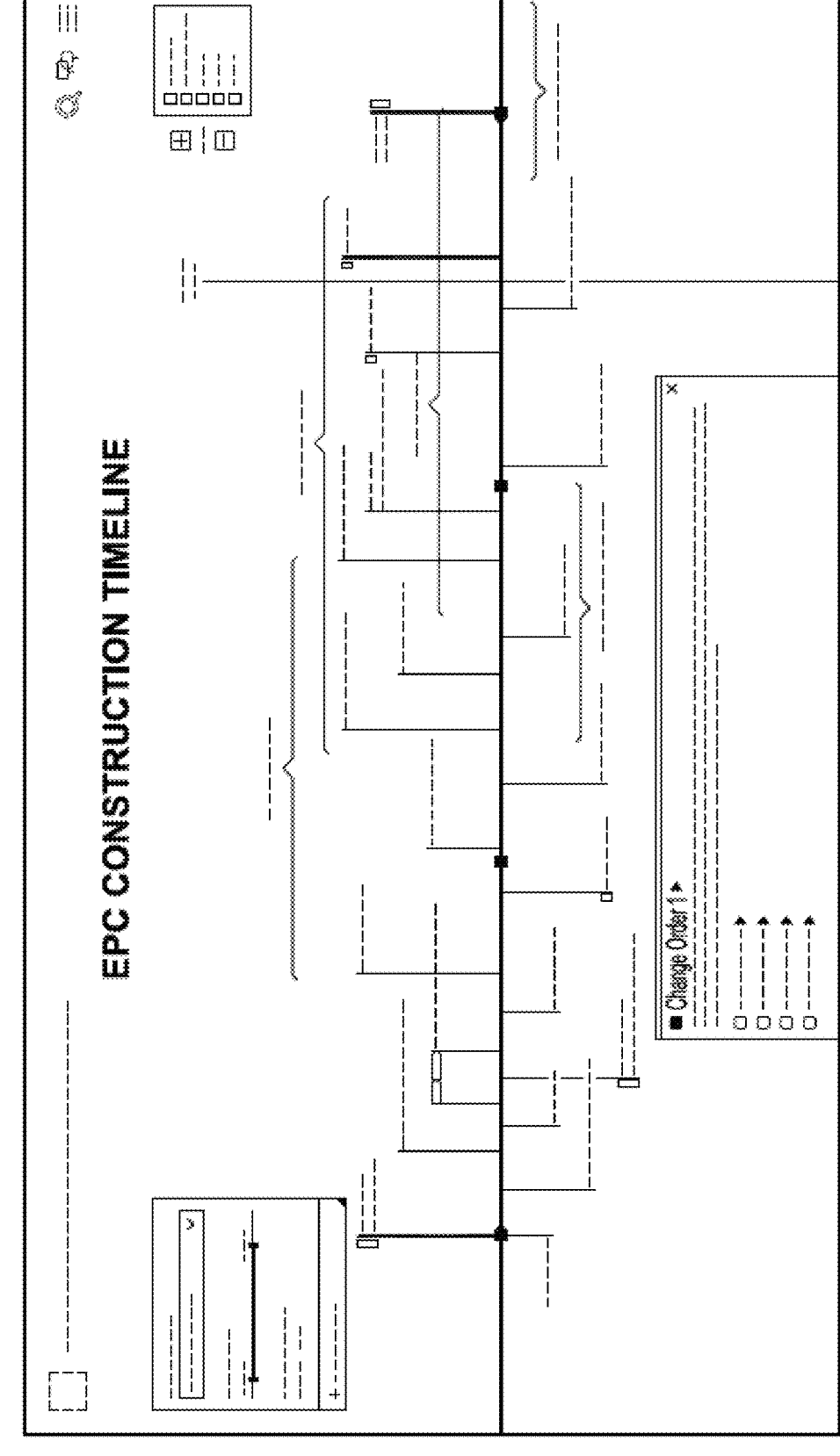

The construction timeline for the period of construction is shown in FIGS. 7M-O. As shown, all the components relating to the construction periods set out across different provisions in a construction contract are collated and aggregated into a dynamic "live" timeline. Relevant construction markers and change orders can be identified in this user interface. For example, a summary data range 713 can be used to filter the time period. A summary table is shown in the navigation panel 711 of the construction milestones and dates with an automated calculation of days elapsed and dates remaining in the construction timeline. This summary can also be shown in a key dates and milestones widget 714. An automated editing window 712 can be used to query the construction timeline, which dynamically adjusts the relevant dates and periods. Each node shown in the timeline can represent an identified milestone/data period in the construction cycle. Peeks 401 and stacks 402 can be used here, such as shown in FIG. 7N. FIG. 7O illustrates an alternative embodiment of the construction timeline.

Figure 7P:
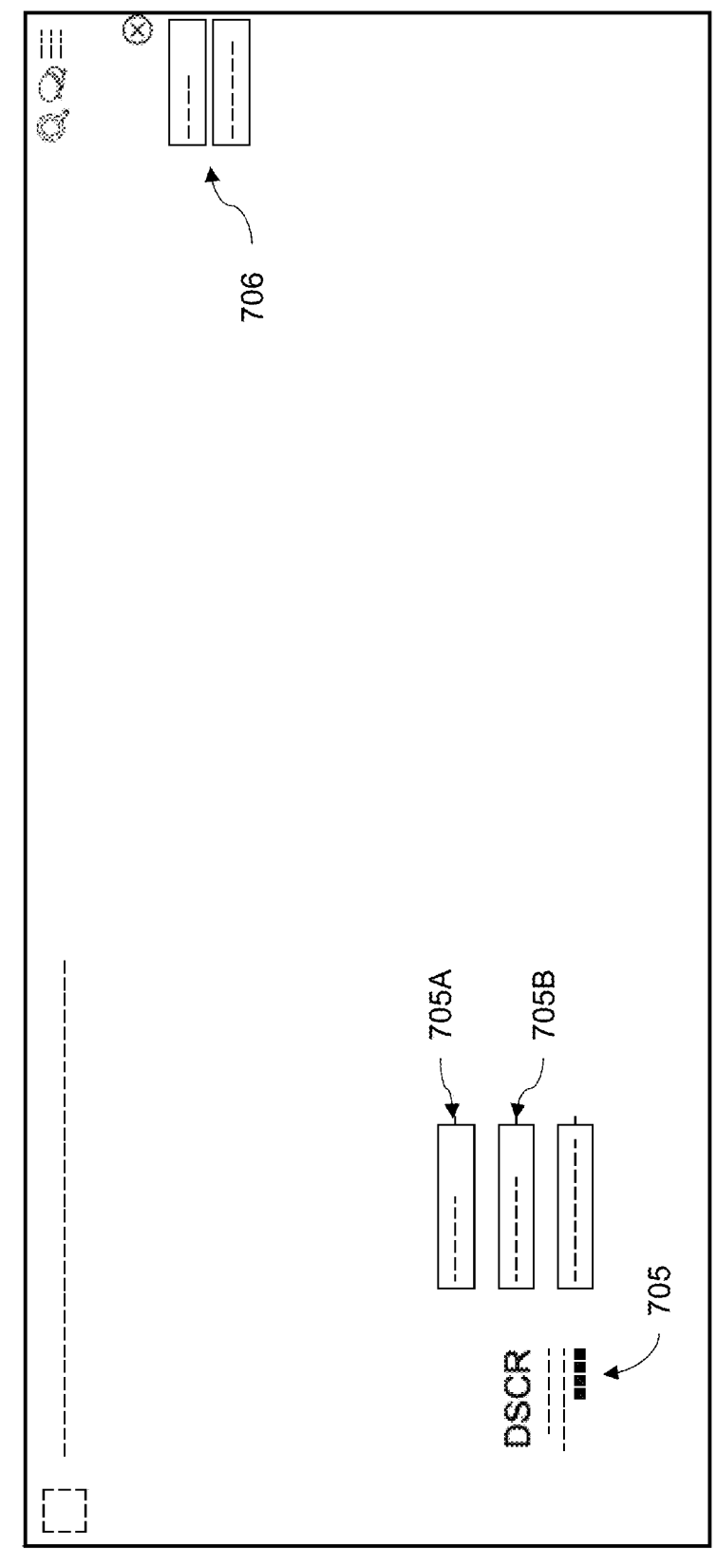
FIG. 7P is an exemplary screenshot illustrating another embodiment of a graphical user interface for presenting the knowledge feature of FIG. 2B.
Figure 7Q:
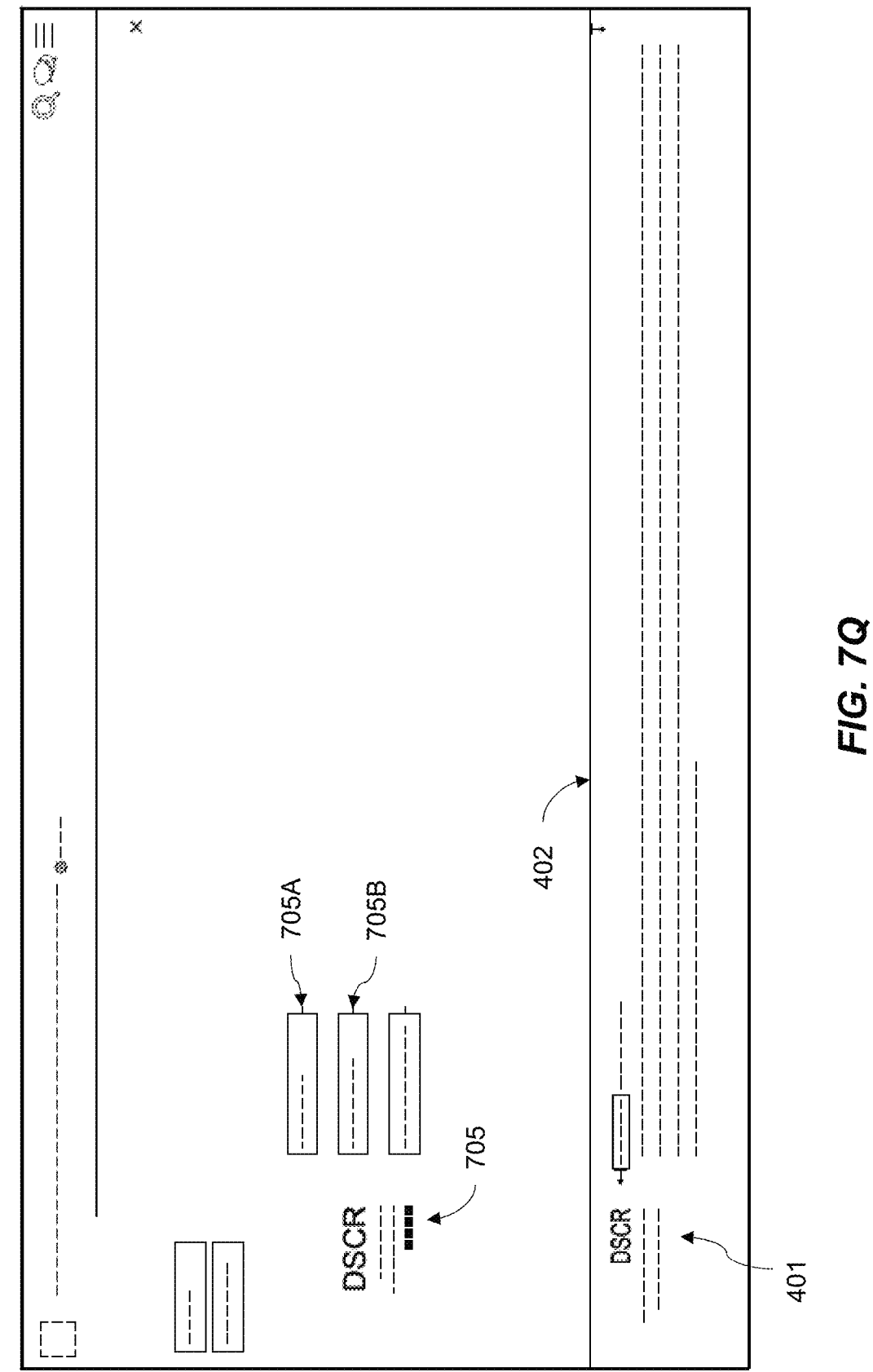
FIG. 7Q is an exemplary screenshot illustrating another embodiment of a graphical user interface for presenting the knowledge feature of FIG. 2B.
Figure 7R:
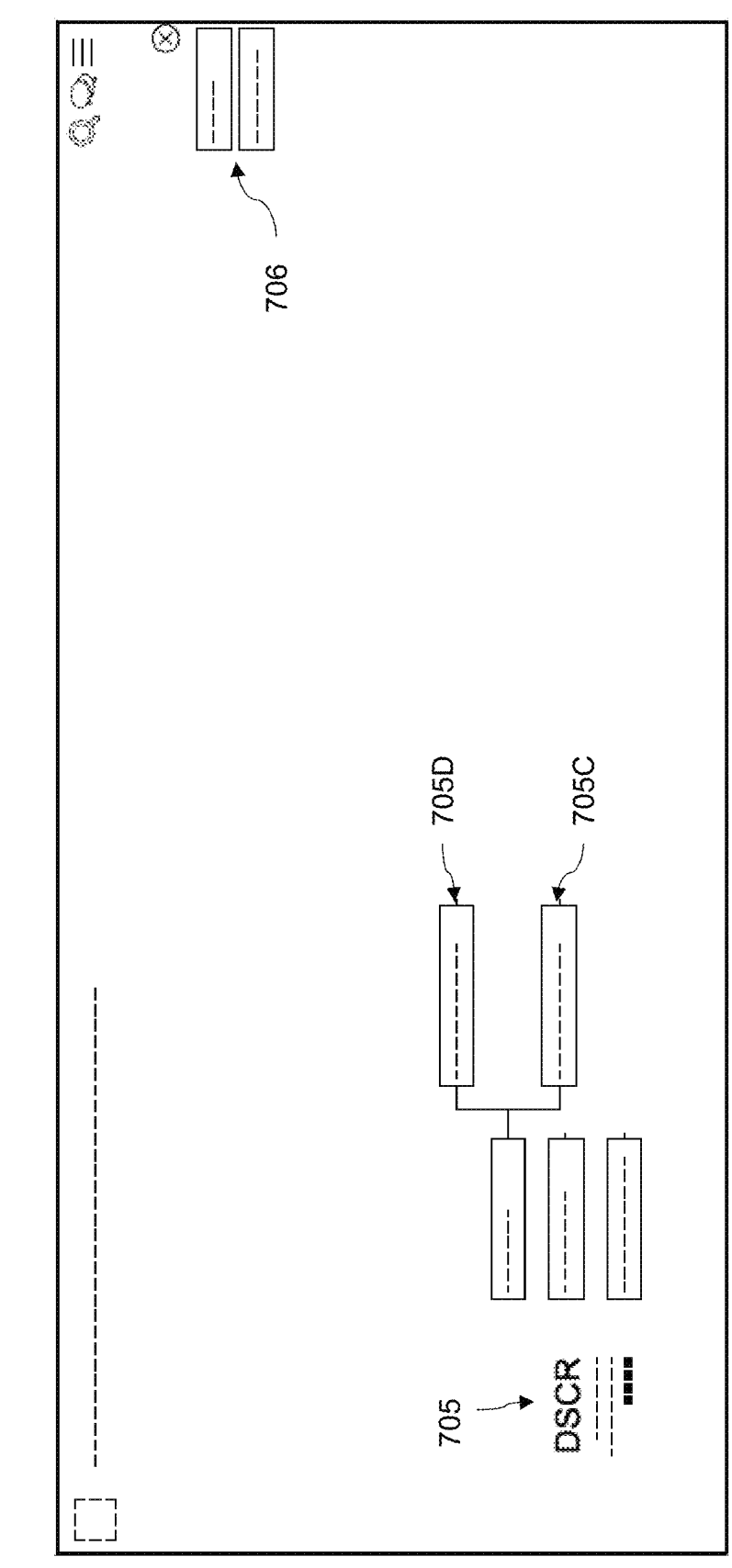
FIG. 7R is an exemplary screenshot illustrating another embodiment of a graphical user interface for presenting the knowledge feature of FIG. 2B.
Figure 7S:
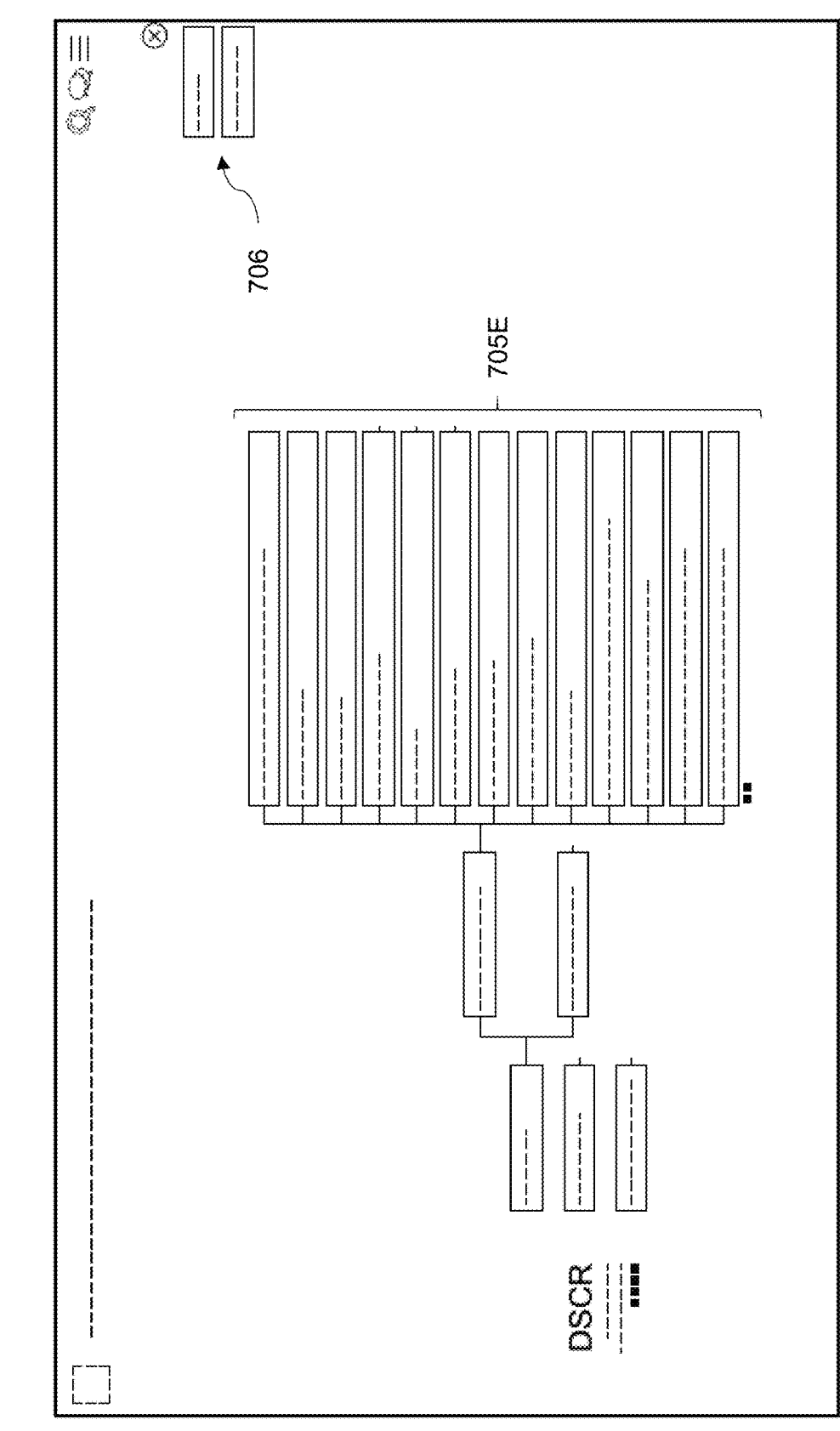
FIG. 7S is an exemplary screenshot illustrating another embodiment of a graphical user interface for presenting the knowledge feature of FIG. 2B.
Figure 7T:
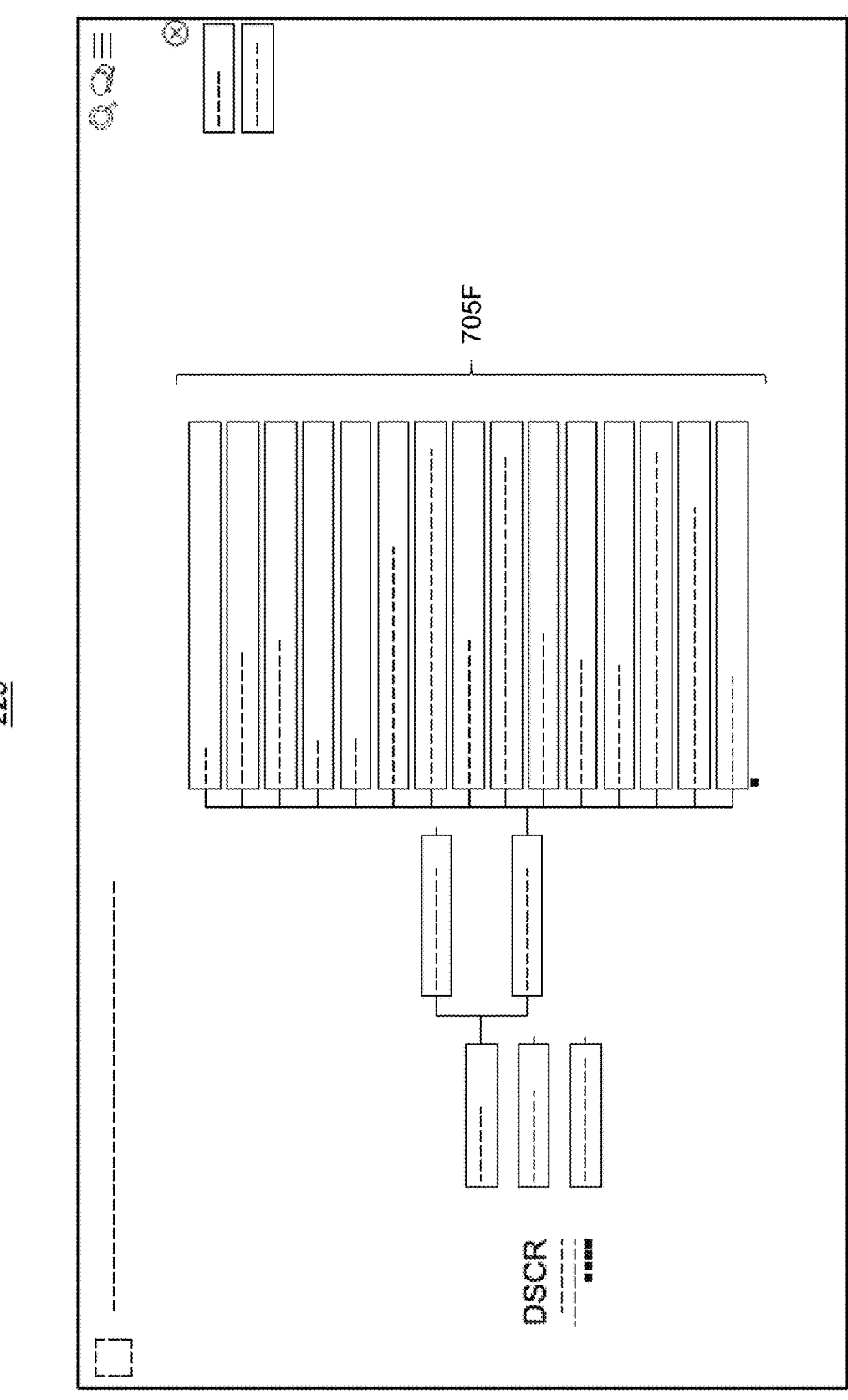
FIG. 7T is an exemplary screenshot illustrating another embodiment of a graphical user interface for presenting the knowledge feature of FIG. 2B.
Figure 7U:
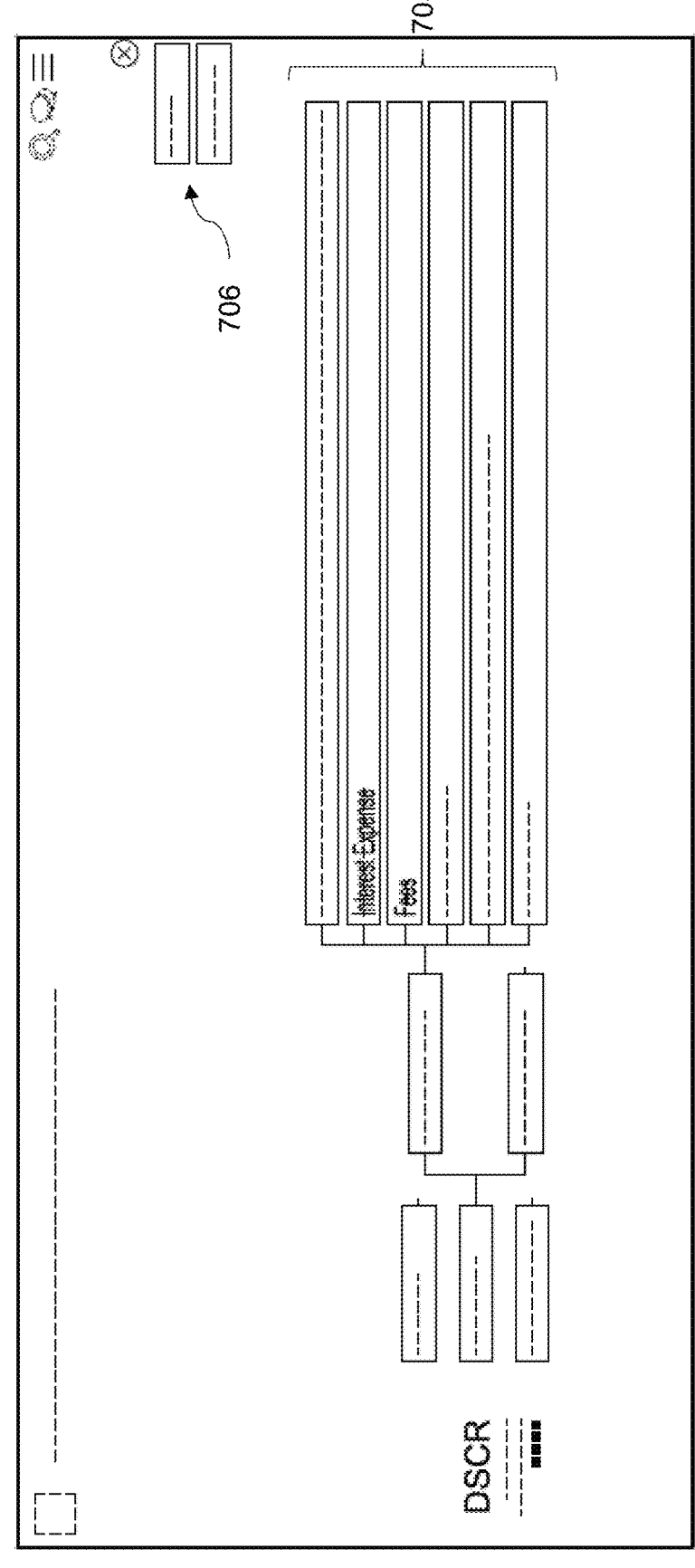
FIG. 7U is an exemplary screenshot illustrating another embodiment of a graphical user interface for presenting the knowledge feature of FIG. 2B.
Figure 7V:
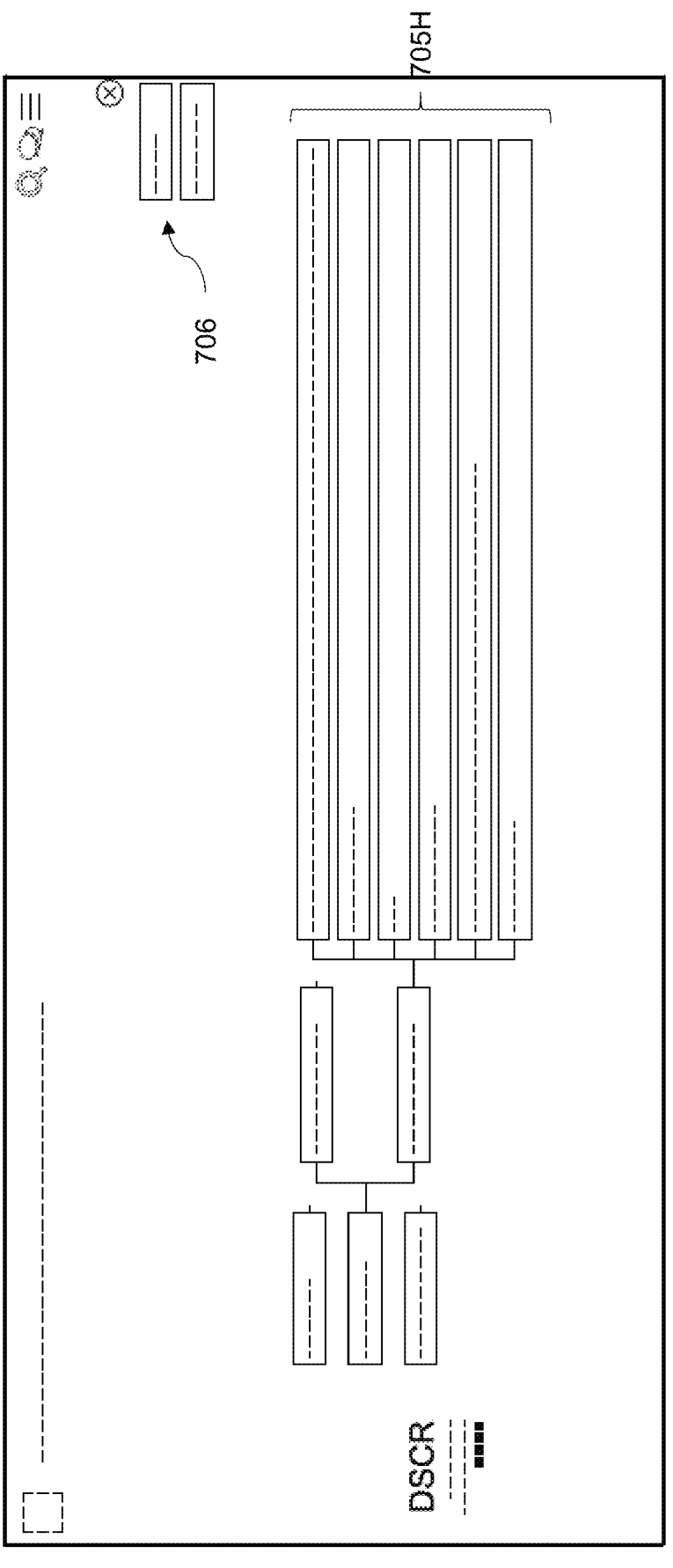
FIG. 7V is an exemplary screenshot illustrating another embodiment of a graphical user interface for presenting the knowledge feature of FIG. 2B.
Figure 7W:
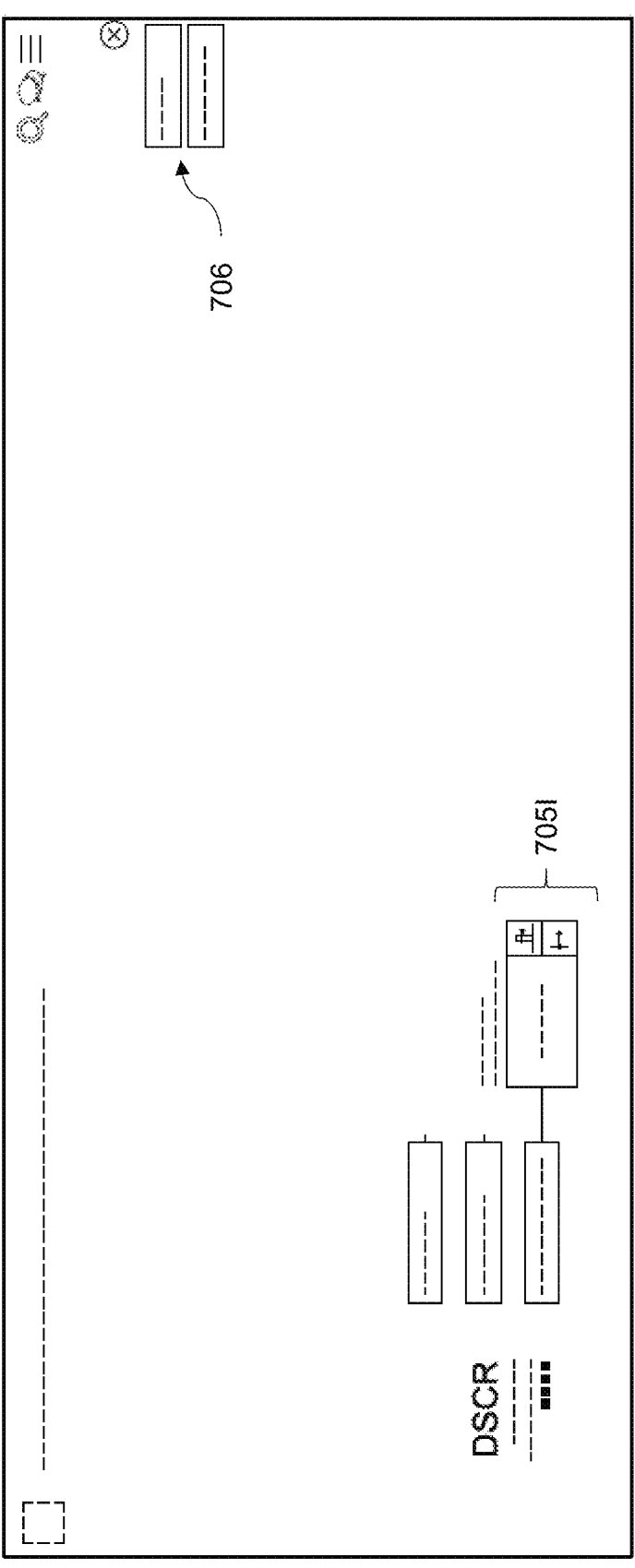
FIG. 7W is an exemplary screenshot illustrating another embodiment of a graphical user interface for presenting the knowledge feature of FIG. 2B.

With reference to FIGS. 7P-W, an image of an alternative knowledge 225 feature of a debt service coverage ratio 705 is shown. As shown, all the components relating to a debt service coverage ratio set out across different provisions in an agreement are collated and aggregated into a dynamic "live" data hierarchy through which the user can delve into the relevant details on the concept in a structured and organized framework. FIG. 7P illustrates the debt service coverage ratio 705 in its initial state. The debt service coverage ratio 705 can be displayed as a numerator 705A and a denominator 705B. The references on the right can be used as a legend/key 706 to identify relevant components of the ratio that the system can detect as well as identify those that are not detected. FIG. 7Q shows an exposed definition of debt service that is selectable from the knowledge 225 feature. The definition includes the peek 401 and stack 402 feature to enable the user to access any relevant part of the document. FIG. 7R shows the initial limbs of the graphic selected to highlight the numerator 705A, the denominator 705B, and the compliance requirements of the ratio. With reference to FIG. 7R, the compliance requirements of the ratio can be shown as component amounts that are expressly included (705D) and those that are expressly excluded 705C. The relevant provisions are automatically identified and extracted into a data framework, such as a graph (not shown). Each limb can be expanded for further details, such as shown in FIGS. 7S-W. As shown in FIG. 7S, the data framework 705E for amounts included in the numerator 705A are expanded. Turning to FIG. 7T, the data framework 705F for amounts excluded in the numerator 705A is shown. With reference to FIG. 7U, the data framework 705G for amounts included in the denominator 705B is expanded. FIG. 7V illustrates the data framework 705H for amounts excluded from the denominator 705B. In some embodiments, the presence (or lack thereof) of a selected component can be color coded (not shown) for better viewability, for example, using one or more unique colors. FIG. 7W illustrates that the ratio compliance value 705I can be extracted from the document and displayed.

Figure 7X:
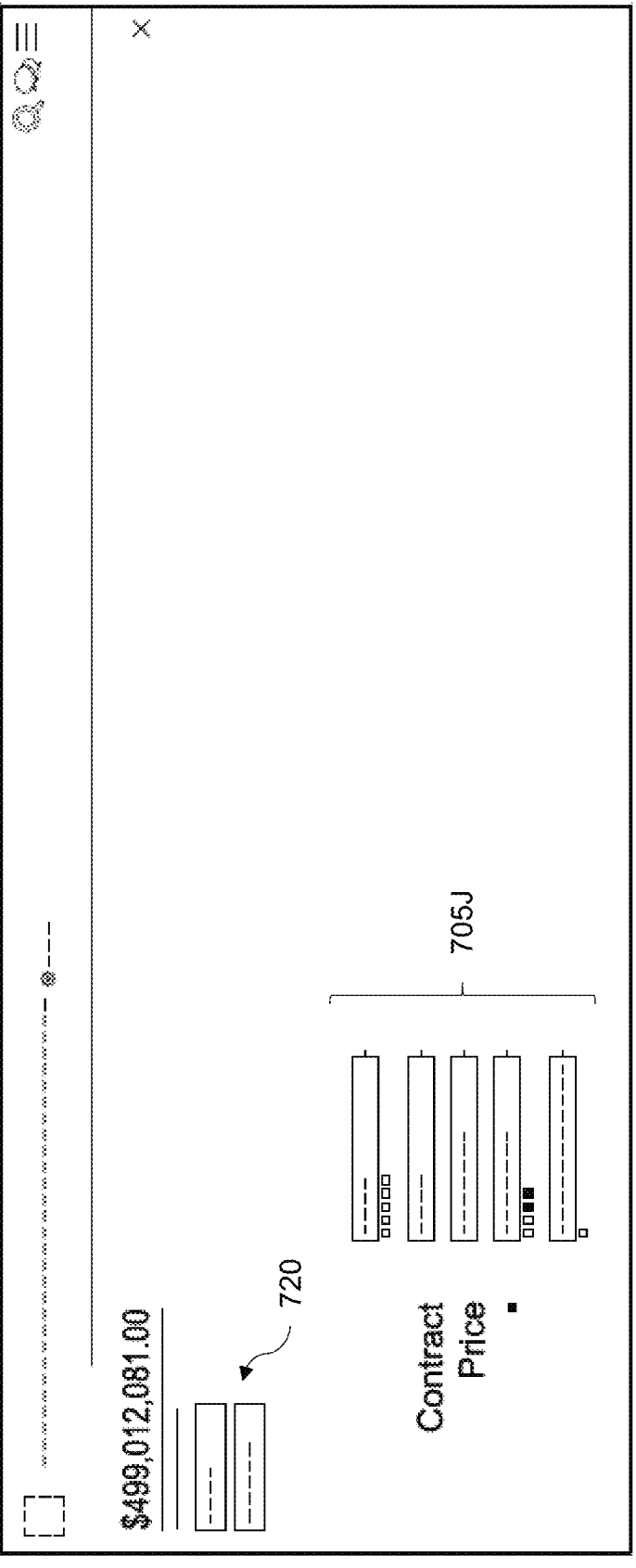
FIG. 7X is an exemplary screenshot illustrating another embodiment of a graphical user interface for presenting the knowledge feature of FIG. 2B.

FIGS. 7X-CC show an alternative knowledge 225 feature of a concept of contract price for a construction contact in its initial state. As shown, all the components relating to contract price set out across different provisions in a construction contract are collated and aggregated into a dynamic "live" data hierarchy through which the user can delve into the relevant details on the concept in a structured and organized framework. Each of the initial limbs expands to expose the aggregated details of the contract price. A legend 720 is included on the left of the interface to indicate the presence/no presence of relevant portions of the price. In some embodiments, with reference to FIG. 7X, inclusions 705J are shown in the contract price calculation. The contract price can be formatted in the style of the drop-down option 708 to present any related definitions.

Figure 7Y:
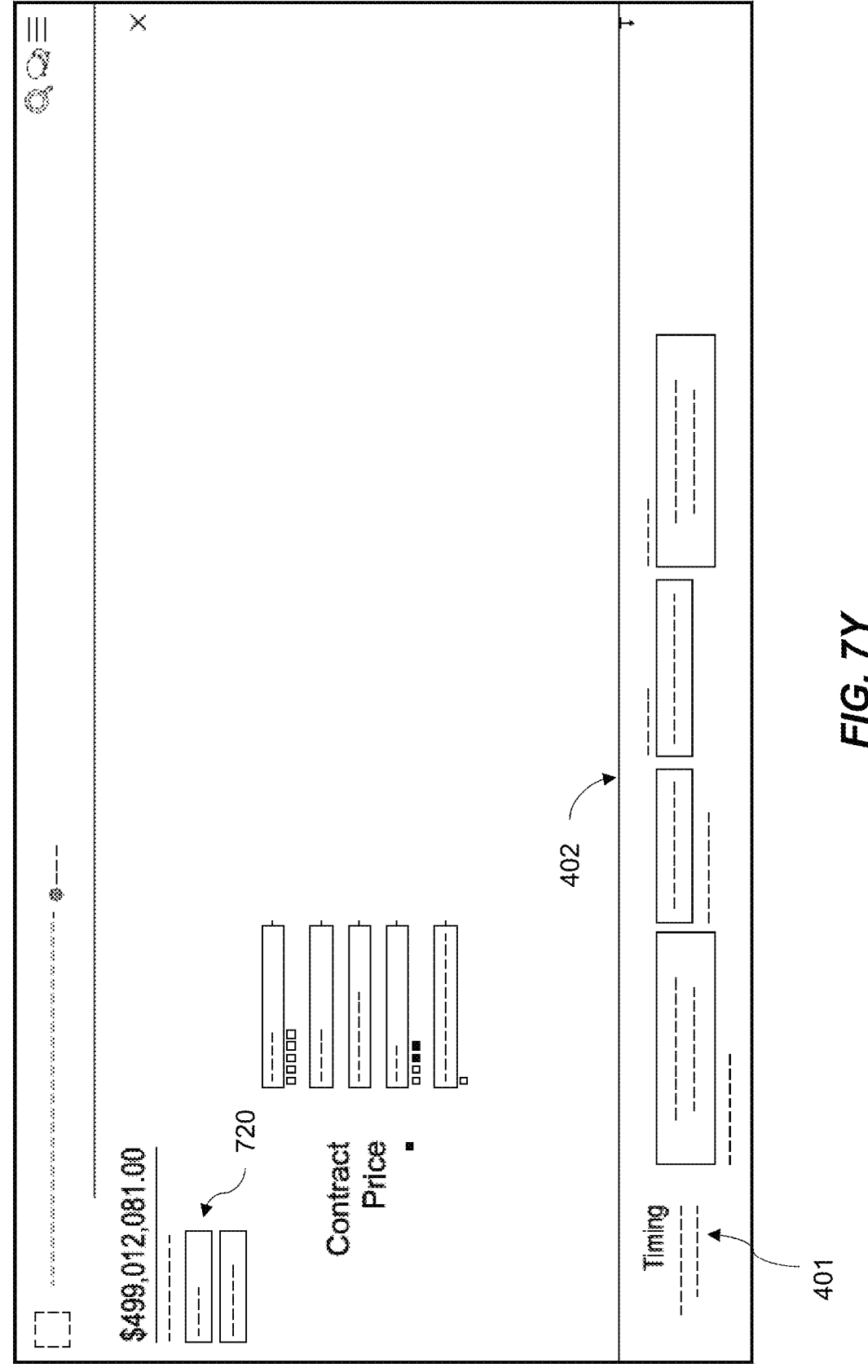
FIG. 7Y is an exemplary screenshot illustrating another embodiment of a graphical user interface for presenting the knowledge feature of FIG. 2B.
Figure 7Z:
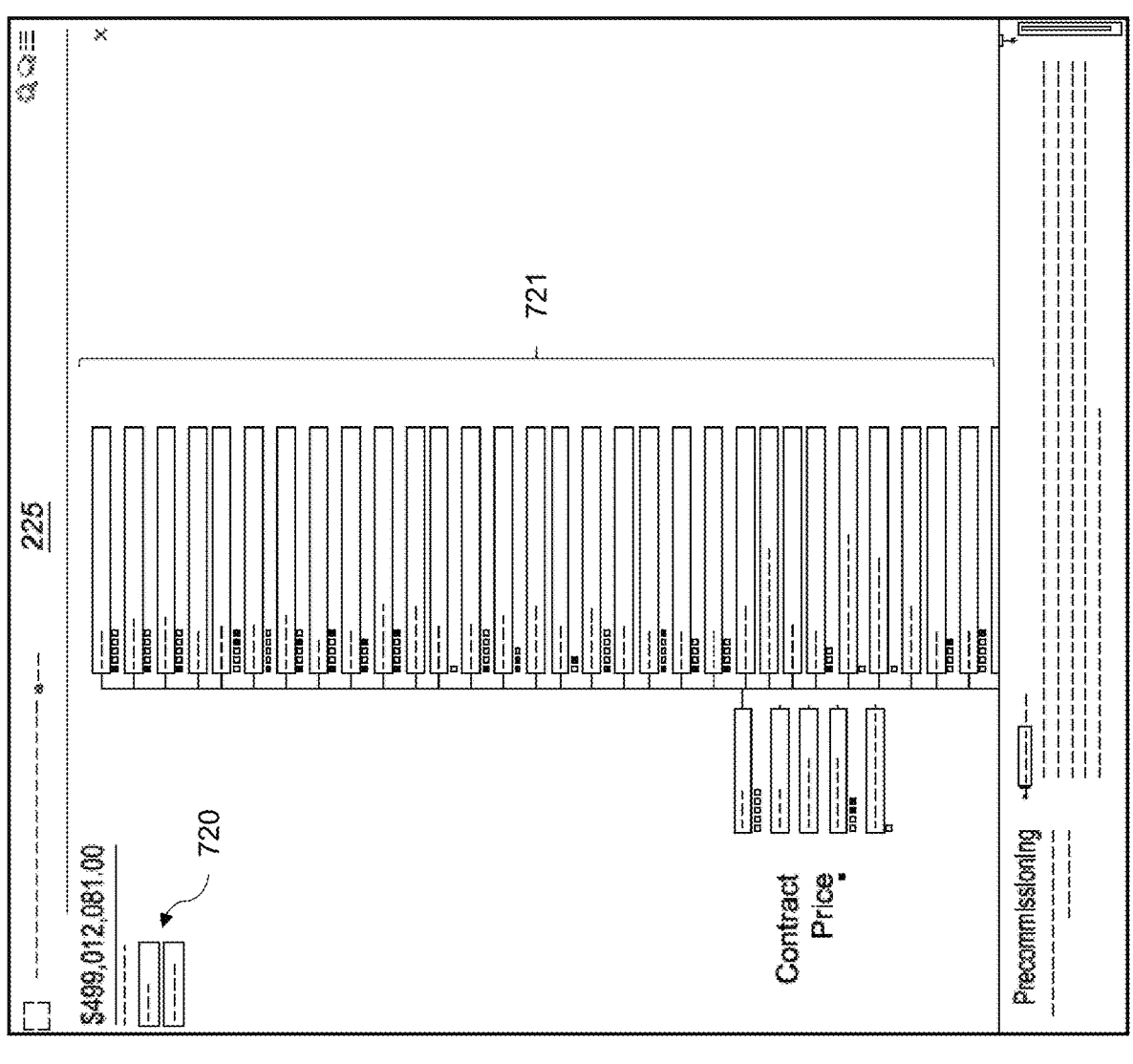
FIG. 7Z is an exemplary screenshot illustrating another embodiment of a graphical user interface for presenting the knowledge feature of FIG. 2B.
Figure 7A:
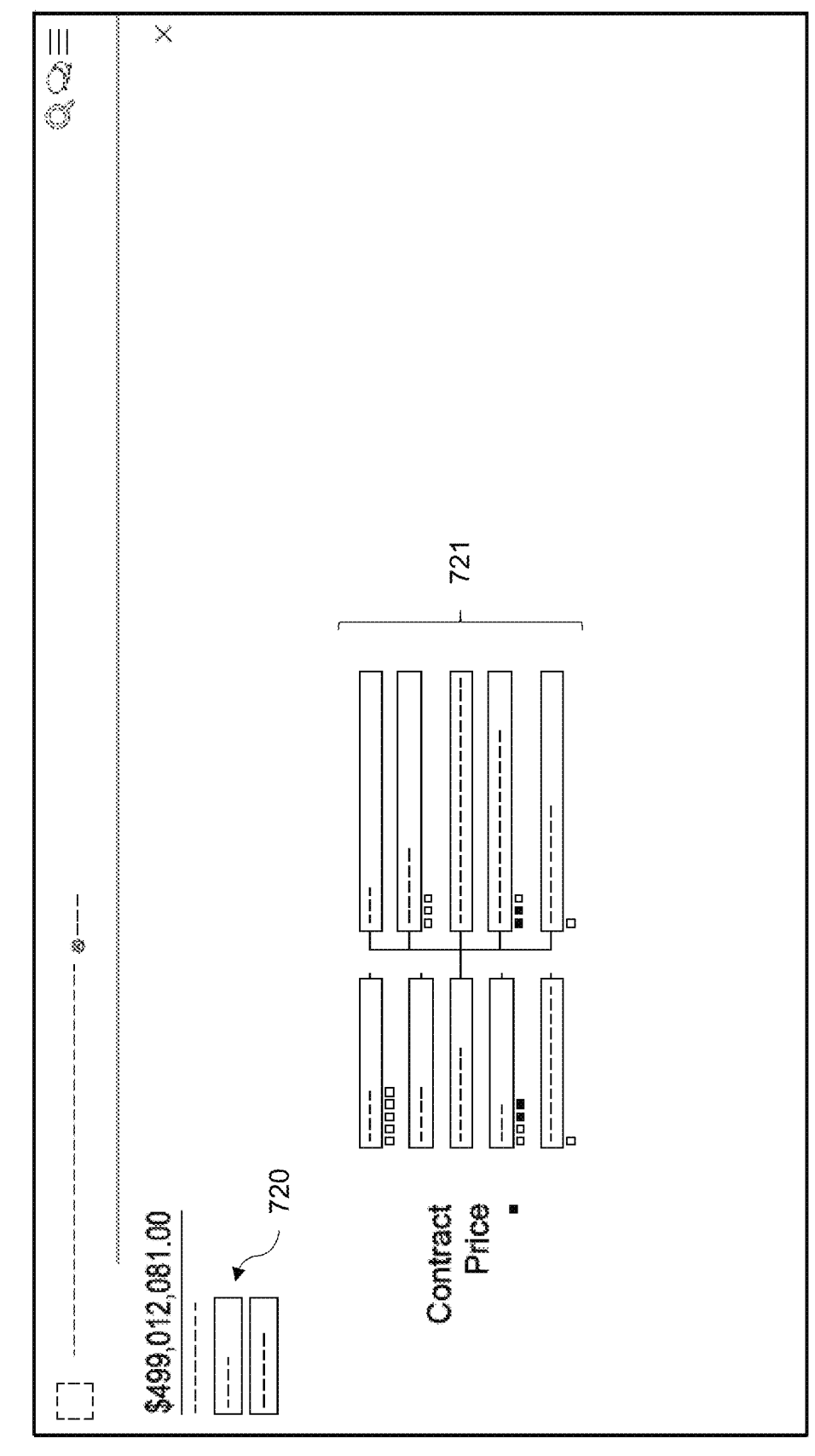
Figure 7B:
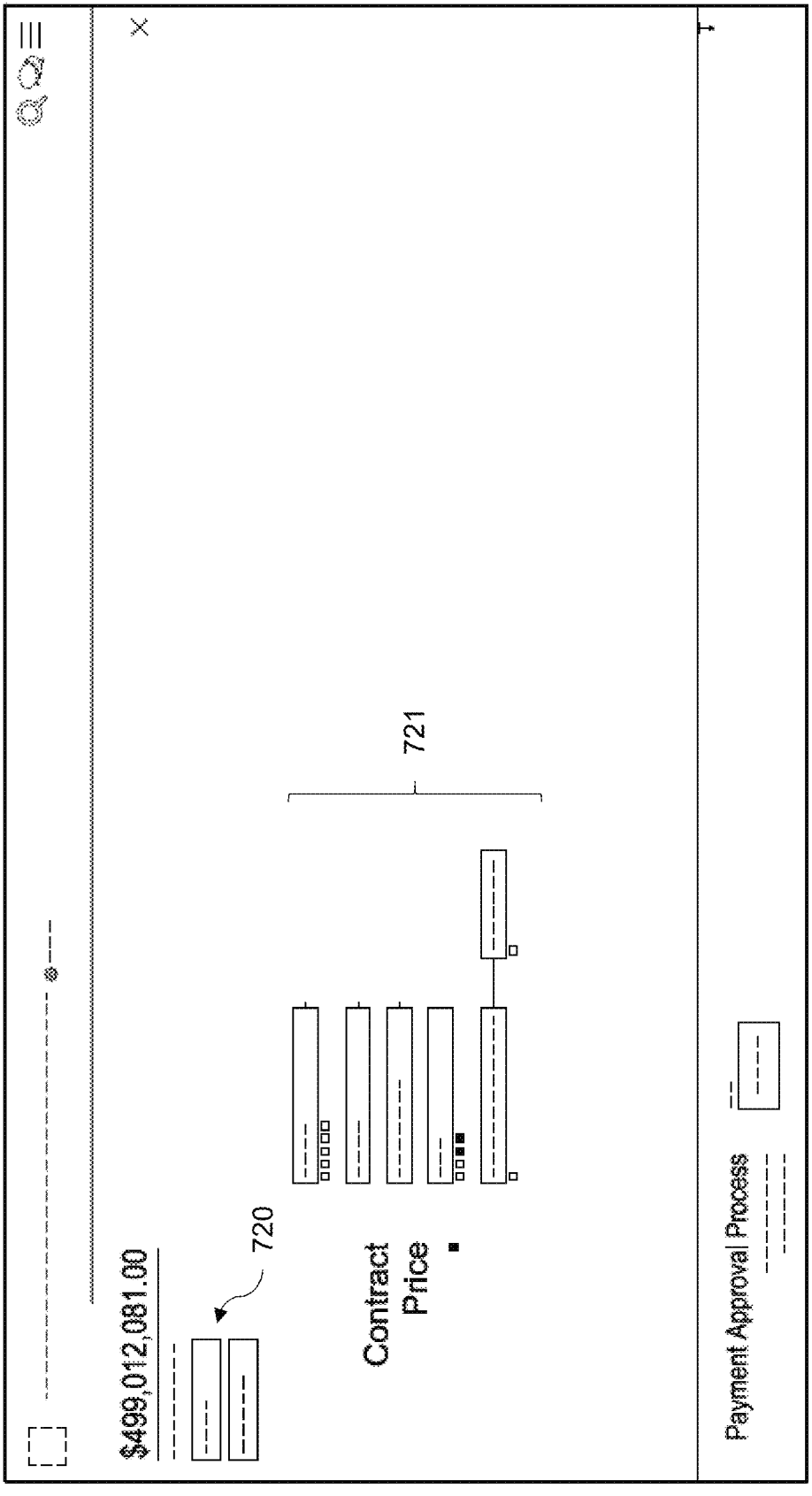
FIG. 7B is an exemplary screenshot illustrating another embodiment of a graphical user interface for presenting the knowledge feature of FIG. 2B.
Figure 7C:
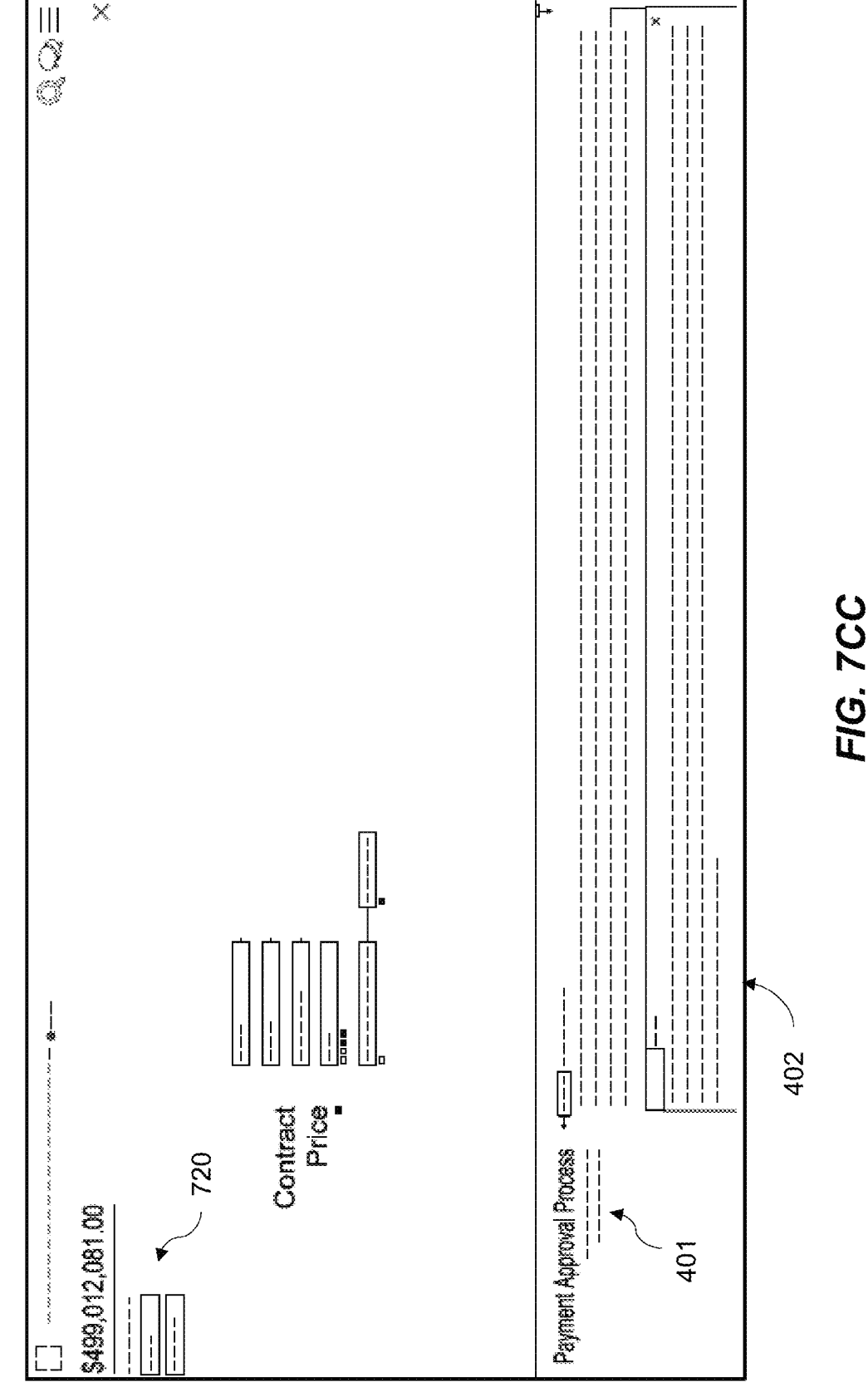
Figure 7D:
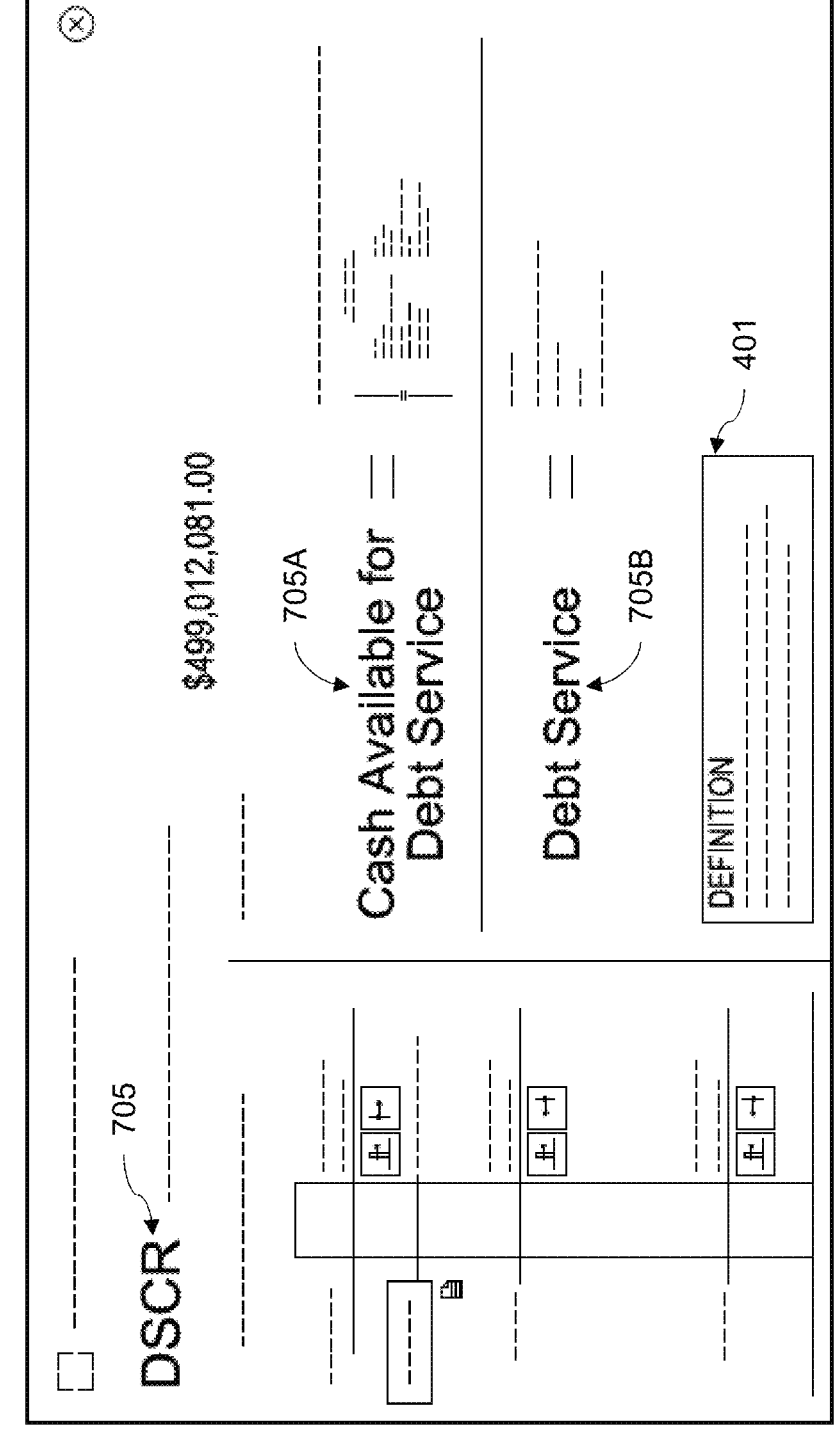
Figure 7E:
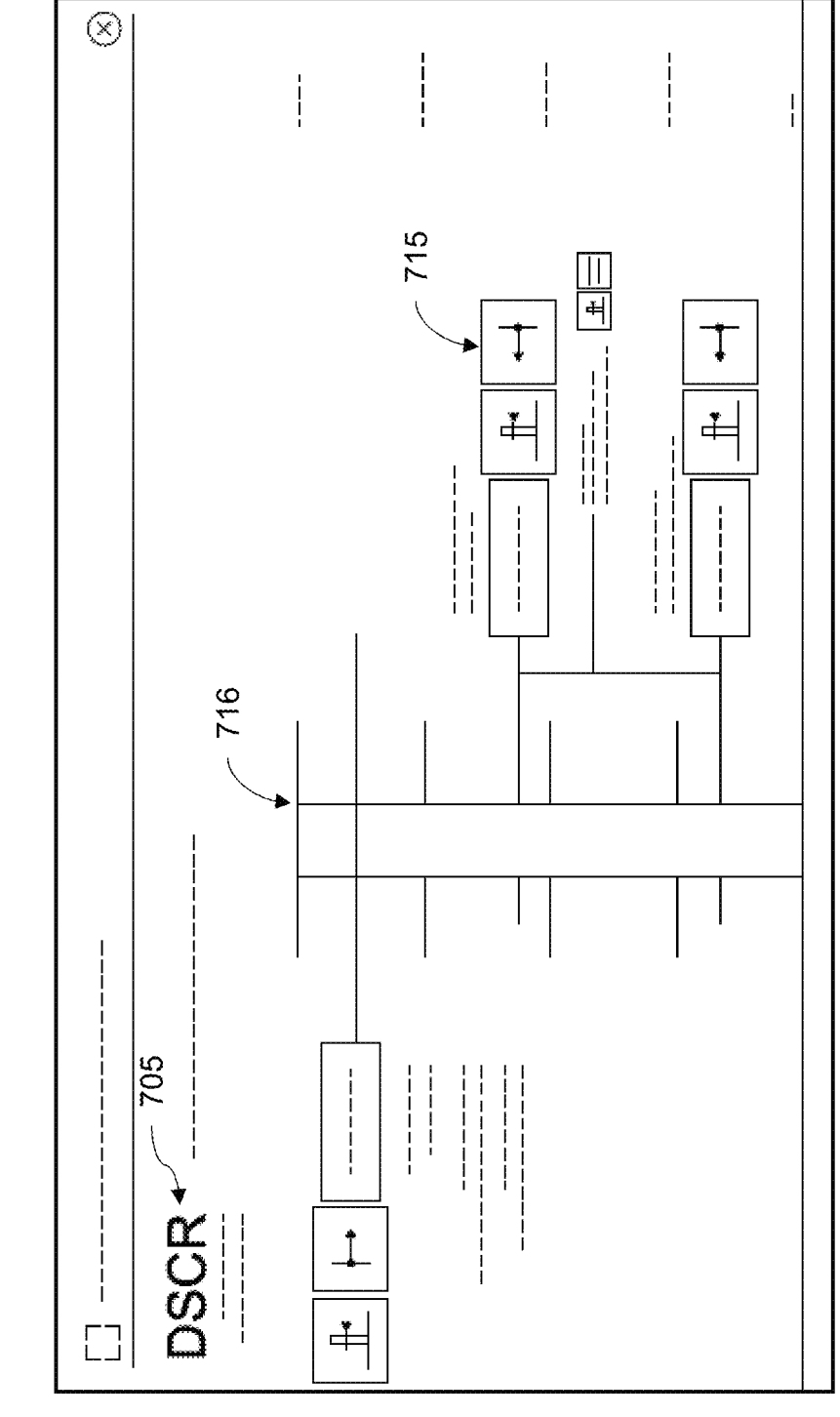
Figure 7F:
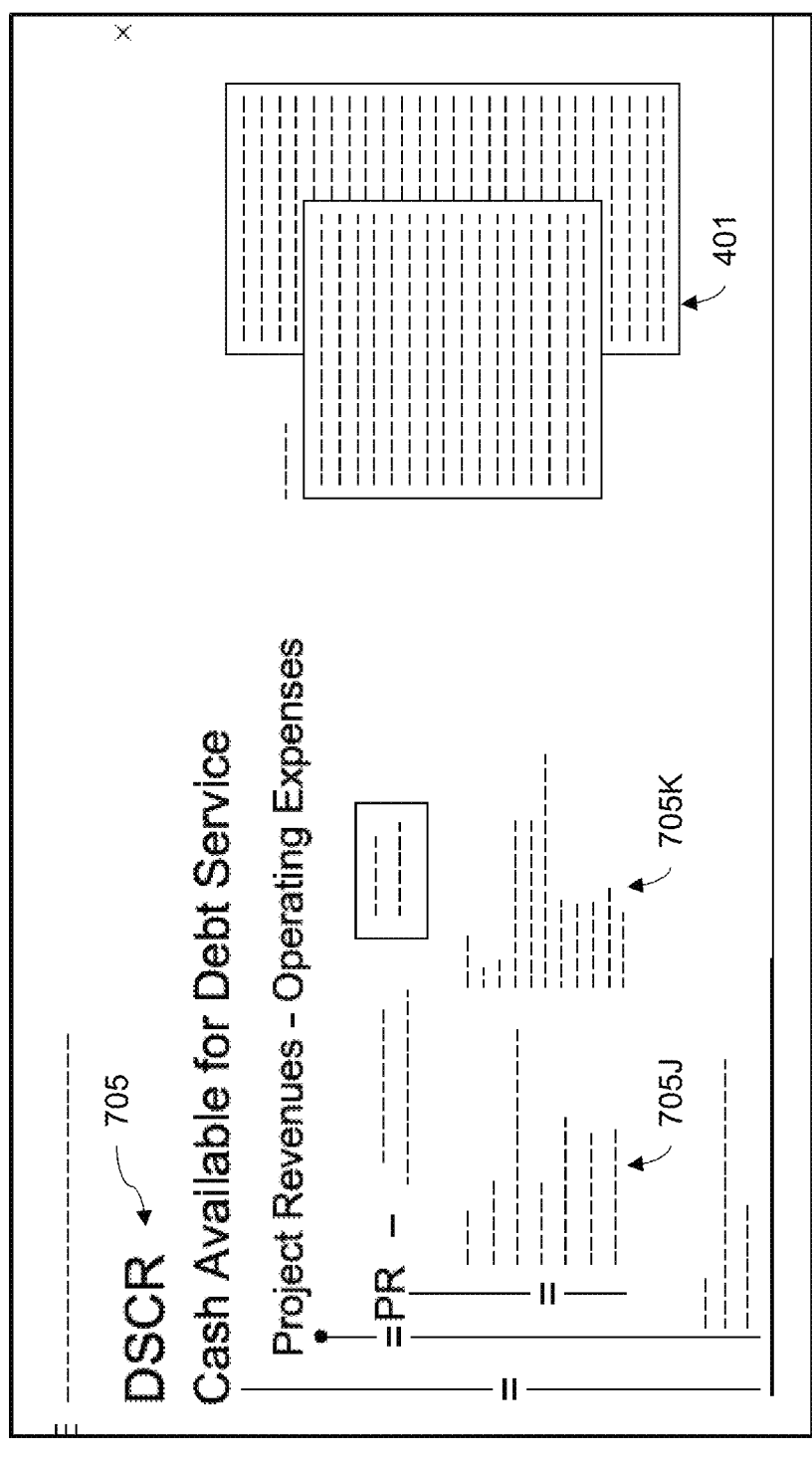
Figure 7G:
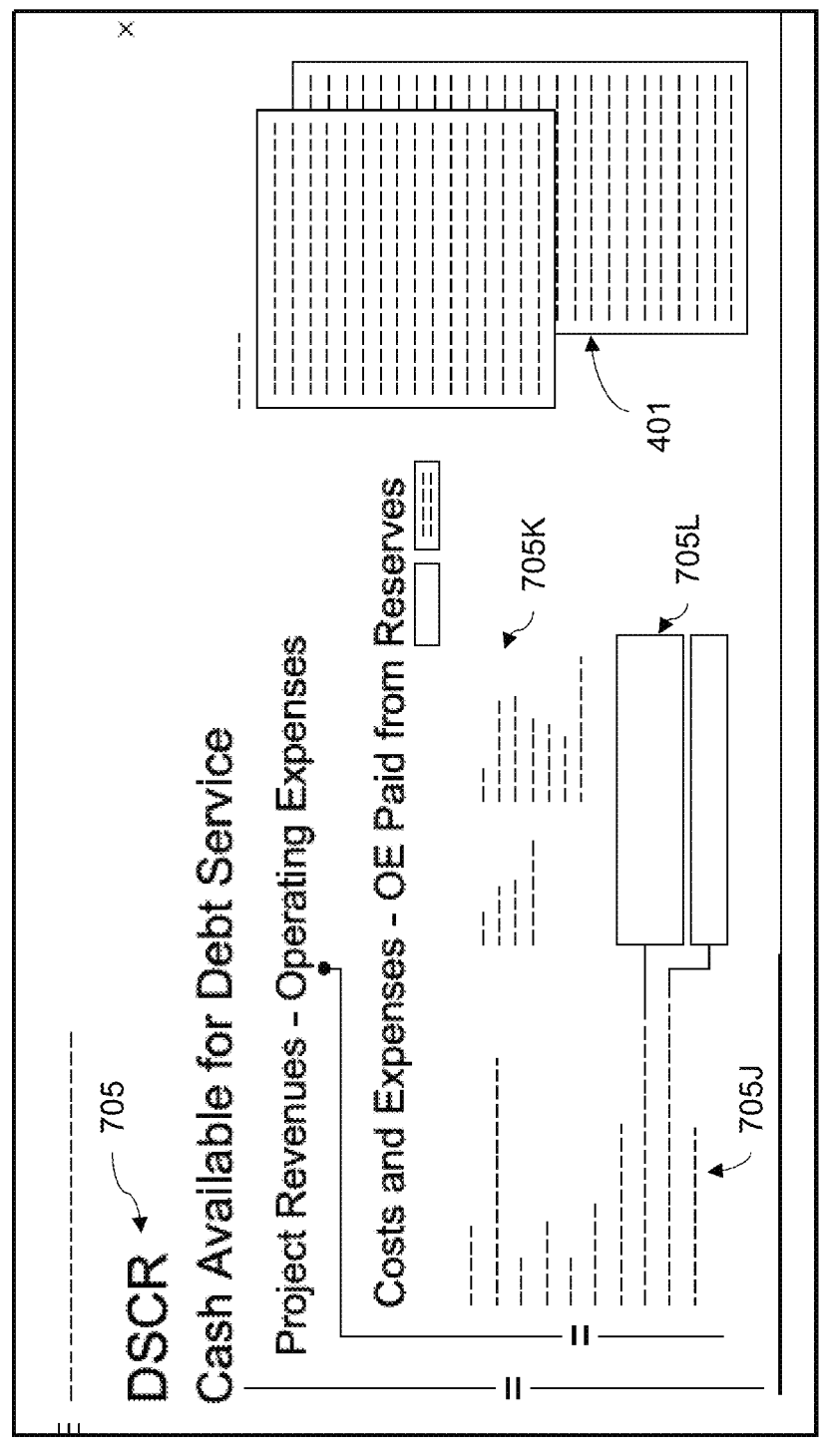
Figure 7H:
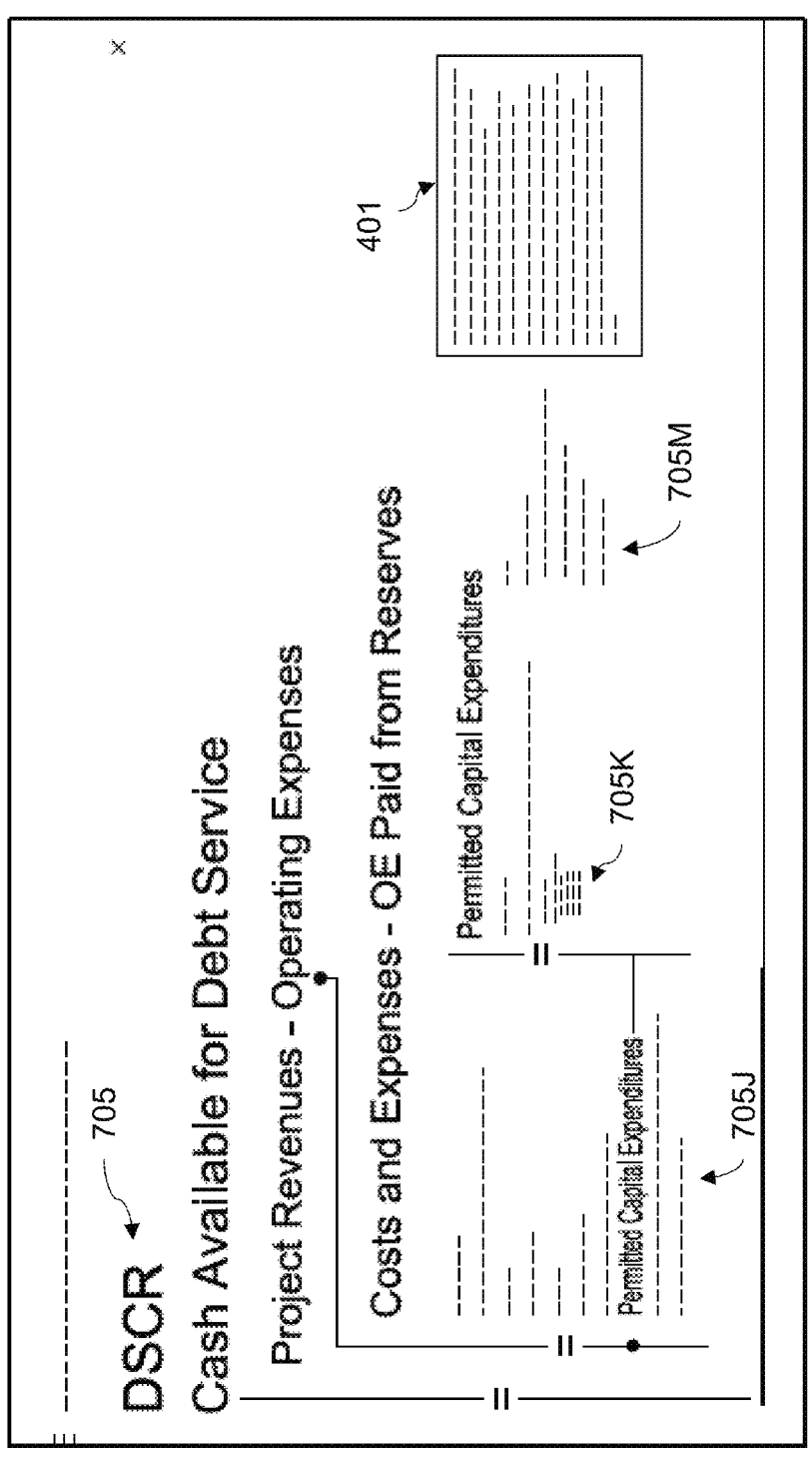
Figure 7I:
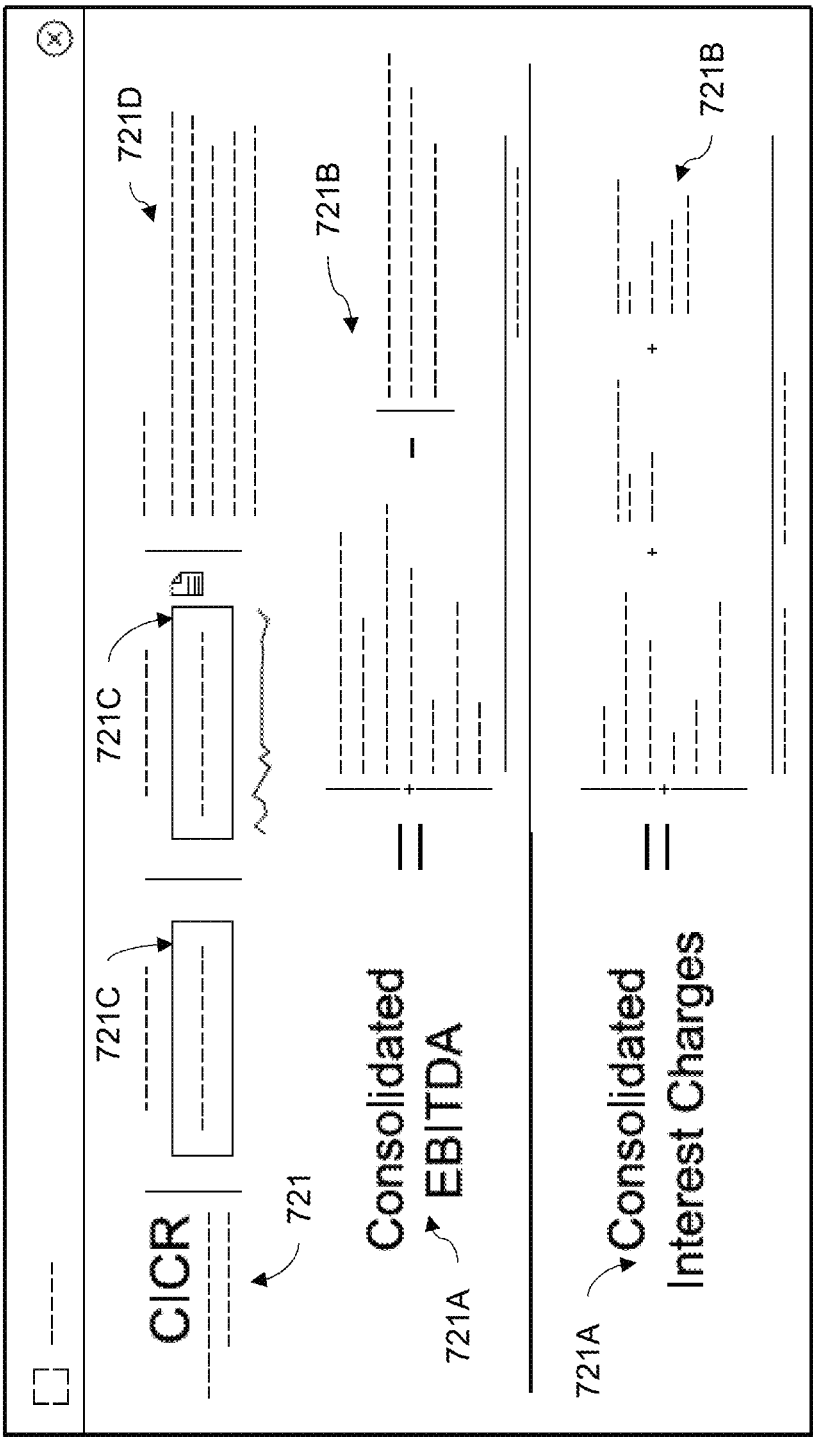
FIG. 7I is an exemplary screenshot illustrating another embodiment of a graphical user interface for presenting the knowledge feature of FIG. 2B.
Figure 7J:
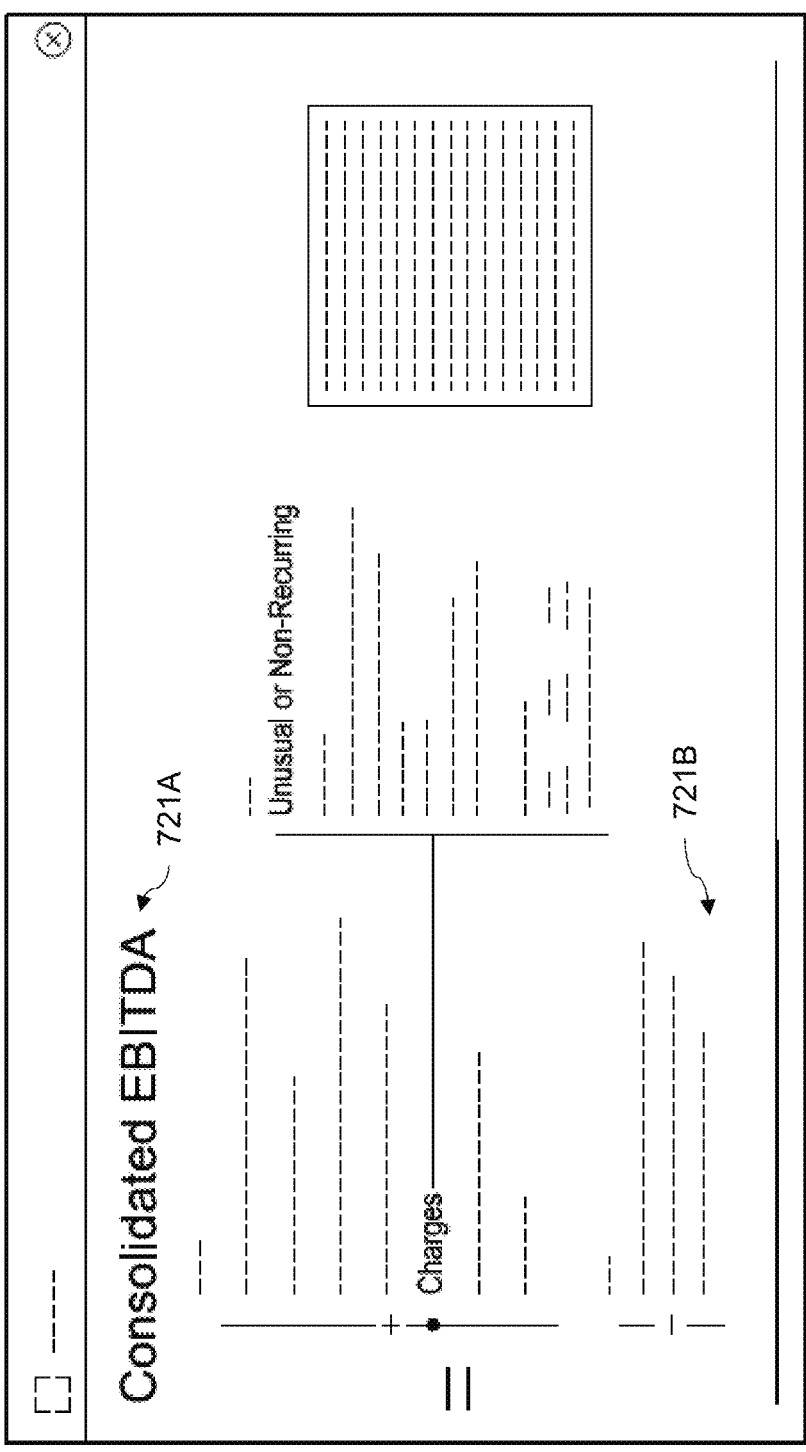
Figure 7K:
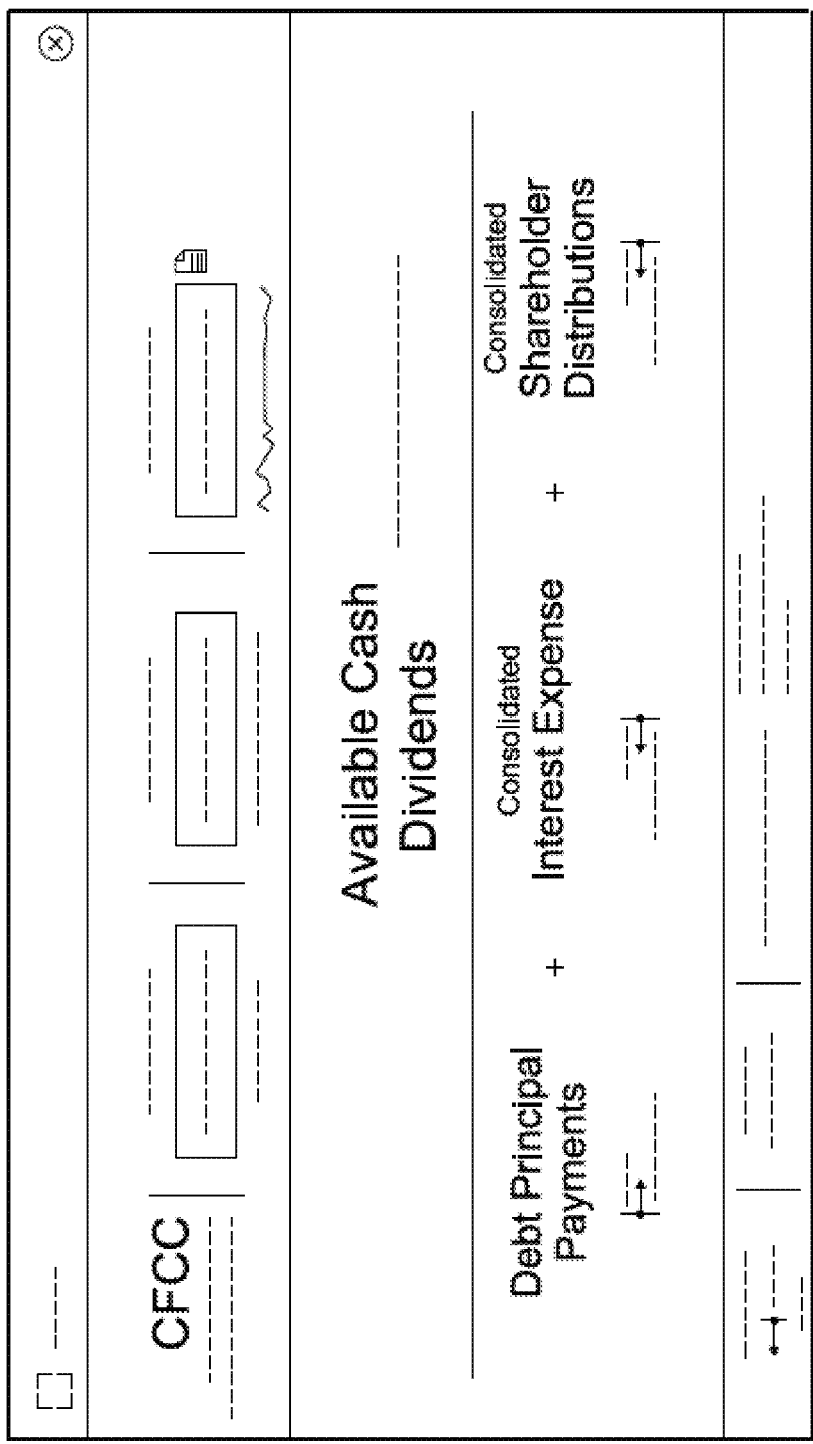
Figure 7L:
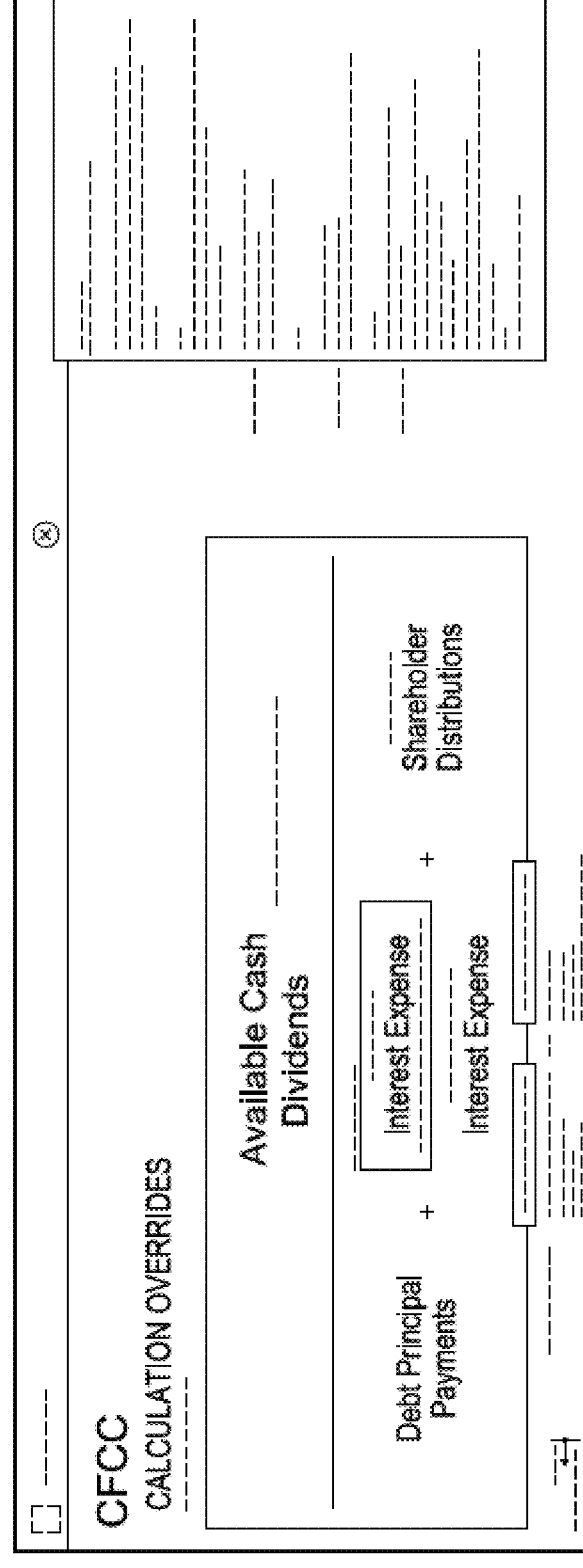
Figure 7M:
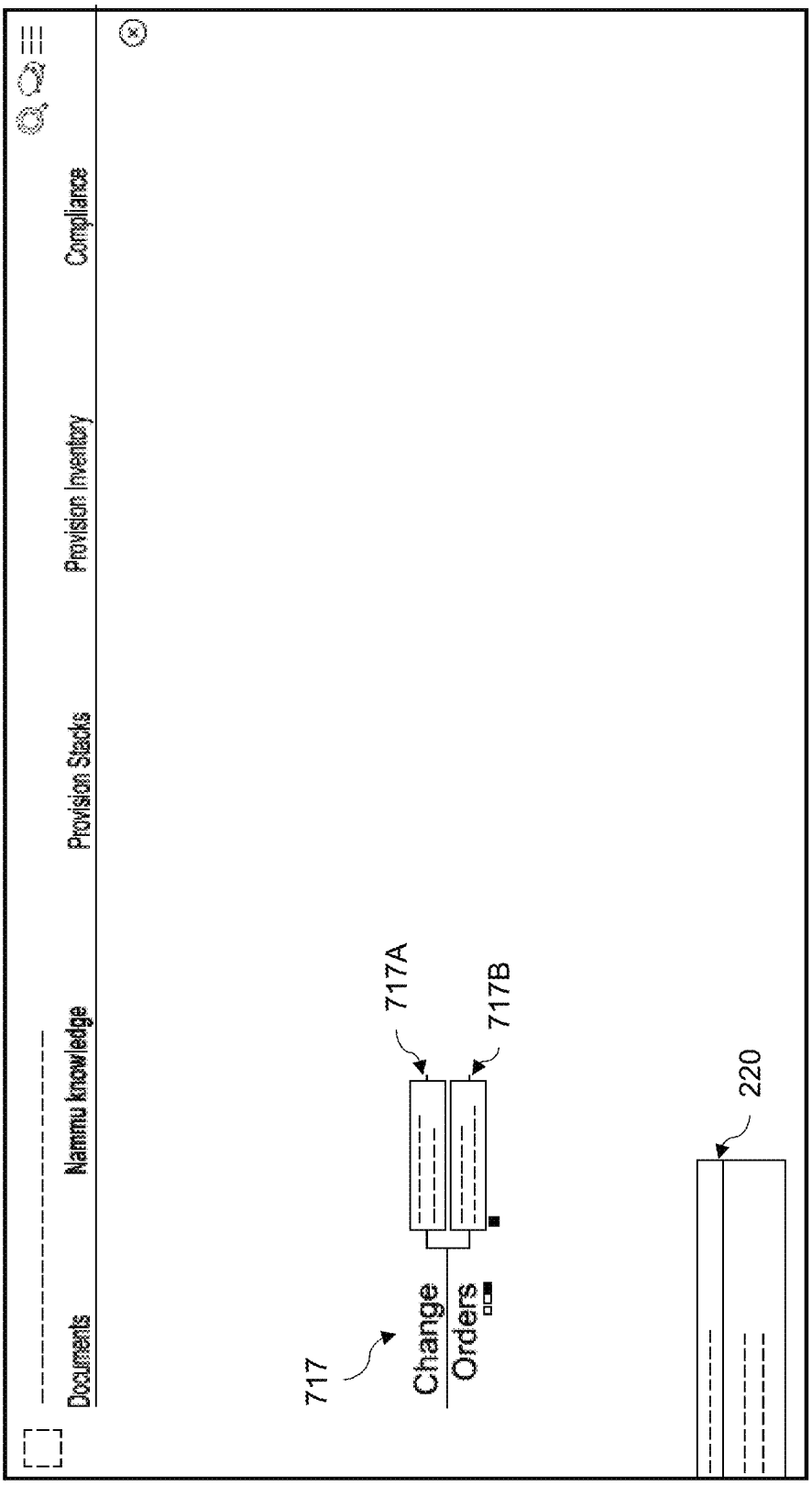
Figure 7N:
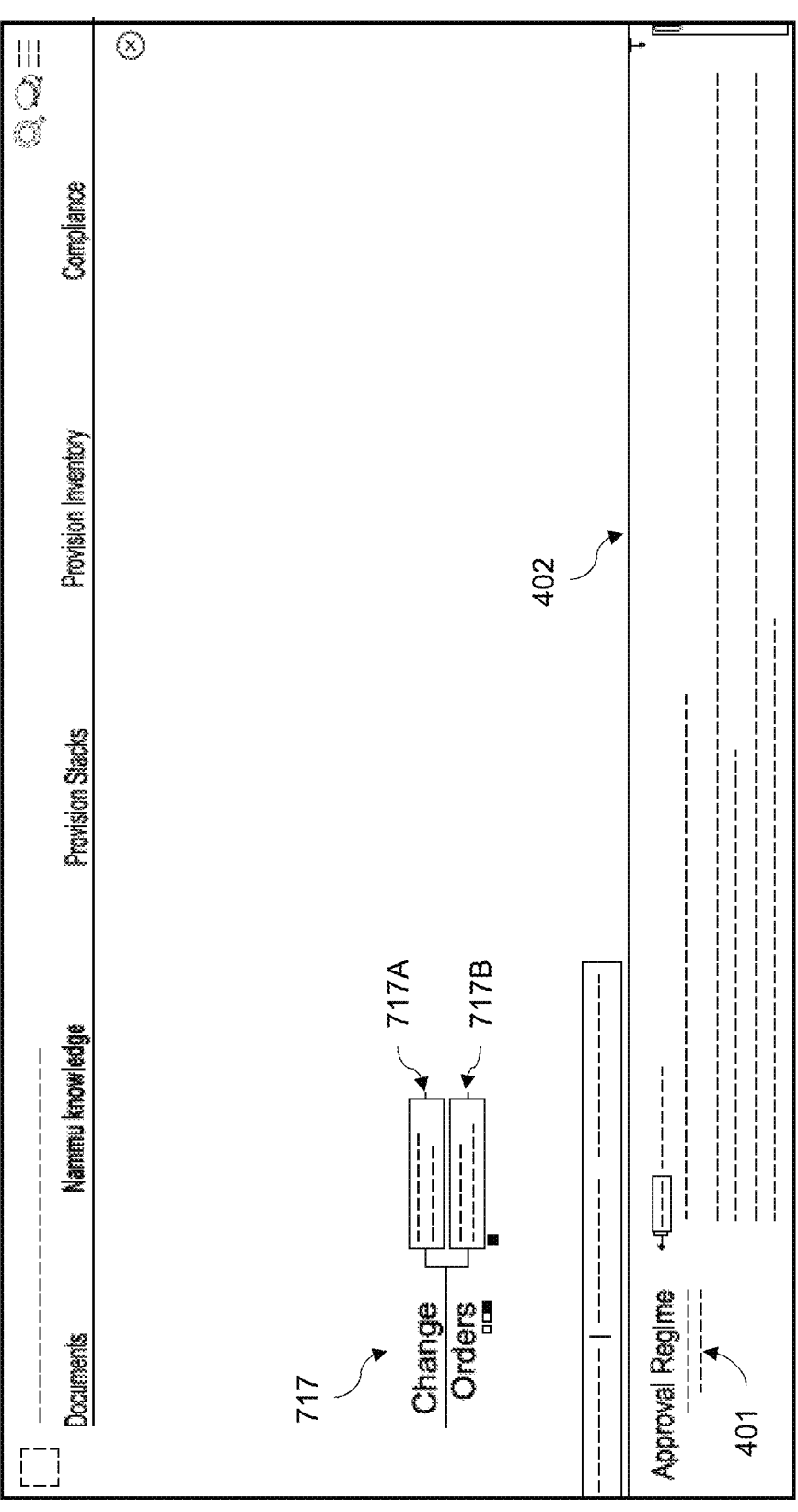
Figure 700:
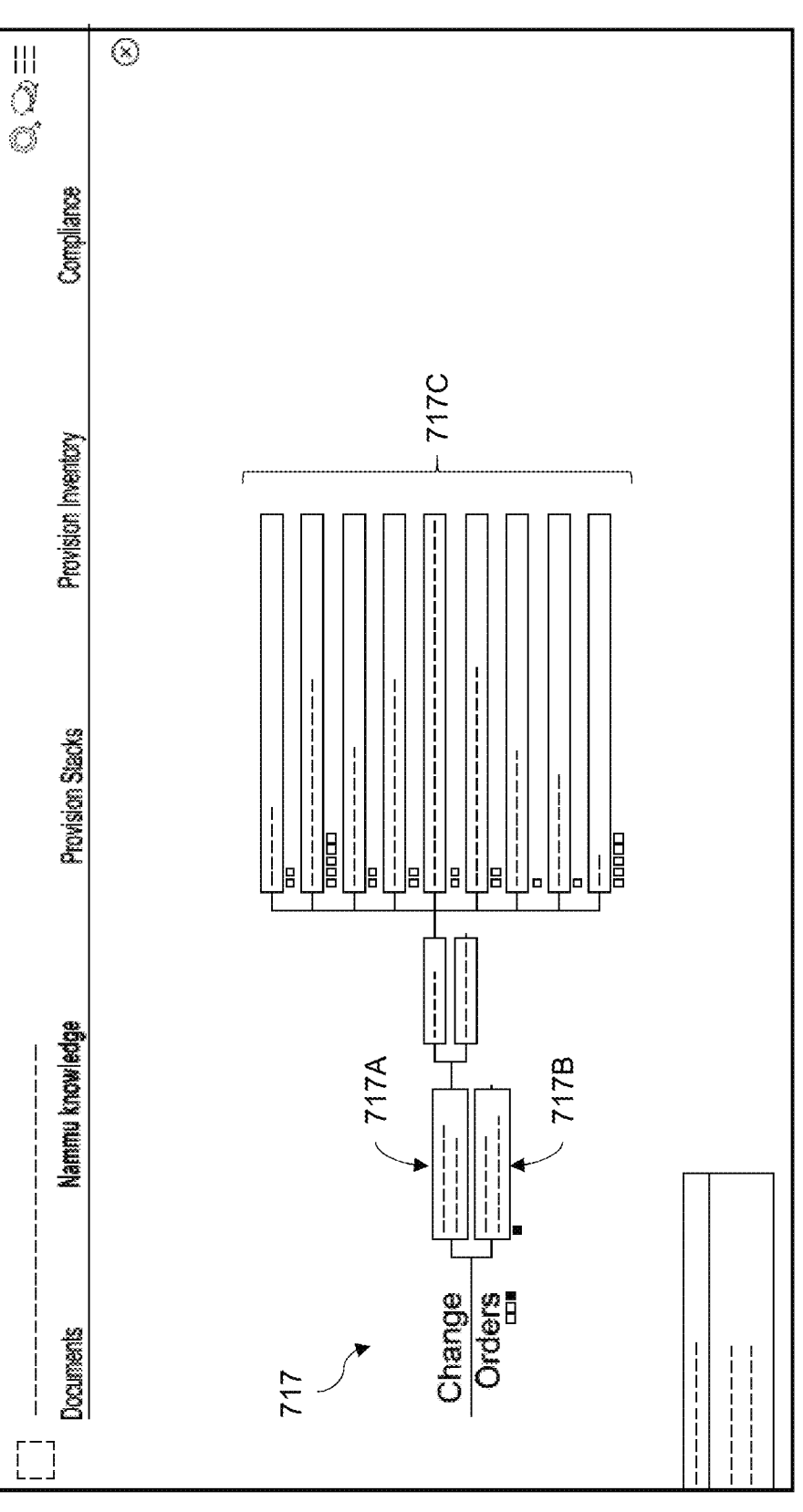
Figure 7P:
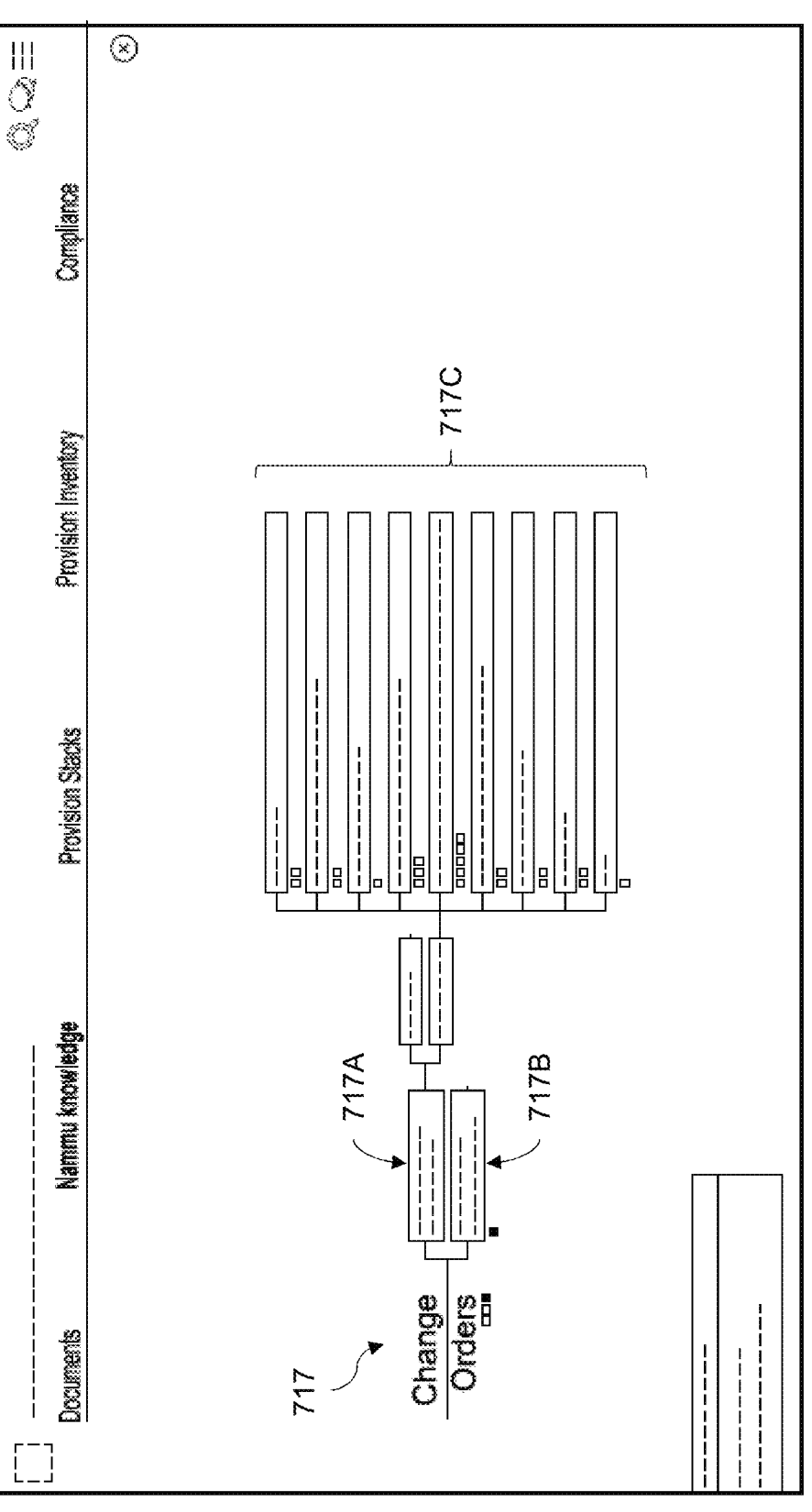
Figure 7Q:
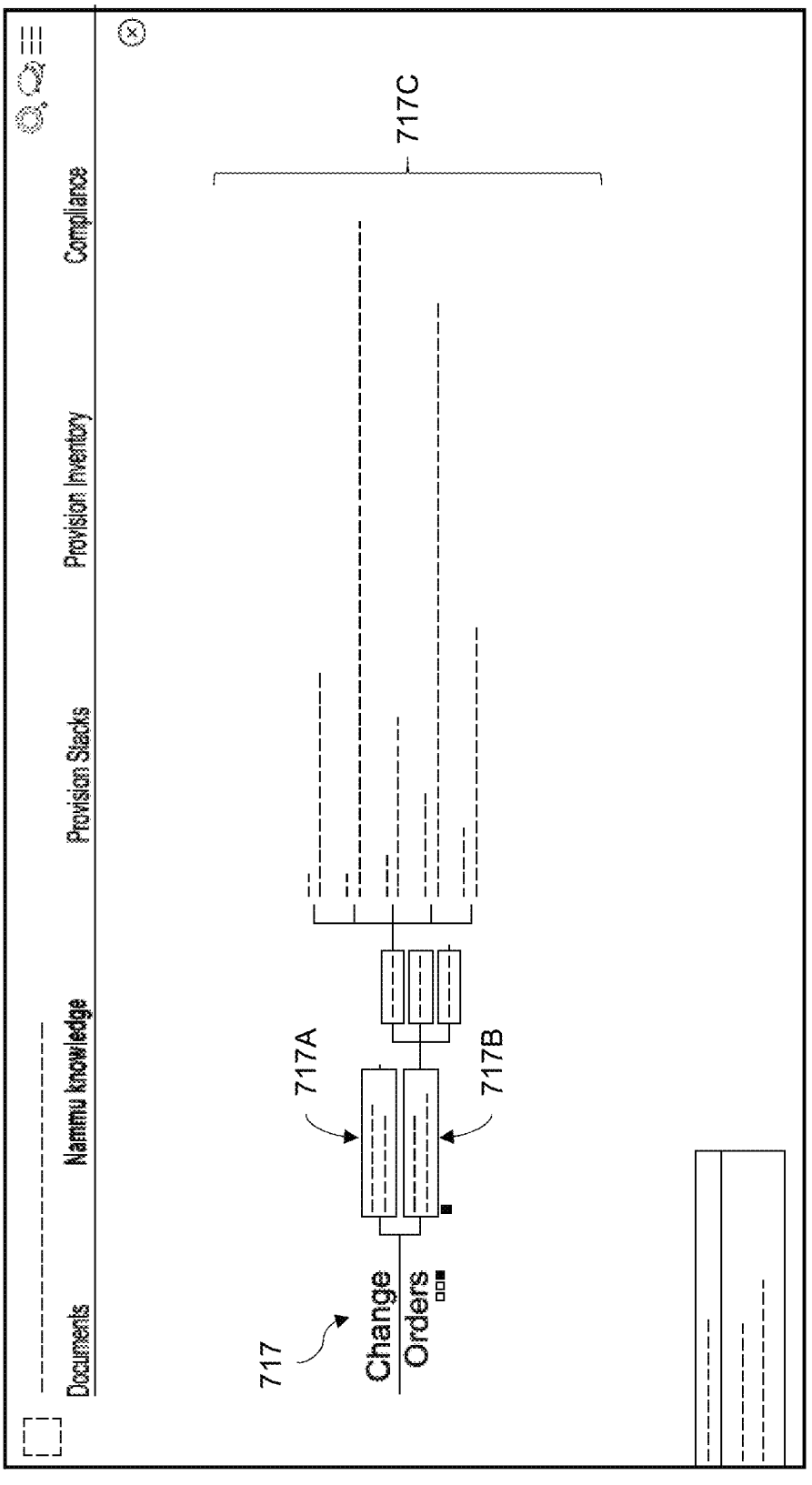
Figure 7R:
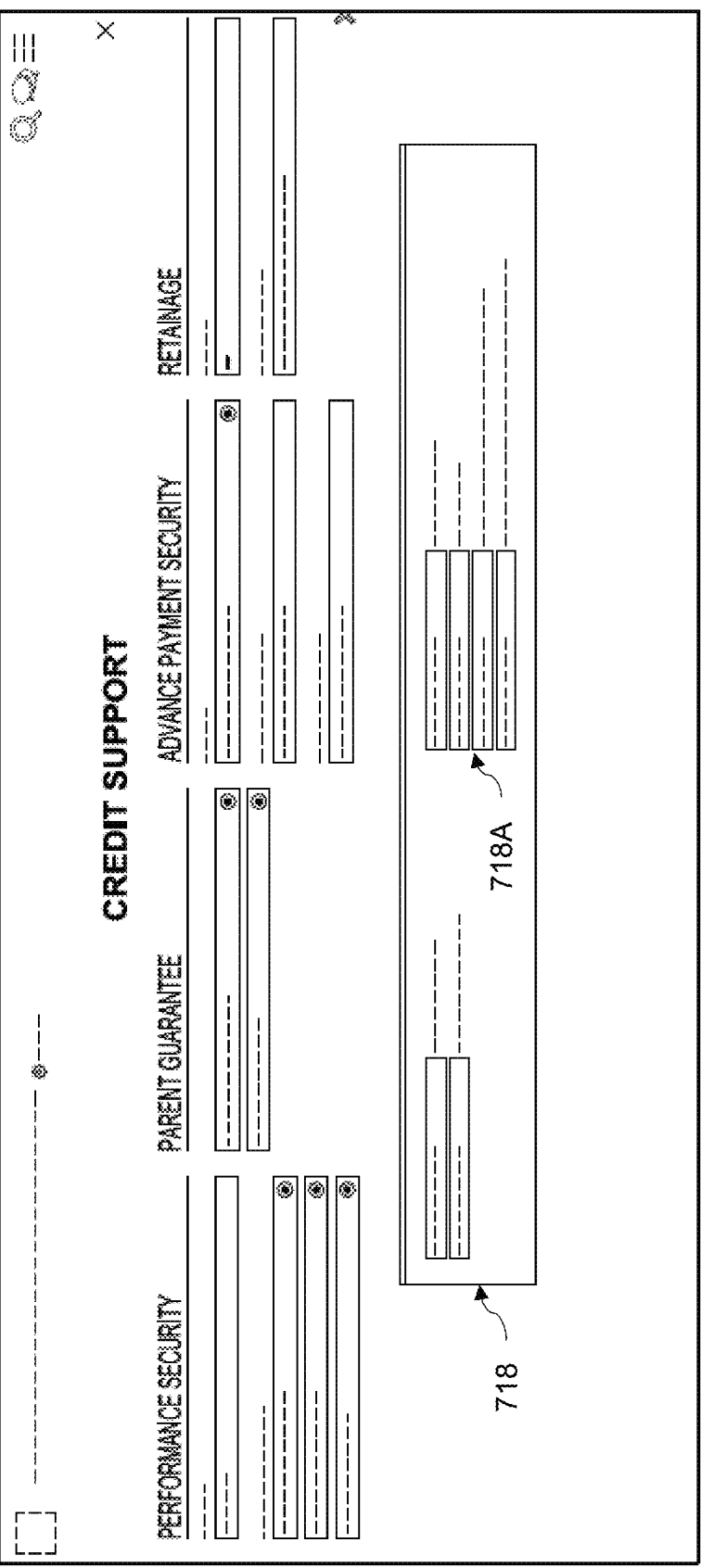
Figure 7S:
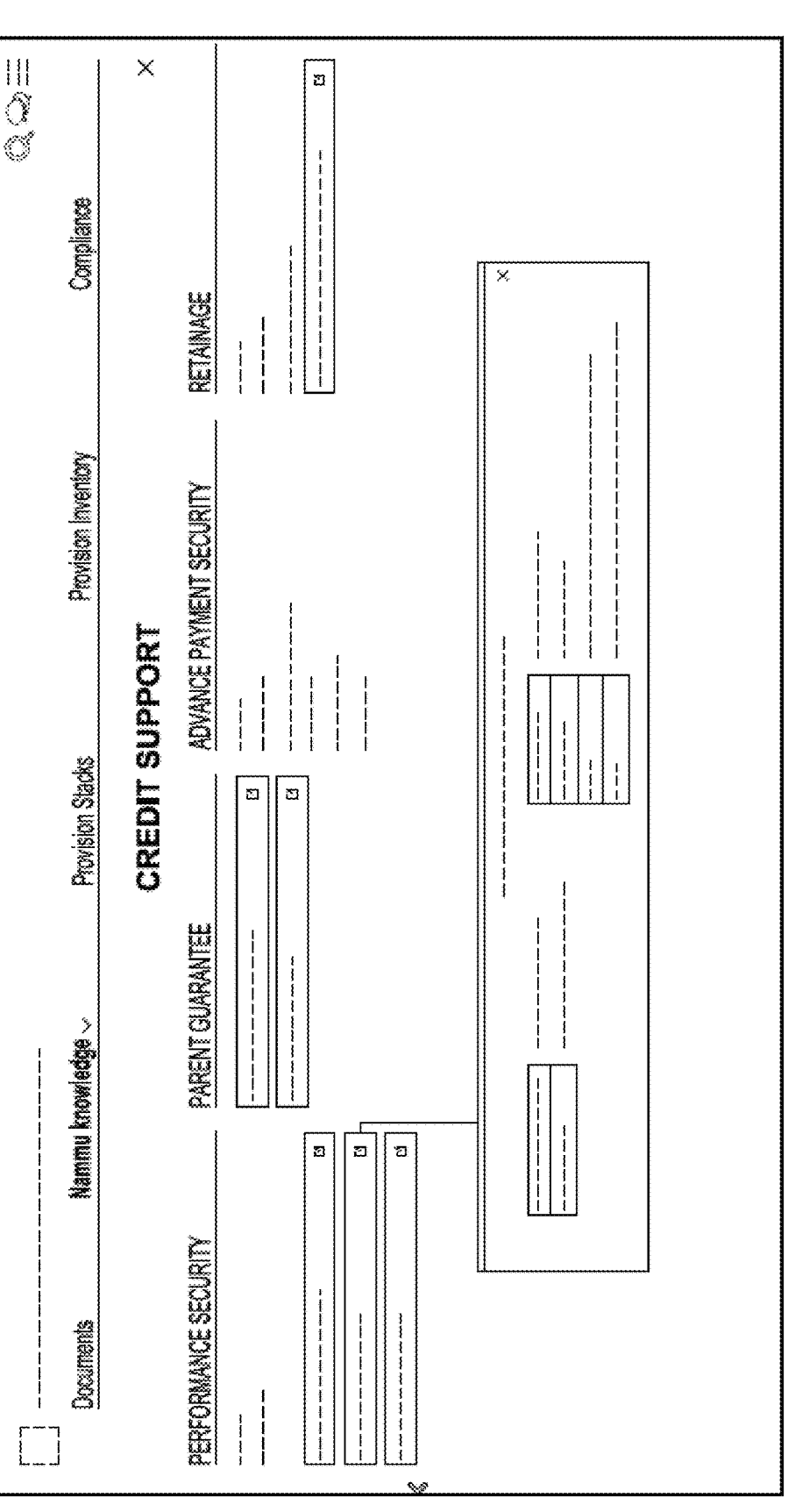
Figure 7T:
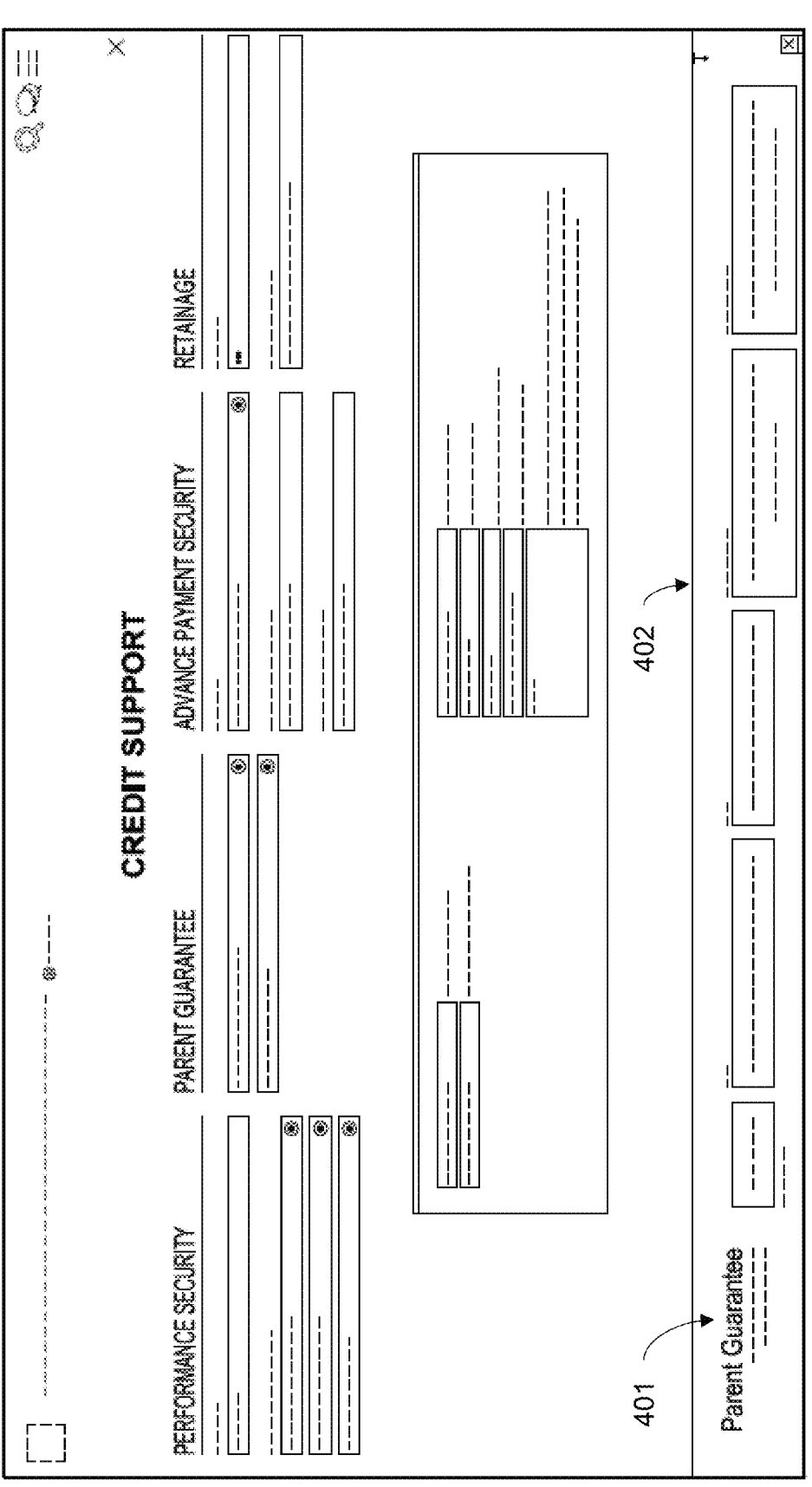

Each of the boxes can be color-coded (not shown) to indicate different segments (e.g., relevant definitions versus relevant schedules), such as shown in FIG. 7Y. With reference to FIG. 7Z, a second level 721 of the data hierarchy is shown to identify components of the concept of contract price, wherein each principal component can be accessed so that relevant provisions from the document can be reviewed. FIG. 7AA illustrates another embodiment of the user interface shown in FIG. 7Z, wherein the data hierarchy includes concepts of other payments that can be relevant to the contract price in the construction contract. The payment approval process is shown in FIG. 7BB. Pecks 401 and stacks 402 can also be available, as also shown in FIGS. 7BB-CC. References from the graphic into the underlying document are shown at the bottom of the screen, such as shown in FIG. 7CC.

FIGS. 7DD-HH illustrate exemplary images of an alternative knowledge 225 feature of a debt service coverage ratio. FIG. 7DD illustrates the debt coverage ratio 705 in its initial state. For example, the numerator 705A and the denominator 705B are shown as a fraction. As shown in FIG. 7DD, the second tier of components for the ratio are also expanded for both the numerator 705A and the denominator 705B. Turning to FIG. 7EE, one or more icons 715 can be used to illustrate ratio compliance and/or ratio compliance thresholds. A ratio monitoring summary 716 connects/links the adjustments to the ratio with performance metrics and obligations from the document. FIG. 7FF illustrates inclusions 705J in the project revenue calculation while exclusions 705K from the project revenue calculation also are shown. Extracted language from the original document with access into definitions and/or cross-references are available as a peek 401 and stack 402. FIG. 7GG shows the user interface of FIG. 7FF wherein extracted language 705L from the original document that is relevant to the inclusions 705J is shown. Similarly, FIG. 7HH illustrates the calculation 705M of permitted capital expenditures.

FIGS. 7II-JJ illustrate the knowledge 225 feature for a consolidated interest coverage ratio 721. The user interfaces shown in FIGS. 7II-JJ are similar to the knowledge feature 225 feature for the debt service coverage ratio shown and described herein. Turning to FIG. 7II, for example, a summary of ratio thresholds 721C is shown. A first level hierarchy summary 721A of the consolidated interest coverage ratio is also distilled into the one or more components 721B of the consolidated interest charges. For example, the components 721B can also indicate the inclusions and exclusions for the first level hierarchy summary 721A. An extracted definition 721D of the ratio with access into definitions and cross-references can be displayed at the top of the interface. An exemplary deconstruction of the components 721B is further shown in FIG. 7JJ. FIGS. 7KK-LL illustrate the knowledge 225 feature for a consolidated fixed charge coverage ratio.

FIGS. 7 MM-QQ illustrate a change order 717 with the initial limb of the graphic selected to show what is included in that component part of the data structure (e.g., exceptions to the approval regime, shown in FIG. 7QQ). FIG. 7 MM illustrates the intelligence 220 feature at the bottom left of the screen, indicating that there is a mismatch in the definition of the change order between the construction contract and the loan agreement. As shown, the intelligence 220 feature represents a smart connection notifying the user that there is a mismatch. The change order 717 also is expanded to reveal two disparate, but connected, rights across two separate, but connected, documents in a single transaction: the construction rights 717A under the construction contract and the loan rights 717B under the loan agreement. The user interface can be used to show the approval regime for the change order from the loan agreement shown in FIG. 7NN, for example, using peeks 401 and stacks 402. The entitlement is shown in FIG. 7OO (shown as additional provisions 717C); the right to request is expanded in FIG. 7PP (shown as additional provisions 717C). In FIG. 7QQ, disparate provisions related to change orders in the related loan agreement are shown as additional provisions 717C.

FIGS. 7RR-TT illustrate the data framework for credit support provided under an exemplary construction contract. FIG. 7RR includes an expanded data structure 718 and categories for each principal component. A sub-framework 718A is also shown for each principal component. Definitions and cross-references can be provided using the peeks 401 and the stacks 402.

Compliance

The compliance 230 feature can span the three components (e.g., the data frameworks 330, the data aggregation

320, and the operational efficiency 310) described above. The compliance 230 feature creates a structure over data sets that enables efficient and effective review and assessments of both complex terms and conditions in a unique and intuitive manner. This type of data structure and data aggregation ultimately increases productivity and insights and improves both focus on critical issues and the identification of anomalies and deviations at speed and scale currently not available in this market.

The requirement for transactions to be benchmarked, assessed and monitored against internal institutional provisions, internal standard forms, precedents and/or market standard forms as well as concepts of "market" has become an essential component of the transaction process for both internal regulatory purposes and external reporting purposes. For example, financial institutions regularly need to report on certain specific compliance issues to shareholders, regulators, and boards, and for certain external and internal marketing and business development purposes. Examples of these issues include environmental, social, and governance (ESG) type provisions. This critical exercise is considerably manual, involving multiple stakeholders, both internal and external to an institution, and is generally ad-hoc with limited tools and structures to enable the streamlining and equivalency of assessments, analysis and review of identified key provisions which is essential to enable this transaction process to be effective and accurate, both at a transaction and portfolio level. Conventional processes also are generally unable to build on earlier transactions or scale effectively.

Figure 8A:
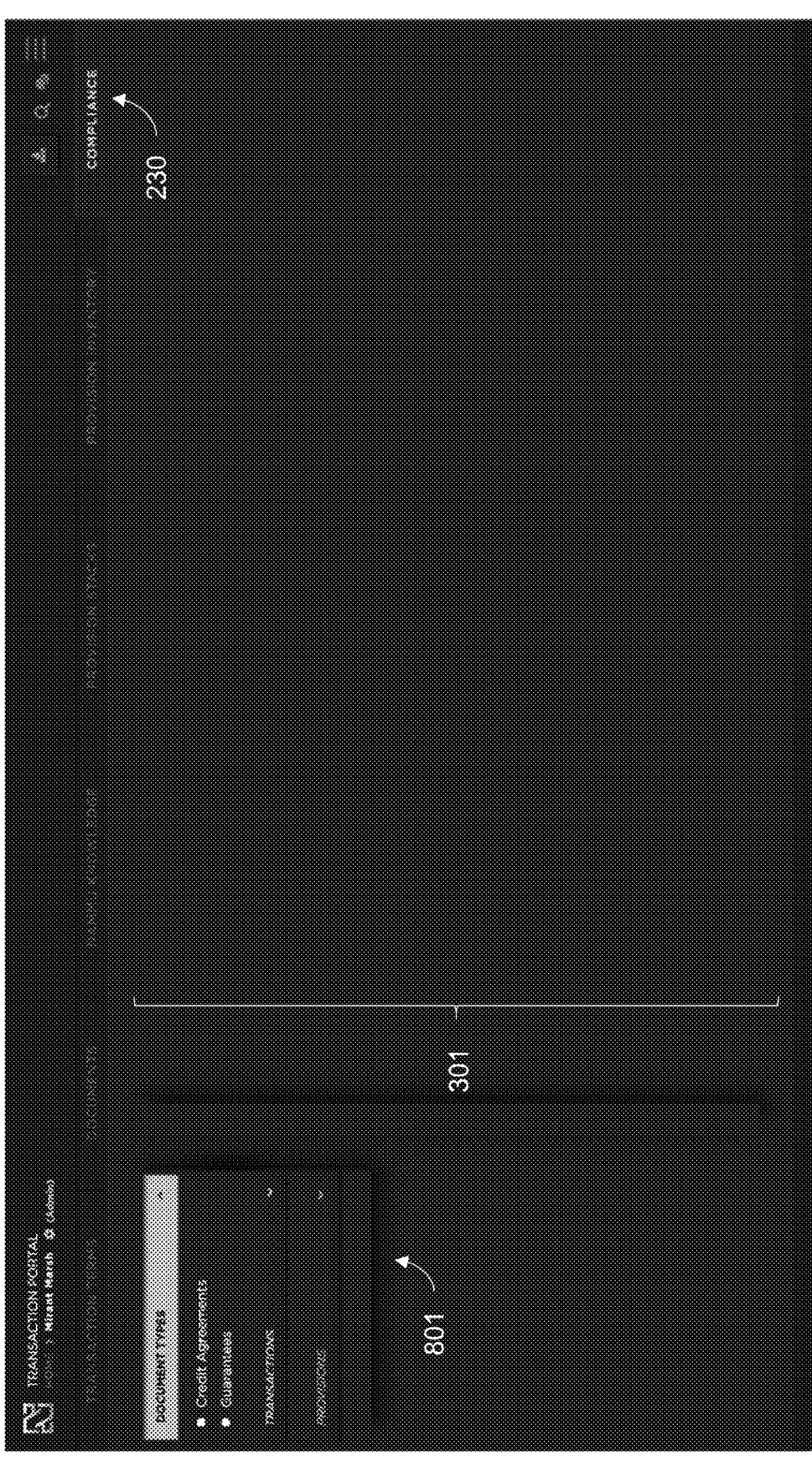
FIG. 8A is an exemplary screenshot illustrating another embodiment of a graphical user interface for presenting the compliance feature of FIG. 2B.
Figure 8B:
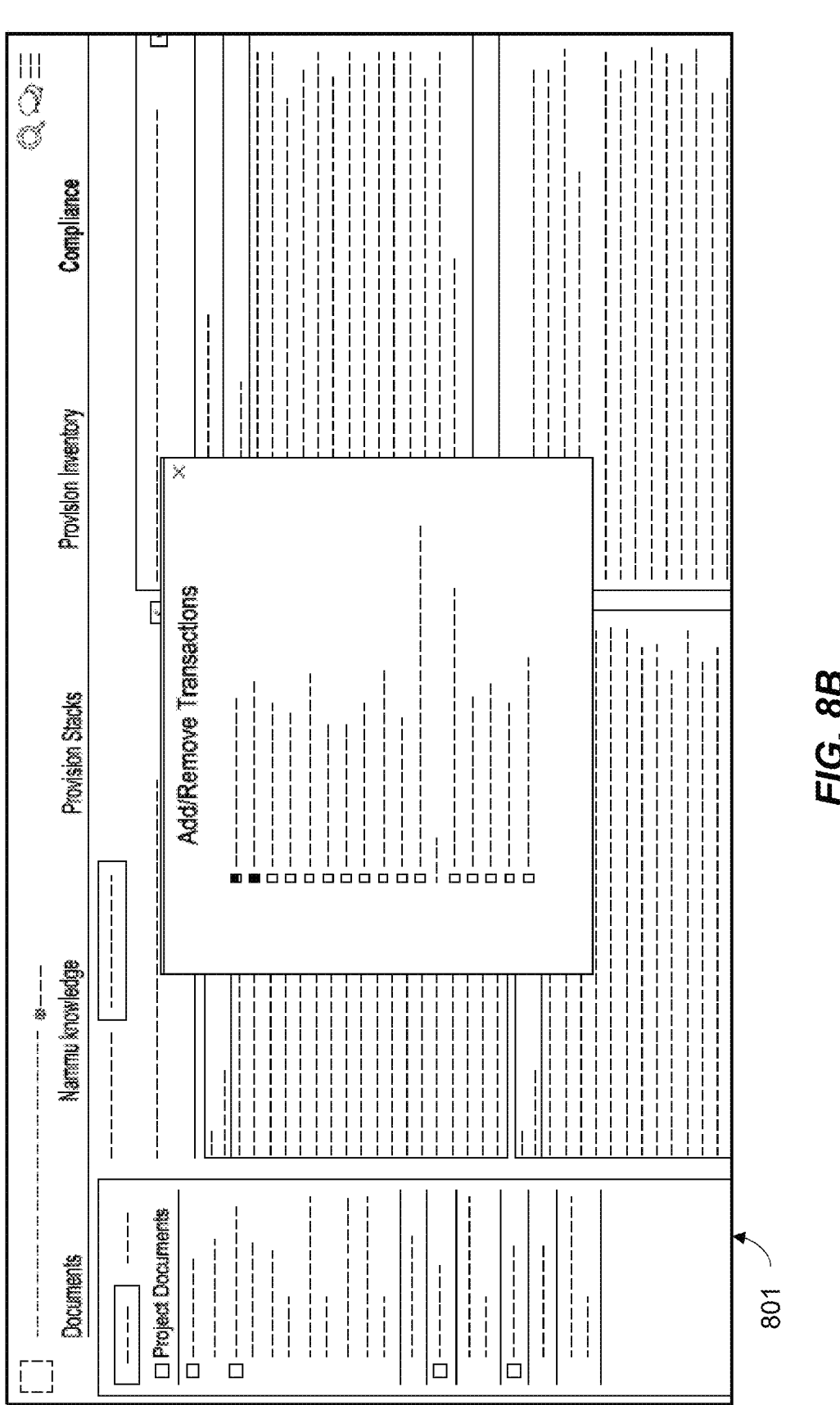
FIG. 8B is an exemplary screenshot illustrating another embodiment of a graphical user interface for presenting the compliance feature of FIG. 2B.
Figure 8C:
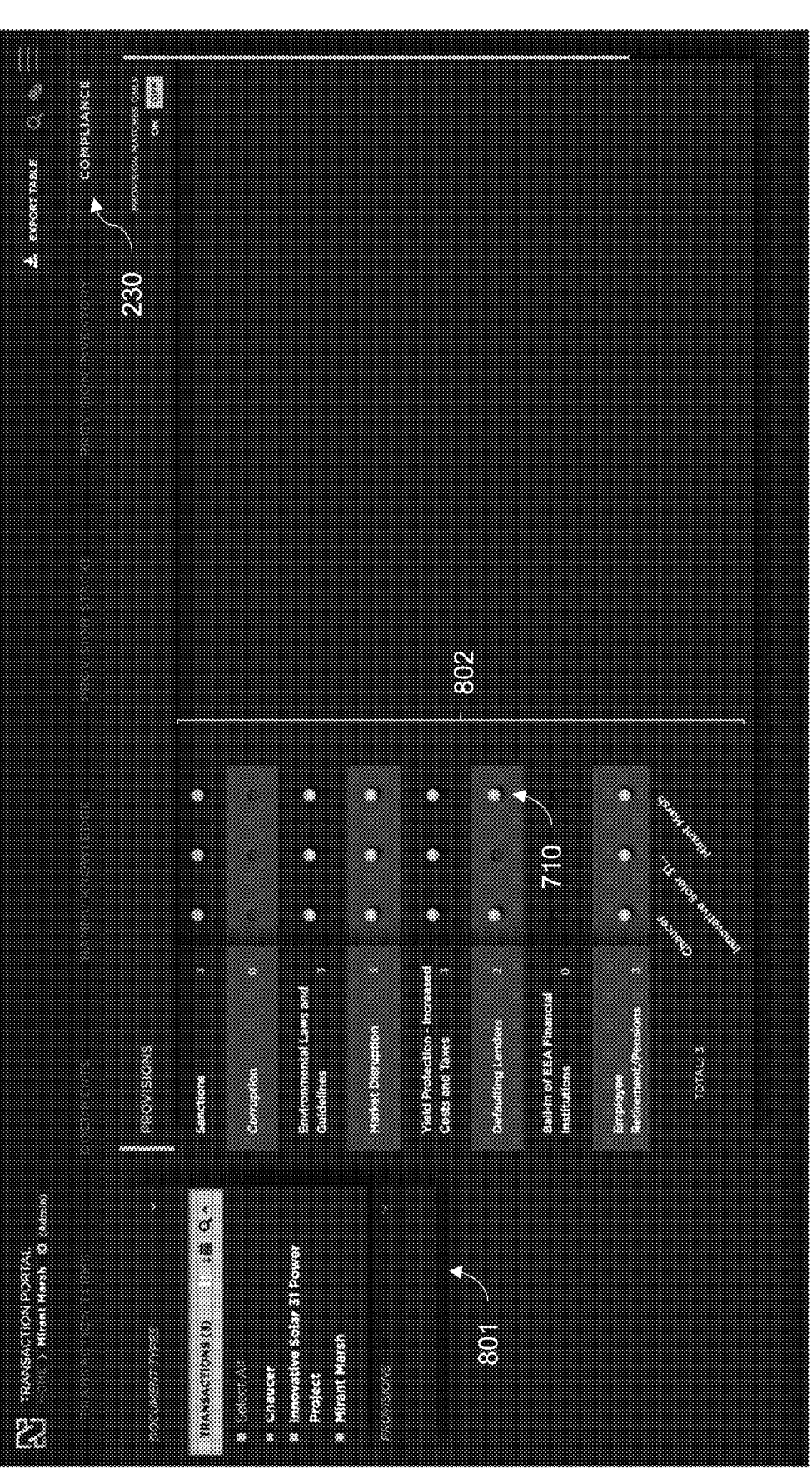
FIG. 8C is an exemplary screenshot illustrating another embodiment of a graphical user interface for presenting the compliance feature of FIG. 2B.

In some embodiments and as shown, for example, in FIGS. 8A-8C, the compliance 230 feature provides a data structure presenting a side-by-side display of key equivalent provisions-specifically, those which are generally understood to be relevant for an organization's internal and regulatory compliance requirements. The compliance 230 feature provides a comparison of these key provisions relevant to internal and regulatory compliance in a specific document against an organization's "standard form", any relevant market standard form and/or the equivalent document in other transactions in the user's institutional data set.

Additionally and/or alternatively, the categories of provisions that can be "stacked" next to one another on the user interface are those which stakeholders continually reference and compare throughout the documentation process as well as during the operations/transaction management phase following the execution of the transaction documents. The framework to organize, classify, catalogue and display the provisions into the "compliance" format is an intuitive solution to provide immediate and direct access to equivalent provisions across connected documents.

In some embodiments, the compliance 230 feature cooperates with the native 210 view and further enables the use of peeks 401 and stacks 402. The system advantageously provides a dynamic, activated user interface for the review and assessment of identified provisions across portfolios of transactions.

The compliance 230 feature advantageously presents a comparison of selected provisions, such as set out in table form. This table is structured to display data from a framework of provisions, with data aggregated across a customized document selection. This enables stakeholders to immediately and directly review and consider the results, based on the documents relevant to them at a particular time.

The compliance 230 feature enables access and insight into real time pools of information and knowledge previously inaccessible at scale, speed in analysis, decision making, assessment and judgment, consistency in transaction analysis, enhanced ability to manage risk and increased productivity and insights. It also enables and improves the ability of transaction stakeholders to both focus on critical issues as well as the identification and communication (both internally and externally) of anomalies and deviations at speed and scale currently not available in this market.

Figure 8D:
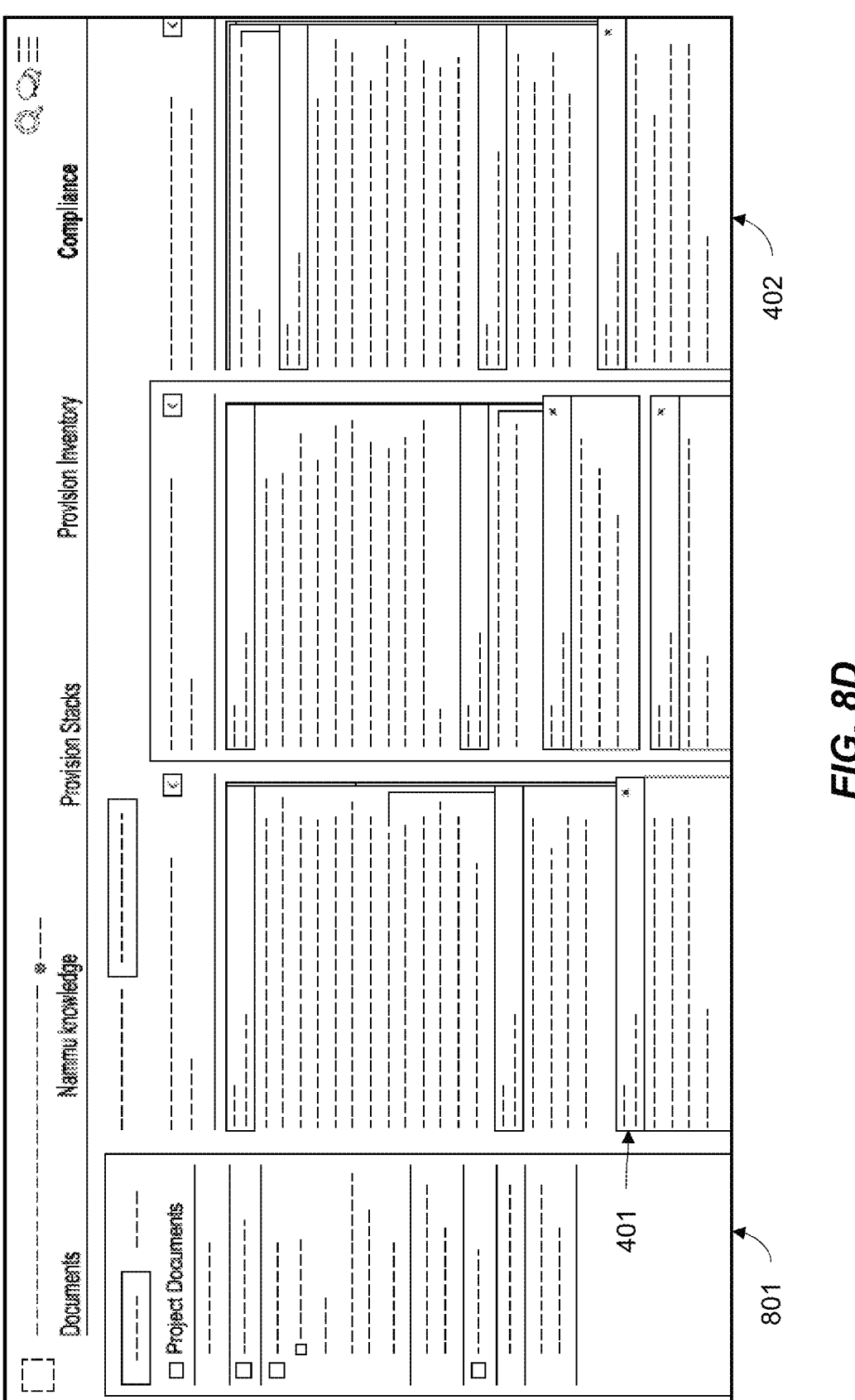
FIG. 8D is an exemplary screenshot illustrating another embodiment of a graphical user interface for presenting the compliance feature of FIG. 2B.
Figure 8E:
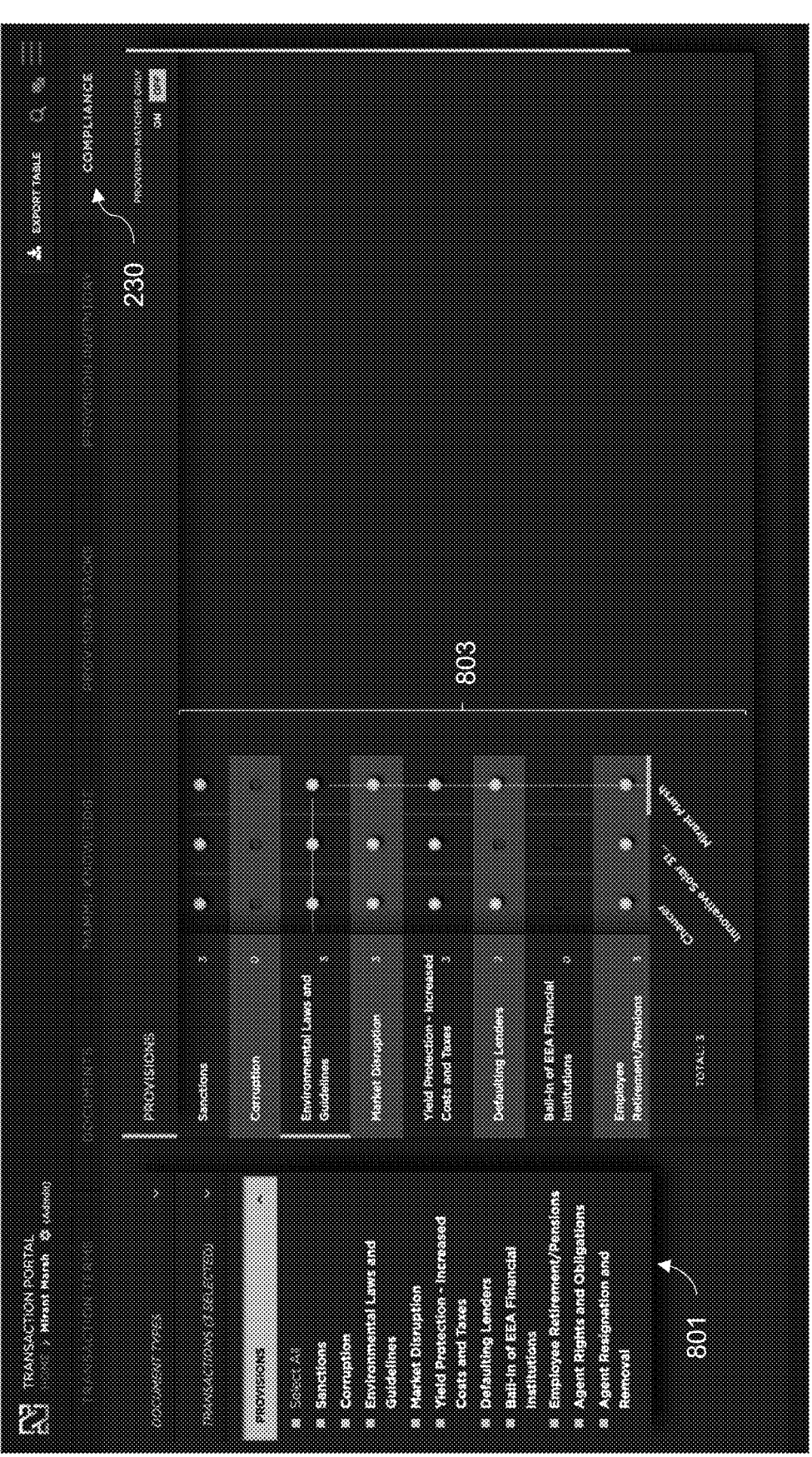
FIG. 8E is an exemplary screenshot illustrating another embodiment of a graphical user interface for presenting the compliance feature of FIG. 2B.

FIGS. 8A-C illustrate exemplary screenshots showing the presentation of the compliance 230 feature of exemplary documents. FIG. 8A illustrates an image of a landing page used to show the compliance 230 feature. As shown, categories 801 of documents that are available to be selected are displayed on the left side column. Additional subcategories can be available once a selected category is chosen. Additionally as shown, transactions (shown in FIG. 8B) and provisions (shown in FIG. 8C) can be selected for display in the main window 301. FIG. 8C illustrates the compliance 230 feature exposing a loan agreement provision data schema 802 and the selected provision across three transactions. In some embodiments, with reference to FIG. 8C, the indicator button 710 is displayed to indicate the presence of absence of a component of compliance. Upon selection of the indicator button 710, the provision carousel 255 can be opened. FIG. 8D illustrates the compliance 230 feature cooperating with one or more peeks 401 and stacks 402 for displaying dynamic text. FIG. 8E illustrates the compliance 230 feature exposing one or more compliance provisions 803 with additional connections graphically represented.

Although compliance provisions are described across two different agreement types (i.e., loan agreements and construction contracts), the structure and framework of the compliance 230 feature can be applied to the identification and extraction of compliance provisions across many types of transaction documents.

Stacks

The provision stacks 235 feature can span the three components (e.g., the data frameworks 330, the data aggregation 320, and the operational efficiency 310) described above. The provision stacks 235 feature creates a structure over data sets enabling efficient and effective review and assessment of complex terms and conditions in a unique and intuitive manner. This type of data structure and data aggregation ultimately increases productivity and improves both focus on critical issues and identification of anomalies and deviations.

The provision stacks 235 feature provides a data structure presenting a side-by-side display of key equivalent provisions across multiple documents from a single transaction. The categories of provisions which can be "stacked" next to one another on the user interface are those which stakeholders continually reference and compare throughout the documentation process as well as in the operations/transaction management phase following the execution of the transaction documents.

As shown in FIGS. 9A-F, the framework to organize, classify, catalogue and display the provisions into the "stacks" format is an intuitive solution to provide immediate and direct access to equivalent provisions across connected documents. For example, the view of the user interface shown in FIGS. 9A-F displays equivalent provisions across connected documents from a single transaction. In addition, the user's immediate ability to select and assemble the document sets which the user needs to review and compare from a drop-down index on the user interface creates further efficiencies in this process.

The ability to ensure and confirm consistency in these provisions within a set of connected documents, whether during drafting or document review, is an established part of the documentation process in private credit transactions. In addition, across the majority of transactions, advisory teams (internal and external) are also required to ensure that these provisions comply with internal credit approvals.

In some embodiments, the provision stacks 235 cooperate with the native 210 view for enabling peeks 401 and stacks 402. The system 100 provides a dynamic, activated user interface for the review and assessment of identified provisions.

Conventionally, market stakeholders continue to use manual methods to cross check provisions across connected documents, physically searching across the required provisions, and/or using printed paper copies, tables and/or spreadsheets to set out the provisions to be compared. This is an inefficient and costly process which is not undertaken in any consistent manner, so there is limited, if any, equivalency in approach or comparable data sets even within the same institution on its own transactions.

The provision stacks 235 enable access and insight into real time pools of information and knowledge previously inaccessible at scale, speed in analysis, decision making, assessment and judgment, consistency in transaction analysis, enhanced ability to manage risk, increased productivity focusing on critical issues, and the identification of anomalies and deviations at speed and scale currently not available in this market.

Figure 9A:
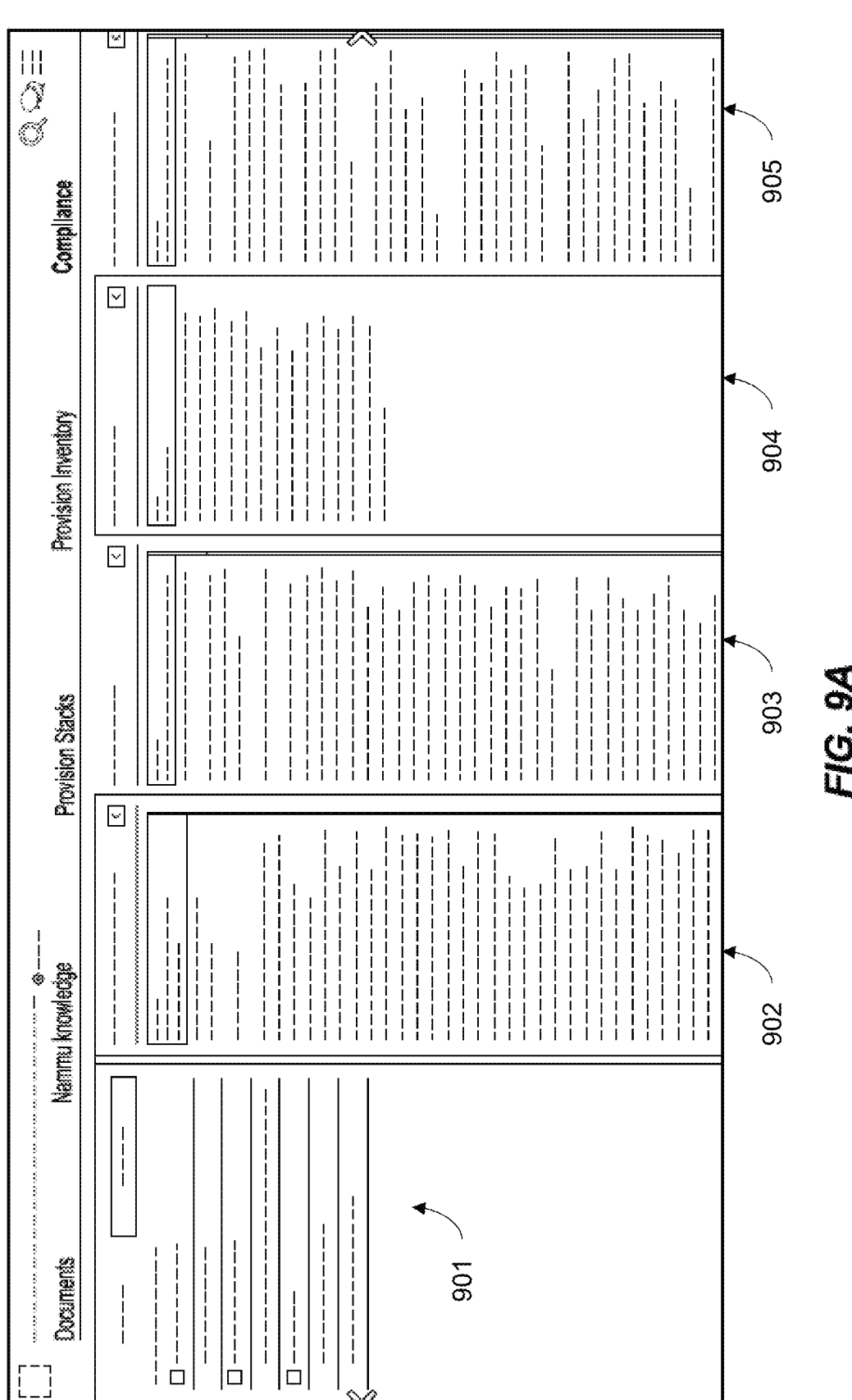
FIG. 9A is an exemplary screenshot illustrating one embodiment of a graphical user interface for presenting the provision stacks feature of FIG. 2B.
Figure 9B:
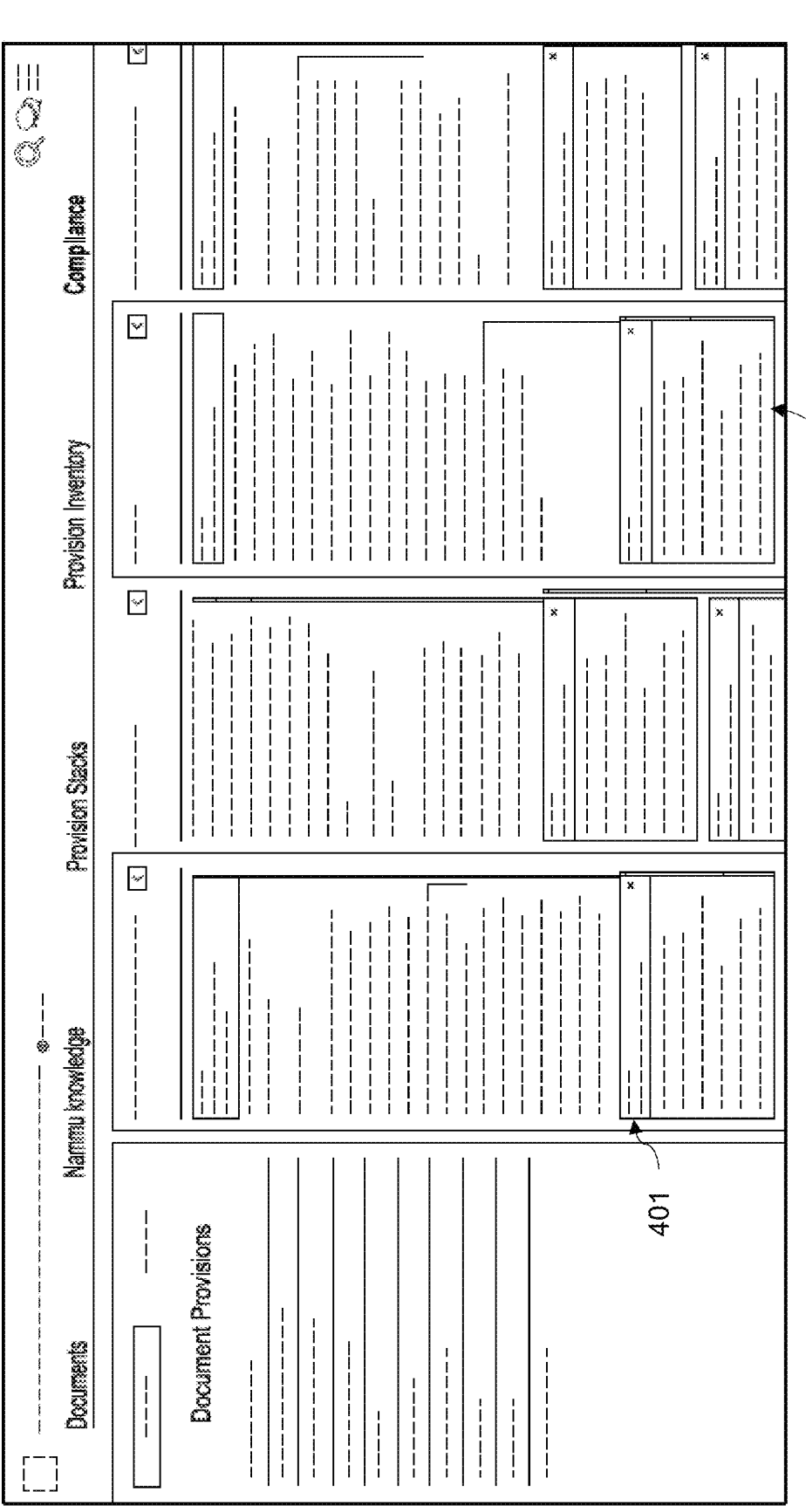
FIG. 9B is an exemplary screenshot illustrating another embodiment of a graphical user interface for presenting the provision stacks feature of FIG. 2B.
Figure 9C:
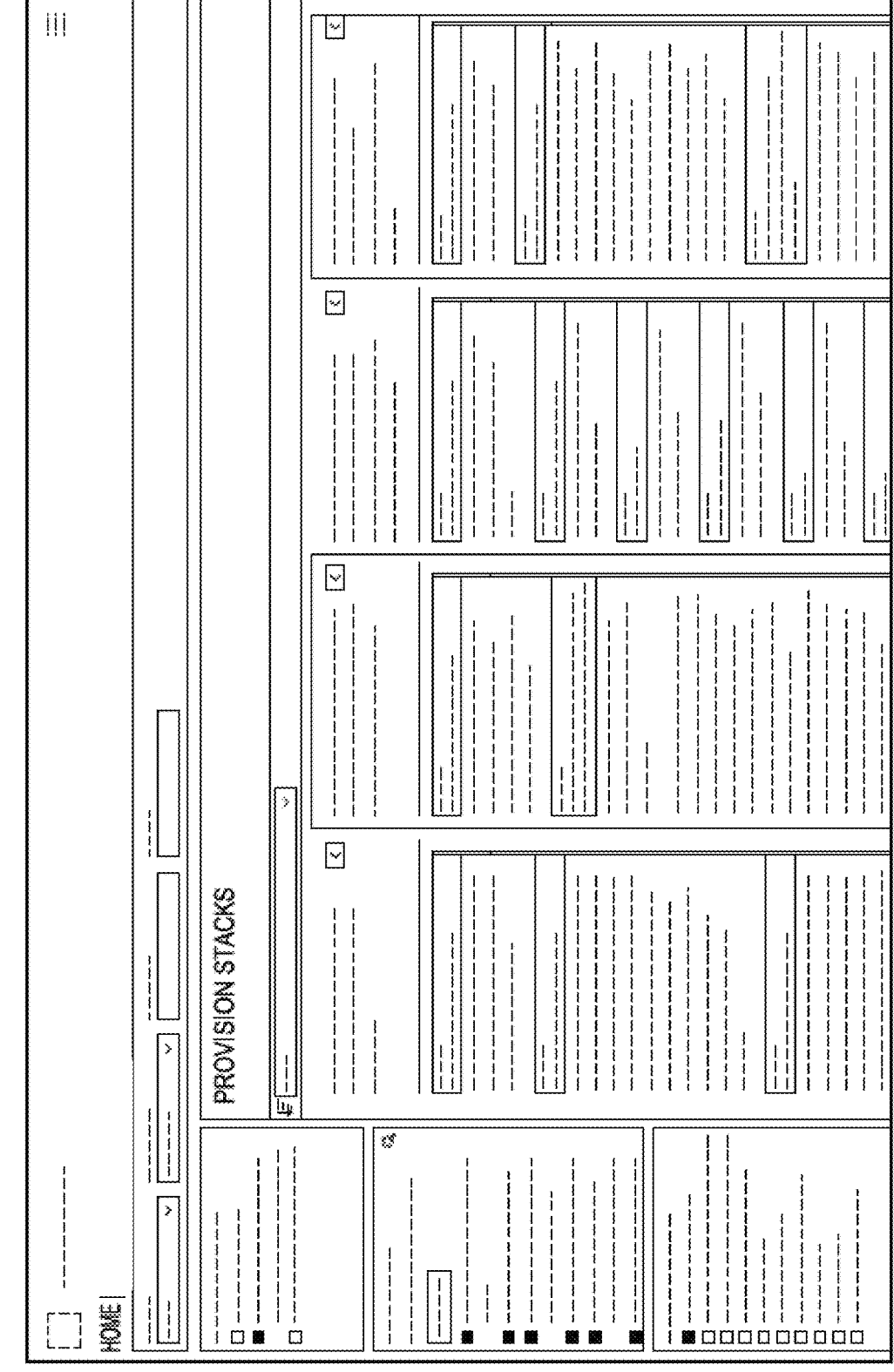
FIG. 9C is an exemplary screenshot illustrating another embodiment of a graphical user interface for presenting the provision stacks feature of FIG. 2B.

FIGS. 9A-F illustrate exemplary screenshots showing the presentation of the provision stacks 235 of exemplary documents. FIGS. 9A-C illustrate the provision stacks 235 across four different agreements from a single transaction, for example, through the transaction portal 110. The document categories can be exposed to allow the user to select provision types that are extracted across the four agreements, such as shown in FIG. 9A. The selection of provision types can be done in a provision selection menu 901, which lists an index of transaction documents. Once selected, for example, an exemplary construction contract 902 can be shown in the first column; an exemplary loan agreement 903 can be shown in the second column; an exemplary guaranty 904 can be shown in the third column; and an exemplary power purchase agreement 905 can be shown in the column on the right. In some embodiments, peeks 401 and stacks 402 are available, such as shown in FIG. 9B.

Figure 9D:
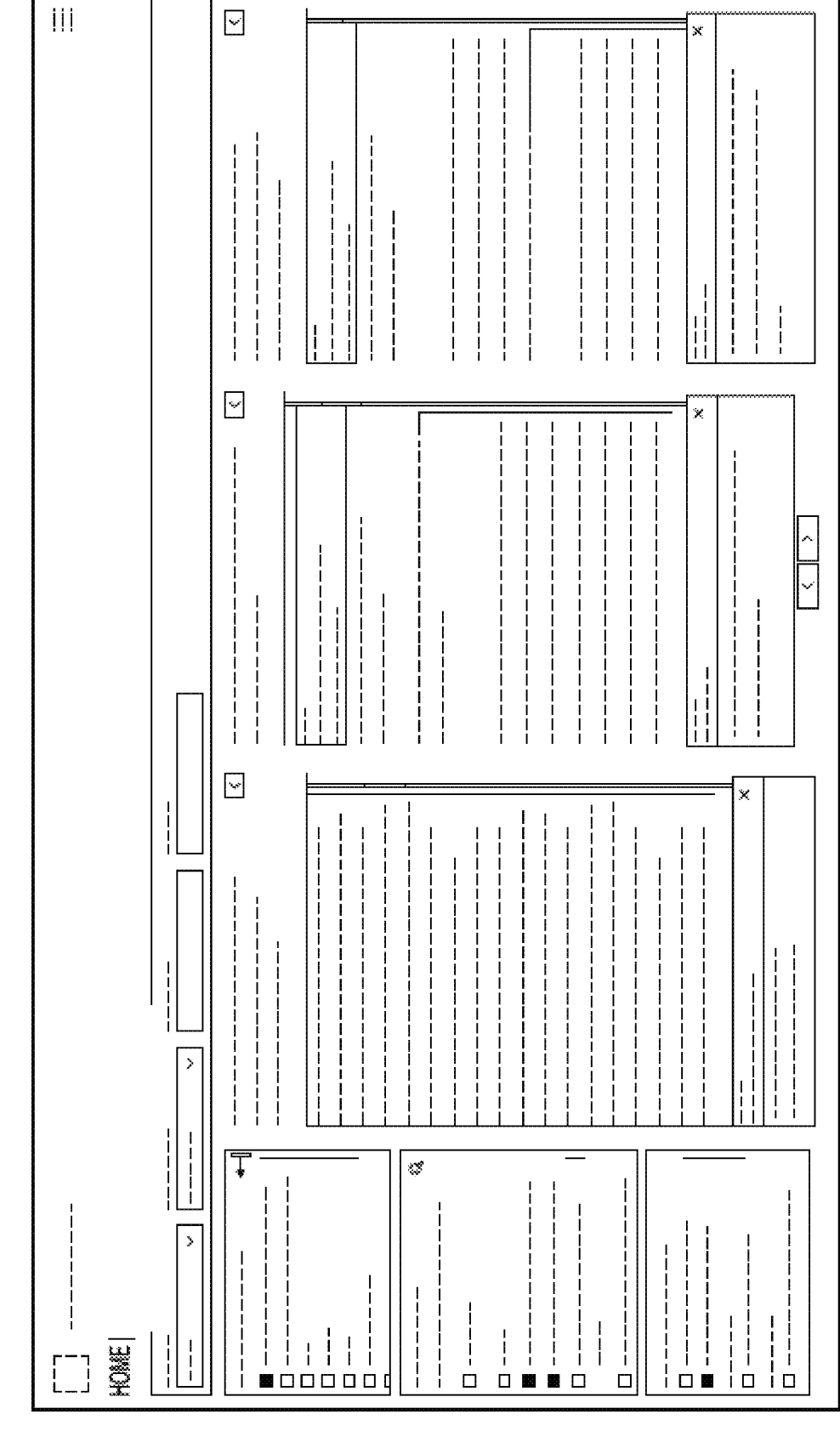
FIG. 9D is an exemplary screenshot illustrating another embodiment of a graphical user interface for presenting the provision stacks feature of FIG. 2B.
Figure 9E:
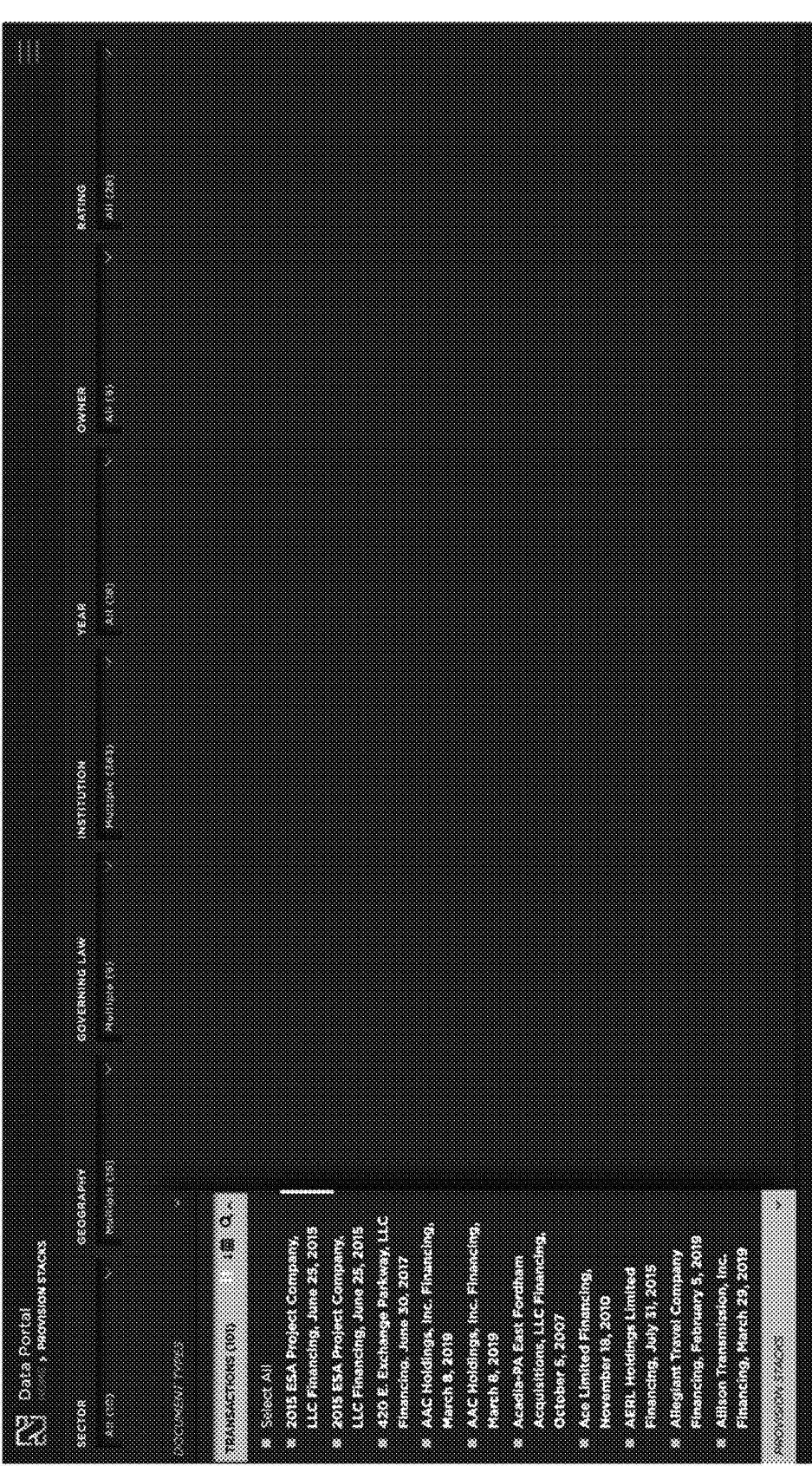
FIG. 9E is an exemplary screenshot illustrating another embodiment of a graphical user interface for presenting the provision stacks feature of FIG. 2B.
Figure 9F:
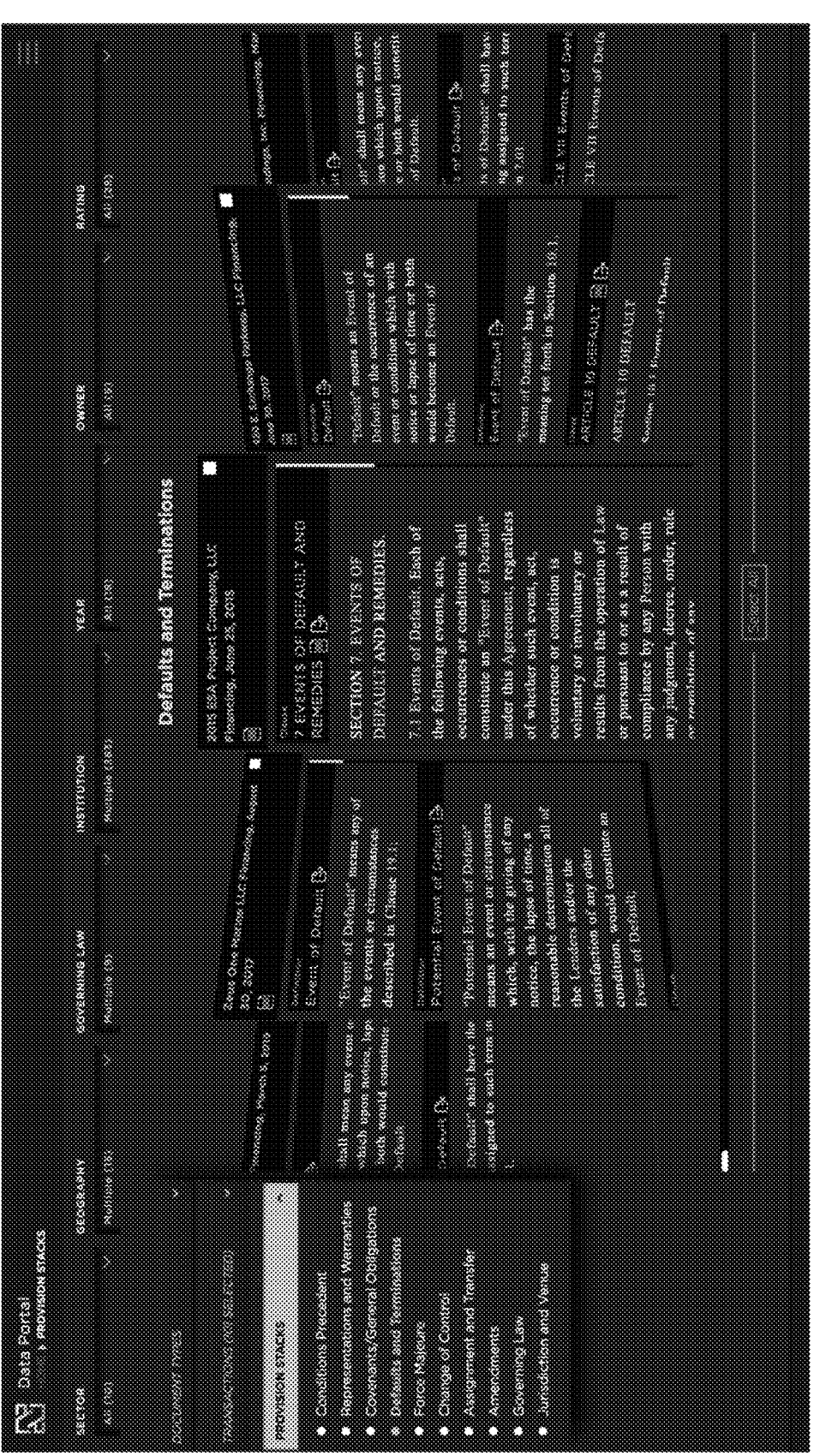
FIG. 9F is an exemplary screenshot illustrating another embodiment of a graphical user interface for presenting the provision stacks feature of FIG. 2B.

Additionally and/or alternatively, the provision stacks 235 can extract and showcase equivalent provisions from equivalent documents across different transactions. FIGS. 9C-D illustrate exemplary screenshots showing the presentation of the provision stacks 235 of exemplary documents using the data portal 130. For example, the provision stacks 235 can highlight defaults and terminations from loan agreements across different transactions, as shown in FIGS. 9E-F.

Inventories

The provision inventories 240 feature can span the three components (e.g., the data frameworks 330, the data aggregation 320, and the operational efficiency 310) described above. The provision inventories 240 feature provides a series of connected frameworks for creating multiple structures over data sets, enabling efficient and effective review and assessments of both complex terms and conditions in a unique intuitive manner. This type of data structure, data aggregation and operational efficiency ultimately increases productivity and insight improving both focus on critical issues as well as the identification of anomalies and deviations at a speed and scale currently not available in this market.

The provision inventories 240 feature represents a data framework which assembles, indexes and inventories identified, extracted, and aggregated provisions in an intuitive and dynamic structure. The organization scheme is structured to immediately showcase to the user which provisions from its document are present and those which are not present as compared to both what has been identified by the platform as either being in other equivalent documents across the group of market data sets reviewed or in the user's institutional data set.

In this market, there is significant value in knowing not only what is present in, but also what is missing from, a document. As these transactions are generally intended to be liquid and trade across their life-cycles, market stakeholders generally look to ensure that the documents reflect or follow an accepted market position. This understanding and reflection of "market" generally enables a transaction to be successfully syndicated ultimately ensuring that the user's institution is more effectively able to transfer and share the risk of that transaction.

The categories of provisions included in the provision inventories 240 feature, which are compared to the user's document, are based on what transaction stakeholders across transactions continually reference and compare throughout the documentation process to understand and determine "market" in their documents.

Conventionally, there is no simple, efficient method of immediately, intuitively and graphically creating an inventory of provisions across a portfolio or a data set. To the extent an inventory is created, market stakeholders use manual methods to inventory provisions, physically searching across other equivalent transactions to which they have access (whether assessing these data points across the same sector, same jurisdiction, same lender group, and/or same developer/sponsor), utilizing electronic or printed paper copies, tables and/or spreadsheets to set out the provisions to be compared. These inventories (to the extent they are even produced) are static and instantly become stale after the transaction in connection with which they were created has been executed.

In addition, an informal network across institutions and transaction participants assists in understanding what is accepted in the market and what different sponsors, developers, and capital providers are agreeing to in their documents. Both conventional processes are ad hoc, lack precision and accuracy and are inefficient, costly and bespoke, with the analysis and information flow being recreated each time it is required.

The provision inventories 240 feature provides a classification and framework to assess provisions within a document at multiple levels. In some embodiments, the provision inventories 240 feature represents an index of provisions that are common for a particular document type. At the next level, the provision inventories 240 feature immediately notifies the user of whether a particular provision has been identified within its document. The provision inventories 240 feature also provides the user with immediate access to extracts of each provision including with the benefits of peeks 401 and stacks 402 (as further described below). The provision inventories 240 feature also determines whether each of the provisions in a document is: (i) "on or off" the "market"; or (ii) "on or off" the standards of equivalent documents in that user's data set. These assessments can be filtered through certain additional categories including geography/region, sector, and time, providing the user with information and knowledge previously unavailable and to date considered impossible to determine particularly on an aggregated and scalable basis. This immersive, detailed data mapping and structure allows the user to focus attention and negotiation time on the provisions which are most important and critical. Exemplary provision inventories 240 are shown in FIGS. 10A-R.

The provision inventories 240 feature is immediately accessible with the "on or off" market aspect identified through a prevalence percentage statistic which measures the frequency with which that provision occurs across the different filters as noted above. This prevalence enables the user to immediately understand the "value" and significance of that provision. For example, if there is a provision which is identified as not being part of the document being reviewed but which occurs in 75% of the documents in the data set on the system 100, the user is immediately able to assess its importance. The inverse-knowing that there is a provision which is present in the document being reviewed but is only in 1% of the documents in the data set-provides the user with critical information to assess that provision's relative importance in the customary back and forth of a negotiation across transaction stakeholders.

The provision inventories 240 feature can cooperate with the native 210 view and further enable the peeks 401 and stacks 402 for providing a dynamic, activated interface for review and assessment of identified provisions.

Figure 10A:
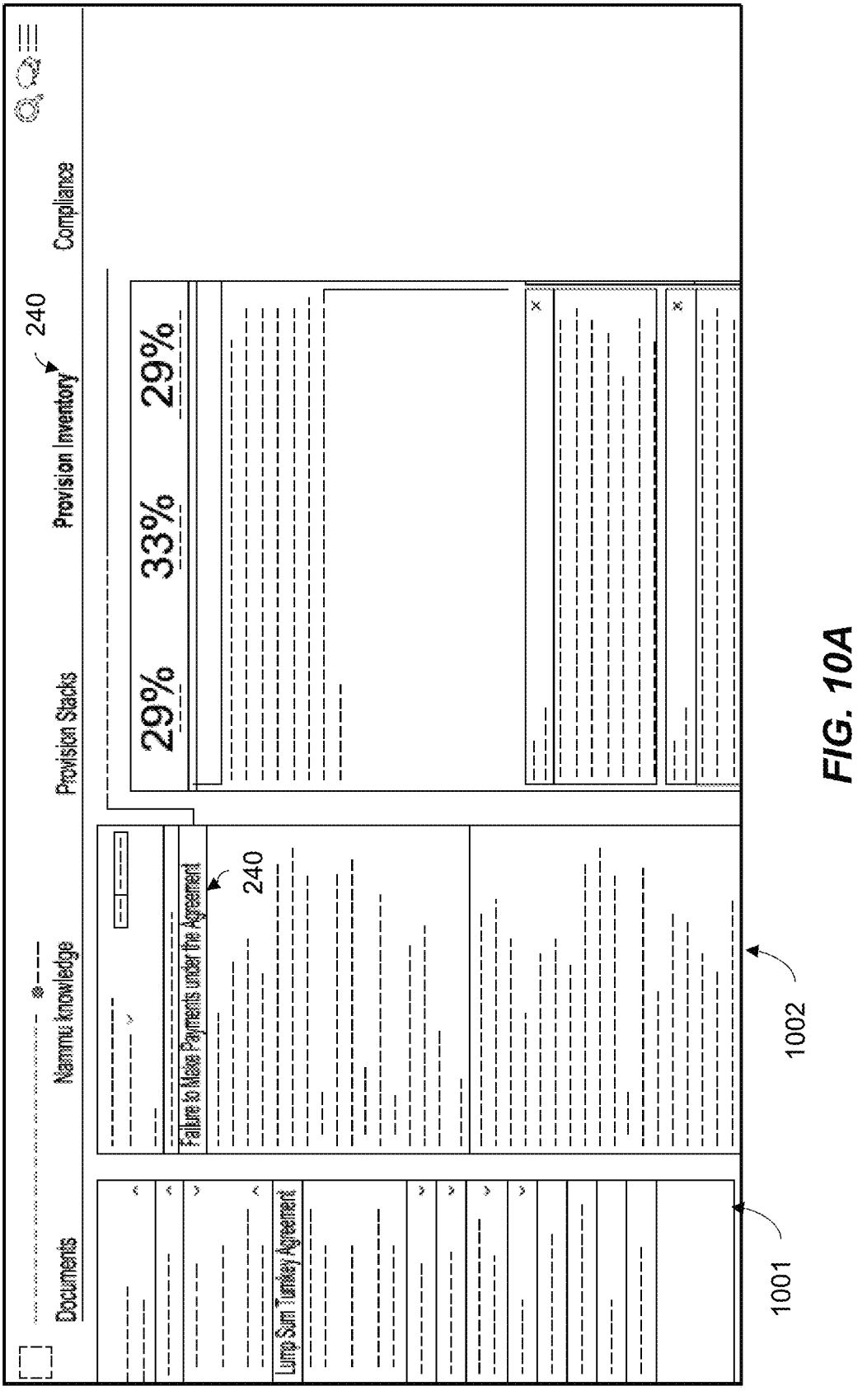
FIG. 10A is an exemplary screenshot illustrating another embodiment of a graphical user interface for presenting the provision inventories feature of FIG. 2B.
Figure 10B:
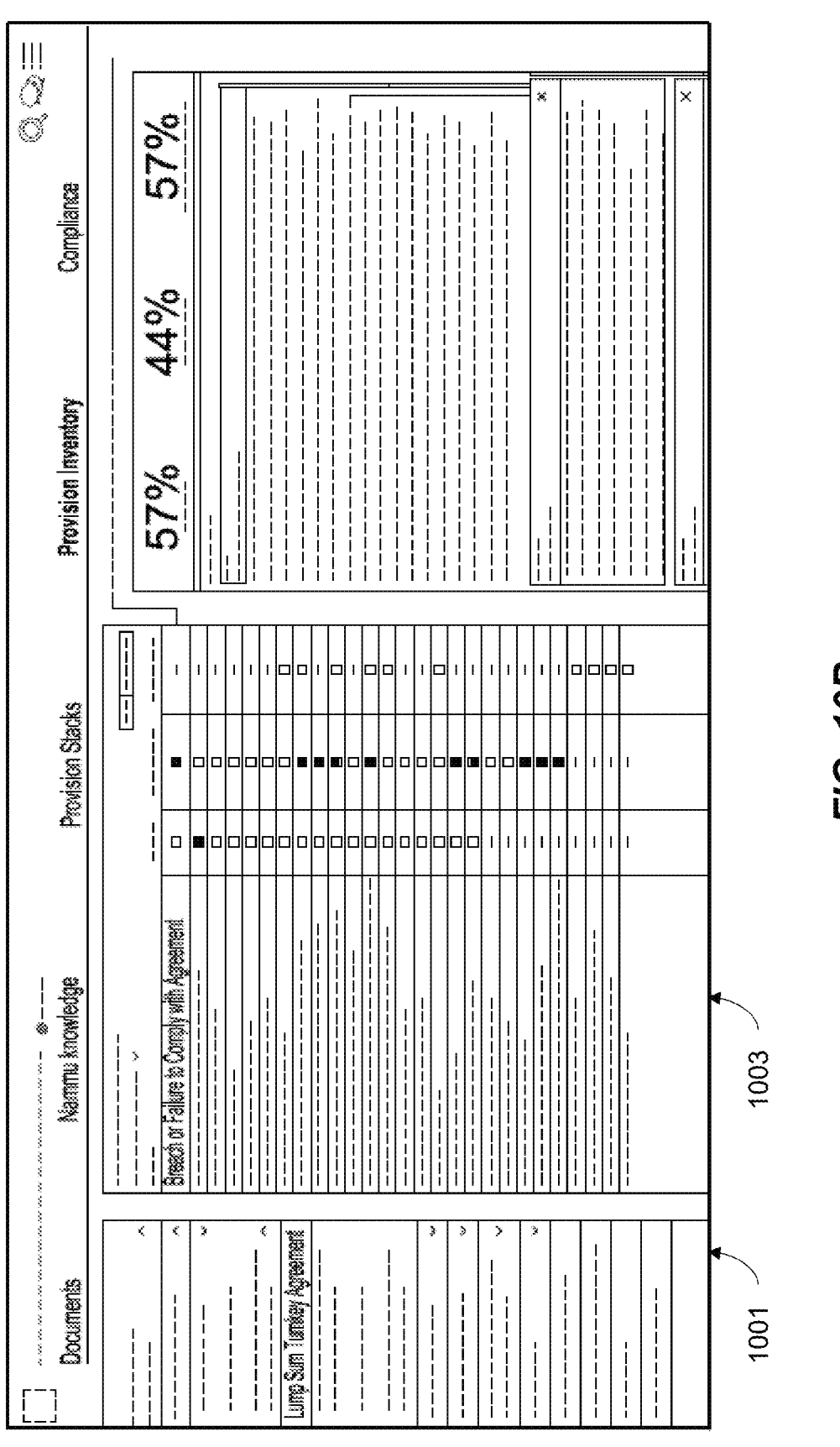
FIG. 10B is an exemplary screenshot illustrating another embodiment of a graphical user interface for presenting the provision inventories feature of FIG. 2B.
Figure 10C:
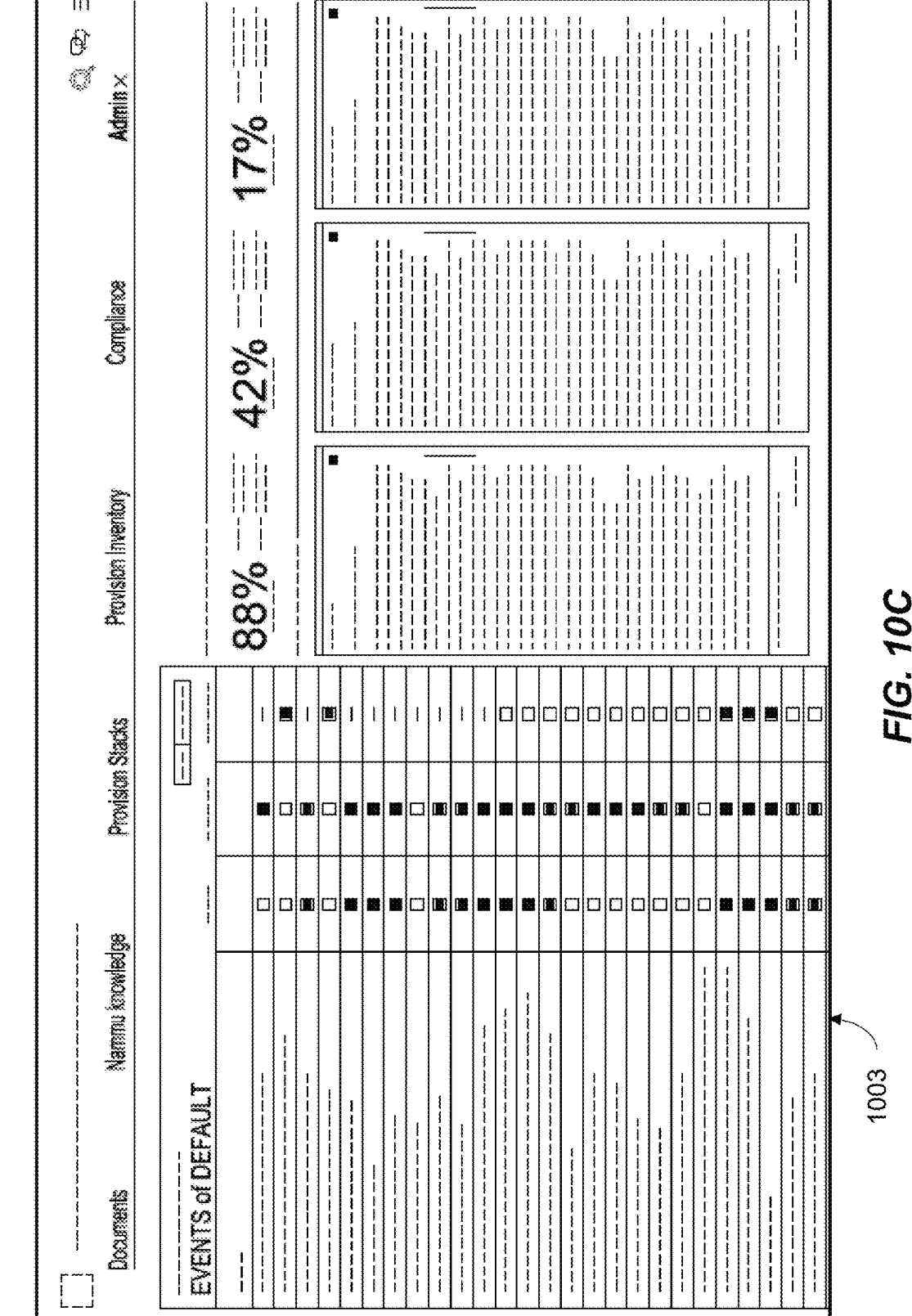
FIG. 10C is an exemplary screenshot illustrating another embodiment of a graphical user interface for presenting the provision inventories feature of FIG. 2B.
Figure 10D:
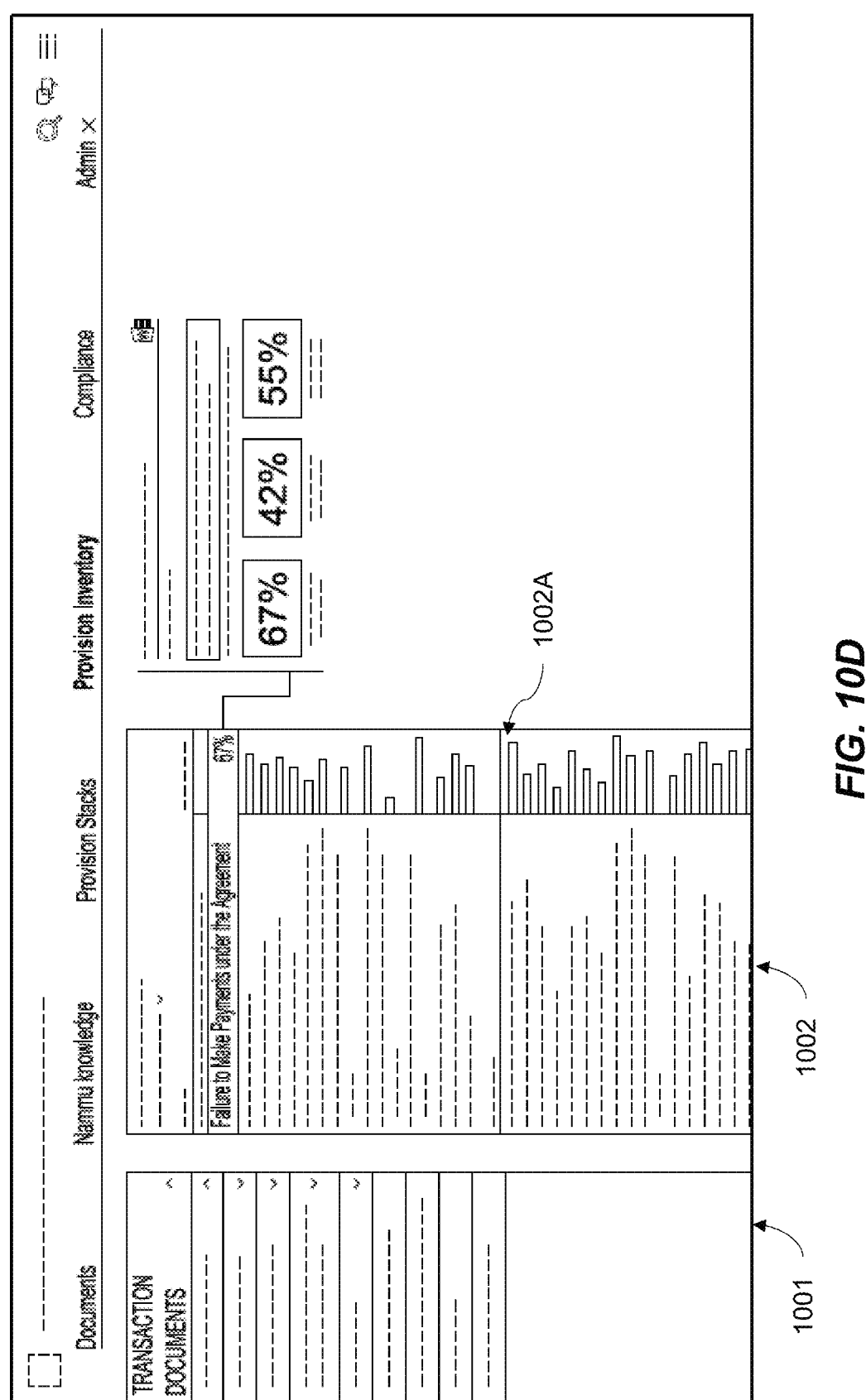
FIG. 10D is an exemplary screenshot illustrating another embodiment of a graphical user interface for presenting the provision inventories feature of FIG. 2B.
Figure 10E:
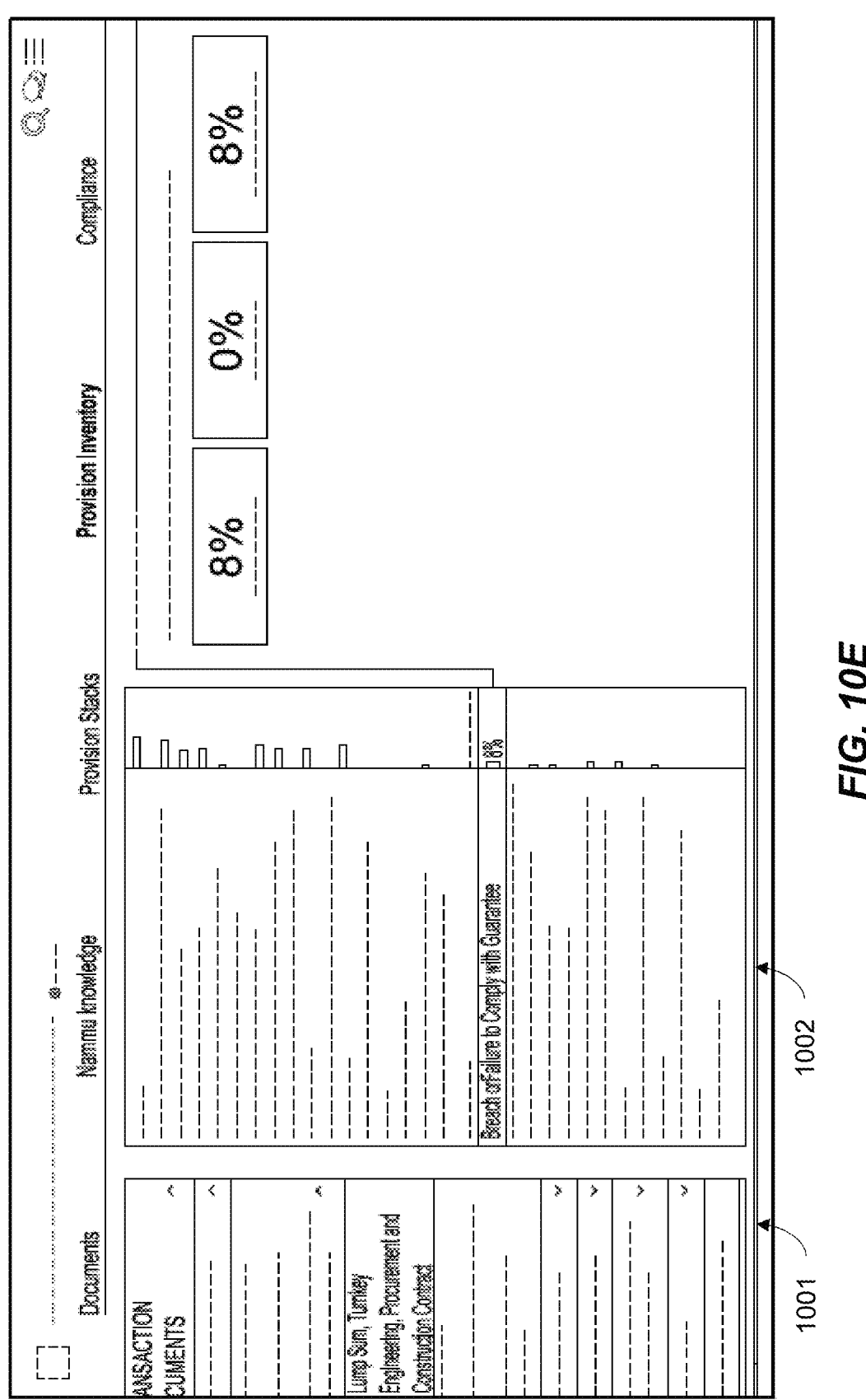
FIG. 10E is an exemplary screenshot illustrating another embodiment of a graphical user interface for presenting the provision inventories feature of FIG. 2B.
Figure 10F:
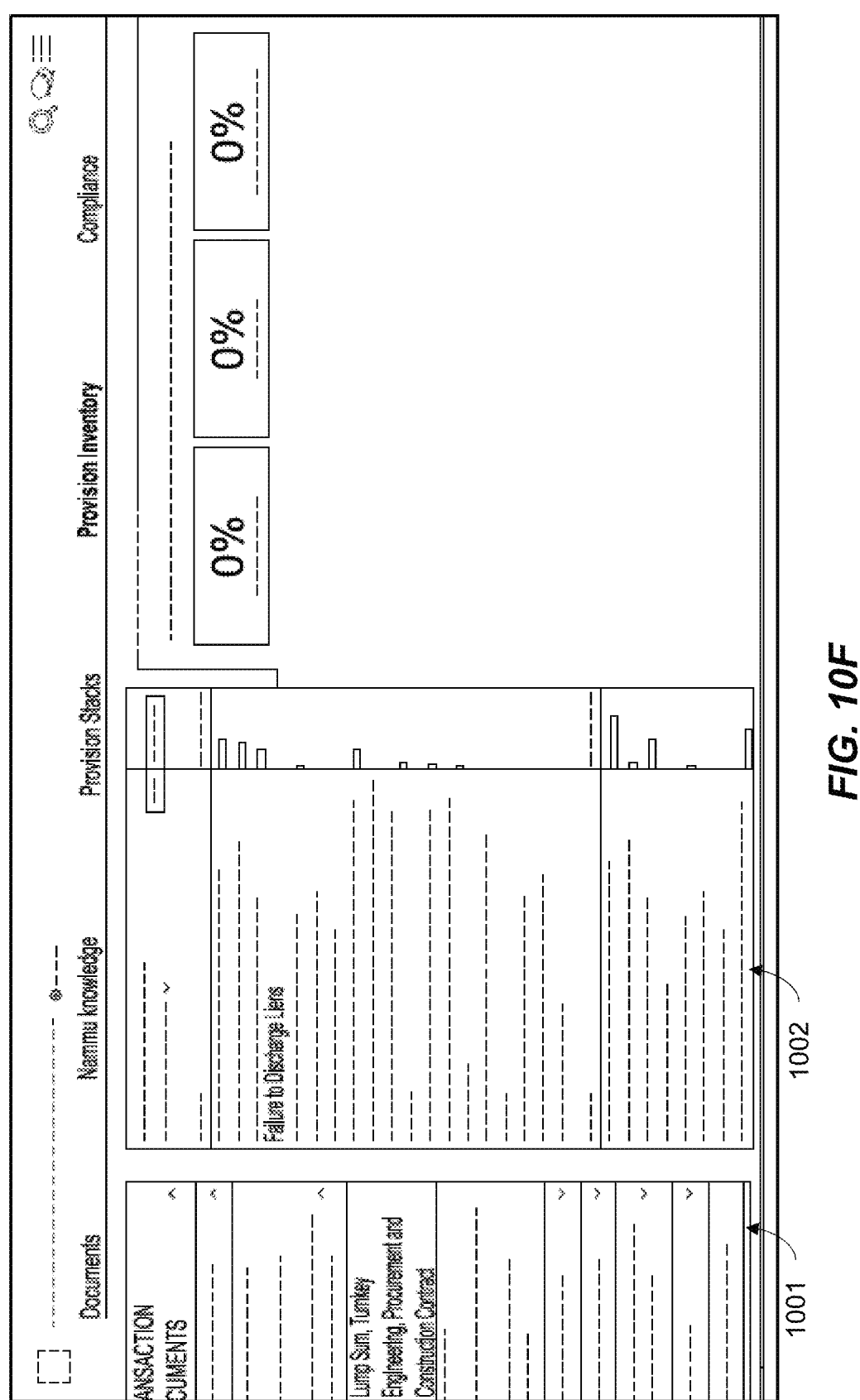
FIG. 10F is an exemplary screenshot illustrating another embodiment of a graphical user interface for presenting the provision inventories feature of FIG. 2B.
Figure 10G:
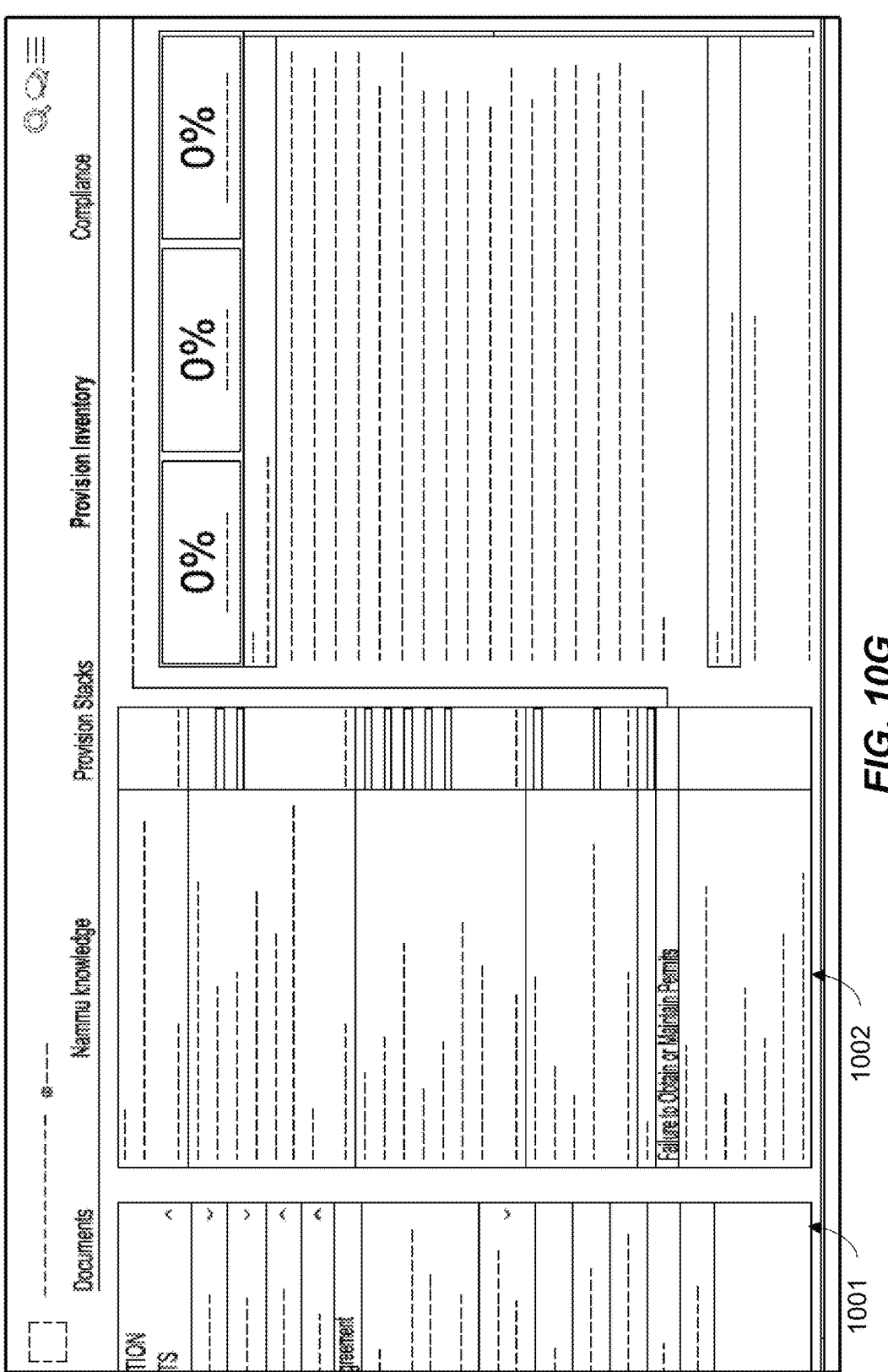
FIG. 10G is an exemplary screenshot illustrating another embodiment of a graphical user interface for presenting the provision inventories feature of FIG. 2B.
Figure 10H:
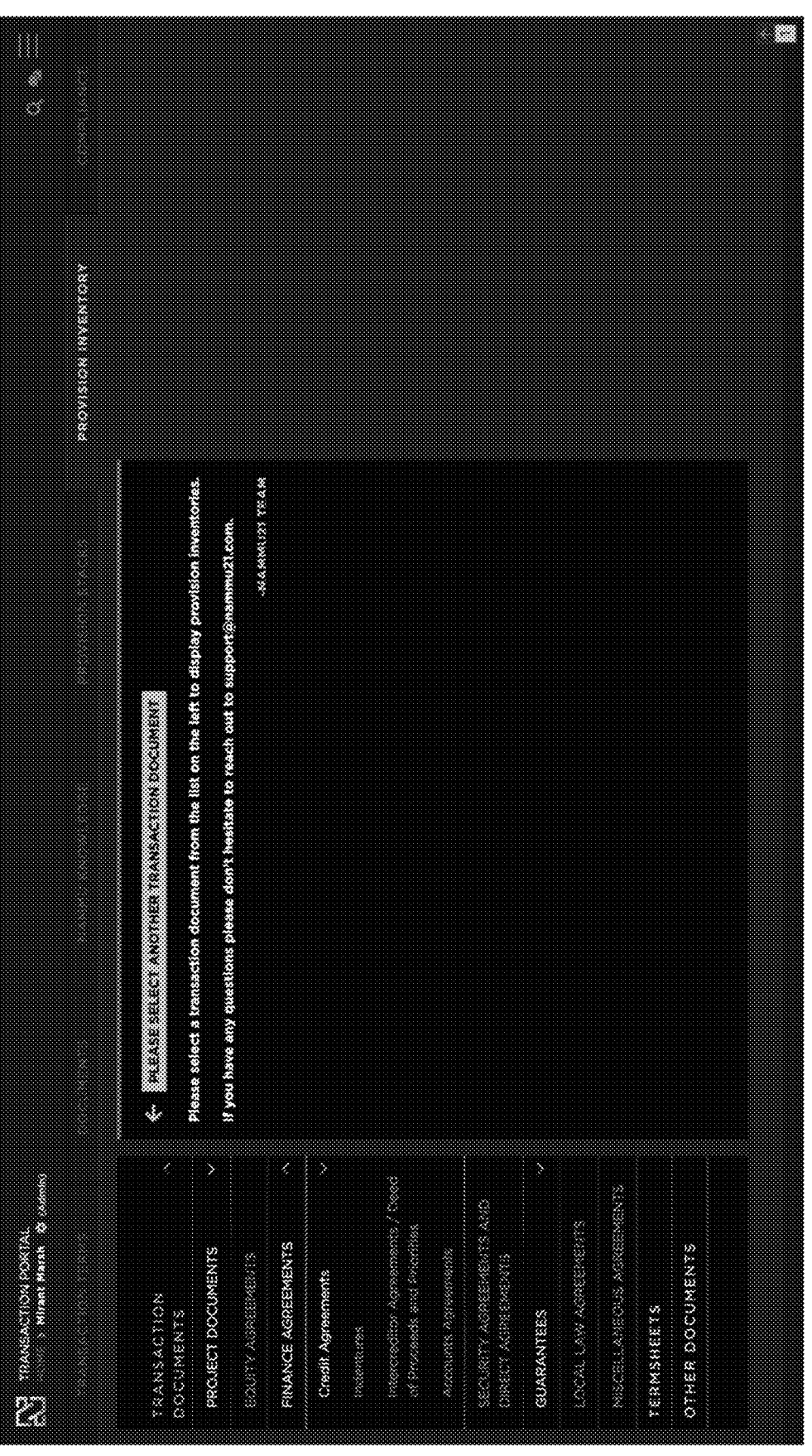
FIG. 10H is an exemplary screenshot illustrating another embodiment of a graphical user interface for presenting the provision inventories feature of FIG. 2B.
Figure 10I:
FIG. 10I is an exemplary screenshot illustrating another embodiment of a graphical user interface for presenting the provision inventories feature of FIG. 2B.
Figure 10J:
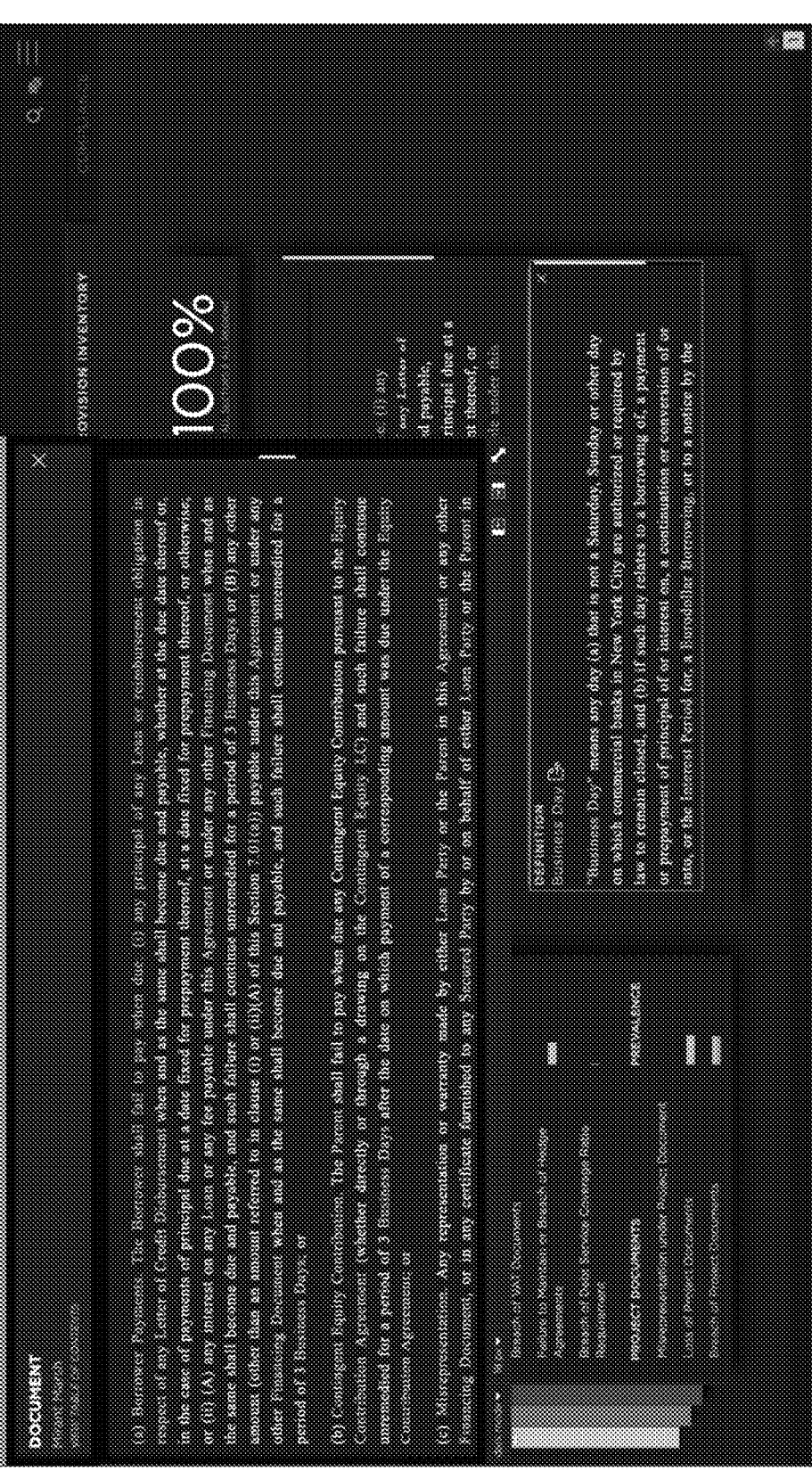
FIG. 10J is an exemplary screenshot illustrating another embodiment of a graphical user interface for presenting the provision inventories feature of FIG. 2B.
Figure 10K:
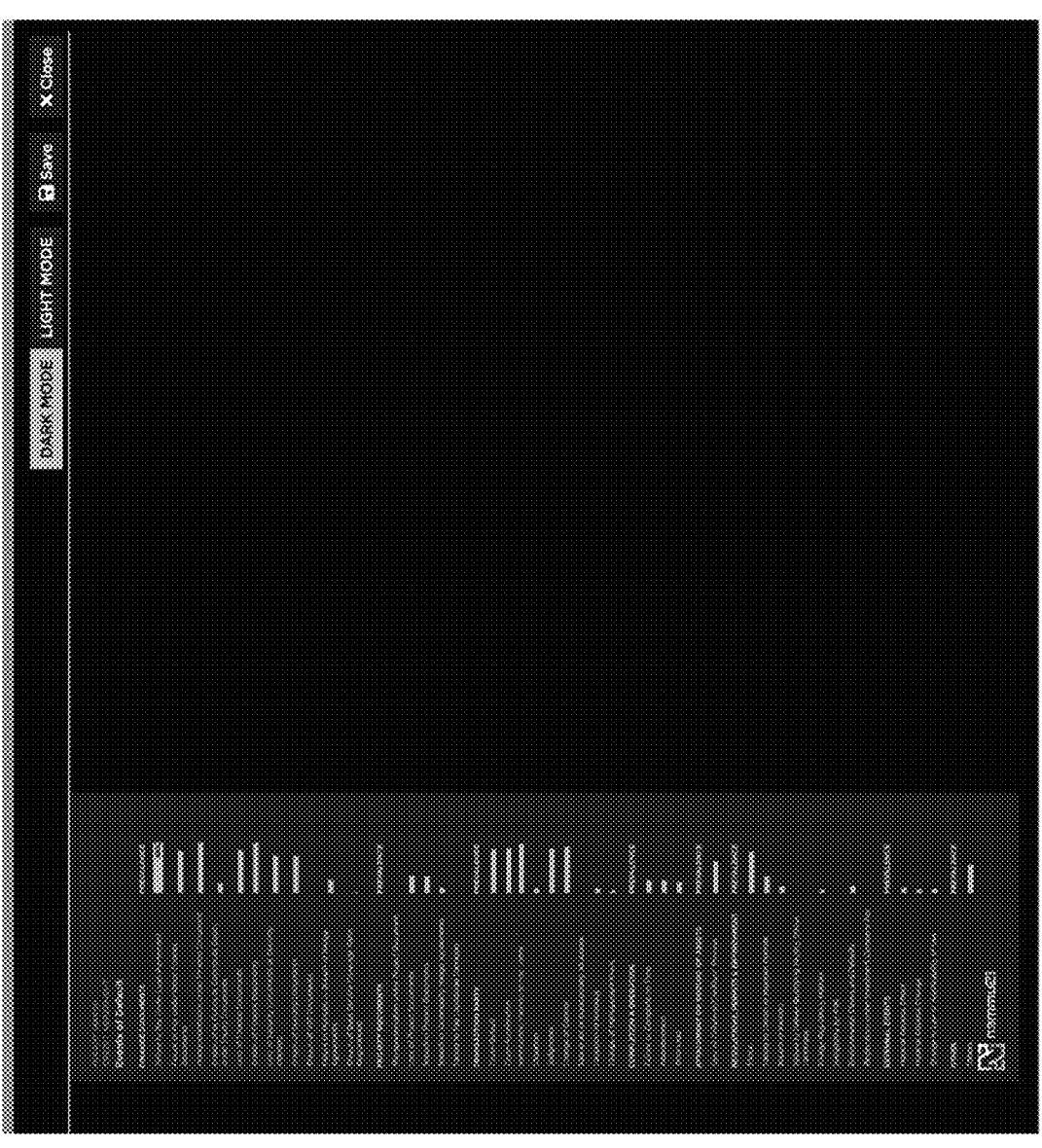
FIG. 10K is an exemplary screenshot illustrating another embodiment of a graphical user interface for presenting the provision inventories feature of FIG. 2B.
Figure 10L:
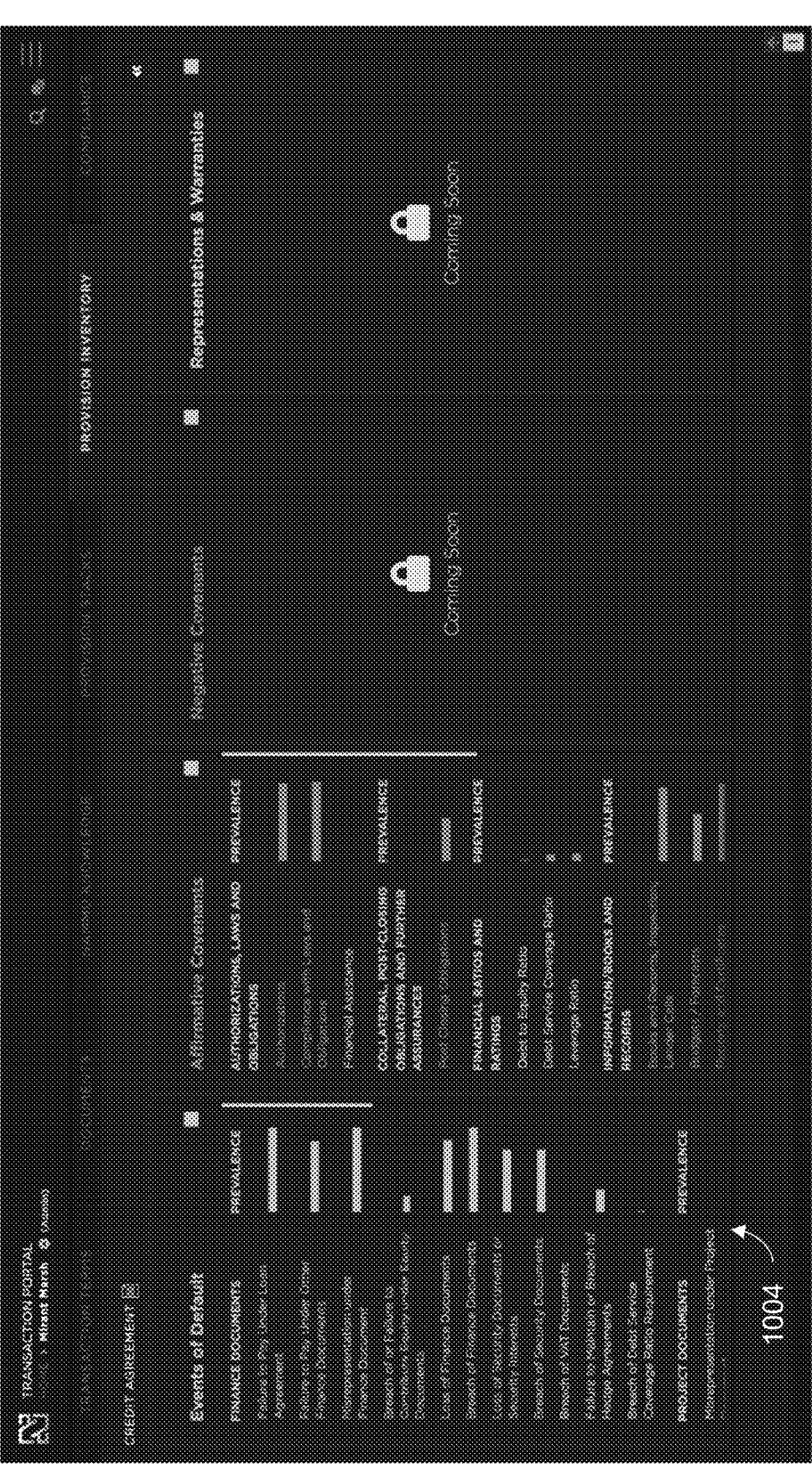
FIG. 10L is an exemplary screenshot illustrating another embodiment of a graphical user interface for presenting the provision inventories feature of FIG. 2B.
Figure 10M:
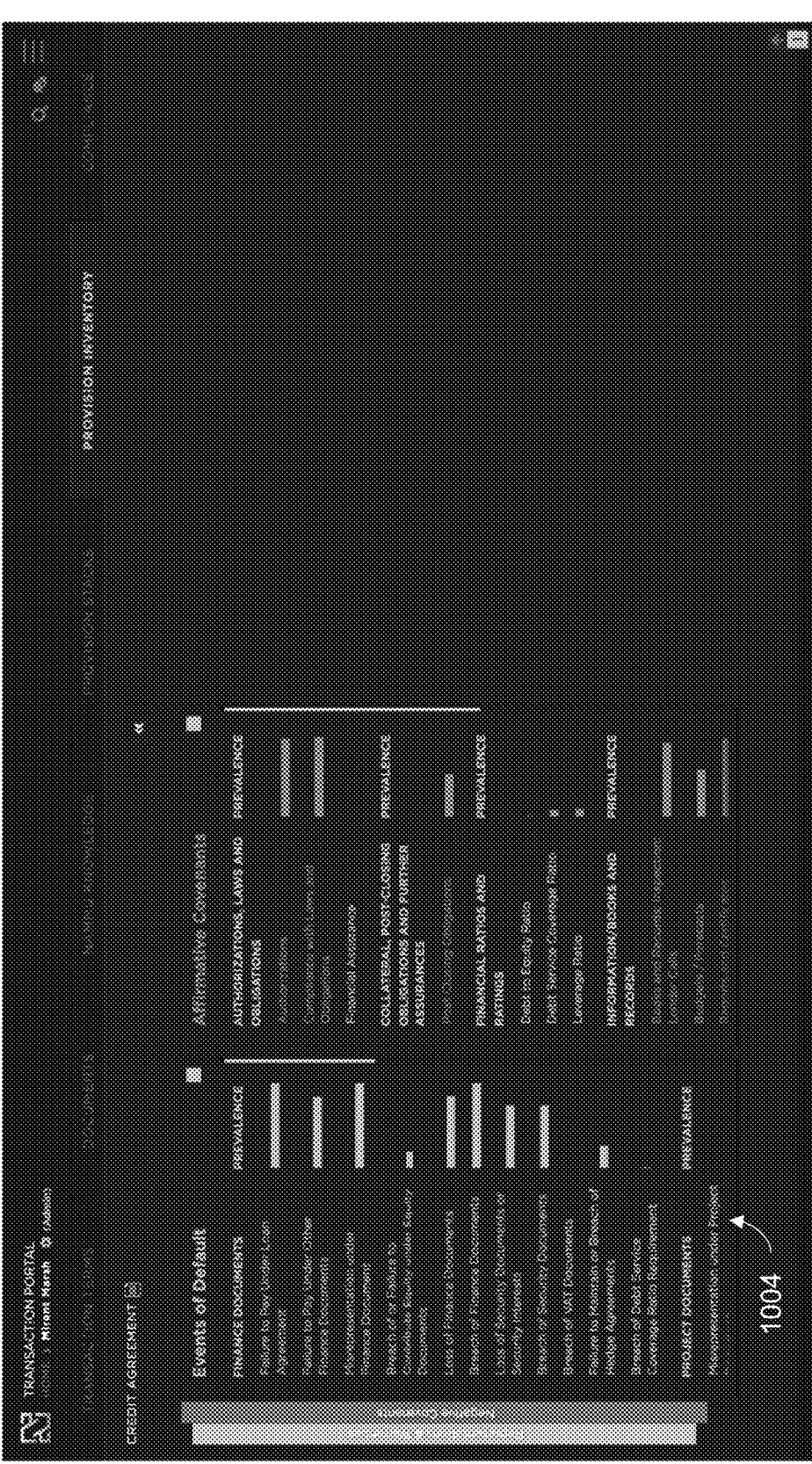
FIG. 10M is an exemplary screenshot illustrating another embodiment of a graphical user interface for presenting the provision inventories feature of FIG. 2B.
Figure 10N:
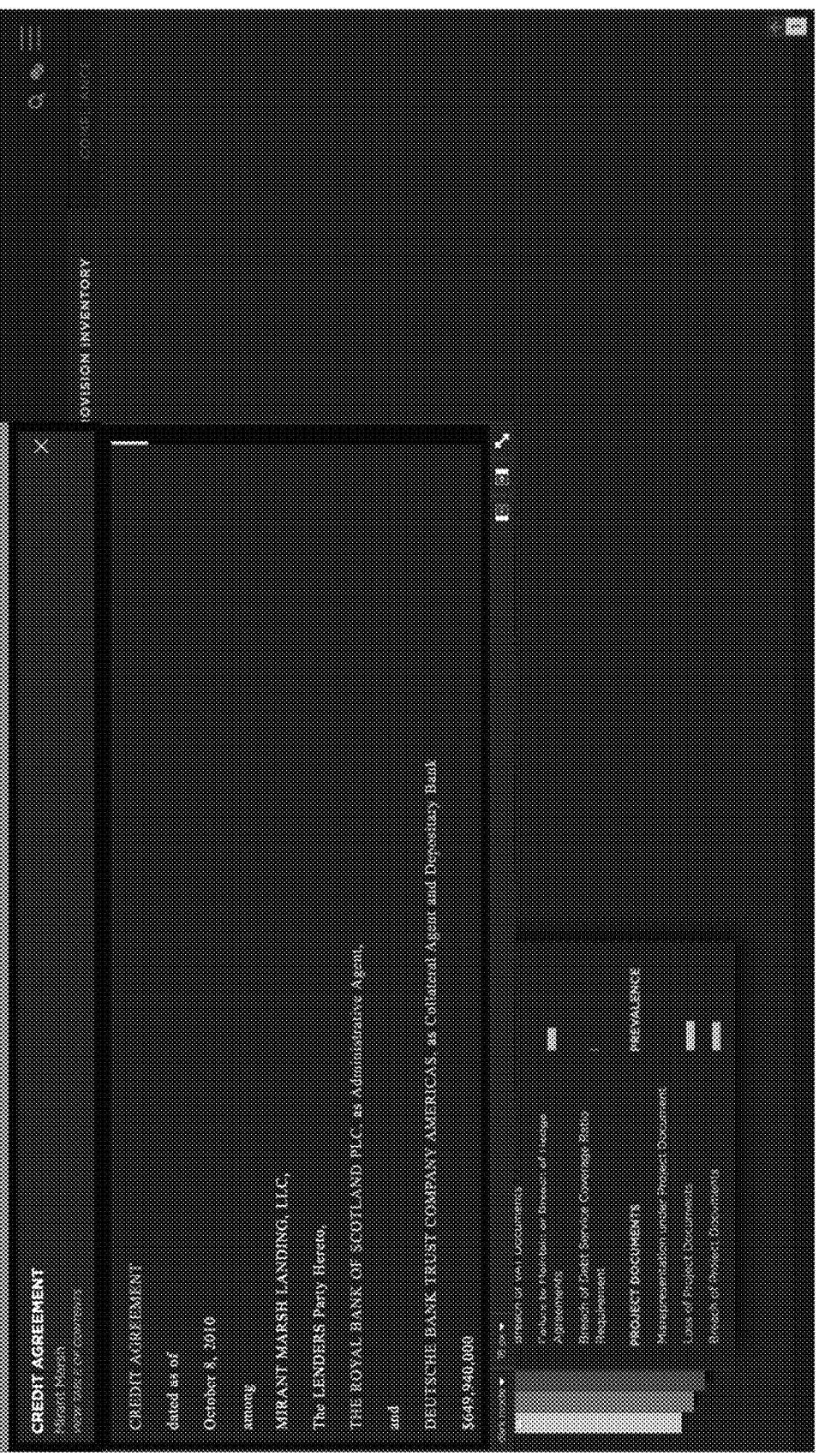
FIG. 10N is an exemplary screenshot illustrating another embodiment of a graphical user interface for presenting the provision inventories feature of FIG. 2B.
Figure 10O:
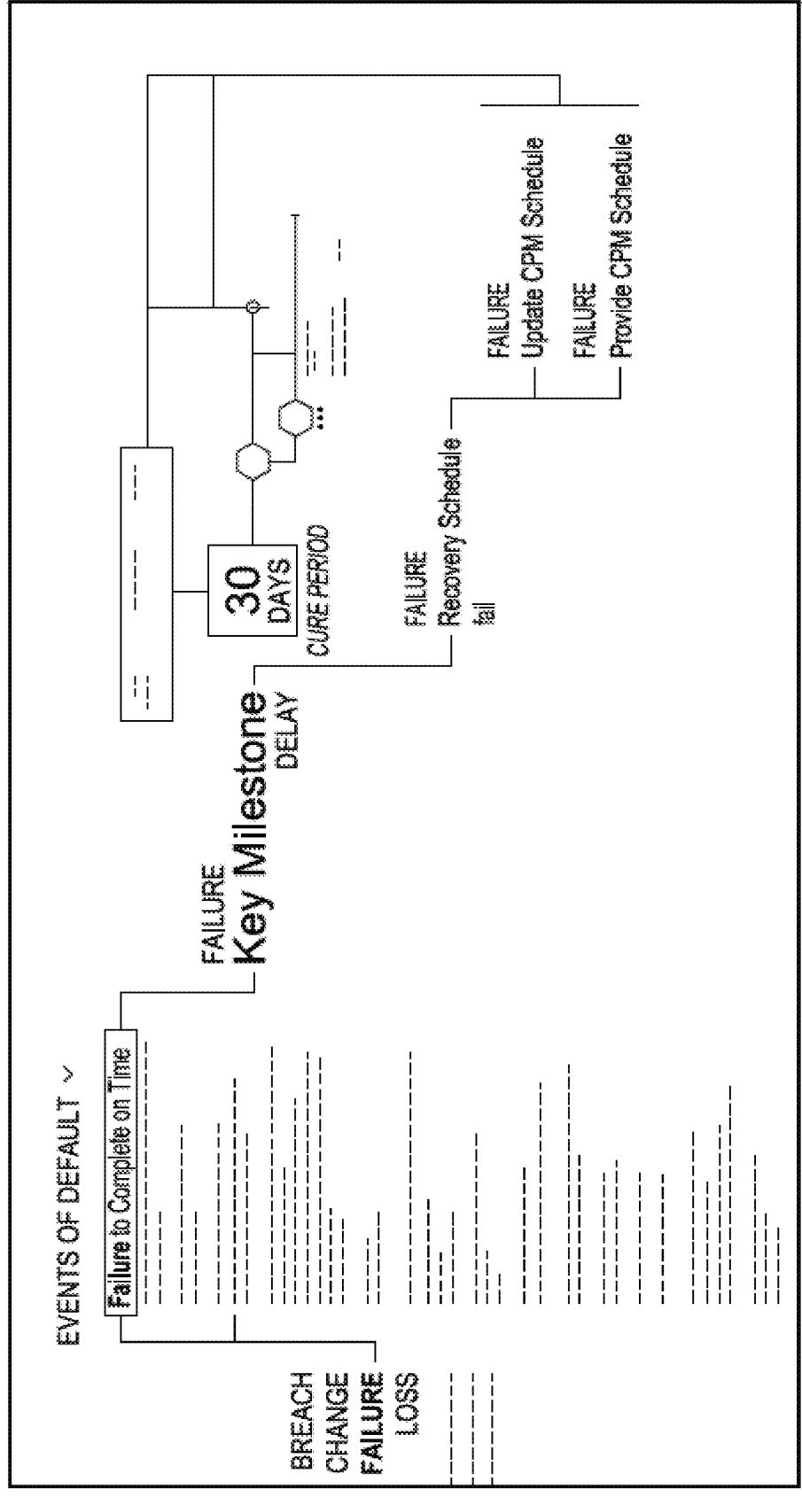
FIG. 10O is an exemplary screenshot illustrating another embodiment of a graphical user interface for presenting the provision inventories feature of FIG. 2B.
Figure 10P:
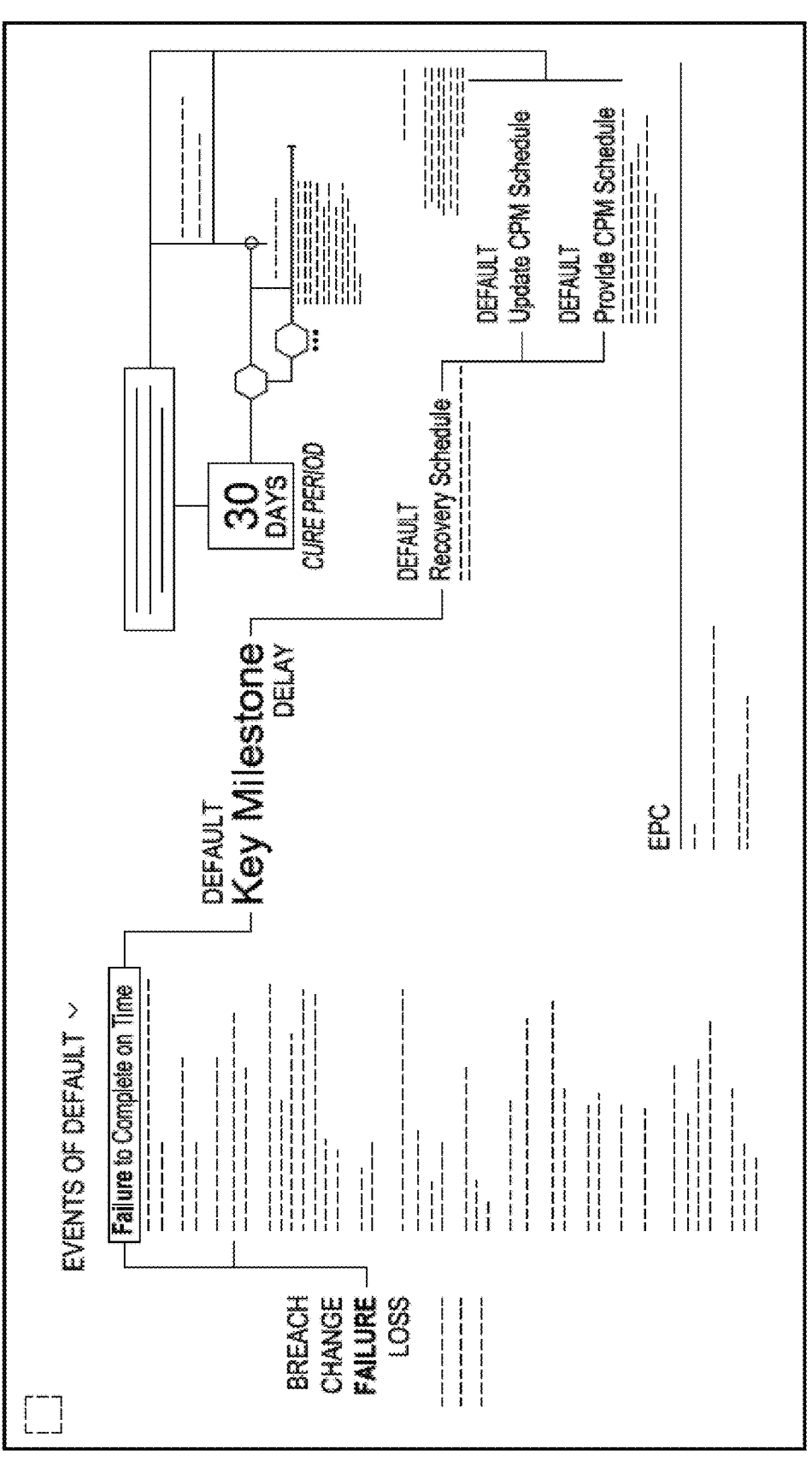
FIG. 10P is an exemplary screenshot illustrating another embodiment of a graphical user interface for presenting the provision inventories feature of FIG. 2B.
Figure 10Q:
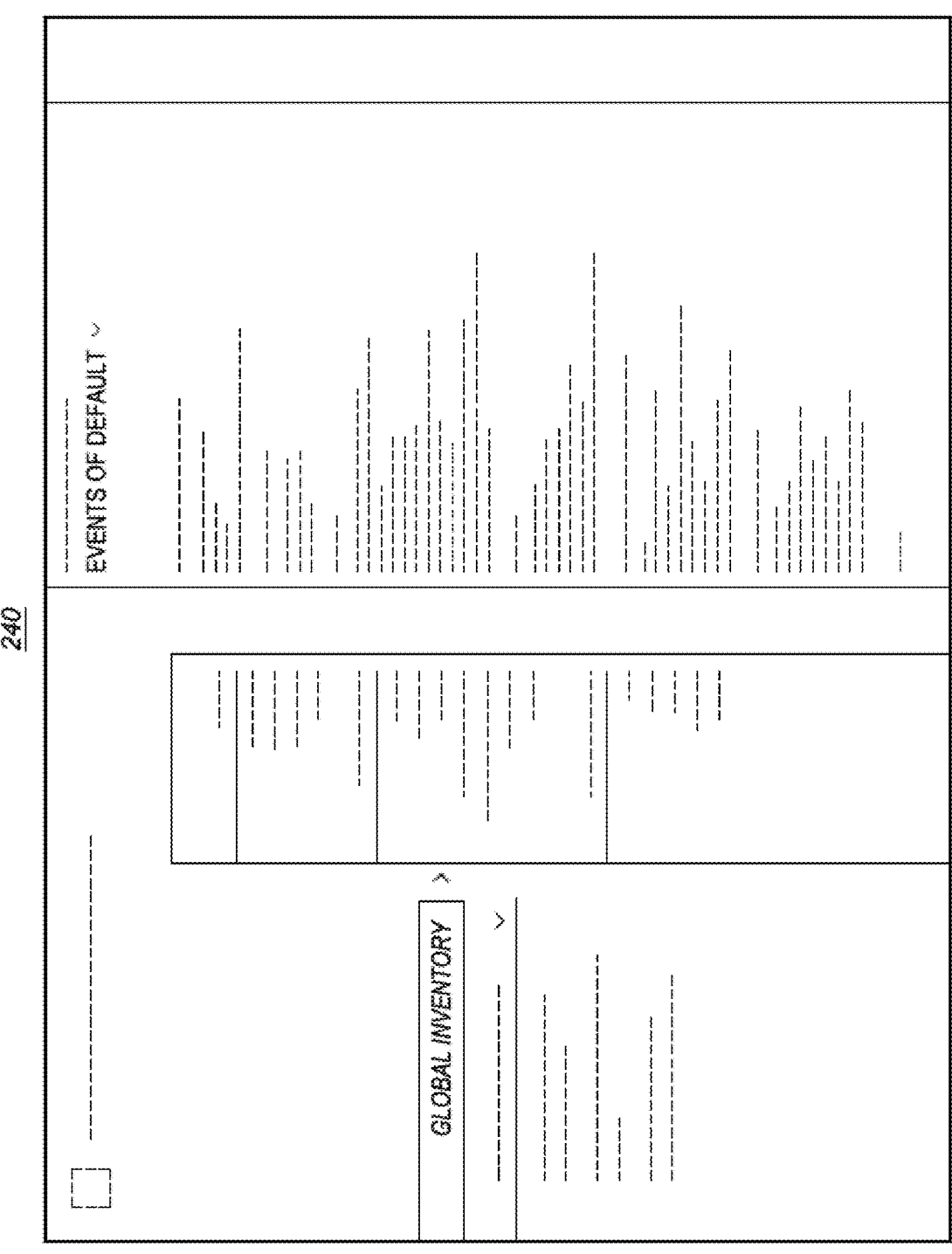
FIG. 10Q is an exemplary screenshot illustrating another embodiment of a graphical user interface for presenting the provision inventories feature of FIG. 2B.
Figure 10R:
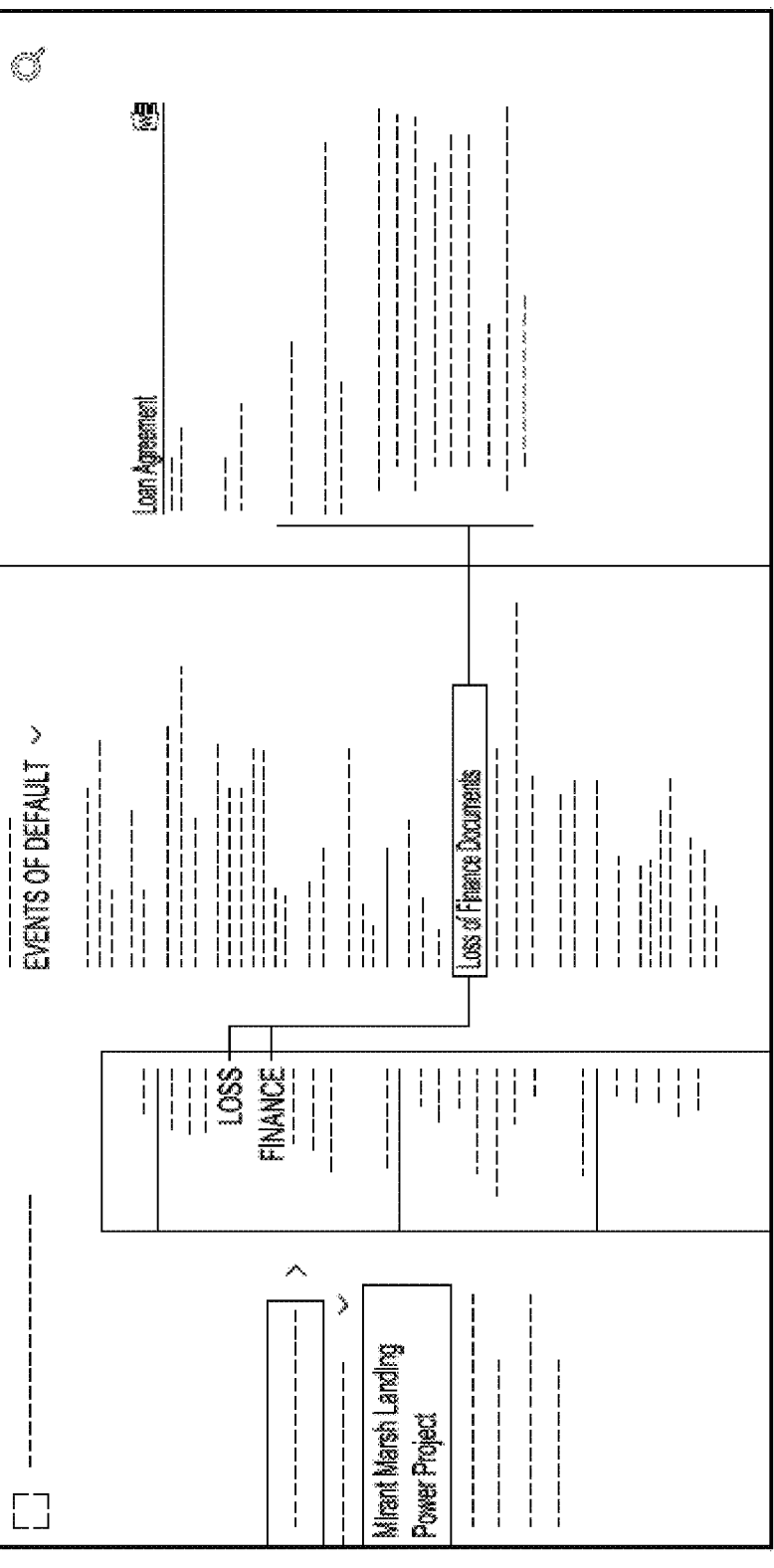
FIG. 10R is an exemplary screenshot illustrating another embodiment of a graphical user interface for presenting the provision inventories feature of FIG. 2B.

FIGS. 10A-R illustrate exemplary screenshots showing the presentation of the provision inventories 240 feature of exemplary documents. FIGS. 10A-C illustrate the provision inventories 240 feature showing a default provision from a loan agreement. FIG. 10A exposes a default data schema and a document framework 1001 for the user to select the required document to inventory the relevant provisions. A series of filters can also be used to highlight the prevalence of selected provisions across loan agreements in an institution's portfolio based on categories that include geography, sectors, and time. A list view 1002, for example, for construction contract defaults, can be used, such as shown in FIG. 10A. Once the selection of the inventory relevant for the selected document is made from the list view 1002, the events of default for that provisions from the selected document type can be shown. As shown, prevalence metrics are automatically calculated and the relevant text for selected provisions from the document is exposed.

Similarly, a "compare" view 1003 of construction contract events of default that are indexed to immediately show how such events of defaults apply to different parties to the construction contract, such as shown in FIG. 10B, is also available. By way of example, the "compare" view 1003 for the selected contract can represent three stakeholders: the owner, the contractor, and the guarantor. As shown, the highlighted boxes can indicate which sub-breaches apply to which stakeholder. An exemplary sub-breach can include failure to achieve key milestones or failure to make payments. In this view, the default event is shown to apply only to the contractor party of the construction contract. Similarly, FIG. 10C shows another example where the owner, contractor, and the guarantor can each be subject to the default event. Text and provisions are taken from disparate sections and clauses of a selected document and organized into the data hierarchy discussed herein with a framework of relevant obligors and prevalence metrics that are dynamically determined and displayed. FIG. 10D illustrates an alternative example of the provision inventories 240. An anti-prevalence feature to indicate when a selected provision is included in a dataset, but not in the primary document being reviewed is shown. A summary 1002A of the prevalence statistics for each default can also be automatically calculated in real-time for additional context regarding each default.

FIGS. 10E-G illustrate additional examples of the provision inventories 240 with the prevalence feature of a selected provision. FIG. 10E illustrates the prevalence of the selected provision not present in a primary document, but present in the data set; FIG. 10F illustrates the prevalence of the selected provision that is not present in the primary document or the data set; FIG. 10G illustrates the prevalence of the selected provision that is present in the primary document, but not present in the data set.

FIG. 10H-N illustrate even further examples of the provision inventories 240 with the prevalence feature of a selected provision. FIG. 10H shows a landing page for the provision inventories 240 from which the user can select one or more documents to review. For example, the user interface shown in FIGS. 10I-N are all based on the selection of an exemplary loan agreement. Turning to FIG. 10I, three layers of the data hierarchy are shown. In a first level, the categories 1004 of the provision inventories 240 align into the hierarchy of the provision stacks level above. Specifically, the categories 1004 includes an index of provisions (e.g., events of default, affirmative covenants, negative covenants, and representations and warranties) that can be selected for further review. A subsequent level includes the list of relevant clauses 1005 that occur within each provision inventory 240. For example, the list of events of defaults is exposed to immediately indicate which provisions are present in the document being reviewed. In some embodiments, a text color can change based on the presence/lack of a selected provision. A third level represents the prevalence of a particular provision and its existence within a broader data set. For example, four states of prevalence can include: (i) present in the document and in the data set; (ii) not present in the document and present in the data set; (iii) present in the document and not present in the data set; and (iv) not present in the document or in the data set.

FIG. 10J illustrates the text of the document shown in the native 210 view. As shown, the user can view the selected clause in context of the full document shown in the native 210 view for further context (also shown in FIG. 10N). The results of the provision inventories 240 can also be exported with the prevalence bars, such as shown in FIG. 10K. In some embodiments, the system 100 can export the interface of the provision inventories 240 as a PDF, Microsoft Word document, Excel spreadsheet, a comma-separated values (CSV) file, and so on.

FIGS. 10L-M illustrate an expanded view of the provision inventories 240, wherein the provision index is shown in the categories 1004. In some embodiments, a modal window can be used to present a complete transaction document when clicked on from a user interface of the provision inventories 240, such as the loan agreement shown in FIG. 10N.

FIGS. 10O-P illustrate alternative presentations of the provision inventories 240 feature setting out additional frameworks and data pathways to enable users to immediately and intuitively review and assess critical risk flows in transactions. FIGS. 10Q-R illustrate alternative presentations of the provision inventories 240 feature setting out certain categories of provisions providing the user with additional structures and data hierarchies to review and assess critical risk flows in transactions.

Inventory Matrix

The inventory matrix 245 feature can span the three components (e.g., the data frameworks 330, the data aggregation 320, and the operational efficiency 310) described above. The inventory matrix 245 feature creates a structure over data sets, enabling efficient and effective review and assessments of both complex terms and conditions in a unique intuitive manner. This type of data structure, data aggregation, and operational efficiency ultimately increases productivity and insights improving both focus on critical issues as well as the identification of anomalies and deviations at a speed and scale currently not available in this market.

The inventory matrix 245 represents a data aggregation and data structure framework which assembles, indexes, and inventories data that has been identified, extracted, and aggregated from transaction documents into an organized, scalable, and intuitive structure. The feature provides flexibility to the user by enabling the user to select from the available transactions, documents and provisions to build the required inventory. The inventory matrix 245 provides filters enabling data sets to be filtered across, for example, sectors, geographies, and institutions.

In some embodiments, the inventory matrix 245 presents a matrix that automatically builds and stacks up each provision inventory across a selected group of transactions with the ability to efficiently and effectively review an overall summary of a provision across an entire data set graphically. From the matrix, the user is also able to click into each type of provision, review the specific language in any included document and compare its language to the language in other equivalent provisions within the selected data set, such as using the provision carousel 255 (see also the provision carousel 255).

By way of example, the provision carousel 255 displays "cards", each of which relates to a specific transaction and contains the identified provision for that transaction. The user can select the cards to compare and then view the provisions on those cards in their entirety in a comparative view. The inventory matrix 245 ensures that a user is immediately able to determine at speed (and with scalability across its portfolio) what provisions are present/not present within its data set as well as to analyze, compare, and contrast those provisions so that decisions can be made at speed and with accuracy and precision. In some embodiments, the provision carousel 255 cooperates with the native 210 view with embedded peeks 401 and stacks 402 to provide the dynamic, activated interface for review and assessment of the identified provisions.

Conventionally, there is no simple, efficient method of immediately, intuitively and graphically comparing provisions across a portfolio or a data set. Other than through manual means requiring documents and provisions to be identified and searched, there is also no way of immediately accessing the provisions themselves and comparing them side by side. The framework, structure, and aggregation of the inventory matrix 245 offers an efficiency which is currently not contemplated in the market as it is simply seen to be impossible and overly complex to construct. Examples of the inventory matrix 245 feature are shown in FIGS. 11A-F.

Figure 11A:
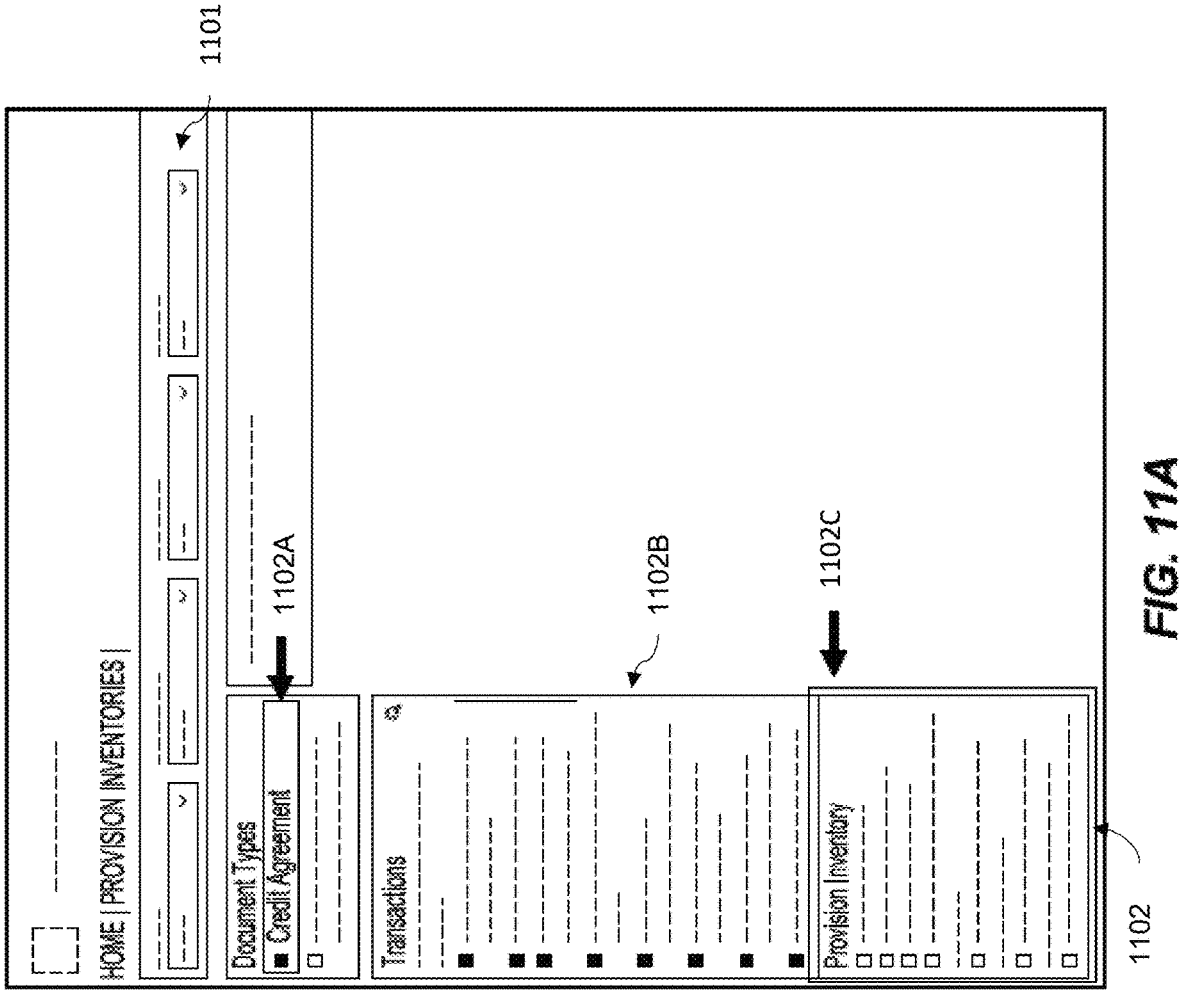
FIG. 11A is an exemplary screenshot illustrating one embodiment of a graphical user interface for presenting the inventory matrix feature of FIG. 2B.
Figure 11B:
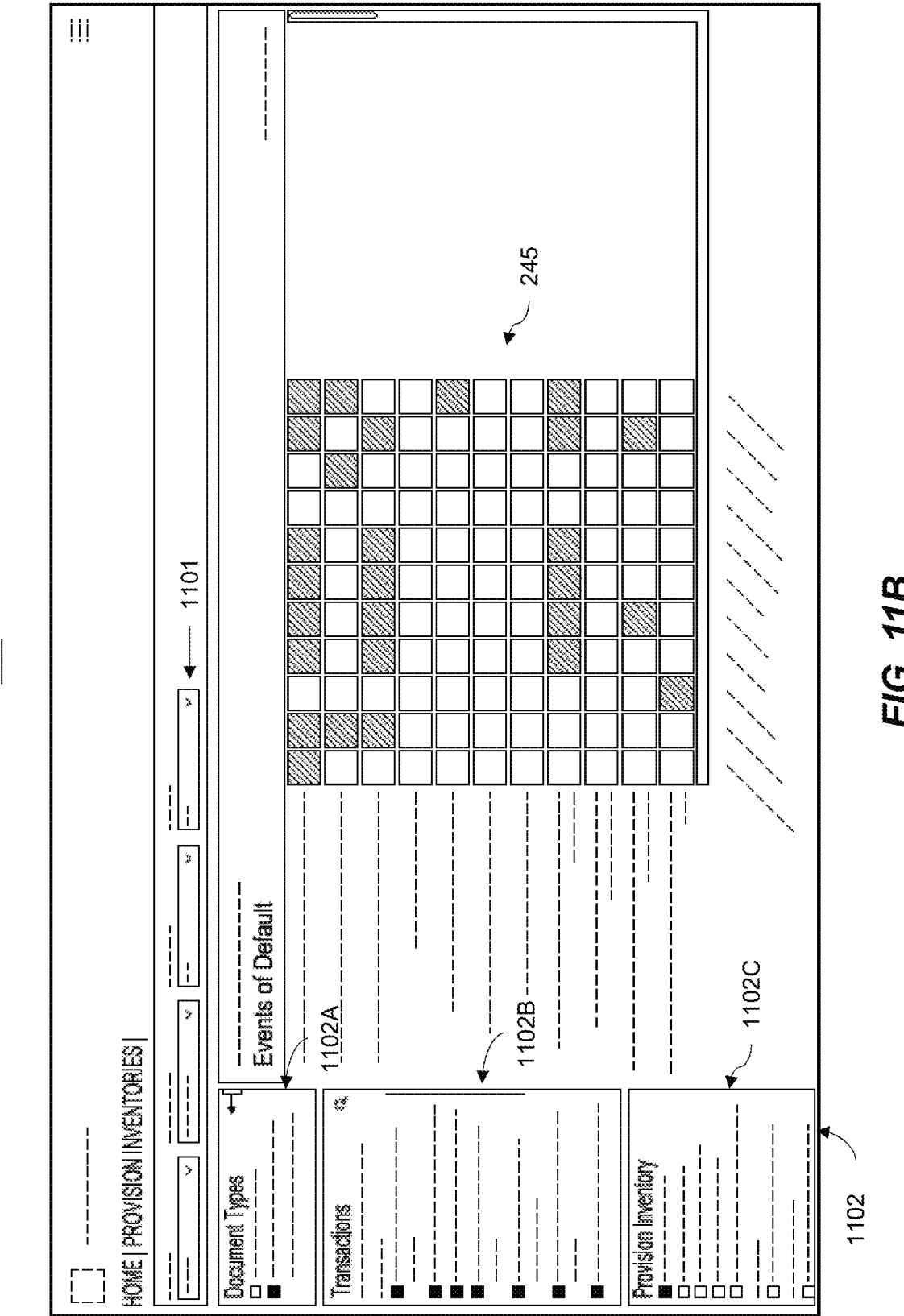
FIG. 11B is an exemplary screenshot illustrating another embodiment of a graphical user interface for presenting the inventory matrix feature of FIG. 2B.

FIGS. 11A-F illustrate exemplary screenshots showing the presentation of the inventory matrix 245 of exemplary documents. FIG. 11A illustrates a selection column 1102 enabled by the inventory matrix 245. The selection column 1102 includes a document type selection 1102A, a transaction selection 1102B, and an inventory selection 1102C. The inventory matrix 245 aggregates equivalent provisions across equivalent documents from a portfolio and/or data set. In FIG. 11A, a loan agreement is selected via the document type selection 1102A to show the list of transactions which have loan agreements and the relevant provision inventory from the same. One or more filters 1101 can be used to create additional data structures. FIG. 11B shows the inventory matrix 245 of default events from selected construction contracts. In some embodiments, the user can filter selected transactions/the extracted data by various filters 1101 (e.g., geography, sector, clients, and products) (shown in FIG. 11D). The inventory matrix 245 is automatically generated based on the document type selection 1102A, the transaction selection 1102B, and the inventory selection 1102C.

Figure 11C:
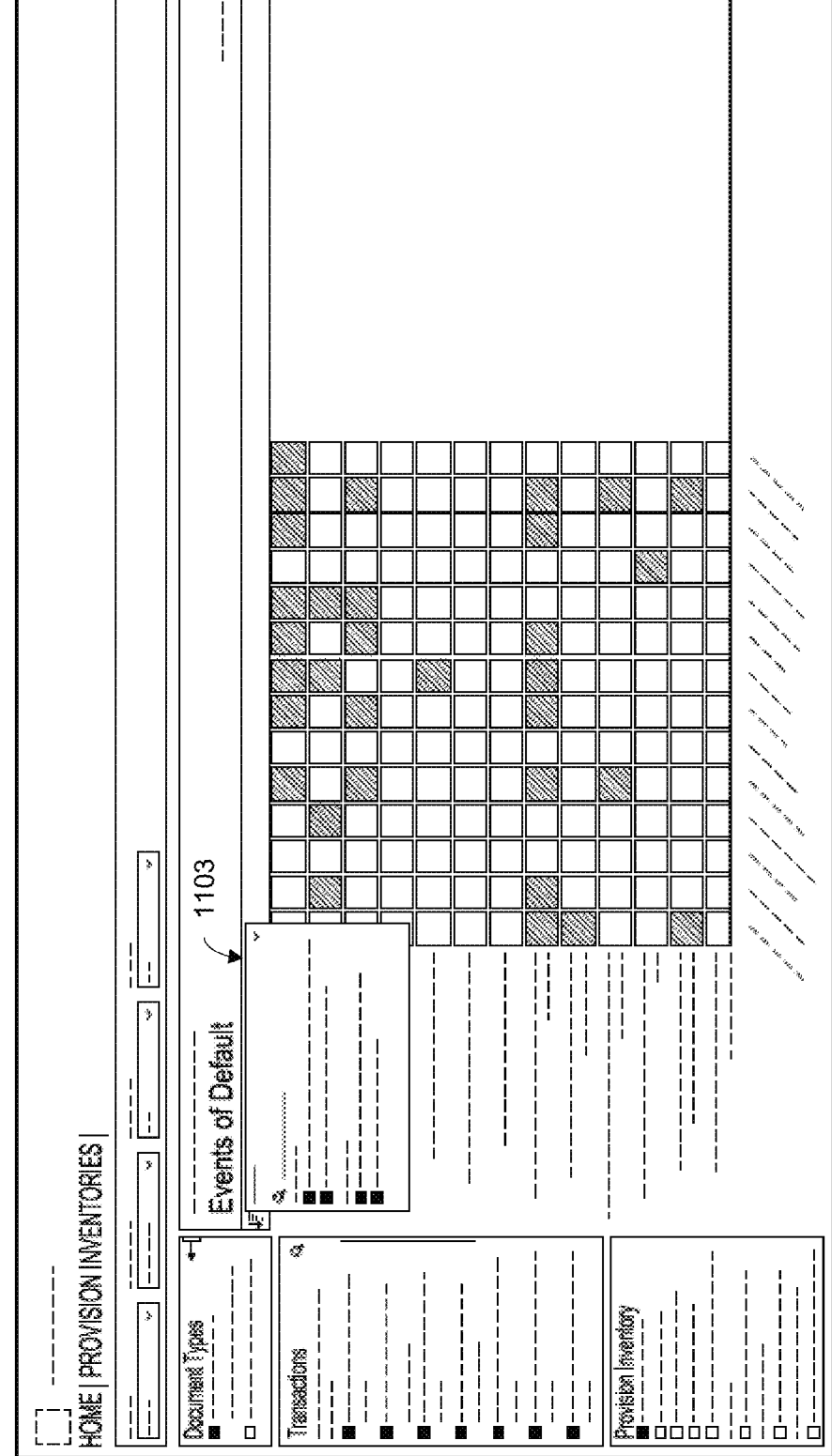
FIG. 11C is an exemplary screenshot illustrating another embodiment of a graphical user interface for presenting the inventory matrix feature of FIG. 2B.
Figure 11D:
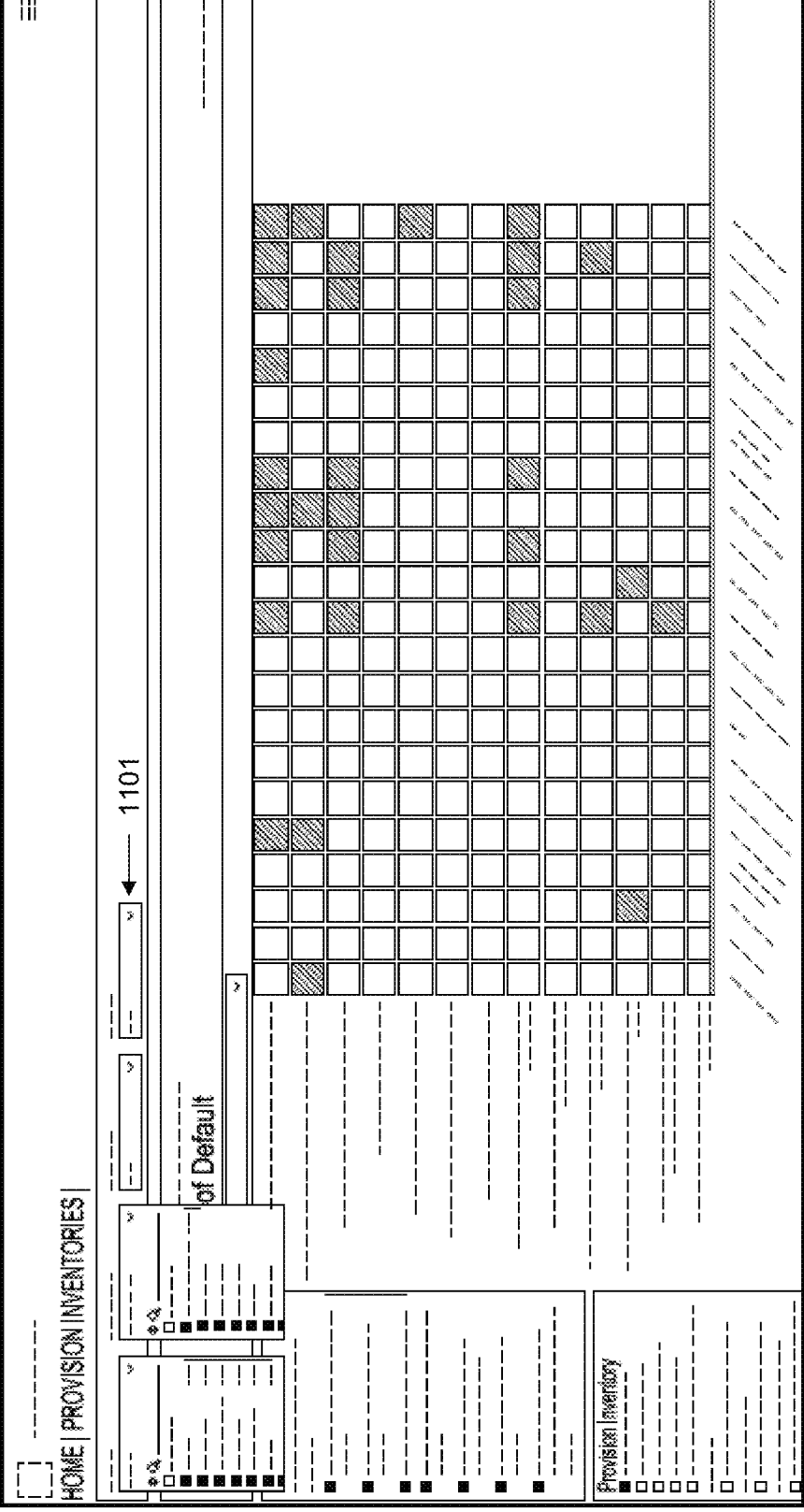
FIG. 11D is an exemplary screenshot illustrating another embodiment of a graphical user interface for presenting the inventory matrix feature of FIG. 2B.
Figure 11E:
FIG. 11E is an exemplary screenshot illustrating another embodiment of a graphical user interface for presenting the inventory matrix feature of FIG. 2B.
Figure 11F:
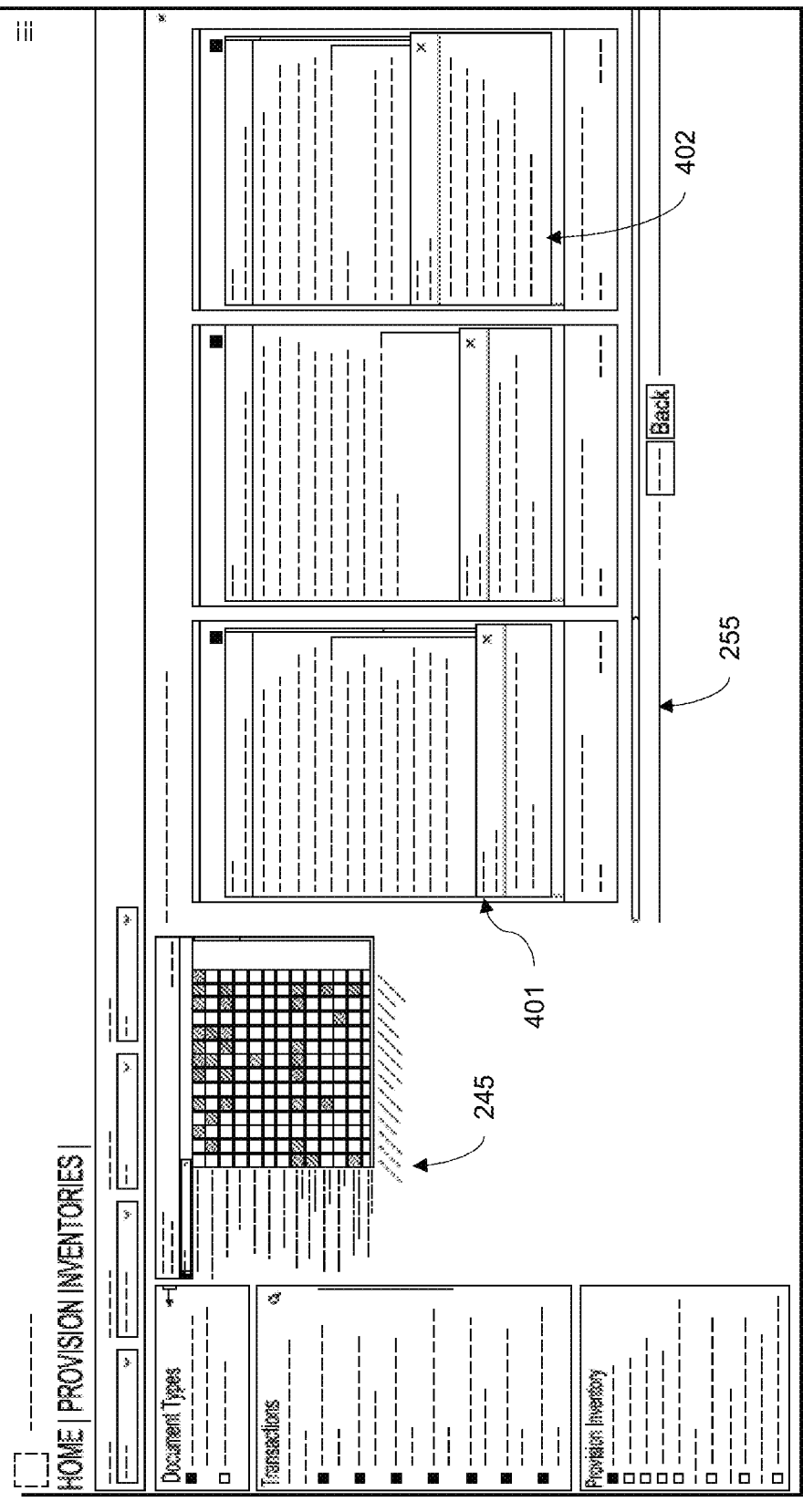
FIG. 11F is an exemplary screenshot illustrating another embodiment of a graphical user interface for presenting the inventory matrix feature of FIG. 2B.

FIG. 11C illustrates a drop-down option 1103 enabled by the inventory matrix 245 to select specific events of default. Users can also move between one or more "cards" of provisions from the inventory matrix 245 using the provision carousel 255, such as shown in FIG. 11E. Once a card is selected, the relevant language from each transaction is shown. FIG. 11F illustrates a similar view as FIG. 11E for a construction contract with additional navigation controls to move between the carousel view. Peeks 401 and stacks 402 are also available with the inventory matrix 245, such as shown in FIG. 11F.

Figure 11G:
FIG. 11G is an exemplary screenshot illustrating another embodiment of a graphical user interface for presenting the inventory matrix feature of FIG. 2B.
Figure 11H:
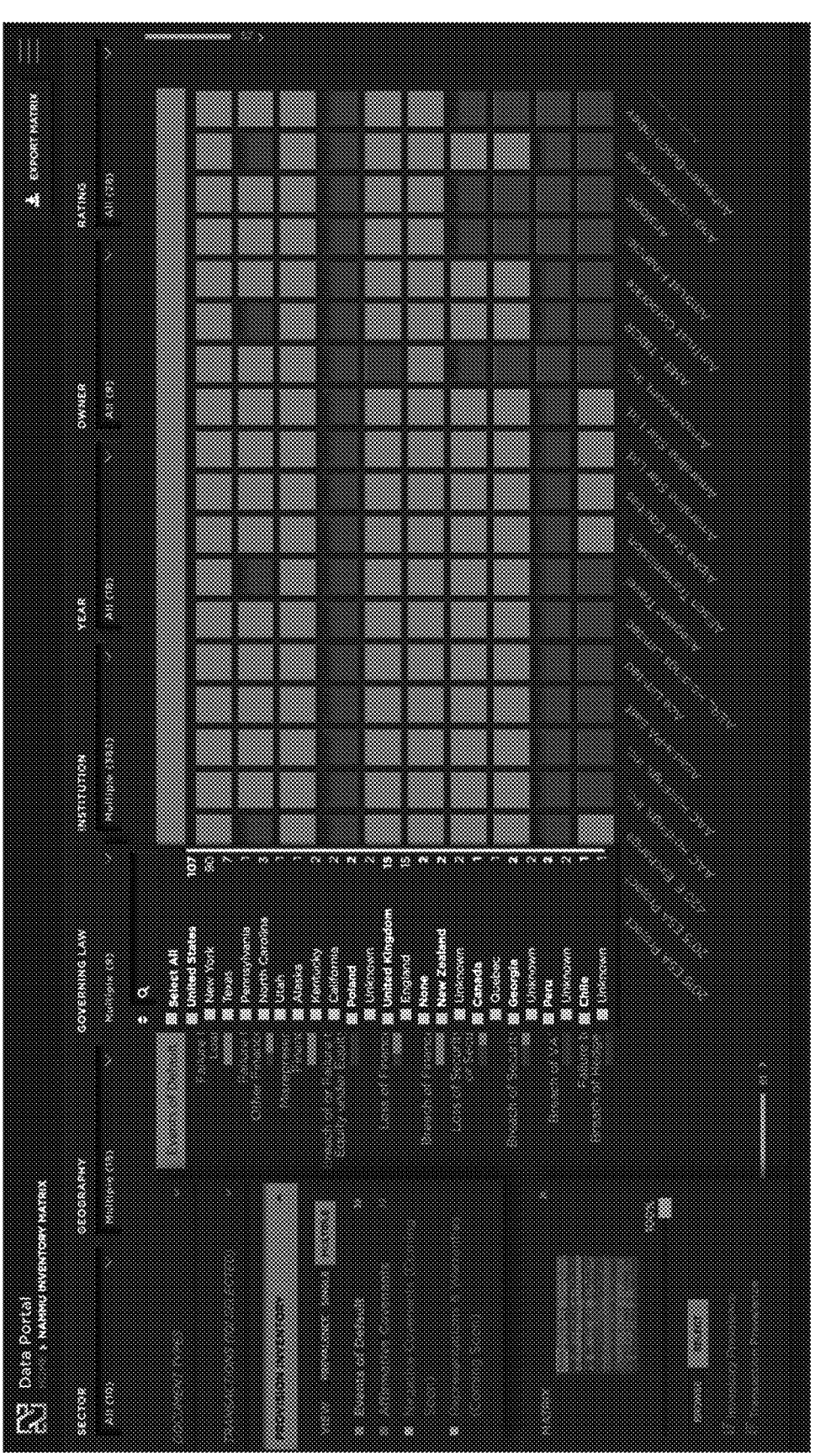
FIG. 11H is an exemplary screenshot illustrating another embodiment of a graphical user interface for presenting the inventory matrix feature of FIG. 2B.
Figure 11I:
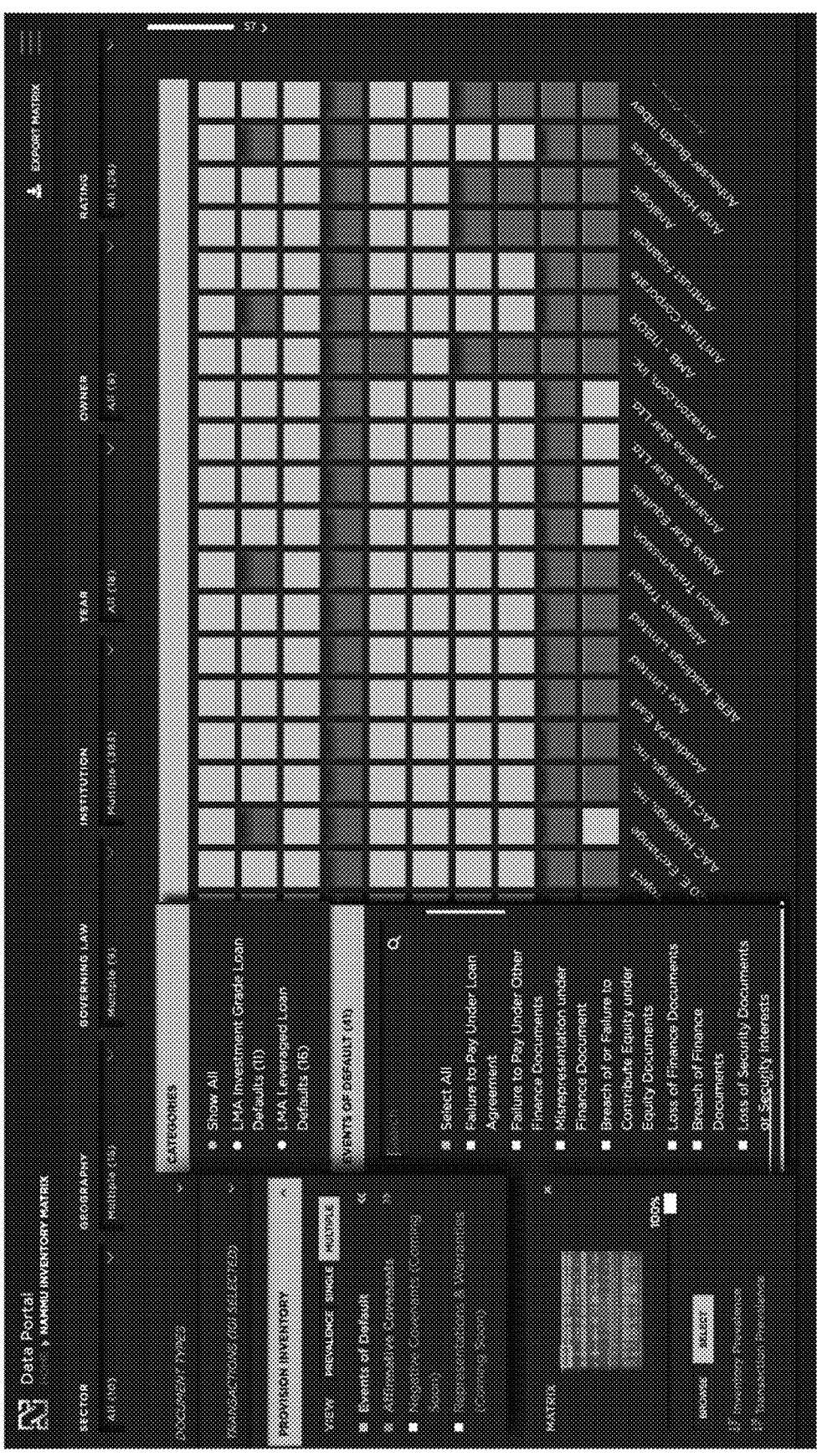
FIG. 11I is an exemplary screenshot illustrating another embodiment of a graphical user interface for presenting the inventory matrix feature of FIG. 2B.

FIGS. 11G-L illustrate additional examples of the inventory matrix 245. FIG. 11G illustrates an exemplary "built" inventory matrix 245 where the user has selected the document type and the inventory using the selection column 1102. The inventory matrix 245 can be viewed as a single inventory or multiple inventories stacked (e.g., events of default, affirmative covenants, negative covenants, and representations/warranties). In a preferred embodiment, the default view is to include a full list of clauses across the provisions with a dropdown to filter the clauses, such as shown in FIGS. 11H-I.

Figure 11J:
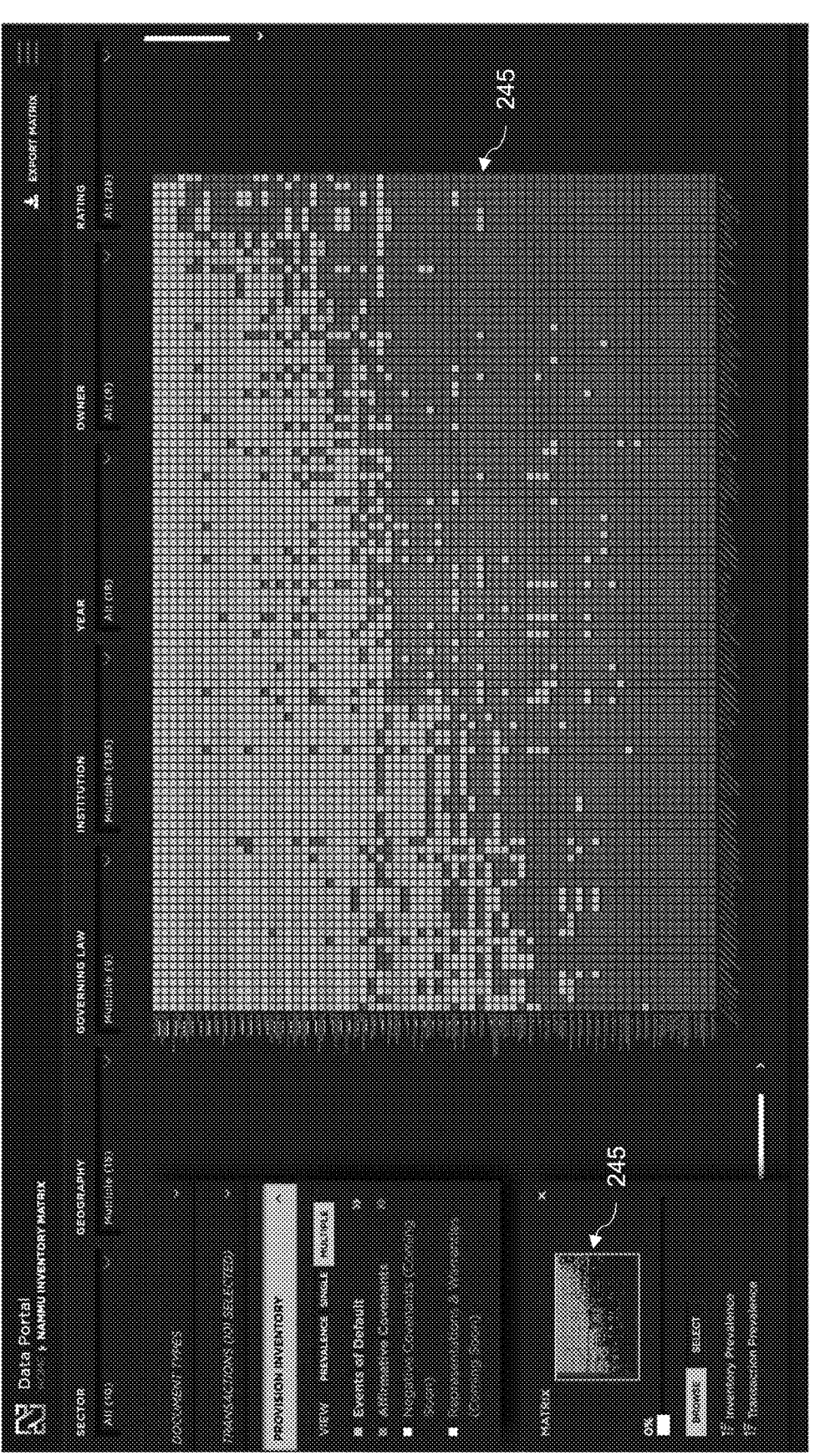
FIG. 11J is an exemplary screenshot illustrating another embodiment of a graphical user interface for presenting the inventory matrix feature of FIG. 2B.
Figure 11K:
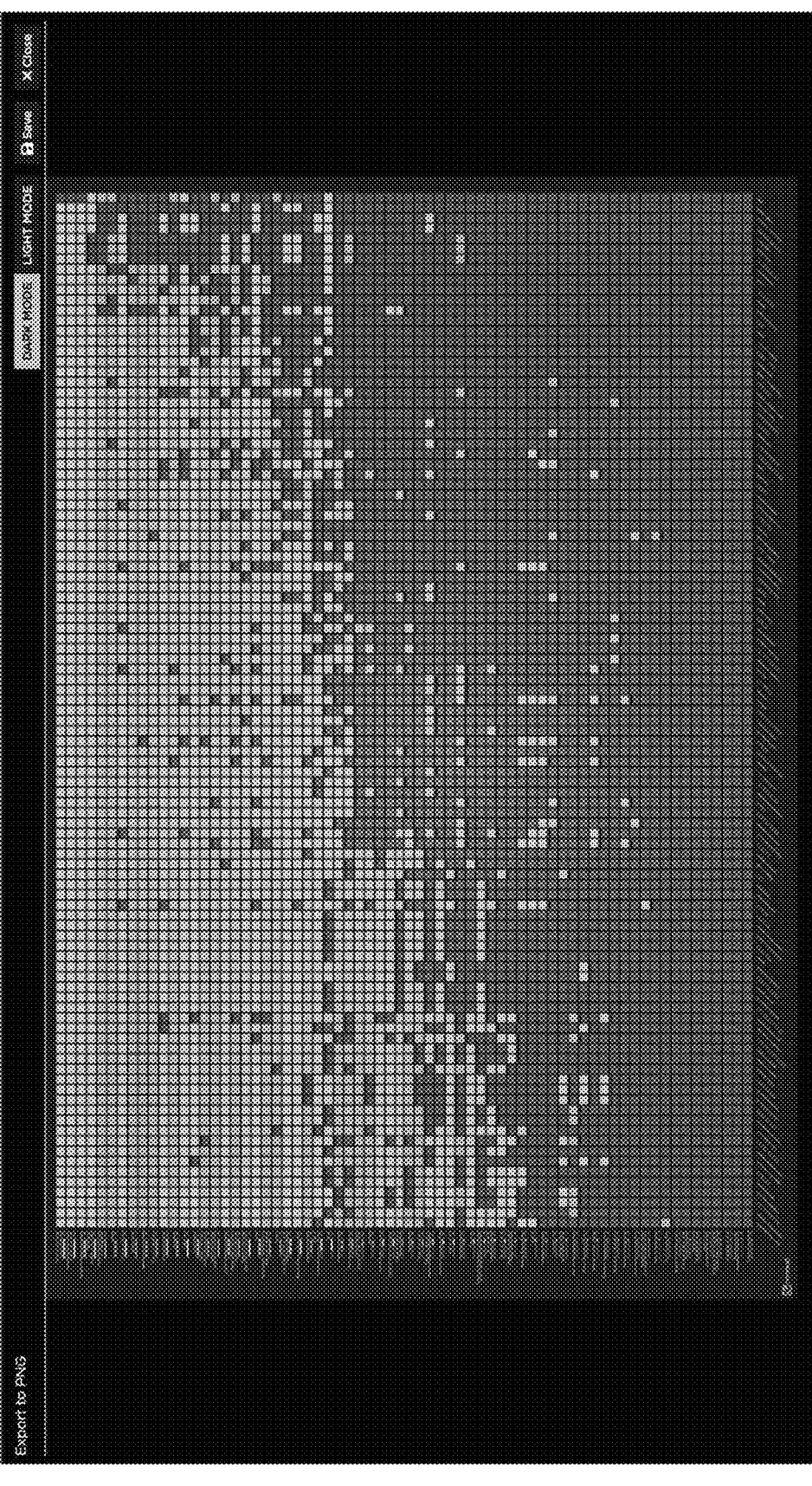
FIG. 11K is an exemplary screenshot illustrating another embodiment of a graphical user interface for presenting the inventory matrix feature of FIG. 2B.

The inventory matrix 245 can also be restructured so the user can view selected transactions (e.g., strongest transactions—those with the most clauses present—or weakest transactions), such as shown in FIG. 11J. As shown in FIG. 11J, a thumbnail version of the inventory matrix 245 is shown at the bottom left of the user interface to review the larger data sets to navigate through the data at scale and speed. In some embodiments, the system 100 can export the inventory matrix 245 as a PDF, Microsoft Word document, Excel spreadsheet, a comma-separated values (CSV) file, and so on, such as shown in FIG. 11K.

Figure 11L:
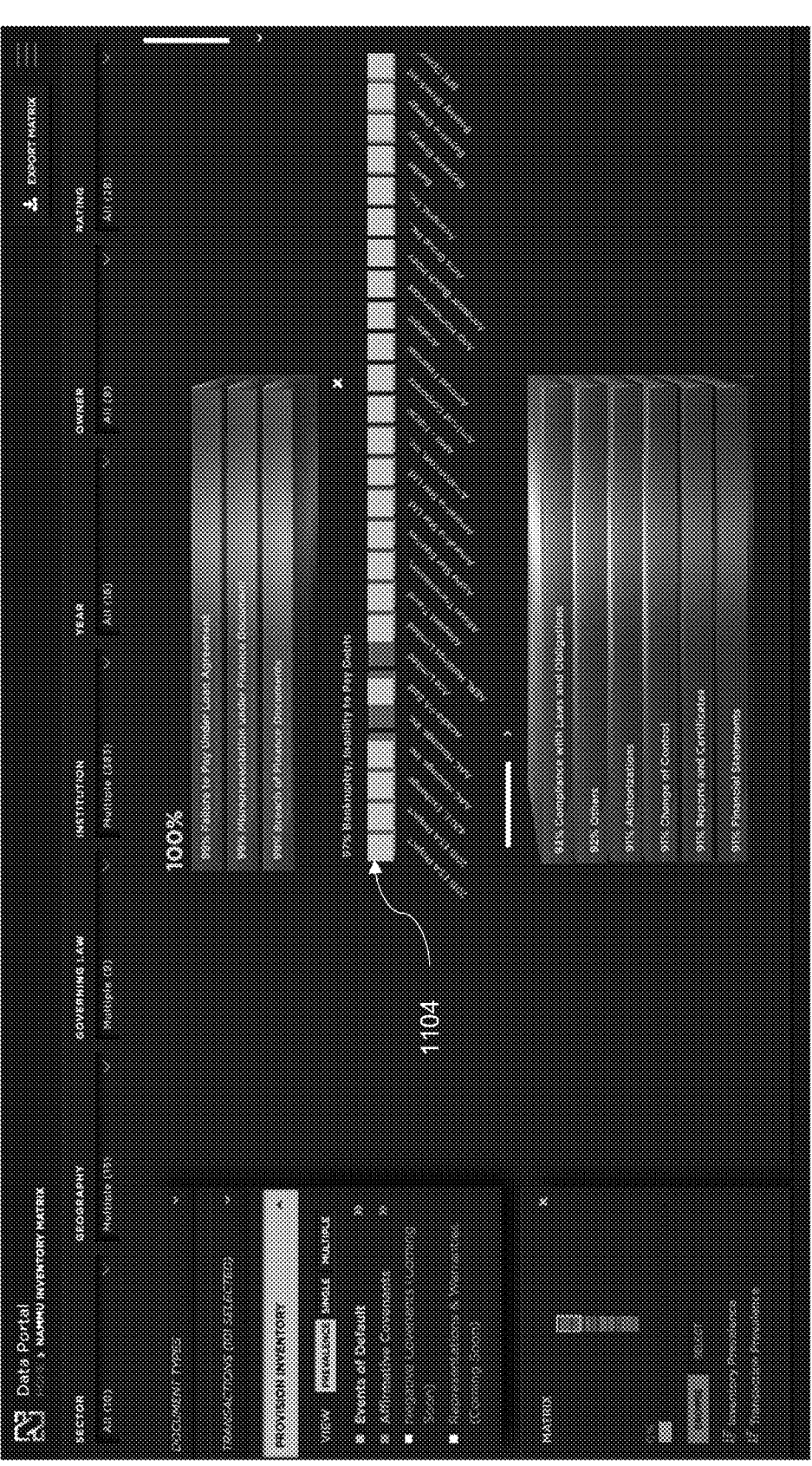
FIG. 11L is an exemplary screenshot illustrating another embodiment of a graphical user interface for presenting the inventory matrix feature of FIG. 2B.

FIG. 11L shows an expanded prevalence bar 1104 that sets out a summary of clause rows from each inventory in the order of prevalence with clauses with the highest prevalence in the data set at the top. For example, the failure to pay under a loan agreement from all loans across all transactions in a data set is shown (i.e., 100%). The system 100 can also export the expanded prevalence bar 1104.

Core Document Metrics

The core document metrics 250 feature can span the three components (e.g., the data frameworks 330, the data aggregation 320, and the operational efficiency 310) described above. The core document metrics 250 feature creates a structure over data sets, enabling efficient and effective review and assessments of both complex terms and conditions in a unique intuitive manner. This type of data structure, data aggregation and operational efficiency ultimately increases productivity and insights improving both focus on critical issues as well as the identification of anomalies and deviations at a speed and scale currently not available in this market.

The core document metrics 250 feature represents a data aggregation and data structure framework which identifies, extracts, quantifies (through a percentage occurrence within the data set), and displays the selected data. The categories of the core document metrics 250 are based on what stakeholders generally look to assess across a transaction portfolio. The core document metrics 250 provide the user with an intuitive presentation of core metrics from equivalent documents across the different transactions contained in the user's data set. The core document metrics 250 feature further enables the user to click into each metric and review the specific language underlying that metric from each relevant document, for example, using the native 210 view, with the benefits of peeks 401 and stacks 402 as further described herein, and compare that language to equivalent provisions within the selected data set utilizing the provision carousel described herein.

Conventionally, there is no simple, efficient method of accessing metrics across a portfolio of documents. Any attempt to create some form of metrics assessment of a portfolio or data set would be manual with any data identification, data aggregation, and data quantification being a manual process. If a decision to create this type of analysis framework was made by a transaction stakeholder this process would be ad-hoc requiring transaction stakeholders and/or their advisors to physically search through all relevant documents and manually aggregate the data points and then do the calculations to determine the metrics. This bespoke process, if attempted, would be inaccurate, cumbersome, time-consuming, not scalable, costly, and would ultimately result in static data with immediately diminishing use and value as it would be out-of-date immediately and therefore instantly limited in its use-case and users.

The core document metrics 250 feature automatically performs this function, with the user immediately being able to determine the identified metric and analyze, compare, and contrast the relevant provisions, resulting in an ability to make decisions at speed and with accuracy and precision. This efficiency is currently not contemplated in the market as it is regarded to be impossible and overly complex to construct.

Figure 12B:
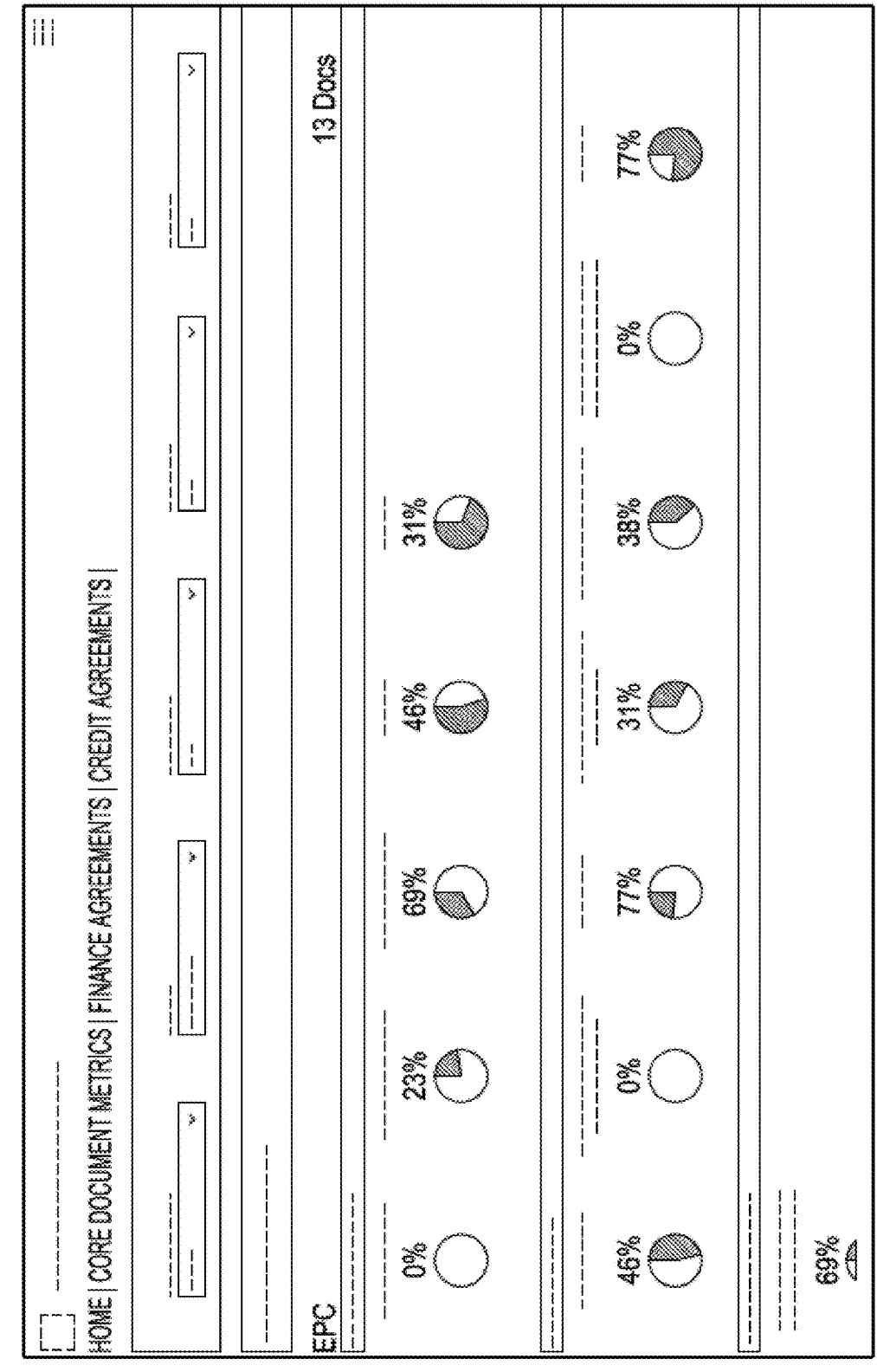
FIG. 12B is an exemplary screenshot illustrating another embodiment of a graphical user interface for presenting the core document metrics feature of FIG. 2B.

FIGS. 12A-D illustrate exemplary screenshots showing the presentation of the core document metrics 250 of exemplary documents. FIG. 12A illustrates the core document metrics 250 for a loan agreement. The core document metrics 250 aggregate equivalent provisions across equivalent documents from a portfolio and/or data set to provide metrics for those provisions. In some embodiments, the metrics can be further refined by predetermined filters (e.g., document type, sector, geography, products, clients, and so on). The core document metrics 250 for a construction contract are shown in FIG. 12B.

Figure 12C:
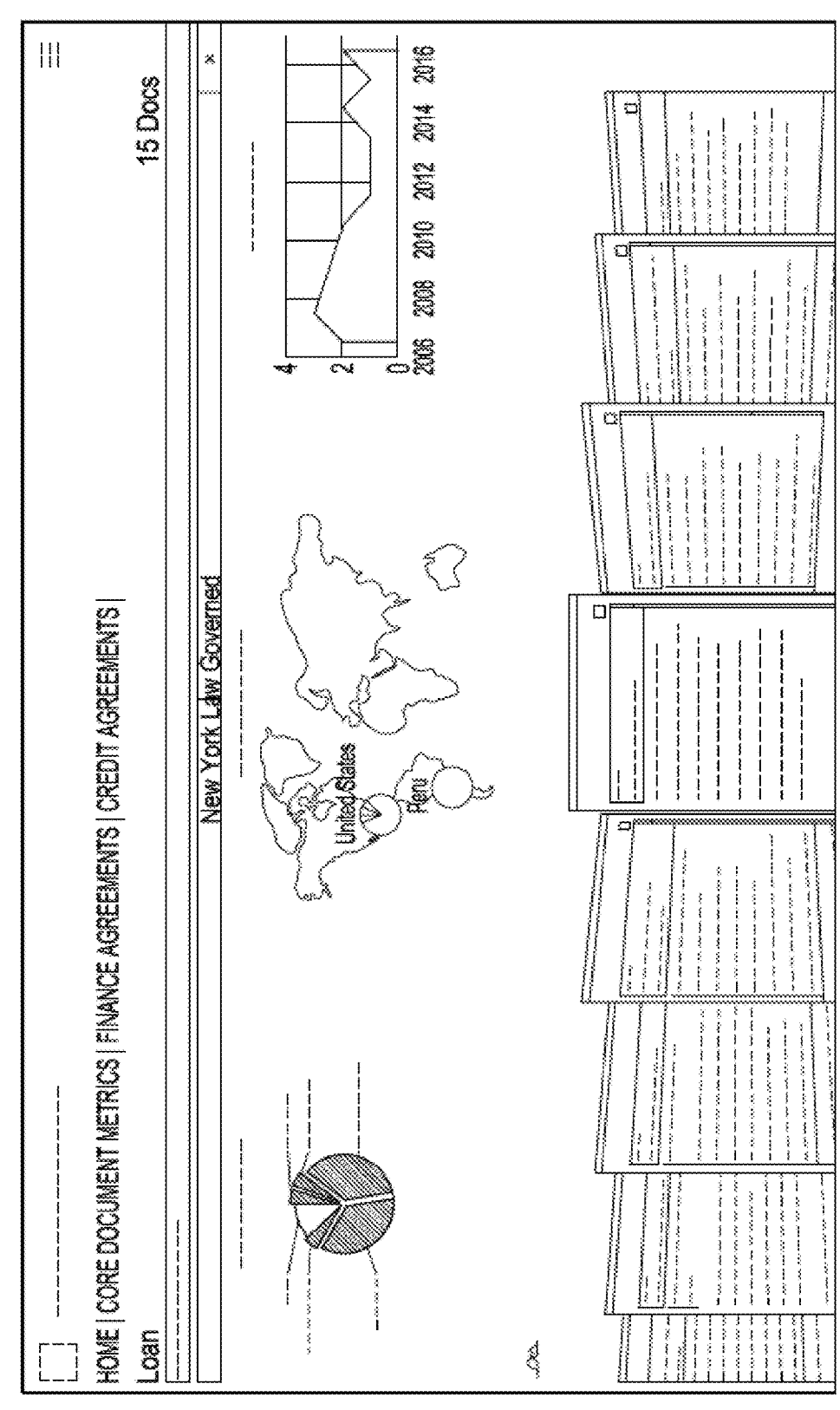
FIG. 12C is an exemplary screenshot illustrating another embodiment of a graphical user interface for presenting the core document metrics feature of FIG. 2B.
Figure 12D:
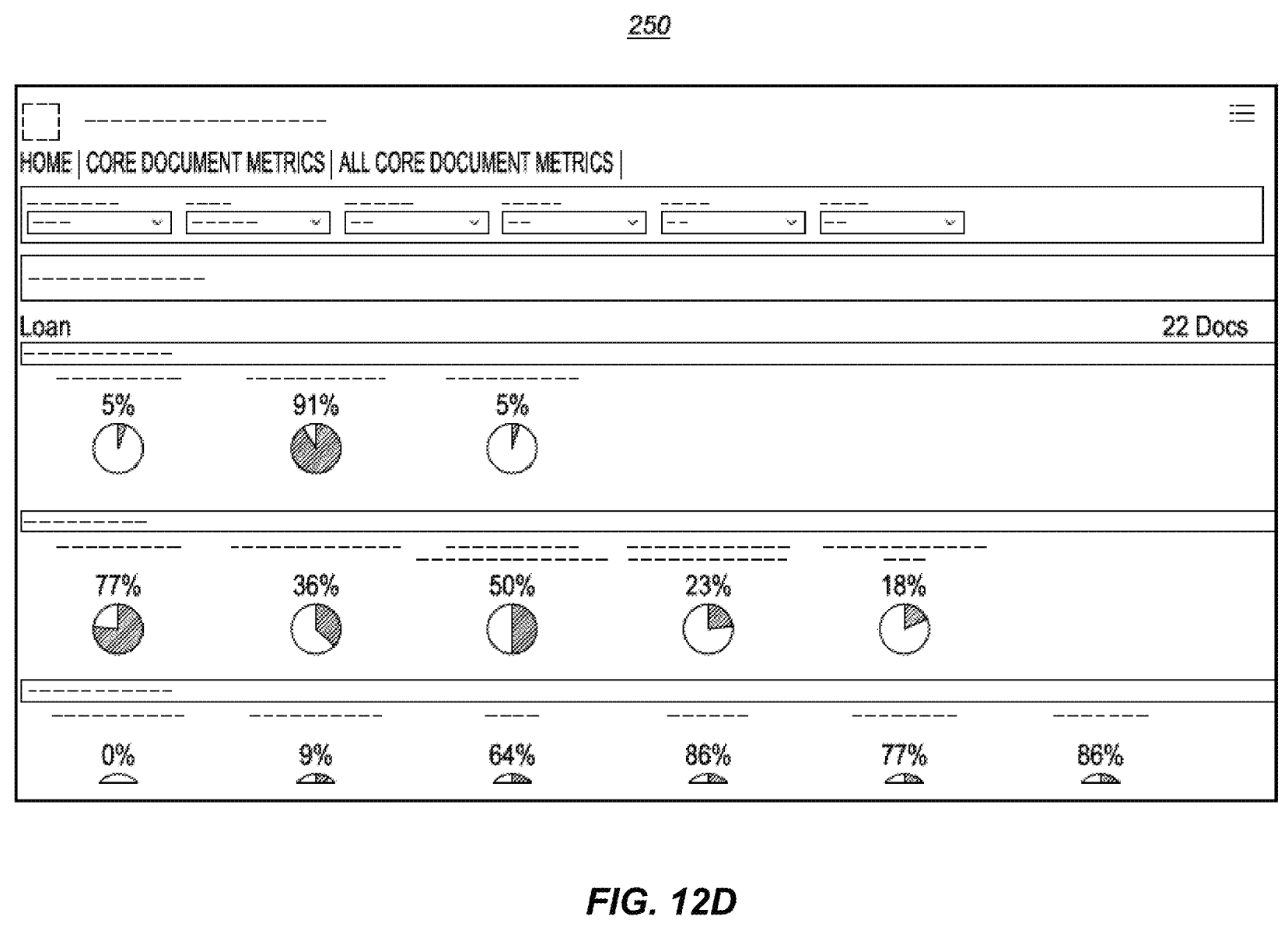
Figure 12E:
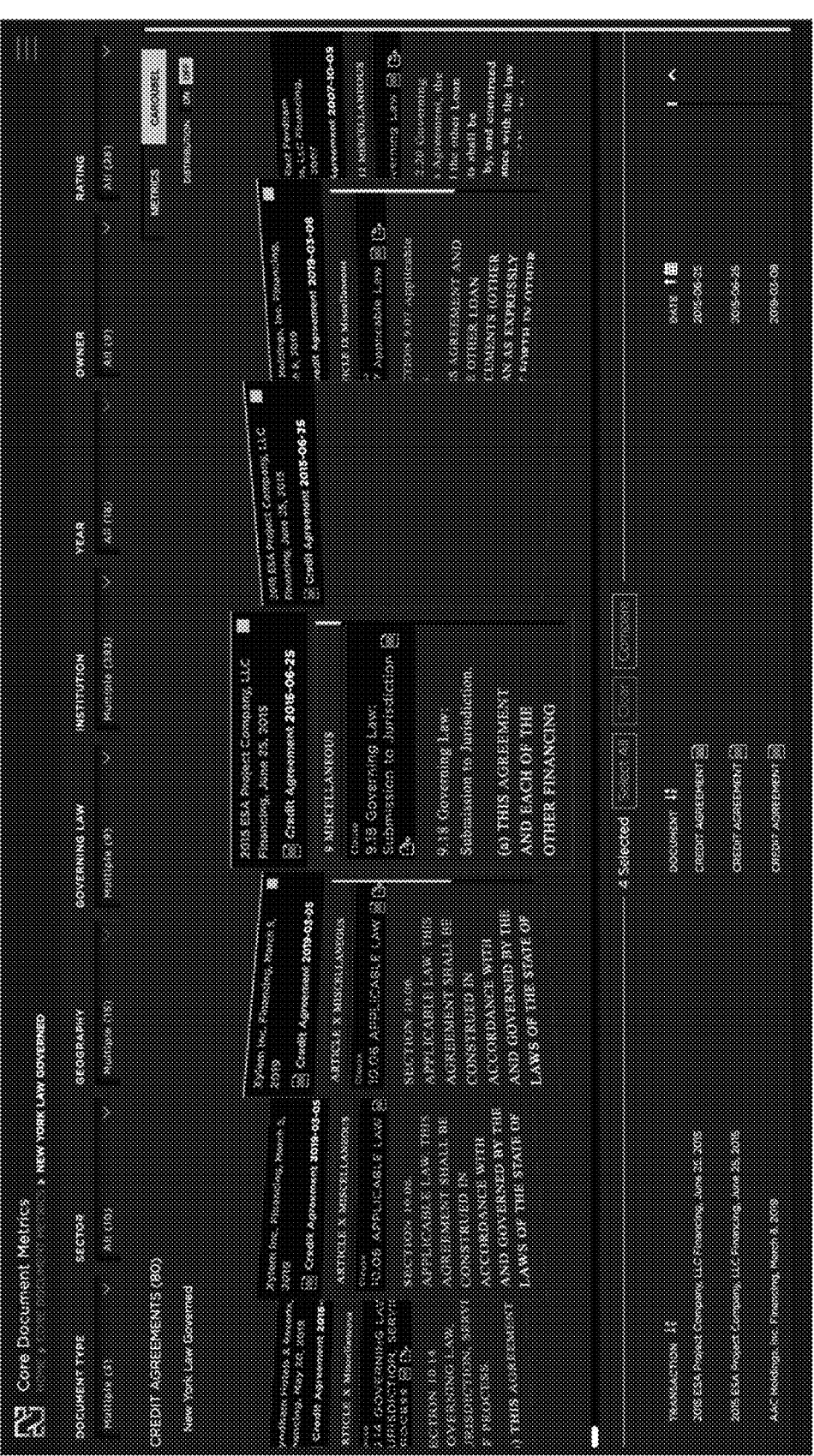
FIG. 12E is an exemplary screenshot illustrating another embodiment of a graphical user interface for presenting the core document metrics feature of FIG. 2B.
Figure 12F:
FIG. 12F is an exemplary screenshot illustrating another embodiment of a graphical user interface for presenting the core document metrics feature of FIG. 2B.
Figure 12G:
FIG. 12G is an exemplary screenshot illustrating another embodiment of a graphical user interface for presenting the core document metrics feature of FIG. 2B.

A particular measure can be selected to extract the relevant language for the selected metric (e.g., a loan metric of governing law and jurisdiction), such as shown in FIG. 12C. With reference to FIG. 12C, detailed data for the selected metric is provided and relevant language can be extracted and displayed in the provision carousel 255. Peeks 401 and stacks 402 can be enabled. FIG. 12D illustrates another exemplary embodiment of a user interface presenting the core document metrics 250 of exemplary documents and showing an optional filter for the governing law. FIGS. 12E-G illustrate additional examples of screenshots showing the presentation of the core document metrics 250 of the documents shown in FIGS. 12A-D. In FIG. 12E, the provision carousel 255 includes a list of transactions with the filters 1101. FIG. 12F shows a metric distribution geographically, across sectors and over time. Clicking into any of the distribution graphics adjusts the transaction lists below so only the relevant transactions are listed for the user. FIG. 12G illustrates a summary of metrics outside of the core document metrics 250 feature in the data portal 130. This view is a synthesis of features—the multi-document windows 420 with the core document metrics 250 feature.

Provision Carousel

The provision carousel 255 feature encapsulates at least the data aggregation 320 and the operational efficiency 310 components described above. The provision carousel 255 represents an innovative framework that creates a structure over provisions across transactions, enabling efficient and effective review and assessments of both complex terms and conditions in a unique intuitive manner. This type of workflow organization and structure, data aggregation and operational efficiency ultimately increases productivity and insights improving both focus on critical issues as well as the identification of anomalies and deviations at a speed and scale currently not available in this market.

The provision carousel 255 is an automatic, fluid, and immediate way for a user to access and review relevant provisions across equivalent documents within a data set. It gives the user the ability to flip through the relevant "cards" in the "carousel" with each card representing a separate transaction and setting out the relevant provision from that transaction, and to review the language of that provision. The user can also select the cards it wants to review in further detail by clicking on those cards, which are then presented to the user separately from the "carousel", enabling the language in the provisions across the selected transactions to be reviewed more thoroughly. More than one card can be selected by the user, enabling a detailed comparative review of the language of a particular provision across the selected transactions.

In other words, the provision carousel 255 feature identifies and aggregates the data to provide an intuitive, dynamic view of selected provisions across a set of related documents from different transactions within a portfolio. In some embodiments, when the user selects the provisions to review in further detail, those provisions can be presented side-by-side. This enables an immediate review, comparison and assessment of the identified and extracted provisions. The use of peeks 401 and stacks 402 is also enabled in this view.

The provision carousel 255 feature can use the native 210 view described herein, with embedded peeks 401 and stacks 402, and provide an organized and systematic framework through which to review, examine and assess equivalent provisions, creating significant operational efficiencies for the user. In some embodiments, the provision carousel 255 feature can be incorporated into other features (e.g., the inventory matrix 235 and the core document metrics 250 feature), thereby enabling additional functionality of both those features as described herein.

Conventional solutions to identify and extract equivalent provisions across equivalent documents from different transactions are manual and extremely time-consuming. These conventional approaches require teams of people to review documents across multiple transactions with limited search functionality for moving through provisions, definitions, and cross-references. In order to identify the provisions and compare the language, transaction stakeholders and/or their advisors are required to physically search through all relevant documents and manually create tables or spreadsheets of comparable language. For all data sets and particularly large data sets, it is costly, time-consuming, prone to errors, and ultimately not scalable. In addition, there are no real tools or features in the market for a user to meaningfully use or access this type of detailed and comprehensive data at scale—to the extent any institution undertook the creation of this type of provision aggregation and categorization it would be limited in its use-case and users.

The provision carousel 255 transforms the conventional method, enabling for much greater speed in document review with immediate access to provisions, definitions, and cross-references within a document across multiple transactions.

Figure 13A:
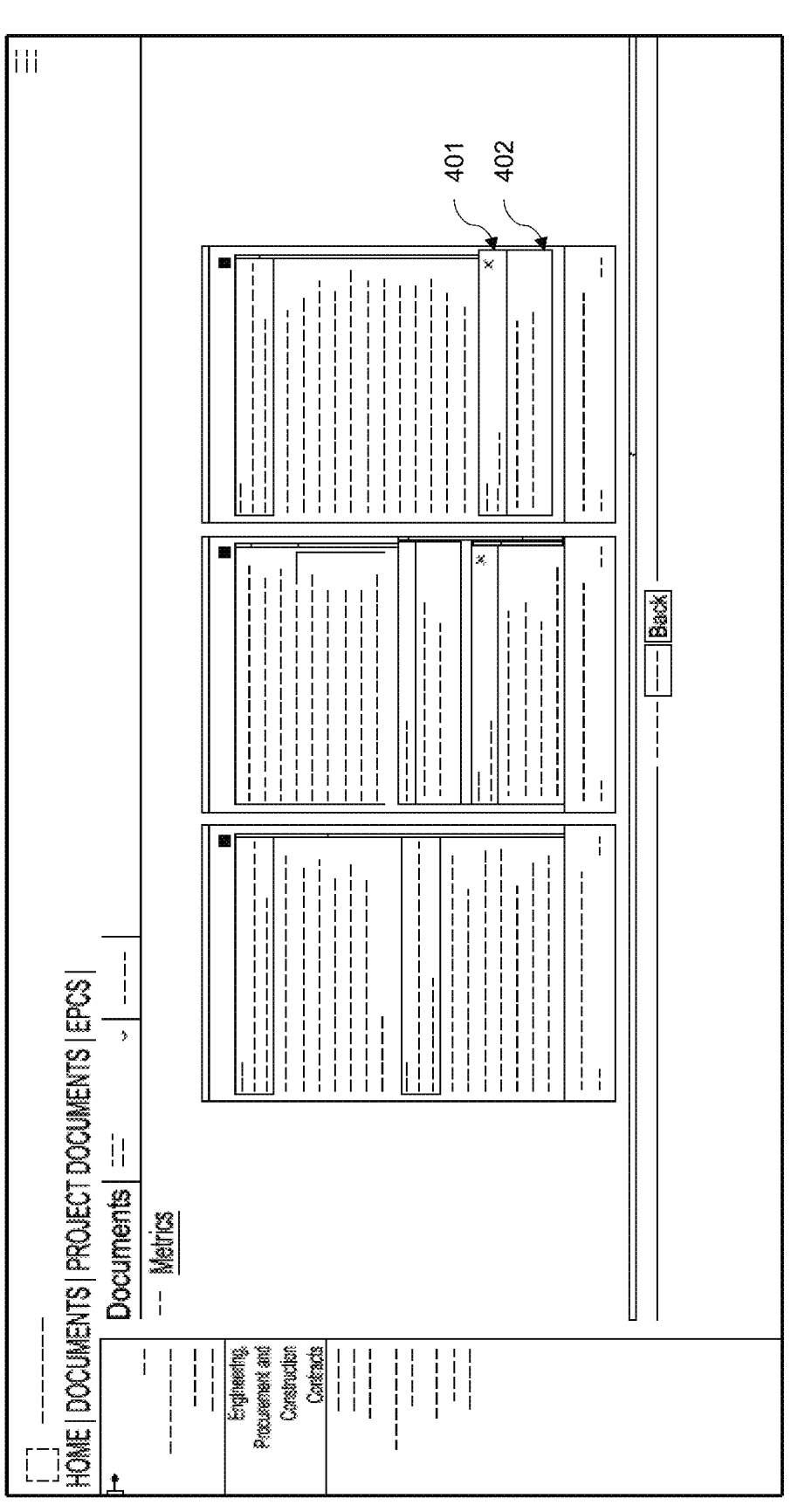
FIG. 13A is an exemplary screenshot illustrating another embodiment of a graphical user interface for presenting the provisional carousel feature of FIG. 2B.
Figure 13B:
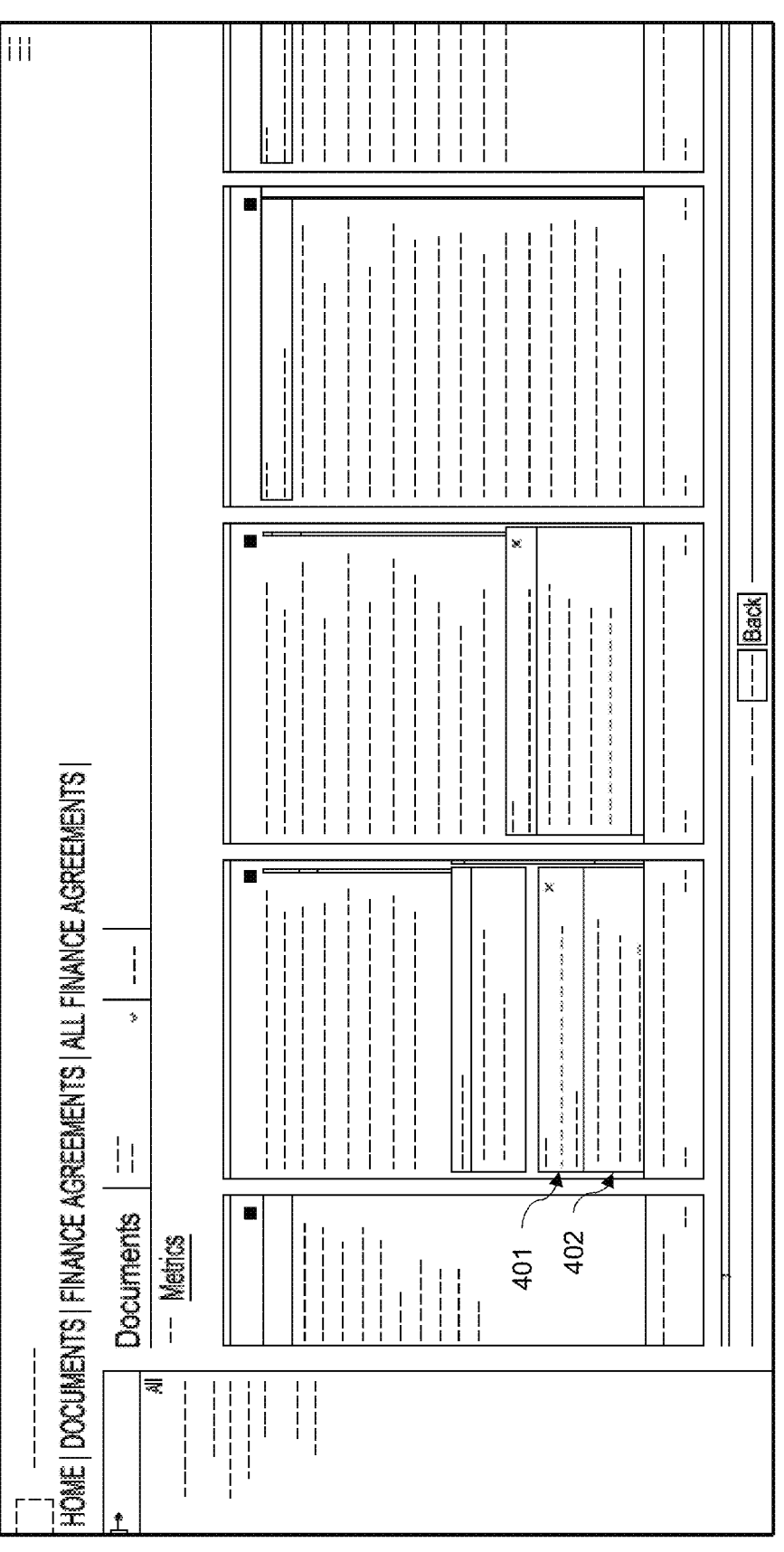
FIG. 13B is an exemplary screenshot illustrating another embodiment of a graphical user interface for presenting the provisional carousel feature of FIG. 2B.
Figure 13C:
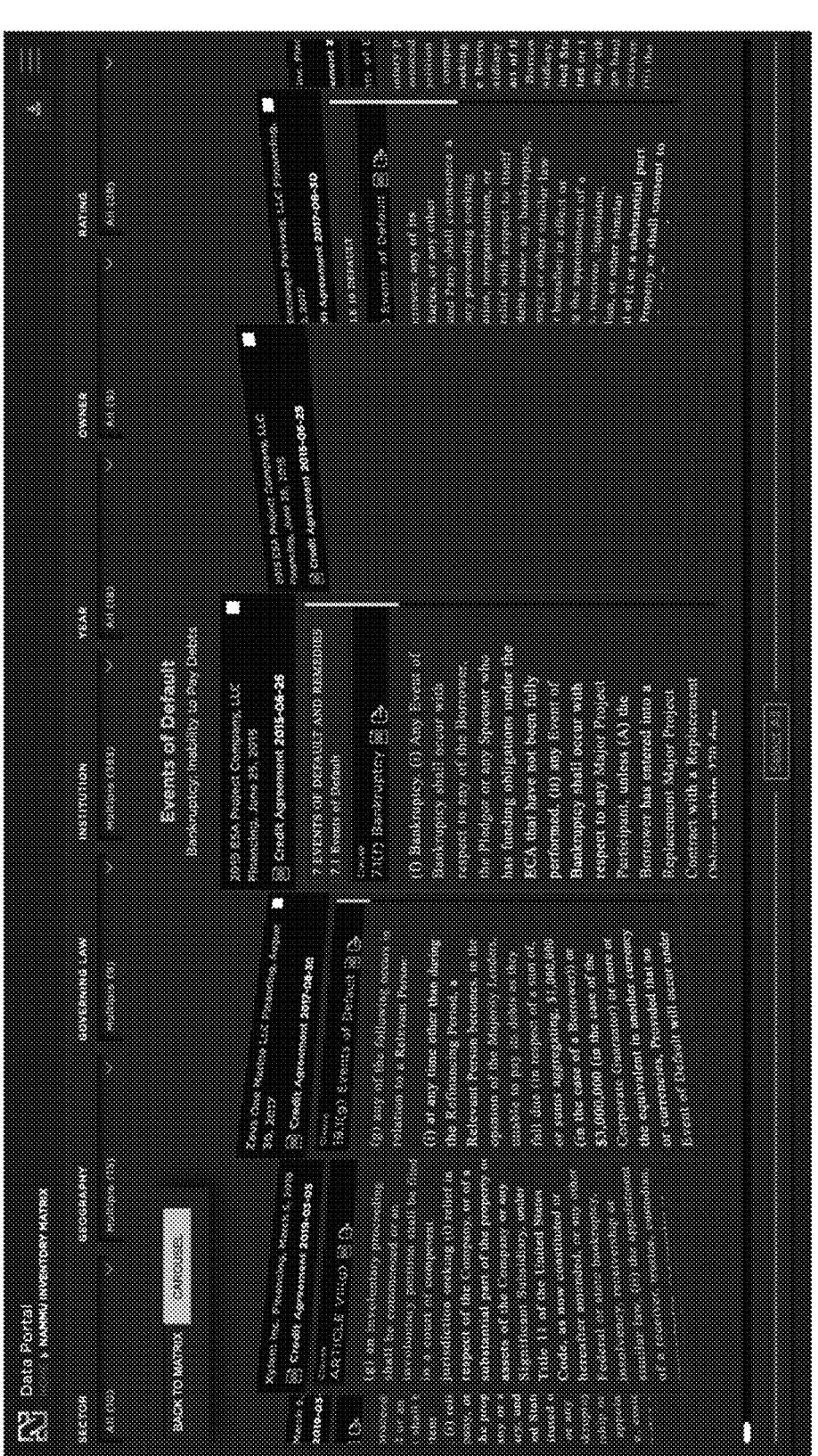
FIG. 13C is an exemplary screenshot illustrating another embodiment of a graphical user interface for presenting the provisional carousel feature of FIG. 2B.
Figure 13D:
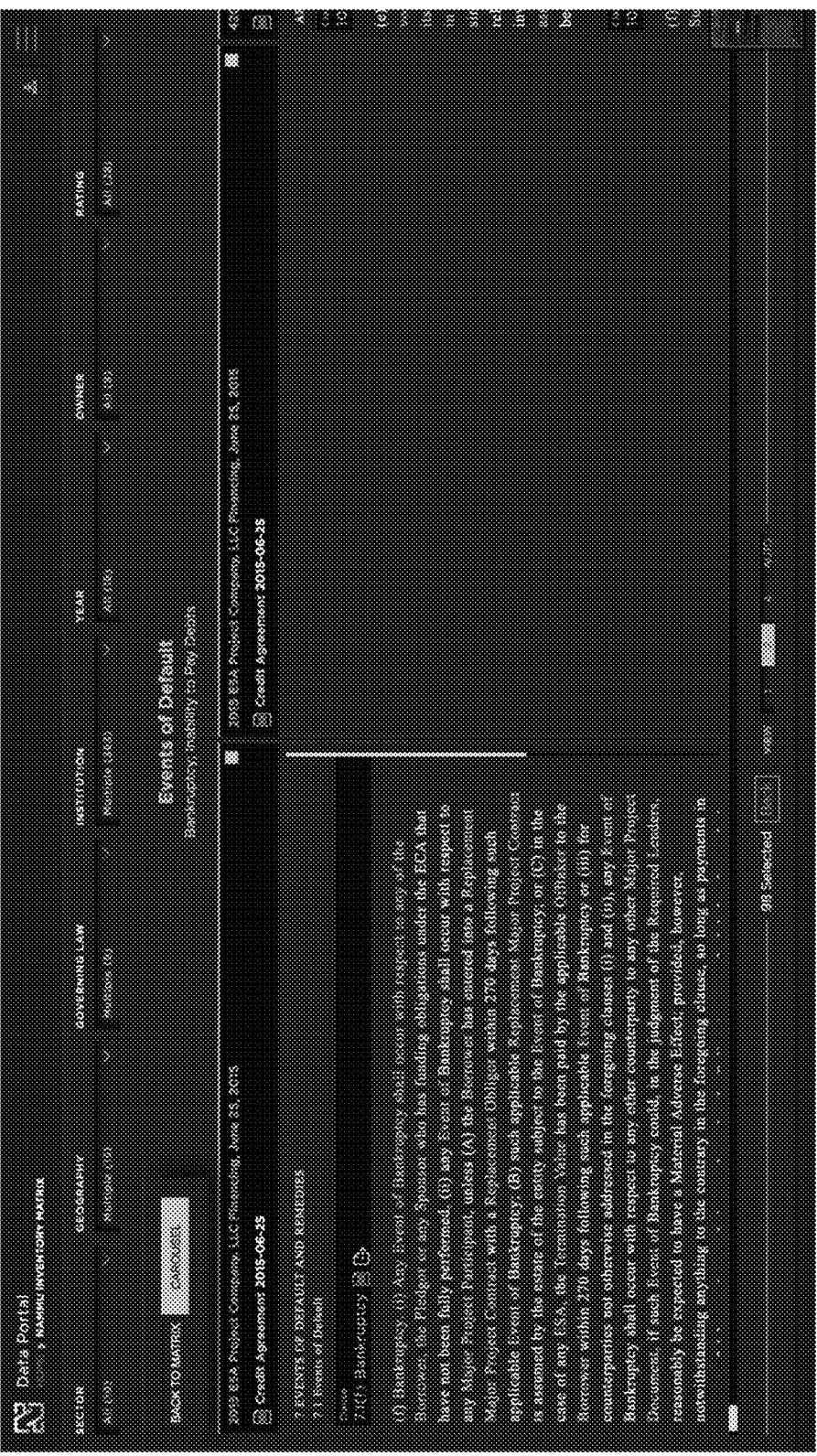

FIGS. 13A-D illustrate exemplary screenshots showing the presentation of the provision carousel 255 of exemplary documents. For example, FIGS. 13A-B illustrate an exemplary presentation of the provision carousel 255, with peeks 401 and stacks 402. FIG. 13C illustrates another exemplary embodiment of the provisional carousel 255, wherein users can scroll at the bottom of the screen to move between carousel cards. In some embodiments, a multi-state toggle view can be used to view one or more cards at a time. For example, FIG. 13D illustrates a selection of groups of two cards.

Sector breakdowns enable the user to identify the relevant sectors (e.g., power, oil, and gas) of the documents/transactions within the dataset in which a metric is being identified. This provides key data points to help the user determine the value of that metric for a particular market segment.

Geographic breakdowns, such as using a map and pie charts, enable the user to identify the relevant geographic locations of the documents/transactions within the dataset in which the metric is being identified. This provides key data points to help the user determine the value of that metric for a particular geography.

Metric trends over time, using a graph, enable the user to identify the trend of the prevalence of that metric across the documents within the dataset in which the metric is being identified. This provides key data points to help the user determine the value of that metric for a particular period of time and its trend over time.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A computer-implemented method for presenting a graphical user interface for transaction management, review, and analysis, the method comprising:

receiving, at a document structure parser of a computing device associated with at least one natural language processor as part of a natural language processing system, an original form of a transaction document of a plurality of transaction documents associated within a single transaction, the computing device comprising a processor, a memory, and a display screen;

parsing, via the natural language processing system of the document structure parser, the received original form of the transaction document to generate an electronic transaction document;

maintaining, by a document management database, the parsed electronic transaction document in the memory as a data set, wherein the electronic transaction document creates an indexing data structure of interconnected data across a plurality of stored data sets that further refines intra-document and inter-document connection points in real-time using at least one embedded data filter schema associated with the natural language processing system; and displaying, by the graphical user interface of the display screen, a listing of portals including a transaction portal, a management portal, and a data portal, each of the portals executing a plurality of selected review features to launch the respective feature, wherein launching the plurality of selected review features causes the graphical user interface to display a dynamic and simultaneous multi-window graphical representation of the electronic transaction document that is unique from an original form of the electronic transaction document and at least one previously stored electronic transaction document indicated as an equivalent document by the natural language processing system that is connected to at least one of the single transaction or a document of the same type across a different transaction, and wherein the plurality of selected review features comprises a core provision framework feature and a provision stacks feature, launching the core provision framework feature causes the graphical user interface to highlight one or more key terms and conditions identified from the document as a framework of classification based on accessing similar terms and conditions across equivalent documents as determined by the document analyzer and the natural language processing system to enable a structured automated navigation schema within the electronic transaction document, launching the provision stacks feature causes the graphical user interface to further display a top-level classification of the electronic transaction document organized into the indexing data structure using the structured automation navigation schema that includes one or more sections of provisions from the original form of the electronic transaction document and also causes the graphical user interface to display one or more peeks of the electronic transaction document, wherein a selected peek exposes at least one of a cross-reference or a defined term identified from the electronic transaction document based on the organization of the electronic transaction document into the indexing data structure.

2. The method of claim 1, wherein the plurality of selected review features further comprise the core provision framework feature and a compliance feature, and launching the compliance feature causes the graphical user interface to display provisions relating to one or more compliance requirements from the electronic transaction document based on identified core provisions from the core provision framework and using the structured automation navigation schema.

3. The method of claim 1, wherein the plurality of selected review features further comprise the core provision framework feature and a provision inventory feature, and launching the provision inventory feature causes the graphical user interface to display a further classification of the top-level classification of the provision stacks feature.

4. The method of claim 3, wherein the plurality of selected review features further comprises a prevalence determination feature, and launching the prevalence determination feature causes the graphical user interface to display an identification of a frequency of each classified top-level classification using one or more predetermined benchmarks.

5. The method of claim 4, wherein the one or more predetermined benchmarks comprises at least one of a region and a sector.

6. The method of claim 3, wherein the plurality of selected review features further comprise an inventory matrix feature, and launching the inventory matrix feature causes the graphical user interface to display an aggregate of one or more top-level classifications across multiple transactions.

7. The method of claim 1, wherein said displaying by the graphical user interface comprises further displaying one or more stacks for the selected peek, wherein a selected stack embeds the cross-reference or the defined term identified from the electronic transaction document within the selected peek.

8. The method of claim 1, wherein said displaying by the graphical user interface comprises further displaying one or more carousel cards, wherein a selected carousel card includes the identified core provisions and extracted provisions from the electronic transaction document.

9. The method of claim 1, wherein the plurality of selected review features further comprises of the core provision framework feature and a knowledge framework feature, and launching the knowledge framework feature causes the graphical user interface to present to the user comparative data based on content identified from the electronic transaction document and from one or more equivalent documents from a unique transaction.

10. The method of claim 1, wherein the plurality of selected review features further comprises of the core provision framework feature and a core document metrics feature, and launching the core document metrics feature causes the graphical user interface to present core metrics from the equivalent documents from one or more unique transactions based on provisions from the electronic transaction document.

11. The method of claim 1, further comprising exporting, via the computing device, data on the display screen of the graphical user interface into at least one of a portable document format (PDF) file, a Microsoft Word document file, a spreadsheet file, and a comma-separated values (CSV) file.

12. A system for presenting a graphical user interface for transaction management, review, and analysis, the system comprising:

a computing device comprising a processor, memory, and a display screen, the computing device being configured to display by the graphical user interface on the display screen a listing of portals including a transaction portal, a management portal, and a data portal, each of the portals executing a plurality of selected review features to launch the respective feature;

a document structure parser, associated with at least one natural language processor as part of a natural language processing system, of the computing device for receiving an original form of a transaction document of a plurality of transaction documents associated within a single transaction, and parsing the received original form of the transaction document via the natural language processing system of the document structure parser to generate an electronic transaction document that is stored in the memory as a data set, wherein the electronic transaction document creates an indexing data structure of interconnected data across a plurality of stored data sets that further refines intra-document and inter-document connection points in real-time using at least one embedded data filter schema associated with the natural language processing system;

a document analyzer in operable communication with the document structure parser; and a document management database for maintaining the electronic transaction document based on parsing the original form of the transaction document via the natural language processing system of the document structure parser, wherein launching the plurality of selected review features causes the graphical user interface to display a dynamic and simultaneous multi-window graphical representation of the electronic transaction document that is unique from an original form of the electronic transaction document and at least one previously stored electronic transaction document indicated as an equivalent document by the natural language processing system that is connected to at least one of the single transaction or a document of the same type across a different transaction, and wherein the plurality of selected review features comprises a core provision framework feature and a provision stacks feature, launching the core provision framework feature causes the graphical user interface to highlight one or more key terms and conditions identified from the document as a framework of classification based on accessing similar terms and conditions across equivalent documents as determined by the document analyzer and the natural language processing system to enable a structured automated navigation schema within the electronic transaction document, launching the provision stacks feature causes the graphical user interface to further display a top-level classification of the electronic transaction document organized into the indexing data structure using the structured automation navigation schema that includes one or more sections of provisions from the original form of the electronic transaction document and also causes the graphical user interface to display one or more peeks of the electronic transaction document, wherein a selected peek exposes at least one of a cross-reference or a defined term identified from the electronic transaction document based on the organization of the electronic transaction document into the indexing data structure.

\* \* \* \* \*